United States Patent [19]

Doelz

[11] 4,156,798

[45] May 29, 1979

[54] SMALL PACKET COMMUNICATION NETWORK

[76] Inventor: Melvin L. Doelz, 2015 Galatea Ter., Corona del Mar, Calif. 92625

[21] Appl. No.: 828,976

[22] Filed: Aug. 29, 1977

[51] Int. Cl.$^2$ .................... H04Q 9/00; H04L 11/20
[52] U.S. Cl. .................. 179/15 AL; 178/3; 358/257
[58] Field of Search ............ 340/147 R; 364/200, 364/900; 179/15 AL, 15 AQ, 15 AF, 15 BS, 15 BA, 18 EA; 178/2 C, 2 R, 3, 4.1 R, 4.1 B; 358/257, 256

[56] References Cited

U.S. PATENT DOCUMENTS

| | | | |
|---|---|---|---|
| 3,979,733 | 9/1976 | Fraser | 179/15 AQ |
| 4,031,512 | 6/1977 | Faber | 179/15 AL |
| 4,049,906 | 9/1977 | Hafner et al. | 178/2 C |
| 4,058,672 | 11/1977 | Crager et al. | 358/257 |
| 4,058,838 | 11/1977 | Crager et al. | 358/257 |
| 4,071,706 | 1/1978 | Warren | 179/15 BS |
| 4,074,232 | 2/1978 | Otomo et al. | 179/15 BA |

*Primary Examiner*—Thomas A. Robinson
*Attorney, Agent, or Firm*—Fraser and Bogucki

[57] ABSTRACT

A highly efficient and modular communication network includes a small number of different exchange units including a network controller exchange unit, line master exchange units, line exchange units and terminal exchange units. For high volume, low cost manufacture and ease of maintenance, the exchange units are in turn comprised of a few standard modules such as a microprocessor unit, a RAM unit, a PROM unit and 2 port adapter units. A combination of high communication efficiency and rapid response is attained using small, address carrying data blocks which are threaded through one or more addressable micronodes along a communications channel. A predetermined communication discipline using fixed length blocks and a single start bit per block minimizes data block overhead to maintain a high communication efficiency notwithstanding the small data block size.

113 Claims, 23 Drawing Figures

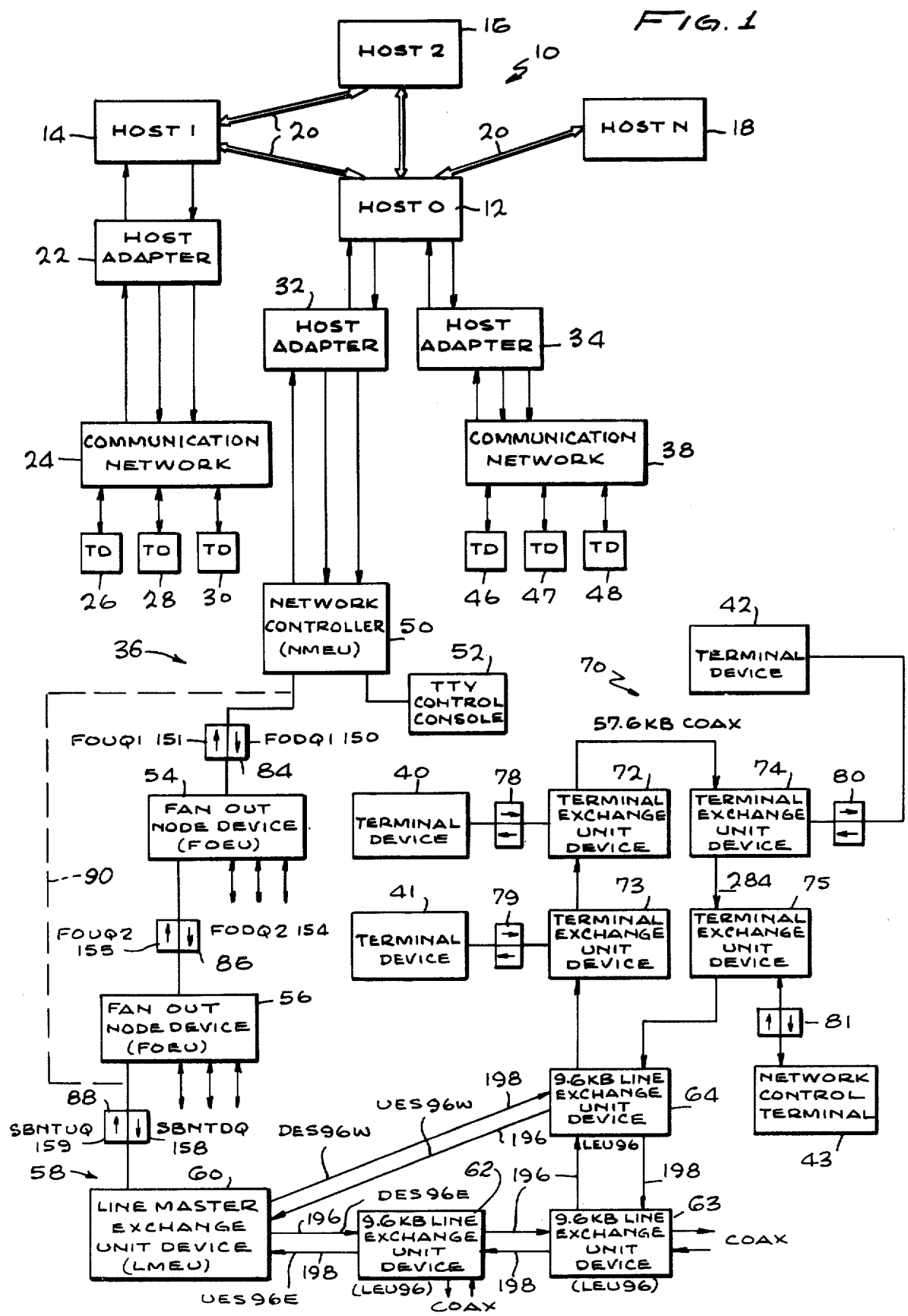

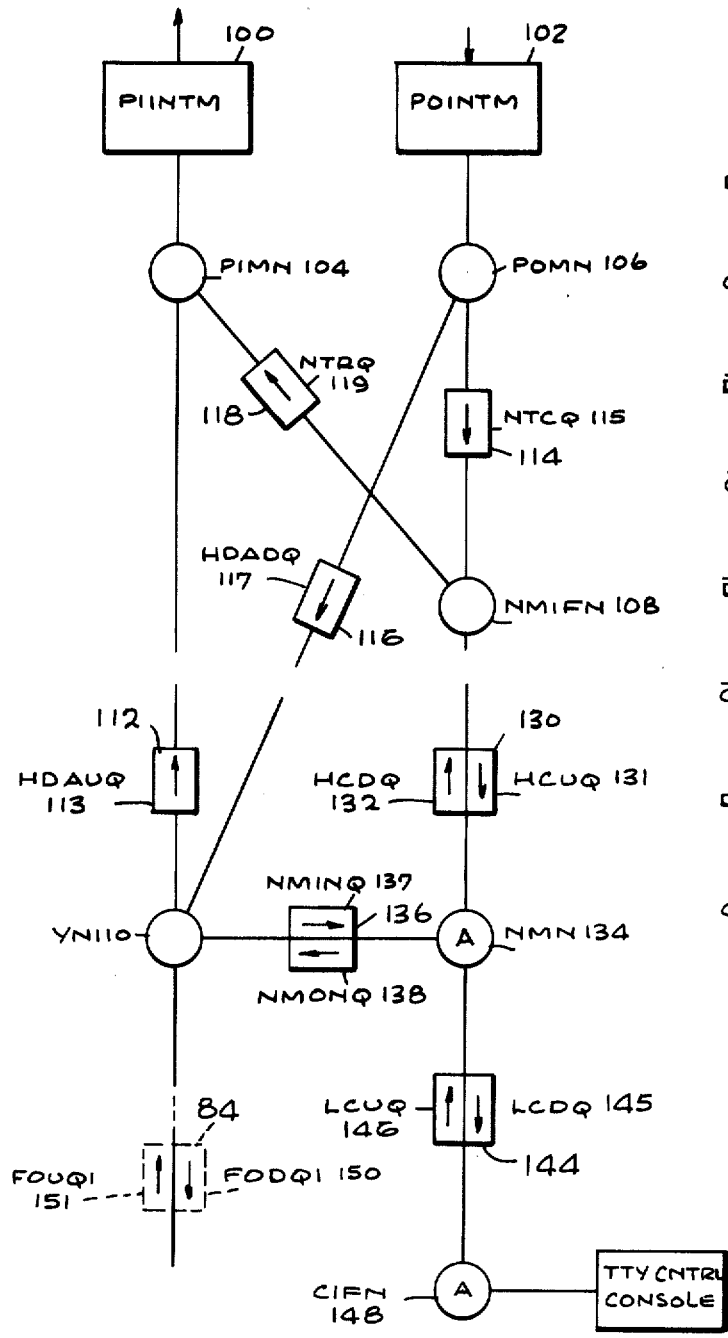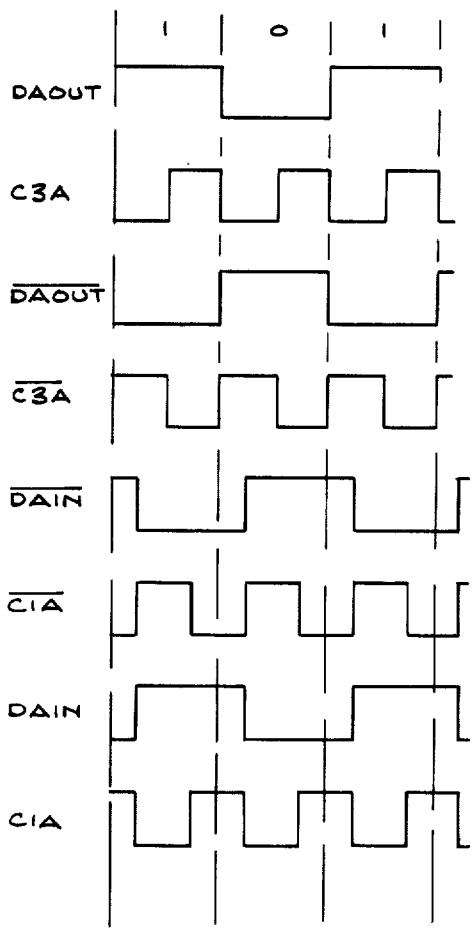

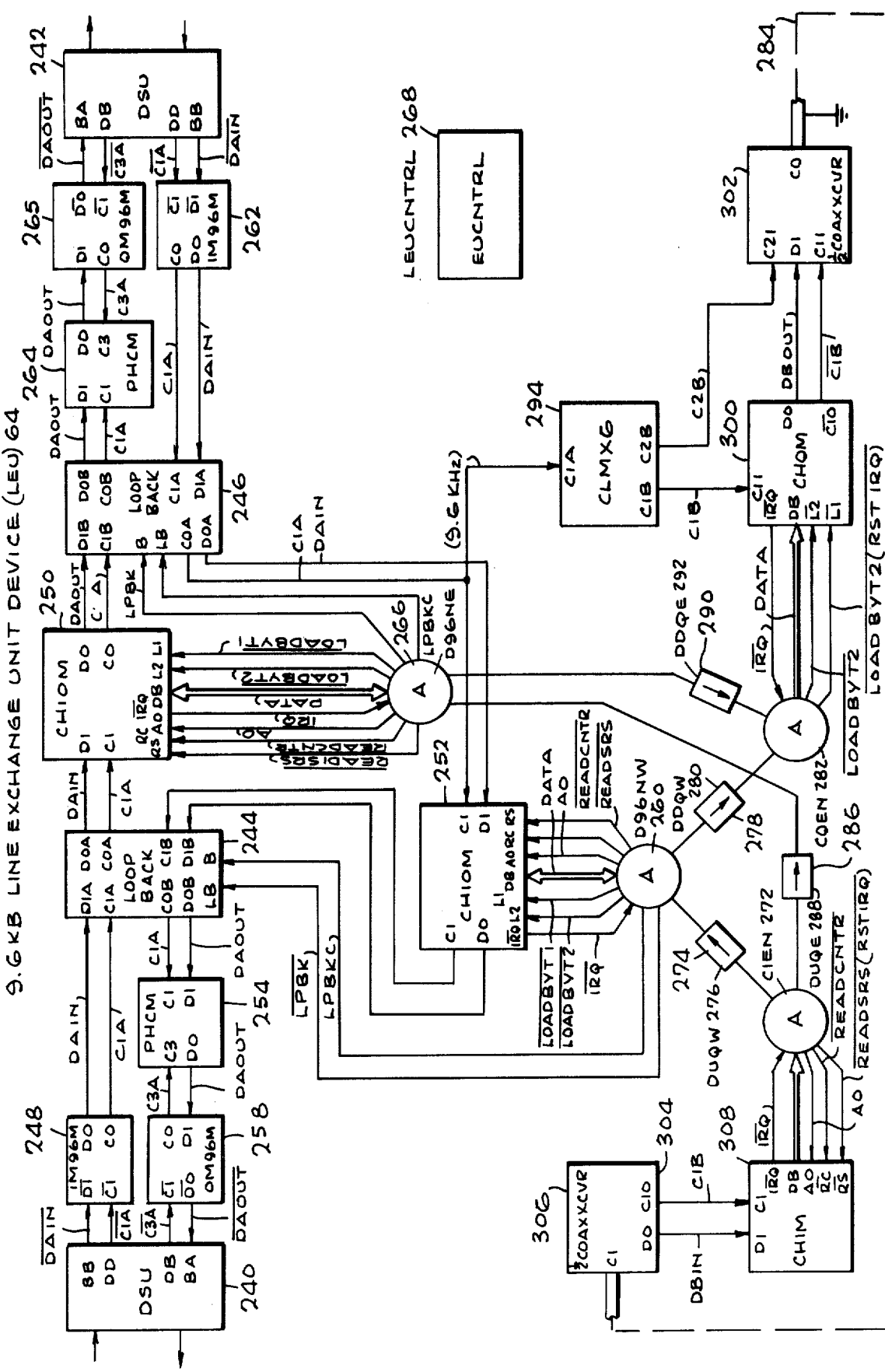

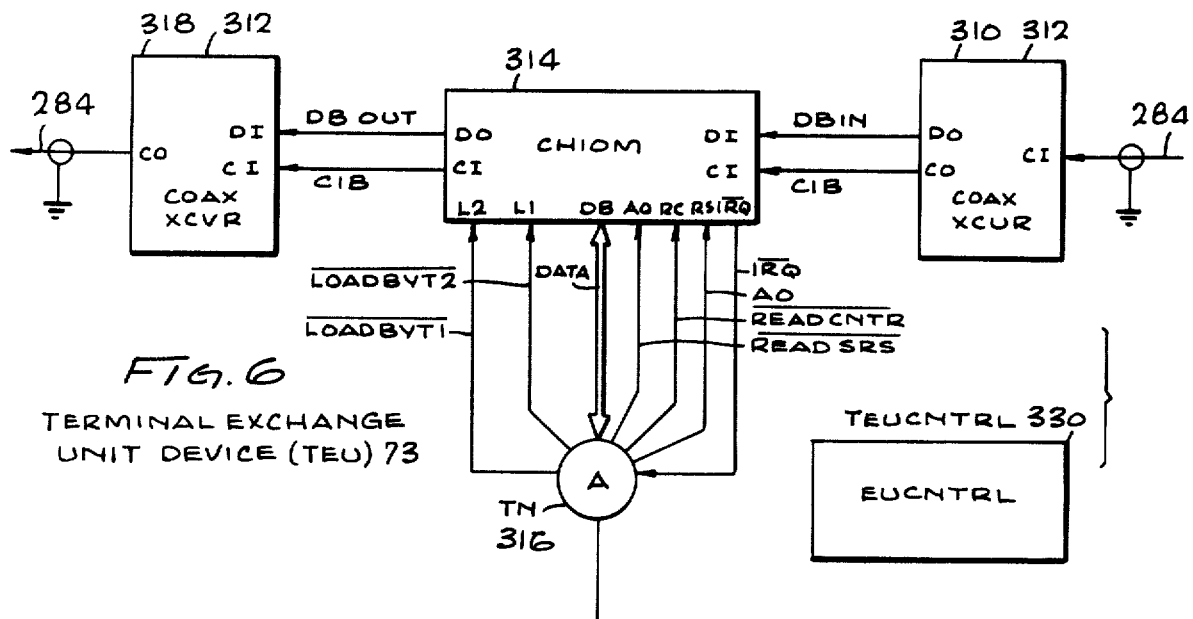
FIG. 6
TERMINAL EXCHANGE UNIT DEVICE (TEU) 73
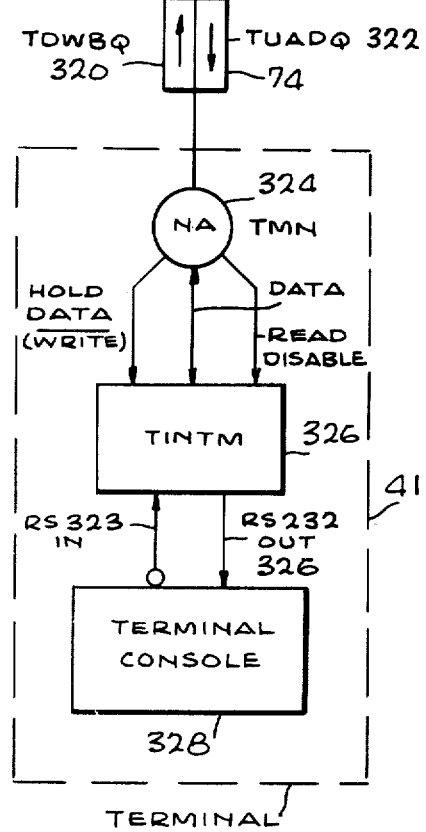
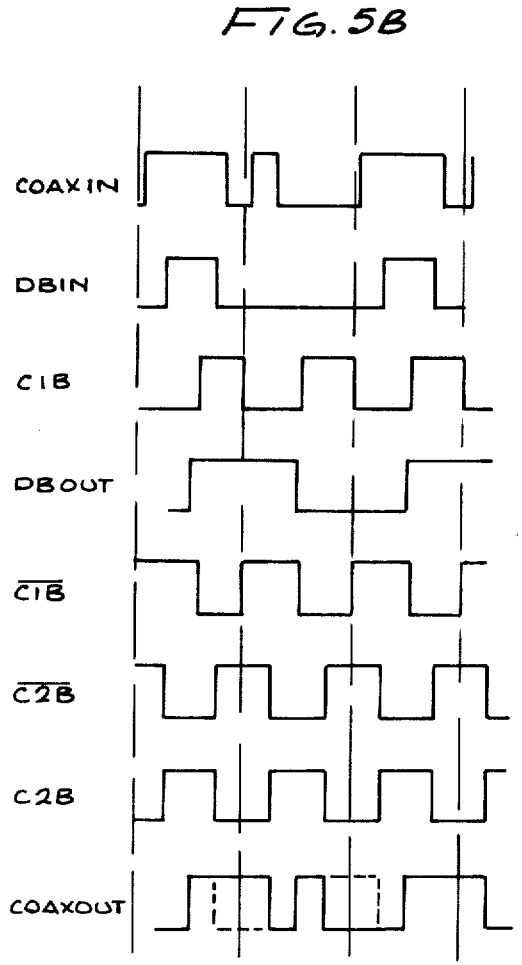
FIG. 5B

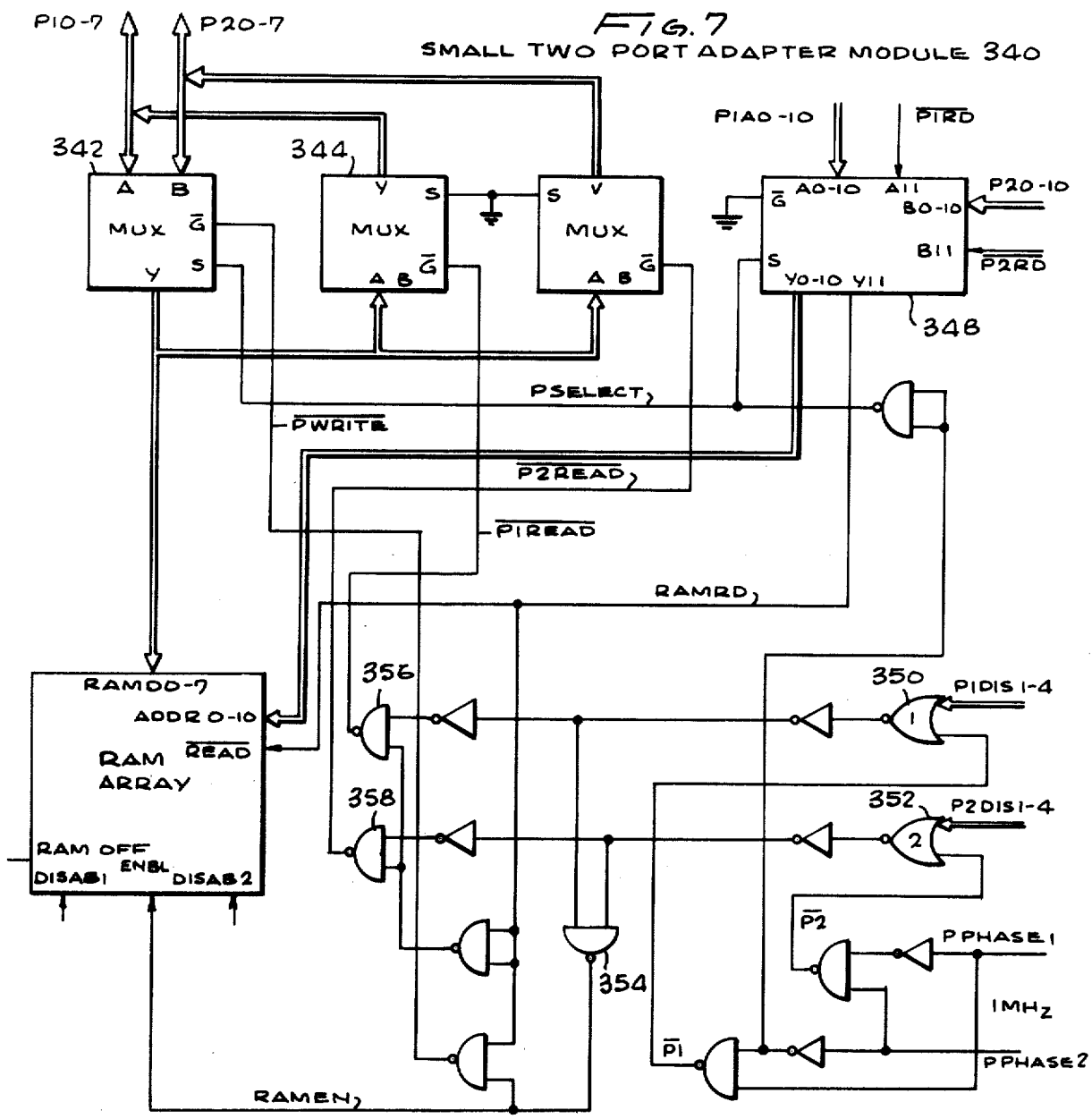
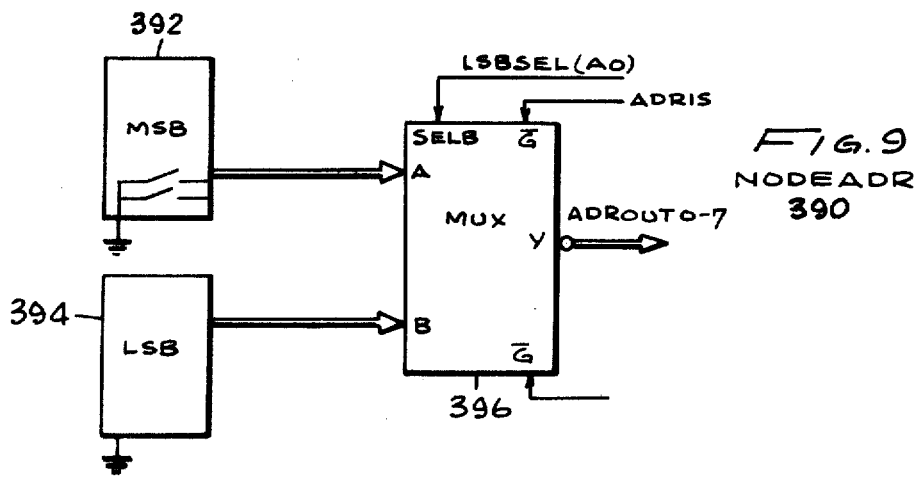

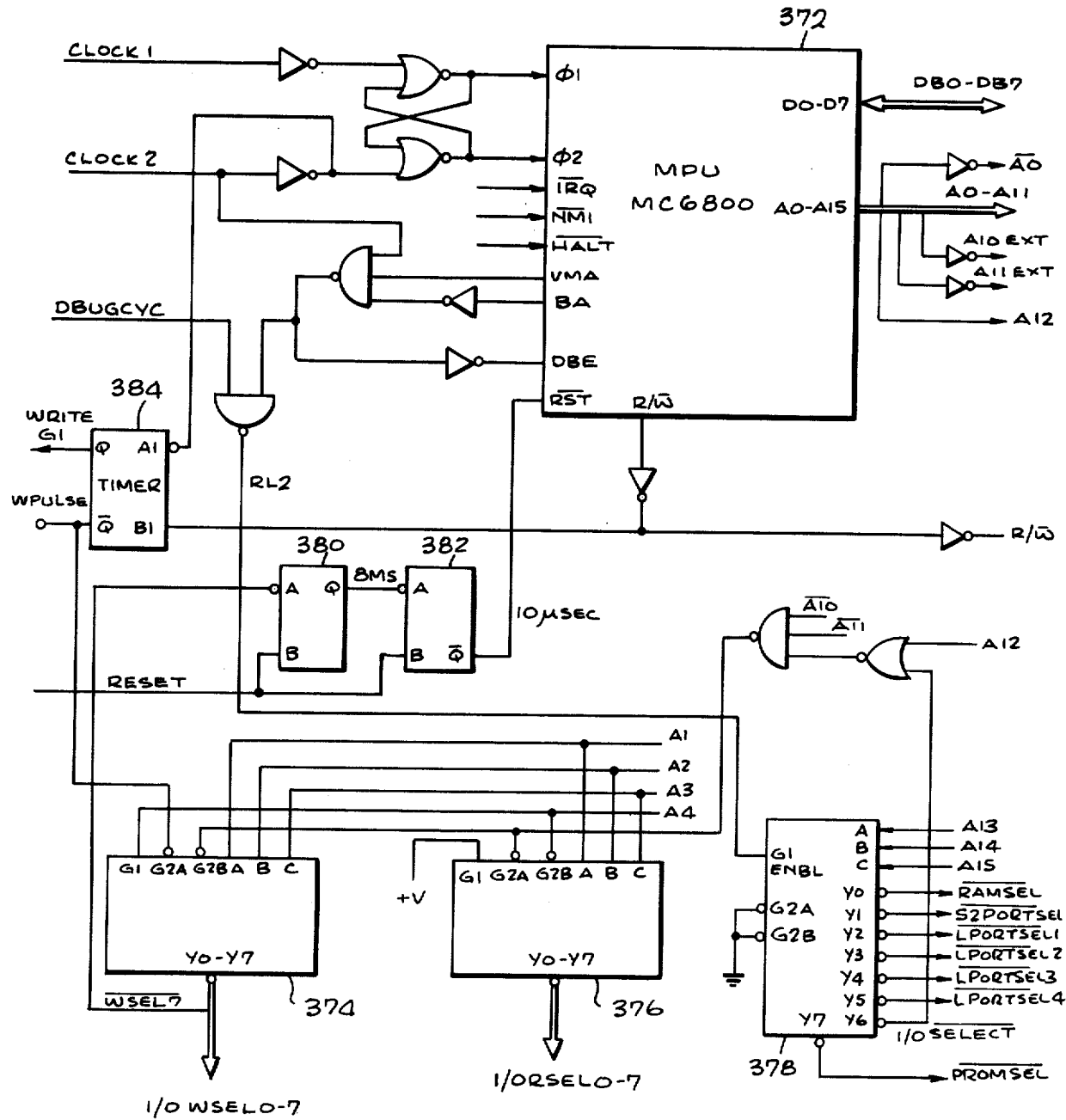
FIG. 8 MPUMOD 370

EUCONTROL 414

BUSXTEND 400

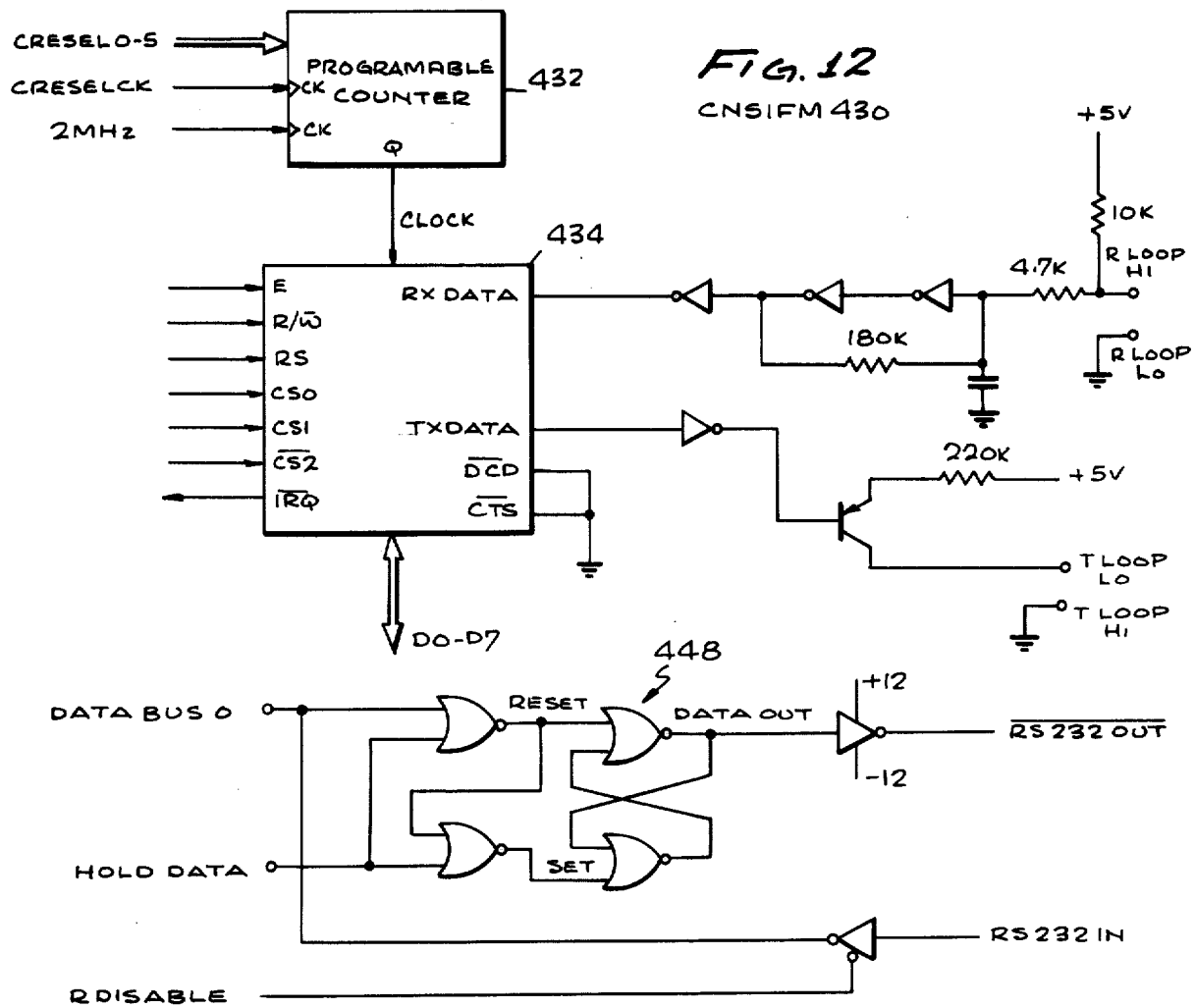
FIG. 12 CNSIFM 430
FIG. 13 TINTM 446
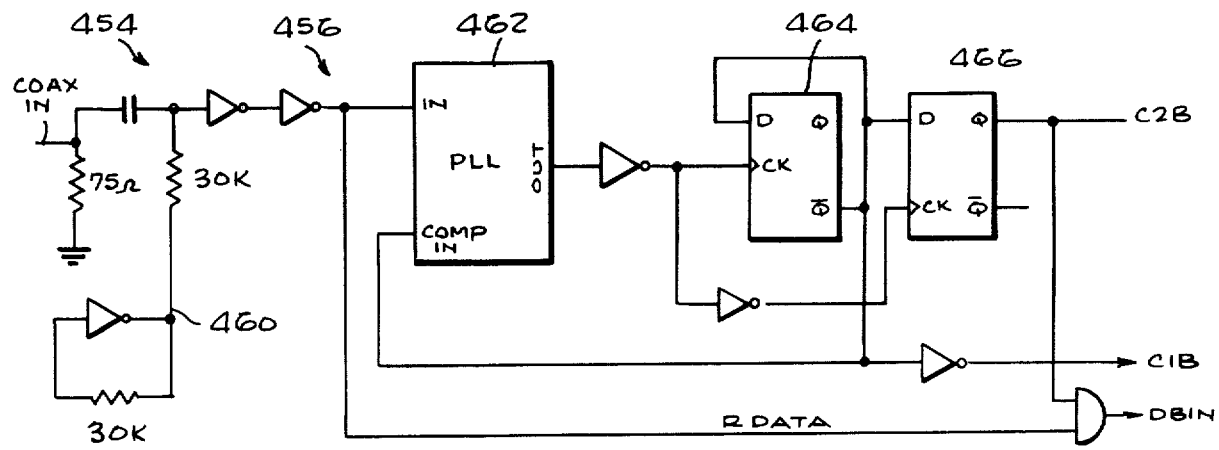
FIG. 14A COAXXCUR 312

PHACM 472

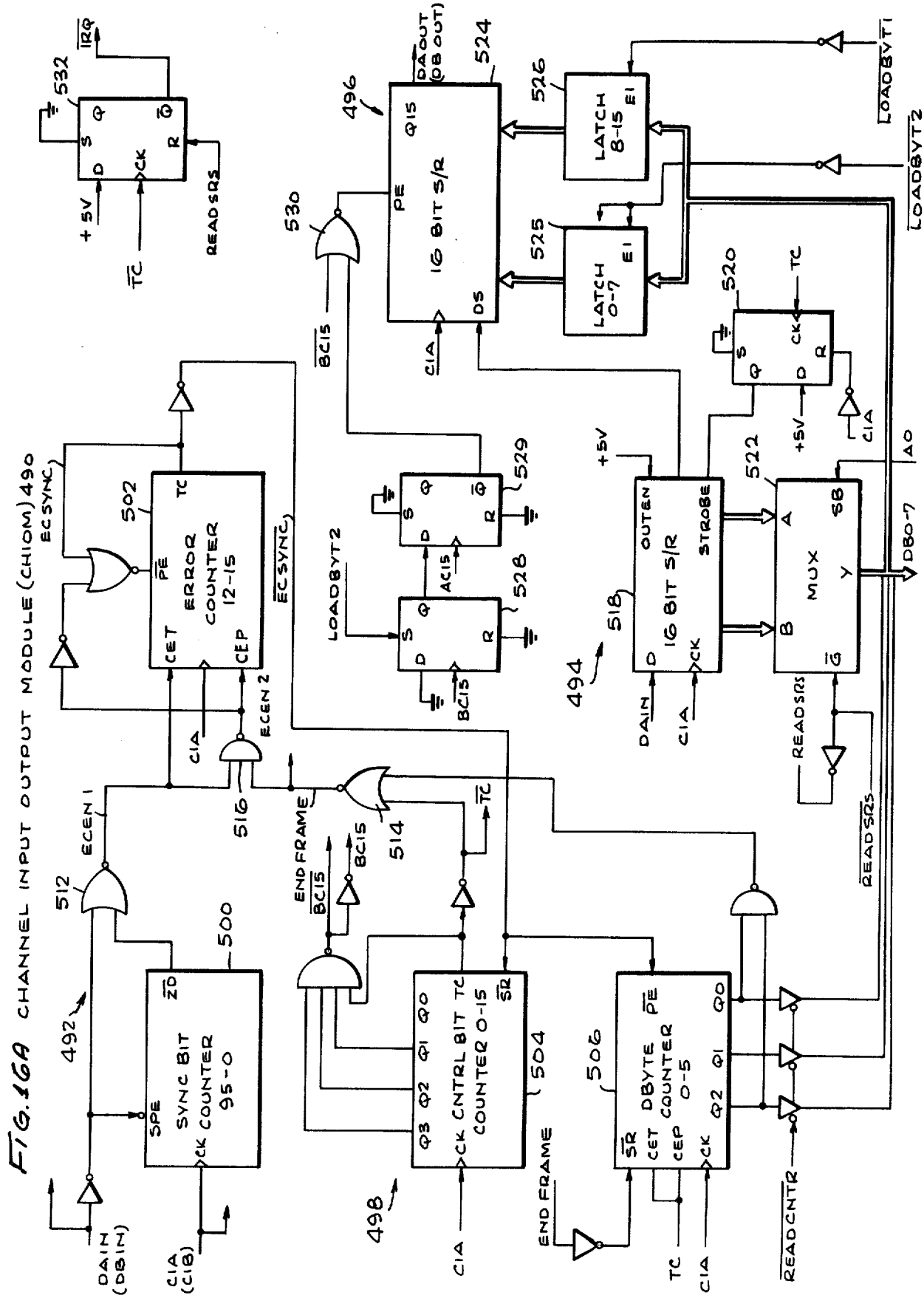

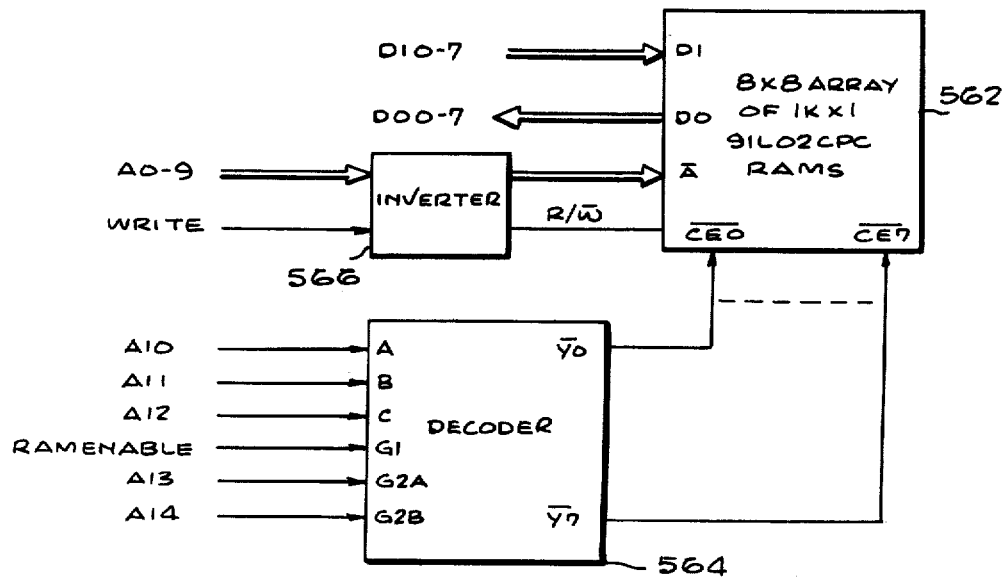
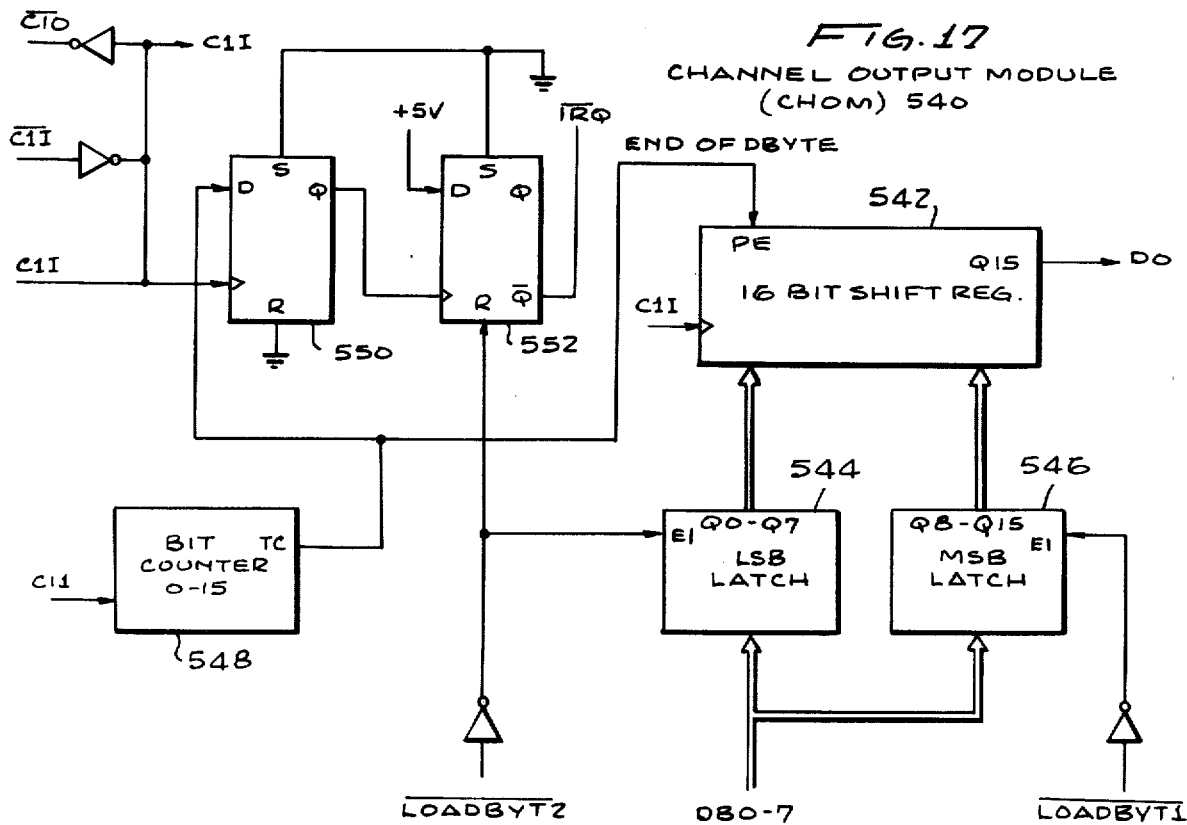

LARGE 2 PORT ADAPTER MODULE (L2PADAPT)

SMALL PACKET COMMUNICATION NETWORK

BACKGROUND OF THE INVENTION

1. Field of the Invention

This invention relates to communication networks and more particularly to communication networks using individually switched small blocks of data for communication through the network.

2. Discussion of the Prior Art

There exists today a great demand for rapid and efficient communication of digital data through a network. Rapid response is particularly required for such applications as interactive communication between a plurality of terminals and a host data processor as in an educational terminal system. Such a system is particularly demanding because of the nature of the interactive communication between a terminal and a host computer. A terminal keystroke may require a host response in which enough data is communicated back to the terminal to fill a CRT display. If even short, perceptible delays occur in the communication of this information, the terminal user may become discouraged and the value of the system is impaired.

While a number of data communication systems are currently known, they fail to provide the combination of reliability, economy and rapid response that is available with the present system. The most straight forward approach to data communication is to provide a dedicated communication link between each terminal and the host. The link can be provided either continuously or only upon demand while a terminal is operational. Such an arrangement solves the delay problem because the link is always available for the communication of data. However, a link that is capable of carrying high speed digital data is quite expensive and the utilization of a dedicated data link is very poor because data is actually being sent to or from an operational terminal only a small percentage of the time. Where any substantial distances are involved the costs can be prohibitive for many network applications, including educational terminals.

An approach which helps to reduce the cost of a communication link is to employ switching to permit sharing of a link. A complete communication link is established between a sender and a recipient of data, but only during the times that data is actually being transmitted. Such a system still remains quite expensive and cannot accommodate well multiple simultaneous requests for the data link during times of peak demand.

Further data link efficiencies are realized by a technique known as packet switching in which a block of data, typically having 1024 bits or more is sent as an individual entity. The blocks are sent through the network from switching point to switching point and different portions of a data link can carry different data blocks simultaneously. There is no need to establish at one time a dedicated path from sender to receiver and blocks relating to different senders and recipients can be interspersed on a shared data link segment to maximize the efficiency of use. However, substantial communication data or "overhead" is required just to direct the data blocks through the switching network and the delay between sending and receipt may be substantial from the viewpoint of an interactive terminal user. In addition, the block or packet switching sytem does not readily accommodate peak demands in which communication demand exceeds the capacity of the data links.

Such a system is discussed in articles by Lawrence G. Roberts, "Data by the Packet," *Spectrum* pages 46-51, Vol. 11, No. 2 (February 1974) and by R. E. Kahn, "Resource-Sharing Computer Communication Networks," *Proceedings of the IEEE,* pages 1397-1407, Vol. 60, No. 11 (November 1972).

One arrangement using time division multiplexing with dedicated time slots is shown in U.S. Pat. No. 4,007,441. Small, 4 element communication rings are established with communication processor coupling the small rings to terminal devices or other rings.

Still another arrangement that is commonly known as a Pierce Ring is illustrated in U.S. Pat. No. Re. 28,811 and described in an article Pierce, J. R. Coker, C. H., and Kroppl, W. J., "Network for Block Switching of Data" *IEEE Conv. Rec.,* New York, March 1971. Another loop arrangement is taught by Fraser, "Digital Data Communication System," U.S. Pat. No. 3,749,845. In this arrangement a series of interconnected loops of different capabilities interconnect the devices of a network. Such a system is further discussed in an article by Hayes, J. F. and D. N. Sherman, "Traffic Analysis of a Ring Switched Data Transmission System", *The Bell System Technical Journal,* Vol. 50, No. 9 Pages 2947-2978 (November 1971).

Further background on data communications can be obtained from *Proceedings of the IEEE,* Vol. 60, No. 11, November 1972, which is a special issue on computer communications.

Additional background information is available from Hayes, J. F. and D. N. Sherman, "A Study of Data Multiplexing Techniques and Delay Performance", *The Bell System Technical Journal,* pages 1983-2011, Vol. 51, No. 9, (November 1972) and from "Computer Network Requirements Study" prepared by Network Analysis Corporation, Beechwood, Old Tappan Road, Glen Cove, N.Y. in March 1974.

SUMMARY OF THE INVENTION

A data communication system in accordance with the invention provides rapid response interactive communication between a plurality of digital data devices. For example, the system forms a network providing communication between a plurality of terminal devices such as those which convert between machine usable and human recognizable forms of data representation and a communicating facility such as a host data processor or a trunk switching system. The system may include a host data processor with a large data base at a central processing location which is coupled for communication with other data processors, a plurality of terminals and a communication network including a network control unit controlling data flow through data channel to provide efficient data communication between the terminals and the host.

The network is particularly useful for communication involving a central processor and a large number of terminals that are separated from the host and from each other. While the present arrangement is specially adapted to accommodate a large volume of traffic flowing downward from the host and a smaller volume of higher priority traffic flowing upward to the host, the system is readily adaptable to other traffic flow patterns using the principles described herein. For example, communication may be predominantly between terminals instead of between terminals and host and may be between terminals of one network and terminals of another network, which may be coupled to a different host with trunking provided between hosts.

Each network is highly modular in nature and includes a network controller coupled between a host data processor and one or more subnetworks through fan out node devices. The network controller provides network supervision, maintains a data base of network operational parameters and separates upward and downward flowing traffic between the network and the host. Actual data flow is substantially independent of the controller with control over data flow being distributed throughout the network.

Each subnet is headed by a line master exchange unit device which contains substantial buffer data storage. Each line master exchange unit device is preferably located for high speed, parallel data communication with the host and is coupled through a serial data link to the individual terminals of the subnet. Host supplied data is stored in the large buffer storage until it can be communicated at a slower rate to buffer storage at a terminal node device or unit at each terminal site.

A line master can be coupled to two serial data loops which typically extend in parallel, opposite flow direction arrangement to provide a single full duplex loop. Such a loop is available as a 9.6 KB digital data service from telephone utilities. The duplex loops provide long distance communication as between cities and buildings within the cities while line exchange units disposed therealong provide 57.6 KB coaxial cable local simplex loops. The individual terminals are coupled along these loops through terminal node units and terminal exchange units to a communication medium such as a host data processor.

The network is capable of moving data much faster than the individual terminals can actually receive it. It thus becomes possible for the network to store a backlog of terminal data both at the subnet level and at each terminal point. A network line allocation algorithm at the line master exchange unit device monitors the availability of terminal data at the subnet level and each terminal usage rate to maintain a buffer data store at the terminal end of the network at a maximum. Thus, during short periods of peak overload, all of the terminal buffers are drawn down slowly and uniformly and each terminal continues to receive data at its normal specified rate. Only during an unusual and extended peak overload can a terminal user notice a pause in the receipt of data. This arrangement allows for higher loading of the communication channels without degradation of service.

The highly modular network is implemented with programmable micronodes and two port memories which implement data queues to provide communication between micronodes. The micronodes and two port memories are themselves implemented with repetitive modular components such as memory arrays, microprocessors, channel input modules, channel output modules and interface modules selected in accordance with a function to be performed. Costs for manufacturing, repair and spare parts storage are thus reduced.

All information, whether data or supervison is communicated through the network over the same communication facilities using a standardized small data block format. Each block contains 24, 8 bit bytes including three header bytes and a check sum byte to leave 20 bytes for actual data. Up to 16 blocks make up a message and multiple messages may be used to send unlimited data. The standard format minimizes the header data while the smaller block size and a special thread through technique assure a rapid time response. Complete data blocks are typically assembled only at buffer storage at the line master, the line exchange unit and at the destination terminal exchange units. In between, each block is handled on a double byte basis. It is possible for the line exchange unit to receive the first byte of a block before the line master sends the last byte, and for a terminal node to receive the first byte of a block before the line exchange unit sends the last byte with intermediate bytes being distributed along the respective connecting channels and nodes. Avoidance of the time delays required to accumulate a complete block at one node prior to communication to the next node greatly improves response time. A high priority is assigned to upward flowing messages to minimize the delay before the beginning of a response reaches the slower terminals.

Along the serial communication channels further efficiency is attained by transforming each 24 byte block into a single or double small block of 12 bytes each. Wasted communication capacity for less than full blocks is thus reduced. Each small block is communicated serially in one 96 bit data frame along the communication link. The data or time frames occur sequentially and small blocks are added to empty frames or pulled off as appropriate. Empty frames are unique in that they contain a logic 1 start bit followed by 95 zeros and they are used for automatic self-synchronization by exchange units connected along a serial data link.

The network provides dynamic self-determination of its own structure. Most of the micronodes have an address assigned thereto which is unique within a network. Every 22 seconds the network controller issues an all call message which reaches all addressable nodes. These nodes respond with a data block carrying a selected one of several performance parameters and the responding node address. The node directly above each responding node inserts its address into the response message to permit dynamic reconstruction of the network hierarchy. In order to distribute the all call responses and prevent a sudden overloading of the network, each node delays a time proportional to its node address before responding. Furthermore, each higher level node maintains an address table of lower level responding nodes to permit proper routing of downward flowing messages. Terminals or other components may thus be added or subtracted from the network and an adjustment of the network hierarchy and network address tables will automatically occur as a result of the next all call messsage.

An error control loop is maintained on a quasi-message basis between a line master exchange unit device and the terminal exchange units for the destination terminals beneath it. When a terminal exchange unit indicates the availability of buffer storage space for a message the line master begins transmitting a message as sequentially numbered blocks. The terminal exchange unit stores each block according to a sequence number and simply discards erroneous blocks. A pointer is maintained for sequential, error free blocks. If a block is received that is too far out of order an error is presumed and an error message is sent to the line master indicating the last complete sequential block. Retransmission resumes from that point on. An acknowledgement message is sent upon receipt of a complete message and a time out condition can generate additional error messages. This system is extremely simple and requires very little communication overhead, yet provides effective error control with very little data redundancy and rapid detection of an error.

Using the inherent system communication facilities, any addressable location at any addressable micronode can be read from or written into, if that is possible, i.e. writeable memory. The entire system can thus be selectively programmed under control of the host or network controller for operation as a giant multiprocessor. During operation as a communication network, the exact status of each node can be checked for diagnostic purposes.

The line master exchange unit periodically checks for continuity on the duplex line connected thereto. If a break is found, it automatically operates to reconfigure the duplex line as two separate simplex loops. Any break is isolated in such a way that communication is maintained with a maximum number of terminals while the break is being repaired.

The network moves the logical interface to the terminal to a node located at the terminal site. This allows sharing of communication channels at all levels in the network, including not only trunking channels (as with current packet switching networks) but also sharing of channels used for local distribution.

Responsiveness in a network increases with data link speed and decreases with packet length. By using efficiently blocks an order of magnitude shorter than current practice, the network structure provides the necessary responsiveness for good man/machine interaction over the low speed data links used for local distribution.

BRIEF DESCRIPTION OF THE DRAWINGS

A better understanding of the invention may be had from a consideration of the following Detailed Description taken in conjunction with the accompanying drawings, in which:

FIG. 1 is a block diagram representation of a communication system in accordance with the invention;

FIG. 2 is a block diagram representation of a host adapter used in the system shown in FIG. 1;

FIG. 3 is a block diagram representation of a network controller used in the system shown in FIG. 1;

FIG. 4A is a block diagram representation of a line-master exchange unit device used in the system shown in FIG. 1;

FIG. 4B is a waveform diagram which is useful in understanding the operation of the linemaster exchange unit device shown in FIG. 4A;

FIG. 5A is a block diagram representation of a 9.6KB line exchange unit device used in the system shown in FIG. 1;

FIG. 5B is a waveform diagram that is useful in understanding the operation of the line exchange unit device shown in FIG. 5A;

FIG. 6 is a block diagram representation of a terminal exchange unit device used in the system shown in FIG. 1;

FIG. 7 is a block diagram and schematic representation of a small two port adapter module used in the system shown in FIG. 1;

FIG. 8 is a block diagram and schematic representation of a microprocessor unit module used in the system shown in FIG. 1;

FIG. 12 is a block diagram and schematic representation of a console interface module used in the system shown in FIG. 1;

FIG. 13 is a schematic representation of a timer interrupt module used in the system shown in FIG. 1;

FIG. 14A is a schematic and block diagram representation of a coax input module portion of a coax transceiver module used in the system shown in FIG. 1;

FIG. 16A is a block diagram and schematic representation of a channel input/output module used in the system shown in FIG. 1;

FIG. 17 is a block diagram and schematic representation of a channel output module used in the system shown in FIG. 1;

FIG. 18 is a block diagram representation of an 8K×8 RAM array module used in the system shown in FIG. 1.

TABLE OF CONTENTS

Figure 9A:
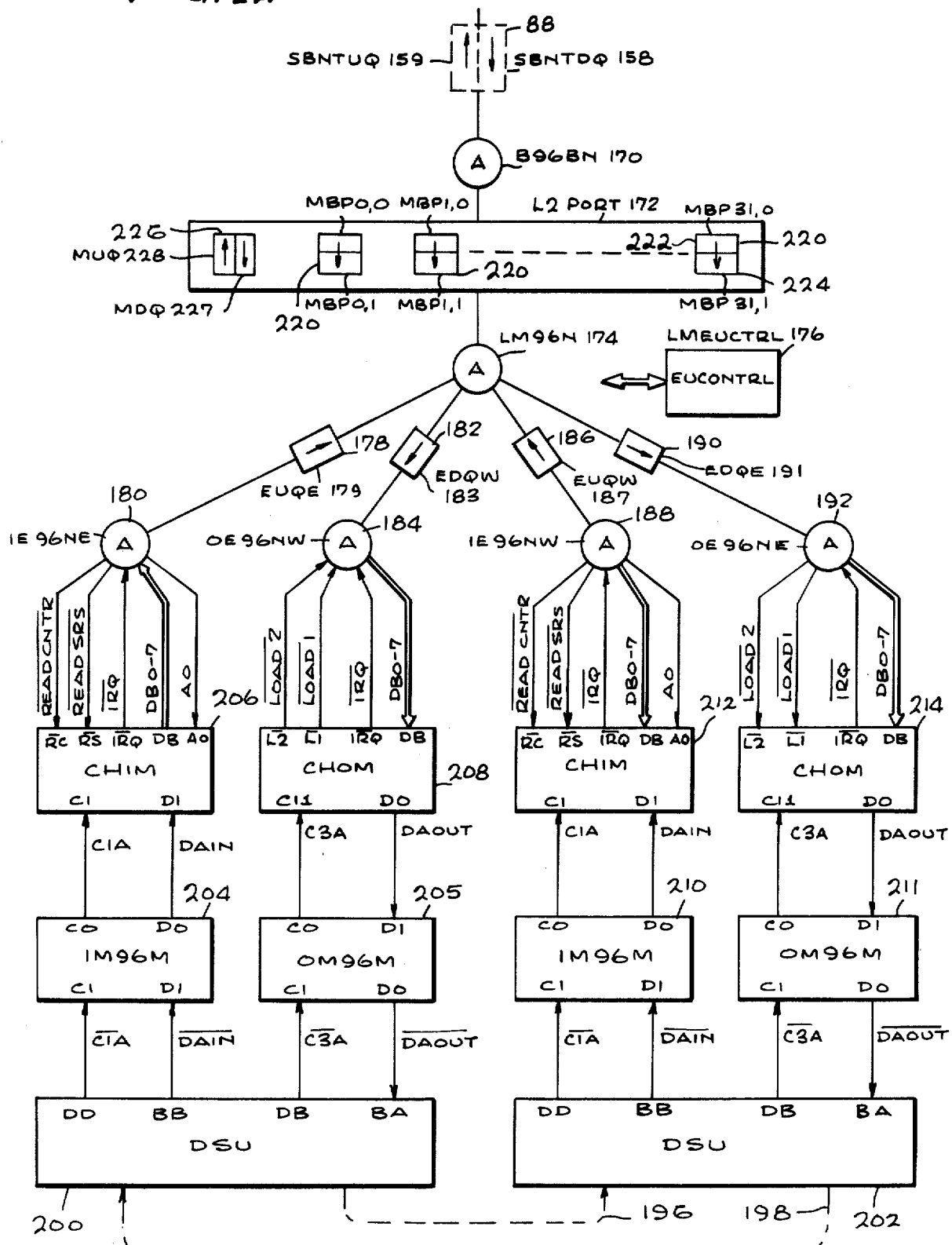
FIG. 9 is a block diagram representation of a node address module used in the system shown in FIG. 1; message SETAKM, channel the then

I. General Configuration
  A. Host Adapter 32
  B. Small Two Port Buffer Memories
  C. Queue Implementation the
  D. Network Controller 50
  E. Fan Out Node Device 54
  F. Line Master Exchange Unit Device 60
  G. Line Exchange Unit Device
  H. Terminal Exchange Unit Device
II. Communication Network Modules
  A. Small Two Port Adapter Module 340
  B. RAM Array Module 360
  C. MPU Module 370
  D. Node Address Module 390
  E. Bus Extender Module 400
  F. Exchange Unit Control Module 414
  G. Programmable Read Only Memory
  H. Net Master Interrupt Module
  I. Console Inerface Module 430
  J. Terminal Interface Module 446
  K. Coaxial Cable 57.6KB Transceiver 454
  L. Clock Multiply Module
  M. Phase Converter Module 472
  N. Loopback Module
  O. Channel Input/Output Module (CHIOM) 490
  P. Channel Output Module (CHOM) 540
  Q. Input Matching Module (IM96M) and Output Matching Module (OM76M)
  R. Channel Input Module (CHIM)
  S. 8K×8 RAM Array Module (RAM[8K]) 560

T. Large Two Port Adapter Module (L2PADAPT) 576
U. Processor Input Interface Module (PIINTM) 100 and Processor Output Interface Module (POINTM) 102

III. Message Formats
A. General
B. Abort Message ABORTM) Output 32
C. Input Data Message (INDATM)
D. Output Data Message (ODATM)
E. Permission To Send Message (PRSNDM) Input 36
F. Blockset Acknowledge and Permission To Send Message (ACKPRM) Input 32
G. Sequence Alarm or Status Request Response Message (ALMSRM) Input 33
H. Request Status Message (REQSTM) Output 40
I. Blockset Acknowledgement Message (SETAKM) Input 34
J. Reconfiguration Messages
K. Loopback Message (LPBAKM) Output 38
L. Cancel Loopback Message (CLPBKM) Output 34
M. Loop Continuity Message (LPCNTM) 35
N. Network Control Messages
O. Network Control Read Message (NCRDM) Output 33
P. Network Control Response Message (NCRSPM) Input 37
Q. Network Control Write Message (NCWRM) Output 35
R. All Call Messages (ALCALM) Output 0-5
S. All Call Response Message (ALCLRM) Input 0-5
T. Reinitialization Message (REINM) Output 41
U. Net Control Interface Messages
V. All Hierarchy Pair Response Message (AHPRM)

IV. Programming
A. General
B. Processor Input Matching Node
C. Processor Output Matching Node
D. Net Master Interface Node
E. Net Master Node
F. Console Interface Node
G. Y Node
H. Fan Out Node Devices
I. Node B96BN
J. Line Master Node
K. Output End Nodes
L. Input End Nodes
M. Drop Nodes
N. Coax Output End Node
O. Coax Input End Node
P. Terminal Node
Q. Terminal Matching Node V. Network Node Program Address Map
VI. Network Node Program Load Lists

DETAILED DESCRIPTION

General Configuration

Referring now to FIG. 1, a digital data communication system 10 in accordance with the invention includes a plurality of host data processing systems 12, 14, 16 and 28 which are interconnected by conventional data communication links 20. While a particular pattern of data communication links 20 is provided between the various host data processors, by way of example, the exact pattern is not material to this invention and in general only a single host data processor such as host 12 may be present in the system. The host data processors 12, 14, 16 and 18 may be any suitable commercially available data processor system which maintains a data base of information and makes portions of the data base available through a communication network to other devices upon demand.

Host data processor 14 is shown as being coupled through a host adapter 22 to a communication network 24 which provides communication between the host 14 and a plurality of terminal devices illustratively represented by terminal devices 26, 28 and 30. 12, 14, 16

Host data processing system 12 is shown as being coupled through two host adapters 32, 34 to two communication networks 36, 38 respectively. Network 36 provides communication between host 12 and a plurality of terminal devices 40, 41, 42 and 43 while communication network 38 provides communication between host 12 and a plurality of terminal devices 46 47 and 48. Network control may be provided through one of the terminal devices which is connected to the network in the same manner as any other terminal device and thus terminal device 43 has been designated a network control terminal.

While the exact configuration of the particular communication networks 24, 36 and 38 will depend upon the numbers and physical locations of the terminal devices connected thereto, the various communication networks may be constructed in accordance with the same principles using identical types of modular communication elements and communication data links which are illustrated. For this reason, only the particular data communication network 36 will be described in detail and it will be understood that the communication networks 24 and 38 may be constructed in a similar manner.

The network 36 includes a network controller 50 which is connected to a TTY control console 52 and which is also coupled between the host adapter 32 and a fan out node device 54. Fan out node device 54 is connected to one or more additional fan out node devices 56 (only one being shown for simplicity). Similarly, fan out node device 56 is connected to one or more communication subsystems as representatively illustrated by the 9.6 kilobit subsystem 58 including line master exchange unit device 60, and 9.6 kilobit line exchange unit devices 62, 63 and 64. Line exchange unit device 64 is in turn coupled to a 57.6 kilobit coaxial cable communication subsystem 70 including terminal exchange unit devices 72, 73, 74 and 75 which are in turn coupled through two port buffer storage memories 78, 79, 90 and 81 to terminal devices 40, 41, 42 and 43 respectively.

Communication between the various elements of the communication network 36 is provided by two port buffer memories similar to two port buffer storage memories 78-81. A two port buffer storage memory 84 couples network controller 50 to fan out device 54 while another two port buffer storage memory 86 couples fan out device 54 to fan out node device 56 and two port buffer storage memory 88 couples fan out node device 56 to line master exchange unit device 60. In an alternative small system network arrangement the fan out nodes 54, 56 may be eliminated with two port 88 being directly coupled to network controller 50 via data path 90 which is shown as a dashed line.

The two port buffer storage memories are used extensively throughout the communication network 36 between major elements of the network and also between programmable micronodes within the major elements of the network, each of which operates as a self-contained programmable processor to perform a designated network function. The two port buffer storage memories are random access memories with two ports, each of which controls access to the memory on different alternate memory cycles. During a cycle in which a given port is active, a device coupled to the memory has complete access to read or write into any location in the memory. During the next or alternate memory cycle a device coupled to the other port has complete access to read or write into any location in the memory. The two port memories are customarily used to implement a pair of queues by designating certain locations within a memory for the storage of network message information which is passing from the host toward a terminal and certain other locations in the memory for storage of network message data which is passing toward the host. The two port buffer storage memories are thus represented as a pair of oppositely directed arrows to represent the bidirectional message data flow provided by the pair of queues in a two port memory. In addition to message data, two port memories may store network control information for which it is desired that two different programmable micronodes or network elements both have access. For example, two port buffer storage memory data content status pointers are also stored in the two port memories and a status pointer for a first private micronode memory may be stored in a connected two port to enable a second micronode coupled to the two port memory to easily ascertain the status (e.g. empty or full) of the first micronode memory.

The communication network 36 is highly modular and submodular in nature to permit a highly flexible network configuration to be constructed of standard components. Because of the standardization of components, production cost may be reduced because of high production volumes and problems of storing, maintaining and accounting for hundreds of different subassemblies are greatly reduced. As previously discussed in connection with FIG. 1, the major modules include two port buffer storage memories, a network controller, fan out node devices, line master exchange unit devices, 9.6 kilobit line exchange unit devices, and terminal exchange unit devices. Each of these primary modules is in turn comprised of a selected combination of about 22 standardized submodules.

For convenient reference, the submodules are listed as follows:
1. S2PADAPT—small two port adapter module.
2. MPUMOD—microprocessor unit module.
3. NODEADR—node address module.
4. BUSXTEND—bus extender module.
5. EUCONTRL—exchange unit control module.
6. PROM [4K, 3K, 2.5K, 2K, 1.5K, 1K, 0.5K]—programmable read only memory with the number of 8 bit words being indicated in brackets, K being 1024.
7. RAMA [2K, 1.5K, 1K, 0.5K, 0.25K] random access memory array with the number of 8 bit words indicated in brackets.
8. NMIM—network master interrupt module.
9. CNSIFM—console interface module.
10. TINTM—terminal interface module.
11. COAXXCVR—57.6 kilobit coaxial cable transceiver module.
12. CLMX6—clock multiply module.
13. PHCM—phase converter module.
14. LOOPBACK—loop back module.
15. CHIO—channel input/output module.
16. CHOM—channel output module.
17. 9.6KX/R—9.6 kilobit RS232-C transmitter/receiver.
18. CHIM—channel input module.
19. 8KRAM—8K by 8 random access memory array.
20. L2PTADAPT—large two port adapter module used only in line master exchange unit devices.
21. Channel input adapter.
22. Channel output adapter.

The various submodules and their abbreviated mneumonics are provided at this point for convenient reference. To the extent that their construction is not readily apparent to a person of ordinary skill in the art, they will be described in greater detail below.

HOST ADAPTER 32

Referring now to FIG. 2, host adapter 32 includes processor input interface module (PIINTM) 100, processor output interface module (POINTM) 102, micronode PIMN 104, micronode POMN 106, micronode NMIFN 108, two port buffer memory 114 providing network control queue (NTCQ) 115 connecting micronode POMN 106 to micronode MNIFN 108, two port buffer memory 118 providing network transfer return queue (NTRQ) 119 connecting micronode NMIFN 108 to micronode PIMN 104 and two port buffer memory 116 providing host data down queue (HDADQ) 117 connecting micronode POMN 106 to micronode YN 110 in network controller 50. Processor interface modules 100, 102 are merely interface units connecting micronode PIMN 104 and micronode POMN 106 to input 115 output channels respectively of a host I/O channel. They merely provide a data format transformation between the network format and host I/O processor format. Their construction is conventional but depends upon the particular host I/O processor and has therefore not been shown in detail.

Processor input micronode 104 includes the standard modules MPUMOD designated PIMNMPU, PROM[3K] designated PINPROM and RAMA[0.25K] designated PINRAM. The three micronodes 104, 106 and 108 in the host adapter 32 are considered to form an interface between the communication network 36 and host 12 and hence are not micronodes which are addressable as part of the communication network 36. However, in general they could of course be assigned a network address and be addressable if desired. Processor input micronode 104 operates to communicate the network control response messages (NCRSPM) through processor input interface module 100. These messages are received through network response queue 119. Micronode 104 also communicates to processor input interface module 100 the input data and permission to send messages, INDATM and PRSNDM, received from a small two port buffer memory 112 which implements a host data up queue 113. Micronode 104 receives (and discards) message ALCLRM from 112. These messages are different types of data and supervisory or control messages which are communicated through the network. In general micronode 104 receives data and data control messages through two port 112 and supervisory and network control response messages through two port 118. Micronode 104 communicates with the network in only a 24 byte large block message format and operates in conjunction with PIINTM 100 to make a format transformation for communication with the host I/O processor.

Peripheral processor output micronode 106 receives data from the processor output interface module 102 and communicates it either through small two port buffer memory 116 which implements host data down queue 117 to Y node 110 or through small two port buffer memory 114 which implements network control queue 115 to net master interface node 108 or both. The messages flowing through HDADQ 117 to Y node 110 include the abort and output data messages, ABORTM and OTDATM, while messages flowing through NTCQ 115 to NMIFN 108 include NCRDM, NCWRM. Micronode 106 communicates with the network in a 24 byte block format and operates in conjunction with POINTM 102 to transform the format for compatibility with the host I/O processor. The standard modules which comprise POMN 106 include MPUMOD designated POMNMPU, PROM[3.5K] designated POMNPROM and RAMA[0.25K] designated POMNRAM. For some purposes POINTM 102 is considered part of micronode POMN 106.

Net master interface node 108 includes as standard modules an MPUMOD designated NMIFNMPU, PROM[3K] designated NMIPROM, and RAMA[0.25K] designated NMIRAM. It communicates data in a 24 byte large block format and, as explained above, it receives data through two port buffer memory 114 which provides the network control queue 115 from micronode 106 and provides information through two port buffer memory 118 which provides a network response queue 119 to micronode 104. Micronode 108 also communicates through two port buffer memory 130 which implements host control up queue 131 and host control down queue 132 to provide bidirectional communication between micronode 108 and net master micronode 134 (FIG. 3). Micronode 108 provides through HCUQ 131 messages DSDBM, NCRDM and NCWRM. It receives through HCDQ 132 messages NSPRM, SNSPRM, SNASRM, ASNPRM, NASPRM, ASPRM, NHPRM, SNHPRM, AHPRM, AHSPRM, NHCHRM, and NCRSPM. In general, net master interface node 108 serves as a communication link for bidirectional supervisory and control messages between net master node 134 and the host data processing system 12.

SMALL TWO PORT BUFFER MEMORIES

The small two port buffer memories which implement the queues provide buffered communication of data between two micronodes. Each memory includes a small two port adapter module (S2PADAPT) and a random access memory module RAMA[XK]. Either a single unidirectional queue or two queues providing bidirectional communication may be implemented by a two port buffer memory. The small two port adapter module causes the random access memory to be address accessible to each of the two micronodes connected thereto on alternate memory cycles. During the proper memory cycles all addressable memory locations are available to a micronode connected thereto.

QUEUE IMPLEMENTATION

Whether a private queue within a single micronode or a two port queue connected between two micronodes, each queue is implemented by four pointers stored at predetermined locations within a memory and a map table. While the specific queue implementation technique is not critical to network operation, it does provide an advantageous combination of simplicity and flexibility.

Each queue is divided into a number of cells ranging from 2 to 128 cells depending upon the size of the queue that is desired. Each cell in turn stores either 12 or 24 eight bit bytes of data (1 block) depending upon whether data is processed in large blocks or small blocks at the point in the network where the queue is implemented.

The four pointers are art of a 6 byte queue control package with predetermined sequential addresses which are available to the programs of the accessing micronodes. The first or smallest address location stores the most significant byte of a two byte next read pointer which defines an address in the map table corresponding to the cell into which data is to be read from next. The second address location in the control package stores the least significant byte of the map address. Because the map table stores a two byte address for each cell, the least significant bit of the second pointer byte is always 0 to point to the most significant of the two cell address bytes in the map table. The next one to seven bits define the cell number of the cell from which reading is to next occur. A queue may thus contain between 2 and 128 cells. Any remaining bits in the second byte define a portion of the address of the map table.

The map table is required to begin at an address that can be defined by merely clearing the cell number portion of the next read (NR) and next write (NR) pointers.

This arrangement allows the next read and next write pointers to be changed with a single word write access of the memory. The single word change of queue content (typically adding or deleting a single block) resolves contention problems between programs in different processors or at different priorities in the same processor in adding and deleting blocks from the same queue.

The third and fourth bytes of the queue control package define the most and least significant bytes respectively of the next write pointer. The next write pointer is implemented in the same manner as the next pointer except that it defines the address in the map table of two bytes which in turn define the beginning address of the next cell into which information is to be written.

The fifth byte of the queue control package stores the last cell pointer (LC), which defines the least significant byte of the next read pointer or next write pointer for the highest numbered cell. Similarly, the first cell pointer (FC), occupies the sixth byte of the queue control package and defines the least significant byte of the next read or next write pointer for the lowest number of 0 cell, which is the first cell of a queue.

The map table stores a two byte address for each cell in a queue. Each two byte address defines the address of the first byte of a cell corresponding thereto. Additional byte locations within a cell are accessed by incrementing the address of the first byte.

A queue is accessed in a circular manner. A microprocessor that is writing information into the queue first reads the next write pointer, which will initially point to the first cell, cell 0. It uses the next write pointer to address the map table to obtain the beginning address of cell 0. This cell 0 address is sequentially incremented each time a new byte is written into cell 0 until all of the data for cell 0 has been written. The microprocessor then returns to the next write pointer and uses the map table to obtain the beginning address for the second cell, cell 1. This process continues with the least significant byte of the next write pointer being compared to the last cell pointer each time the next write pointer is accessed. If the next write and last cell pointers are unequal, the next write pointer is incremented. As the next write pointer is incremented to point to the last cell it will equal the last cell pointer. Then, instead of being incremented, the next write pointer is made equal to the first cell pointer.

Reading from the queue is accomplished in the same circular manner except that the next read pointer is used to define (through the map table) the beginning of the next cell at which reading is to occur. As a new next read pointer is obtained, it is normally compared to the next write pointer. If they are equal the queue is deemed to be empty. In addition, when writing, the next write pointer can be compared to the next read pointer to prevent overlapping or overflow of the queue. However, in most locations in the network, overflow is sufficiently unlikely that the comparison is not made. If an overflow does occur, all of the contents of the queue are lost because the queue is considered to be empty when the next read pointer equals the next write poiner.

NETWORK CONTROLLER 50

Referring now to FIG. 3, network controller 50 (NMEU) includes Y node YN 110, netmaster node NMN 134 which communicates through two port buffer memory 130 and two port buffer memory 136 as previously discussed, and console interface node CIFN 148. Net master 134 also communicates through two port buffer memory 144 which implements local control down queue 145 and local control up queue 146 to controller interface node 148. The messages communicated through local control down queue 145 include NSPRM, SNSPRM, SNASRM, ASNPRM, NASPRM, ASPRM, NHPRM, SNHPRM, AHPRM, AHSPRM, NHCHRM, and NCRSPM while messages communicated through local control up queue 146 include DSDBM, NCRDM, and NCWRM. The net master node 134 includes an MPUMOD designated NMMPU, a BUSXTEND module designated NMBUSX, a RAMA[2K] designated NMNRAMLO, a second RAMA[2K] designated NMNRAMHI and PROM[2K] designated NMNPROM.

Net master node 134 is the master control node for network 36. It provides the network 36 with a supervisory interface through host adapter 32 to host 12 via HCDQ 132 and HCUQ 131 and to local console 52 via two port 144 and console interface node 148. Net master node 134 relays network control messages received through HCUQ 131 and LCUQ 146 to the network via NMONQ 138. Net master node 134 manages a network wide network hierarchy data base and maintains a statistics data base of six parameters for each active node in the network 36. The statistics data base is organized according to node address.

Net master node 134 also operates to generate a network all call message ALCALM every 22 seconds which is communicated through NMOMQ 138 for duplication and distribution to each micronode in the network 36. There are six types of all call messages which are generated in sequence. Each of the six all call messages is essentially the same except that it corresponds to a different one of six parameters which is stored in the statistics table by the net master node 134. Upon receipt of an all call message, each addressable micronode within the network 36 waits for a predetermined period of time which is proportional to the address of the micronode and then sends to the net master node 134 an all call response message which includes the address of the responding micronode and one of six statistical parameters which depends upon the type of all call message which was received. The proportional delay distributes the all call response messages throughout the interval between two successive all call messages and thus avoids the problem of overloading the communication network 36 with many simultaneous responses from all of the addressable nodes in the network. The all call responses not only permit the maintenance of statistics tables for network control functions, but also permit dynamic connection and disconnection of network terminals automatically by the network 36. On the way down, the all call messages are duplicated and distributed to each possible downward path so that they arrive at all nodes in the network. Then, as the all call response messages pass upward through the network 36, each node maintains in memory a table of responding node addresses and corresponding paths over which the responding addresses are received. Subsequently, upon receipt of a downward passing message for one of the previously responding node addresses, the table is utilized to determine the proper path over which the message should be forwarded. Net master node 134 provides statistics and a hierarchy data base on demand to the host data processor 12 or through the console interface node 148 to the TTY control console 52. It also relays network node control information on demand from console 52 or host adapter 32 to the network.

Y node 110 includes an MPUMOD designated YNMPU, an RAMA[1.5K] designated YNRAM, and PROM[1K] designated YNPROM. Y node 110 receives information from peripheral output micronode 106 through two port 116 as explained previously and communicates information to peripheral processor input micronode 104 through two port 112 as previously explained. In addition, Y node 110 communicates through the fan-out node devices 54, 56 and their connecting two port memories 84, 86 and through two port memory 88 to line master exchange unit device 60. The messages which are passed downward toward two port 88 (see FIG. 1) include OTDATM, ALCALM, ABORTM, NCRDM and NCWRM, while the messages which are passed upward from two port 88 include INDATM, ALCLRM, PRSNDM, and NCRSPM. Y node 110 also communicates bidirectionally with net master node 134 through two port buffer memory 136 having net master node input queue (NMINQ) 137 and netmaster node output queue (NMONQ) 138. Messages PRSNDM, ALCLRM, INDATM, and NCRSPM are sent to net master node input queue 137 while messages ALCALM, NCRDM, and NCWRM are received from net master node output queue 138.

Y node 110 operates to move messages in a 24 a byte large block format between the net master node 134 (FIG. 3) and between the host adapter 32 and two port memory 84 for fan-out node device 54. Y node 110 duplicates and routes a copy of each upward flowing message from two port 84 through host data up queue 113 of two port 112 and through NMINQ 137 of two port 136 to net master node 134. Y node 110 also serves to merge messages received from net master node 134 through net master node output queue 138 with upward messages from two port 84.

The console interface node 148 communicates bidirectionally through two port buffer memory 144 with net master node 134 as previously explained. It provides an interface between the data format of the TTY control console 52 and the 24 byte large block data format of the network 36.

Network controller 50 also includes an exchange unit control (EUCONTRL) standard module designated NMCONTRL and a net master interrupt module (NMIM) designated NMIRQM. NMIRQM is a programmable timer that is assigned an address on an internal bus of net master node 134. It is reset by addressing the NMIRQM module and writing therein the four least significant bits of the 8 bit data portion of the bus of net master node 134. NMIRQM then times out after a period of time equal to 32.768 MSEC times the number written therein for resetting and generates an interrupt request signal IRQ which is communicated to the microprocessor in the microprocessor module, NMNMPU. NMCONTRL provides network controller 50 with 2 phase 1MHz master clock signals, run/halt control signals to facilitate program debugging, a power on signal and a master reset signal.

Two port buffer memory 136 includes an S2PADAPT designated HDA2PORT and a RAMA[0.25K] desigated HDAQRAM. Two port buffer memory 130 includes an S2PADAPT designated HCD2PORT and a RAMA[0.25K] designated HCDQRAM. Two port buffer memory 144 includes an S2PADAPT designated LC2PORT and a RAMA[0.25K] designated LCQRAM.

Two port buffer memory 112 includes a S2PADAPT designated HDA2PORT and a RAMA[0.25K] designated HDAQRAM. It provides communication from Y node 110 to micronode PIMN 104. Similarly, two port buffer memory 130 includes a S2PADAPT designated HCD2PORT and a RAMA[0.25K] designated HCDQRAM. It provides bidirectional communication between net master node 134 and net master interface node 108.

Two port buffer memory 84 includes fan out down queue 1 150 and fan out up queue 1 151 to provide communication between Y node 110 and fan out node device 56. FODQ1 150 carries messages OTDATM, ALCALM, ABORTM, NCRDM, and NCWRM while FOUQ1 151 carries messages INDATM, ALCLRM, PRSNDM, and NCRSPM. Two port buffer memory 84 is assembled from an S2PADAPT designated F012PORT and a RAMA[0.25K] designated F01QRAM.

FAN OUT NODE DEVICE 54

Referring now to FIG. 1, fan out node device 54 in-includes a sngle nonaddressable FON1 type micronode having MPUMOD designated FOW1MPU, RAMA[0.5K] designated FON1RAM, a PROM[3K] designated F01PROM, a NODEADR designated FON1ADR and EUCONTR designated FON1CONTRL. It duplicates and fans out the all call message, ALCALM, to four fan outs. It also maintains by all call responding node address a table indicating the one of four paths over which an all call response is received. Downward flowing messages can thus be distributed over the proper fan out path by using the table. Although not implemented in the present embodiment, the network may be expanded by using the last or 24th byte of a data block as a check sum below the fan out nodes and as a path address above the fan out nodes. Each fan out node would then use a different permutation of bits in the last byte to indicate the data path. A full 1K address set would then be available for each of up to 256 data paths. With the fan out nodes located at the host site, communication with the host can be deemed error free without a check sum.

Two port 86 includes fan out down queue 2 154 and fan out up queue 2 155 and is identical to two port 84, except that the RAMA[0.25K] is designated FO2QRAM and the S2PADAPT is designated FO22PORT.

Fan out node device 56 is identical to fan out node device 54 except that the numeral 2 is substituted for numeral 1 in the module designations.

Two port 88 includes subnet down queue 158 and subnet up queue 159 and provides a communication between fan out node 56 and line master exchange unit device 60. Two port 88 includes a RAMA[1K] designated BY2PORT and an S2PTADAPT designated BY2PRAM.

LINE MASTER EXCHANGE UNIT DEVICE 60

Referring now to FIG. 4, the line master exchange unit device 60 includes micronode B96BN 170 which provides bidirectional communication between two port buffer memory 88 and a large two port buffer memory 172, wich is in turn coupled to line master 9.6 KHz node LM96N 174. A line master exchange unit control module 176 provides general control signals for the line master exchange unit device 60 including a 1 MHz clock signal, run/halt control to facilitate program debugging, a power up signal indicating that the power supply is providing adequate power, and a master reset signal.

Micronode 174 communicates through a two port buffer memory 178 which defines an end up queue east EUQE 179 with a micronode IE96NE 180, through a two port 182 which defines an end down queue west EDQW 183 with a micronode OE96NW 184, through a two port 186 which defines an end up queue west EUQW 187 with micronode IE96NW 188, and through two port 190 which defines end down queue east EDQE 191 with micronode 0E96NE 192.

A standard utility supplied 9.6 KHz full duplex data link includes a pair of opposite direction 9.6 kilobit data lines 196, 198, a first data service unit 200 and a second data service unit 202. The end of line 198 which connects to data service unit 200 provides data through input matching module IM96M 204 and channel input module CHIM 206 to node IE96NE 180 and the opposite end, which connects to data service unit 202, receives data from node OE96NE 192 through channel output module CHOM 214 and output matching module OM96M 211. Similarly, the end of line 196 which connects to data service unit 200 is coupled to receive data from micronode OE96NW 184 through CHOM 208 and OM96M 205 and the opposite end which connects to data service unit 202 is coupled to provide data through IM96M 210 and CHIM 212 to micronode IE96NW 188.

The transmission and receipt of data over line 196 and over line 198 is essentially identical except for the opposite directions involved. For this reason, the communication will be described in detail only with reference to the line 196.

As shown in FIG. 4B, the data service unit 200 generates a 9.6 KHz squarewave clock signal $\overline{C3A}$ which is inverted by output matching module OM96M 205 and communicated to channel output module CHOM 208. CHOM 208 receives parallel data from micronode OE96NW and outputs this data serially as signal DAOUT synchronously with C3A. Signal DAOUT is complemented by OM96M 205 before it is provided to DSU 200.

The complemented data is carried by the communication link in complemented form to be output by DSU 202 as signal $\overline{\text{DAIN}}$ synchronously with a clock signal $\overline{\text{C1A}}$. Input matching module IM96M 210 communicates both DAIN and C1A to CHIM 212 in their uncomplemented form where CHIM 212 uses the rising edge of C1A at the center of each bit time interval to sample signal DAIN by loading it into a serial-in-parallel out shift register.

Channel input module 212 provides data block synchronization of the serial data stream and also provides a serial-to-parallel conversion. Upon accumulation of each set of sixteen data bits or two bytes, the channel input module 212 generates an interrupt signal, $\overline{\text{IRQ}}$, which causes the connected micronode IE96NW 188 to address a first I/O read select signal to generate a read shift register signal READSRS which causes channel input module 212 to place the contents of its shift registers onto an eight bit data bus designated DB0-7 which connects to an eight bit data bus of an MPU module of node 188. MPU module address line A0 is connected to channel input module 212 and commands a first byte of data to be placed on the data lines when at logic 0 and a second byte of data to be placed on the data lines when at logic 1.

A second addressable I/O read select output of the MPU module of micronode 188 commands a signal READCNTR which causes the contents of a double byte counter within the synchronizing circuitry of channel input module 212 to be placed on the data bus lines DB0-2. Micronode 188 is thus able at any time to determine the number of double bytes that have been received by channel input module for a given small data block. It will be recalled that information is transmitted over the communication links in the form of small data blocks having twelve bytes equal six double bytes equal 96 bits.

In a somewhat similar fashion, output end node OE96NW 184 provides in parallel byte form over data bus lines DB0-7 data information that is to be communicated by data service unit 200. A channel output module 208 receives the data from micronode 184 in parallel eight bit byte form, provides a parallel to serial conversion and outputs the data in serial form as signal DATA-OUT in response to clock signal, C3A received from output matching module 205. The parallel data is provided to channel output module 208 by micronode 184 in a double byte form by addressing a first I/O write select output to activate a signal load LOADBYT1 which causes data to be transferred from the eight bit parallel data bus lines to a first eight bit shift register and by subsequently addressing a second location to activate a second I/O write select signal to generate a signal LOADBYT2 which causes data appearing on the data lines to be written into a second eight bit latch which is in turn coupled to a second eight bit shift register that is coupled in series with the first eight bit shift register. Upon loading the contents of the latches into the shift registers, channel output module 208 generates an interrupt signal, $\overline{\text{IRQ}}$, to which micronode 184 may respond by loading another pair of bytes into the latches of channel output module 208.

Micronode B96BN 170 includes an MPUMOD standard module designated BNMPU, and NODEADR module signated BNADR, a RAMA[0.25K] module designated BNRAM , a PROM[2.5K] module designated BNPROM1, and a PROM[3.5K] module designated BNPROM2. Micronode B96BN 170 receives downward flowing information through two port 88 and stores the information in one of a plurality of queues formed within large two port 172.

Large two port 172 contains 32K bytes of random access storage and implements 32 buffer pairs 220 designated MBP0-31, with each buffer of a buffer pair designated either, 0 or, 1 and containing storage for sixteen blocks or cells of 24 data bytes each. Each connected terminal node is assigned one of the buffer pairs as the terminal nodes respond to all call messages and micronode 170 stores data coming from two port 88 in one of the buffer pairs according to the destination address indicated by the data. Micronode 170 also tests the availability of a buffer pair and indicates the availability to the host data processor 12 so that host 12 can output information for a given terminal only when space is available in a buffer pair and thus prevent a data overflow. Micronode 170 also stores in a down portion 227 of a master queue 226 implemented by large two port 172, nondata information that is flowing downward from two port 88. Node 170 also receives from a master up queue 228 implemented by large two port 172 all information that is flowing upward toward two port 88 from micronode LM96N 174. The messages handled by node 170 include messages INDATM, PRSNDM, OTDATM, NCRDM, NCWRM, NCRSPM, ALCALM, ALCLRM, and ABORTM. Micronode 170 processes messages ALCLRM, ALCALM, OTDATM, NCRDM, NCWRM and ABORTM with other messages being simply relayed therethrough.

Line master exchange unit device 60 also includes line master 96 node 174, an MPUMOD designated LMNMPU, a BUSXTEND module designated LMBUSX, a NODEADR module designated LMNADR, a ROMA[0.5K] module designated LMNRAM, a PROM[3K] module designated LMNPROM1, a PROM[3K] module designated LMNPROM2 , and a PROM[4K] module designated LMNPROM3.

Micronodes OE96NE 192 and OE96NW 184 each maintain a queue of small 12 byte blocks in their private stores waiting output on data links 198 and 196 respectively. The control pointers for the queue in OE96NE 192 are maintained in two port 190 and the control pointers for the queue in OE6NW 184 are maintained in two port 182. Thus micronode LM96N 174 may examine both sets of pointers and is able to determine the number of small data blocks in storage in the two queues in OE96NE and OE96NW.

In order to maintain maximum loading of the two output data links it is necessary that the two private queues in OE96NE and OE96NW contain blocks waiting for output on the two data links if any blocks are available from the buffer pairs 220 or MDQ 228 in L2PORT 172. Conversely, a large number of blocks waiting in the queues in OE96NE 192 and OE96NW 184 will increase the time required to output a newly arrived higher priority block.

For this reason, micronode LM96N 174 examines the number of blocks stored in the private queues in OE96NE 192 and OE96NW (using its access to the two port) and delivers a large 24 byte block (which may transform into either one or two small 12 byte blocks) to two port queue PDQE 191 only if the private queue in OE96NE 192 contains less than three small 12 byte blocks or to two port queue EDQW 183 only if the private queue in OE96NW 184 contains less than three small 12 byte blocks. Micronode LM96N outputs along either of the two output paths (not having more than two small blocks in the corresponding private queue) on a chance basis, depending on the order of examination.

In contrast to this chance path selection technique, the higher priority upward flowing messages are assigned to flow through a shortest path as explained below.

Referring now to FIG. 4, line master micronode 174 executes an availability algorithm to send information from a master buffer pair 220 to a matching buffer pair in Terminal Exchange Unit Device (40, 41, 42 or 43) when space is available within the destination buffer pair. Node 174 maintains a table of information indicating the rate at which each terminal node accepts data, which is typically much slower than the rate at which the data is communicated through the network. Node 174 uses this table of information to execute a line allocation algorithm in which a parameter is maintained for each active terminal in the subnet below node 174 which indicates the amount of data stored in buffer storage for each terminal. Each time a data block is sent to a given terminal, the stored data quantity parameter is incremented, and at predetermined time intervals, the stored data quantity parameter is decremented to reflect the rate at which the terminal accepts data from its associated buffer storage. As space becomes available in one of the two private queues in OE96NE 192 and OE96NW 184 corresponding to the two downward paths, microprocessor node 174 searches each buffer pair within large two port 172 to determine if data is available for transmission to the corresponding terminal. If data is available, the parameter which indicates the amount of data stored at the corresponding terminal is retrieved from stroage and compared with other similar parameters. The next data block is thus selected for transmission through the network to the terminal among those for which data is available in large two port 170 which has the smallest backlog of stored data at the terminal as determined by the predictive terminal storage parameters. By maintaining a uniform backlog of data blocks in buffers at the terminal site for terminal nodes for which data is available, optimum use is made of the subnet communication link and short term peak loads which might otherwise cause a response delay at the terminal nodes are accommodated. During times of peak demand, the stored backlog of data at the terminal nodes, coupled with continued transmission at a maximum rate through the network, assures the continuous availability of data to each active terminal unless a period of peak demand has an unusually long duration. This buffering provided by the network storage capacity allows more terminals to use the same communication links without peak demand information delays. The cost effectiveness of the expensive transmission links is thus improved.

Node 174 functions to insert a sequence number in the five least significant bits of the third byte of each block to indicate the cell position of each block within a 16 cell buffer. This assures reassembly of the blocks in the proper order upon receipt at the terminals.

Still another function of line master node 174 is to test and maintain the communication integrity of the 9.6 KB data link. It periodically sends a continuity message, LPCNTM, through data lines 196 and 198. If a continuity message for a given line fails to come full circle back to node 174 three times in a row, a line failure is presumed. Node 174 then begins isolating the failure by commanding a loop back at the farthest line exchange unit device from each end. For example, a message is sent through link 196 commanding a loop back at line exchange unit device 64. Continuity is then tested with a continuity message. If no continuity is found, the next farthest line exchange unit device is commanded to loop back. The farthest device for which continuity exists is thus determined and a loop is established through link 196 to this farthest terminal and back on link 198. Similarly, a longest possible loop is established from the other end. The communication failure is thus isolated and the network continues to communicate with as many terminals as possible until the failure is corrected or repaired.

Micronode LM96N 174 processes messages OTDATM, ALCALM, REINM, NCRDM, NCWRM, NCRSPM, ALCLRM, INDATM, SETAKM, ALMSRM, ACKPRM, LPCNTM, LPBAKM, CLPBKM, REQSTM, and ABORTM.

Large two port 172 includes a large two port adapter module designated LM2PORT, and four 8KRAM modules designated 8KRAMD-3.

Master up queue 228 contains sixteen cells, each storing a 24 byte large block of data. Master down queue 227 stores and passes all downward flowing messages except OTDATM. These include ALCALM, ABORTM, NCRDM, and NCWRM.

Master up queue 228 also provides storage for sixteen cells for large data blocks of 24 bytes each. It stores and passes all upward flowing messages from micronode LM96N 174. These upward flowing messages include messages ALCLRM, PRSNDM, INDATM, and NCRSPM.

The master buffer pairs 220, represent two master buffers 222, 224, each providing storage for sixteen cells, each cell storing a large 24 byte data block of information. The master buffer pairs hold host message output blocks of data for corresponding terminals until the data can be sent through the subnet to a terminal node device. For ease of distinguishing, the buffer pairs are designated MBP followed by a first number, a comma, and a second number. The first number designates a particular one of 32 buffer pairs numbered 0–31 and the second number 0 or 1 indicates a particular buffer of a buffer pair. The master buffer pairs pass message OTDATM.

Four two port buffer memories 178, 182, 186 and 190 implement queues for carrying messages between micronode 174 and micronodes 180, 184, 188 and 192 respectively. Each of these two ports is structurally identical and includes a small two port adapter module and a RAMA[0.25K] module. The two port adapter module for two port buffer memory 178 is designated IE2PORT while the RAM array is designated IE2-PRAM. The two port adapter module for two port memory 182 is designated OW2PORT while the memory is designated OW2PRAM. The two port adapter module for two port buffer memory 186 is designated IW2PORT while the memory is designated IW2-PRAM. Similarly, the two port adapter module or two port memory 190 is designated OE2PORT while the memory is designated OE2PRAM. Two ports 178 and 186 implementing upward flowing queues EUQE 179 and EUQW 187 respectively are substantially identical and contain storage for ten cells of 24 byte long blocks of data. They pass messages INDATM, SETAKM, ALMSRM, ACKPRM, LPCNTM, ALCLRM, and NCRSPM. Two port buffer memories 182 and 190 implementing downward queues EDQW183 and EDQE191, respectively, are also substantially identical and contain storage for ten cells of large 24 byte data blocks. These two ports carry messages OTDATM, REINM, REQSTM, LPBAKM, CLPBKM, ALCALM, NCRDM, ABORTM and NCRWM.

Micronode IE96NE 180 includes an MPUMOD module designated IE96NEMPU, and NODEADR module designated IE96EADR, a RAMA[0.25K] module designated IE96ERAM, a PROM[2.5K] module designated IE96EPROM, and for some purposes it is considered to include the channel input module 206 and input matching module IM96M. Micronode 180 operates to either pass on or discard all data blocks received through the data link 198. It processes messages ALCALM, LPCNTM, INDATM, SETAKM, ALMSRM, ACKPRM, NCRDM, ALCLRM, NCWRM, and NCRSPM. It provides a conversion from the small 12 byte double block form in which data is communicated over the data link to a 24 byte large block form over which the data is communicated through the network above the data link.

Micronode OE96NW 184 includes an MPUMOD module designated OE96NWMPU, an NODEADR module designated OE96WADR, a RAMA[0.25K] module designated OE96WRAM, and for some purposes is considered to include channel output module 208 and output matching module 205. Micronode 184 moves blocks of data from queue EDQW 183 to a private internal queue for output on the digital data service line 196. Micronode 184 converts the data from a large 24 byte block format to a small 12 byte double block format in which it is moved over the data link. Whenever the private queue contains no 12 byte small blocks, empty frames consisting of a one bit followed by 95 zeros are communicated to channel output module 208 for communication over the data links. Micronode 184 provides synchronous frame timing for the 9.6 kilobit digital service link and for line master micronode LM96N 174.

Micronode 184 processes messages ALCALM, LPCNTM, OTDATM, NCPSPM, ALCLRM, REQSTM, LPBAKM, CLPBKM, ABORTM, REINM, NCRDM, and NCWRM.

Micronode IE96NW 188 includes an MPUMOD module designated I96NWMPU, an NODEADR module designated I96WADR, a RAMA[0.25K] module designated I96WRAM, a PROM[2.5K] module designated I96WPROM and is sometimes considered to contain channel input module 212 designated I96WCHIM as well as input matching module 210. Micronode 188 is functionally identical to micronode 180 as described above.

Micronode OE96NE includes an MPUMOD module designated OE96NEMPU, a NODEADR module designated OE96EADR, a RAMA[0.25K] module designated OE96ERAM, a PROM[2.5K] module designated OE96EPROM, and for some purposes is considered to include channel output module 214 designated OE96ECHOM as well as output matching module OM96M 211.

LINE EXCHANGE UNIT DEVICE

Referring now to FIG. 1, the 9.6 kilobit line exchange unit devices 62–64 are substantially identical except for the assignment of mutually exclusive addresses to micronodes therein. Each line exchange unit device maintains a table of addresses for addressable micronodes connected therebelow (a terminal device such as device 41 appears to a line exchange unit device as an addressable terminal node within a terminal exchange unit device such as device 73) and selectively removes data blocks from the 9.6 kilobit data links for communication to downstream addressable micronodes or passes the information along the 9.6 kilobit data link to the next line exchange unit device or to line master exchange unit device 60 as the case may be.

Referring now to FIG. 5, 9.6 kilobit line exchange unit device (LEU) 64 is exemplary of the line exchange unit devices and will be described in greater detail. 9.6 kilobit line exchange unit device 64 is coupled to a pair of utility supplied data service units 240, 242 which are identical to the data service units 200, 202 shown in FIG. 4. A loop back module 244 is bidirectionally coupled to data service unit 240 while a loop back module 246 is bidirectionally coupled to data service unit 242. Loop back module 244 selectively operates in a normal mode of operation to receive signals DAIN and C1A from an input matching module IM96M 248 and to pass these signals straight through to a channel input/output module CHIOM 250. Simultaneously, loop back module 244 operates in a normal mode to receive signal C1A and signal DAOUT from channel input/output module CHIOM 252 and pass the two signals straight through to a phase converter module PHCM 254 which synchronizes the data signal with a transmit clock signal C3A received from output matching module OM96M 258 and provides the synchronized data signal to the module 258. The input matching module 248 receives a clock signal $\overline{\text{C1A}}$ and a data signal $\overline{\text{DAIN}}$ from the data service unit 240, inverts the two signals, and passes them on to loop back module 244. The output matching module 258 receives signal $\overline{\text{DAOUT}}$ and inverts it to provide a signal DAOUT to data service unit 240. The output matching module 258 also receives a transmit clock, $\overline{\text{C3A}}$, which is synchronized with the $\overline{\text{DAOUT}}$ data signal, inverts the transmit clock and communicates the inverted clock to the phase control module 254 as signal C3A.

Loop back module 244 is selectively converted between a loop back mode and a normal mode in response to a 1 or a 0 respectively on data bus line DB0 at the occurrence of a loop back write command $\overline{\text{LPBK}}$ active low condition from a micronode D96NW 260. In the loop back mode, loop back module 244 receives signals C1A and DAOUT from channel input/output module 252 and communicates the same signals back to channel input/output module 250.

The coupling of data service unit 242 to line exchange unit device 64 is a substantially identical mirror image of the coupling of data service unit 240. An input matching module IM96M 262 receives signals $\overline{\text{DAIN}}$ and $\overline{\text{C1A}}$ from data service unit 242, inverts these signals, and passes them on to loop back module 246. In a normal mode of operation, loop back module 246 passes these signals on to channel input/output module 252. Loop back module 246 also receives signals DAOUT and C1A from channel input/output module 250 and passes them on to phase converter module 264. Phase converter module 264 synchronizes the data signal DAOUT with a transmit clock signal, C3A received output matching module OM96M 265 and provides the synchronized data signal to output matching module 265. Output matching module 265 receives a transmit clock signal, $\overline{C3A}$, from the data service unit 242 which is inverted and communicated to phase converter module 264 as signal C3A. Output matching module 265 also receives the data signal DAOUT from phase converter module 264, inverts it, and communicates it to the data service unit 242 as signal $\overline{DAOUT}$ for transmission over the data link.

Loop back module 246 is selectively controlled to be in a normal or loop back mode in response to micronode D96NE 266. In the loop back mode, loop back module 246 receives data and clock signals from channel input/output module 250 and communicates them directly to channel input/output module 252.

Line exchange unit control device LEUCNTRL 268 provides the overall control for the other standard modules in line exchange unit device 64. It provides a 1 MHz master clock signals, run halt controls for program debugging, a power on detecter-inhibiter, and a master reset control signal.

Micronode D96NW 260 is connected to receive 24 byte large blocks of data from coax in end node, CIEN 272 through a two port buffer memory 274 which implements a unidirectional queue data up queue west DUQW 276. The data blocks received through DUQW 276 are communicated to the data link through channel input/output module 252. In the present implementation upward flowing messages are always compressible into 12 byte small blocks of data even though they pass through the queue 276 in a large block format, and are given priority over downward flowing blocks of data on the data link.

Upon the storage of a block of data in queue 276, micronode D96NW 260 begins searching for a suitable data frame among the data flowing through channel input/output module 252. Upward flowing messages are allowed to pass therethrough, but upon receipt of the first empty frame or downward flowing message, the upward flowing message stored in queue 276 is inserted into the data stream and occupies one 12 byte time frame therein. If the time frame receiving the upward flowing message previously carried a downward flowing small block of data, the small block is temporarily stored by micronode 260 and inserted in the next time frame that does not carry an upward flowing message. If the next time frame itself carries a second downward flowing small data block, the second small data block is replaced on the communication link by the first small block and stored until space is available. This process continues until one or more empty time frames appear on the data link to permit all of the temporarily stored small blocks of data to be inserted into an empty time frame. Because of the priority assigned to the upward flowing small blocks, a terminal operator is assured a rapid response because the keyboard requests flow rapidly on a priority basis to host data processor 12, which can process a request and rapidly begin sending downward flowing return data to meet the request. As explained previously, the host data processor 12 can supply downward flowing data faster than it can be received from a terminal and the line allocation algorithm operates to assure optimum utilization of the network data carrying capacity to permit each terminal to receive downward flowing data at its maximum data rate.

Optimum terminal usage and minimum operator inconvenience and delay is thereby realized by initiating the downward flow of the return message as soon as possible.

Micronode D96NW 260 also maintains a table of addresses for terminal nodes which are downstream therefrom and upon detecting a message passing through channel input module 252 addressed to one of these downstream terminal nodes, diverts the message from 9.6 kilobit data link through a two port 278 which implements a unidirectional drop down queue west 280 to micronode coax ouput end node COEN 282, which transmits the data block along a coaxial cable 284 to a downstream terminal node.

Micronode D96NW 260 has a pair of I/O write enable outputs $\overline{LOADBYT1}$ and $\overline{LOADBYT2}$ coupled to channel input/output module 252 to write therein respectively the least significant and most significant bytes of a double byte of information for communication over the data link. Channel input/output module 252 accumulates a serially received double byte of information in a serial in and parallel and serial out shift register and generates an interrupt request $\overline{IRQ}$ when a full 16 bits are available. To read this information, the micronode 260 responds to the interrupt request by generating a read control signal through an I/O select output with lowest order address bit A0 commanding reading first the least significant byte and then the most significant byte. The destination address of a block of data is always contained within the first 16 bits to permit micronode 260 to rapidly determine whether the block of data contains an address for a downstream addressable micronode which should be pulled off the 9.6 kilobit line and passed downward or whether it should be allowed to pass along the 9.6 kilobit line. An I/O read select output, $\overline{READSRS}$, commands the reading of the shift registers while a similar output, $\overline{READCNTR}$, commands the reading of a counter inside channel input/output module 252 which counts from 0 to 5 as the six double bytes of a small block of data pass therethrough. Micronode 260 may also respond to the interrupt request by substituting selected output data for serially received data in the output portion of CHIOM 252.

Micronode D96NW 260 includes an MPUMOD module designated W96DNMPU, a RAMA[1K] module designated WDNRAM, PROM[4K] module designated WDNPROM, a BUSXTEND module designated WDNBUSX, a NODEADR module designated WDNADR, and for some purposes is considered to include the channel input/output module 252 designated WESTCHIO, the phase converter module 254 designated WPHCM, the input matching module 248 and the output matching module 258. Micronode 260 passes messages ALCALM, LPCNTM, ODTADM, REQSTM, LPBAKM, CLPBKM, ALCLRM, INDATM, ACKPRM, SETAKM, ALMSRM, ABORTM, REINM, NCRDM, NCWRM, and NCRSPM.

Drop 96 node east D96NE 266 is the counterpart of micronode 260 for channel input/output module 250. It receives upward flowing 24 byte large blocks of data (containing 12 byte small block messages) from coax input end node 272 through two port buffer memory 286 which implements drop up queue east DUQE 288. Micronode 266 also receives downward flowing messages from channel input/output module 250 and communicates them through two port buffer memory 290 which implements drop down queue east DDQE 292 to coax output end node 282.

Micronode D96NE 266 is functionally and structurally equivalent to node 260 and includes an MPUMOD module designated E96DNMPU, a RAMA[1K] module designated EDNRAM, a PROM[4K] module designated ENPROM, a BUSXTEND module designated ENDBUSX, a NODEADR module designated EDNADR, and for some purposes is considered to include channel input/output module 250 designated EASTCHIO, phase converter module 264 designated EPHCM, output matching module 265 and input matching module 262. It receives messages ALCAM, LPCNTM, OTDATM, REINM, REQSTM, LPBAKM, CLPBKM, NCRDM, NCWRM, ALCLRM, INDATM, ACKPRM, SETAKM, ALMSRM, and ABORTM, and NCRSPM. Micronode 266 is a switching and injecting synchronous node which serves as part of the line exchange unit 64 attaching to the east to west 9.6 kilobit loop. It switches downward flowing blocks addressed to nodes on the coax loop which it has access to via micronode COEN 282 with switched blocks being passed to COEN 282 for transmission as blockettes on the coaxial cable 284. Micronode D96NE 266 also relays other blocks through CHIOM 250 and inserts upward flowing blocks from the coaxial cable 284, which are received via micronode CIEN 272, onto the 9.6 kilobit loop according to priority and time availability. Micronode D96NE 266 includes a table of downstream micronode addresses permitting it to determine the addresses of downstream micronodes. Micronode 266 also operates in response to control messages addressed thereto and received through the network to control loop back module 246 in a normal or loop back configuration in response to messages from line master exchange unit device 60 to maintain maximum communication capability for the subnetwork in the event of a data link communication failure.

Clock multiplier times six module, CLMX6 294, receives the 9.6 KHz clock signal C1A from input matching module 246 and includes a multiplying phase locked loop which generates clock signals C1B and C2B at 57.6 KHz to serve as master clock signals for the coaxial cable loop 284. Signal C2B leads signal C1B by one-fourth 57.6 KHz bit rate period.

A channel output module 300 includes a 16 bit double byte parallel in serial out shift register which receives parallel data from micronode COEN 282 and responds to the 57.6 KHz C1B clock signal to drive the coaxial cable 284 through an output half 302 of coax transceiver 304 as shown in FIG. 5B. At the other end of the coax loop, data passes through an input half 306 of coax transceiver 304 which communicates the data to a channel input module 308 along with clock signal C1B which permits a conversion by channel input module 308 from a special self-clocking signal format on coaxial cable 284 to the standard separate data and clock format used elsewhere within the communication network. Channel input module 308 includes a 16 bit double byte serial in parallel out shift register and generates an interrupt signal $\overline{IRQ}$ to micronode CIEN 272 to permit the reading of a double byte of data from the shift register when it is full. A read counter may also be read in response to signal $\overline{READ\ CNTR}$ by micronode 272 to indicate the location of a double byte of data within a small block of data containing six double bytes which is the format for communication along the coaxial cable 284. As with communication along the 9.6 kilobit link, 24 byte large blocks of data are actually communicated through the coaxial cable 284 as two 12 byte (6 double bytes) small blocks of data. Each data time frame carries one small block of data with 96 bits.

Micronode CIEN 272 includes an MPUMOD module designated CIENMPU, and NODEADR module designated CIADR, a RAMA[1K] module designated CINRAM, a PROM[4K] module designated CINPROM, and for some purposes is considered to contain channel input module 308 designated CHIN and the input portion 306 of coax transceiver 304 designated ½(COAXT/R).

Micronode CIEN 272 is a switching, synchronous 57.6 kilobit micronode which passes on or discards all small blocks of data received from the input end of the coaxial cable 284. It passes all switched small blocks to micronode D96NE266 or D96NW260 in response to a shortest path determining algorithm which uses information derived from the all call messages and all call response messages. The micronodes D96NW260 and D96NE266 insert into the all call messages flowing down therefrom a numerical count parameter which indicates the relative positions of these micronodes between the ends of the 9.6 kilobit data link. This information is used by micronode CIEN 272 to determine the shortest path through micronode 260 or micronode 266 to the line master exchange unit 60 and this shortest path is preferentially selected for the communication of upward flowing data blocks.

Micronode CIEN 272 handles messages ALCALM, ALCLRM, INDATM, ALMSRM, REQSTM, OTDATM, ACKPRM, REINM, NCRDM, SETAKM, ABORTM, NCWRM, and NCRSPM.

Micronode COEN 282 operates to receive data blocks from micronodes D96NW260 and D96NE266 and communicate the received information along the coaxial cable 284 through channel output module 300. Channel output module 300 designates an interrupt request $\overline{IRQ}$ when a 16 bit latch therein is ready to receive data and micronode COEN 282 responds by generating a signal $\overline{LOADBYT1}$ to command the loading of the least significant 8 bit byte into the latches and a signal $\overline{LOADBYT2(RSTIRQ)}$ to command the loading of a second most significant byte into the latches and to reset the interrupt request.

Micronode COEN 282 is a nonswitching synchronous micronode which moves blocks of data from queues DDQE 292 and DDQW 280 to channel output module 300. The blocks of data are moved into a private queue within micronode 282 for communication on a space available basis and whenever no data blocks are stored within the private queue, empty frames containing a single one start bit followed by 95 zeros are transmitted over the coaxial cable 284. Micronode 282 communicates messages OTDATM, ALCALM, REQSTM, ABORTM, NCRSRM, ALCLRM, REINM, NCRDM and NCWRM. Micronode COEN 282 includes an MPUMOD module designated COENMPU, a node address module NODEADR designated COADR, a RAMA[1K] modules designated CONRAM, a PROM[4K] module designated CONPROM, and for some purposes is considered to include channel output module 300 designated CHOUT and output portion 302 of coax transceiver 304 designated one-half (COAXT/R).

The two port buffer memories 274, 286, 278, and 290 include a S2PTADAPT module designated WO2-

PORT and a RAMA[0.25K] module designated WO2-PRAM. Similarly, two port 274 includes S2PTADAPT module designated WIN2PORT and a RAMA[0.25K] module designated WIN2PRAM, two port 290 includes an S2PTADAPT module designated EO2PORT and a RAMA[0.25K] module designated EO2PRAM while two port 286 includes an S2PTADAPT module designated EIN2PORT and a RAMA[0.25K] module designated EIN2PRAM.

As shown in FIG. 5B, data is transmitted on the coaxial cable 284 in a self clocking mode in which the first quarter of each bit period is always high or logic 1, the second and third quarters reflect the data, and the fourth quarter is always logic zero to guarantee a logic transition to logic one at the beginning of the next bit period. Some of the modules are used for both high speed and low speed lines and in the convention used herein a suffix A refers to a 9.6KB data link and a suffix B refers to a 57.6KB coaxial cable data link.

Input ↓ coax transceiver 306 provides data signal DBIN and clock signal C1B, which makes a low to high transition at the midpoint timewise of a logic 1 on signal DBIN. Signal C1B may thus be used to clock data input shift registers within CHIm 308.

Multiplier CLMX6 294 derives master clock signals C1B and C2B from signal C1A as provided by loopback module 246. These signals control CHOM 300 and output coax transceiver 302 and provide the master timing on the coaxial cable 284. While the same symbol C1B is used to identify both the clock signal from CLMX6 and the clock signal from input coax transceiver 306 because of their similar relationship to the data signals, it should be appreciated that the two signals will not in general be in phase.

The signals derived from and provided to the 9.6KB line are substantially as shown in FIG. 4B. Clock signal C1A makes a low to high transition at the middle of a DAIN data bit period and the phase converter modules 254, 264 synchronize the phase of DAOUT to place the middle of each data bit period at a low to high transition in signal C3A.

TERMINAL EXCHANGE UNIT DEVICE

Information passing around the coaxial cable 284 passes through a plurality of terminal exchange unit devices where blocks of data containing addresses for terminal nodes within the terminal exchange unit devices are pulled off and communicated to a terminal device coupled thereto and blocks of data from terminal devices are inserted on the coaxial cable to be communicated back around to the line exchange unit device 64.

Terminal exchange unit device (TEU) 73 is exemplary of the terminal exchange unit devices and, as shown in FIG. 6, includes an input portion 310 of a coax transceiver 312 which receives information from coaxial cable 284 and communicates the information to a channel input/output module 314. Channel input/output module 314 is coupled to a terminal node 316 which selectively receives blocks of data from channel input/output module 314, provides blocks of data to channel input/output module 314 or allows blocks of data to pass through channel input/output module 314 from the input portion 310 of coax transceiver 312 to an output portion 318 of coax transceiver 312 to be communicated along the coaxial cable 284. Terminal node 316 communicates through a two port buffer memory 74, which implements a terminal down buffer queue TDWBQ 320 and an terminal up queue TUADQ 322, with a terminal matching node 324. Terminal matching node 324 is not addressable and is not considered part of the network. For purposes of discussion it is considered part of data terminal 41 and provides a data format interface between the parallel internode data format appearing on the network 10 and the serial or other data format required by most terminals. A terminal interface module 326 provides an interface between the input and output serial data paths of terminal console 328 and the single bidirectional serial data path between terminal matching node 324 and terminal interface module 326.

An exchange unit control module designated TEUCTRL 330 provides the general control functions for terminal exchange unit device 73 including a 1 MHz clock signal, run/halt control for use of program debugging, power up detection, and a master reset signal.

Micronode TN 316 includes an MPUMOD module designated TNMPU, and NODEADR module designated TNADR, and RAMA[1.5K] module designated TNRAM, a PROM[3K] module designated TNPROM and for some purposes is considered to include the channel input/output module 314 designated CHIF and the coax transceiver module 312 designated COAXT/R. Terminal node 316 handles messages OTDATM, ALCALM, INDATM, REINM, REQSTM, NCRDM, NCWRM, ALCLRM, ACKPRM, SETAKM, ALMSRM, ABORTM, and NCRSPM. Node 316 is a switching and injecting synchronous node which interfaces terminal matching node 324 with the coaxial cable 284. It moves 24 byte large blocks of data from terminal matching node 324 onto the coaxial cable in 12 byte small block form and removes 12 byte small block form data from the coaxial cable which is destined for the terminal console 328. From the viewpoint of the network, it serves as the origin and destination for data relating to terminal 41. Terminal node 316 has internal queue storage for two 16 block downward flowing messages to provide a data buffer for information being communicated from host data processor 12 to terminal console 328. Two port buffer memory 74 includes an S2PADAPT module designated TMN2PORT and a RAMA[0.25K] module designated TMN2PRAM.

Two port 74 implements downward flowing TDWBQ 320 which stores three large blocks of data and upward flowing queue TUADQ 322 which stores six large blocks of data as a buffer interface between terminal node 316 and terminal matching node 324. TDWBQ 320 carries message OTDATM and queue TUADQ 322 carries message INDATM.

Only micronode TN 316 carries an address within the terminal exchange unit device 73. Downward flowing data blocks carrying this address are automatically pulled off by terminal node 316 and communicated to the terminal console 328. Similarly, messages from terminal console 328 are configured as data blocks and the address of terminal node 316 is inserted therein before they are communicated upward toward the host data processor 312. Thus, while terminal node 316 is considered to be part of the network and not part of the data terminal, the address of terminal node 316 defines the address of the data terminal connected thereto.

SMALL TWO PORT ADAPTER MODULE 340

Referring now to FIG. 7, the small two port adapter module 340 is shown as including three 8 bit two to one three state multiplexers 342, 344 and 346 providing communication between two processor 1 and processor 2 data buses and a single random access memory data bus. A single 12 bit two to one three state multiplexer 348 couples the two processor 1 and processor 2 address buses to a single RAM address bus. Multiplexer 348 carries eleven address signals permitting connection of up to 2K bytes of memory and a $\overline{\text{READ}}$ signal for each processor.

Small two port adapter 340 operates to alternately connect a first processor and a second processor to a random access memory during alternate half cycles of a 1 megahertz clock signal having opposite phase components P phase 1 and P phase 2. The select inputs of multiplexers 342 and 348 are coupled to clock signal P phase 1 so that during the half cycle when this clock signal is low, the A inputs which are connected to processor 1 are enabled and during the alternate half cycles, when signal P phase 1 is high, the B inputs connected to processor 2 are enabled and pass through to the Y outputs. Multiplexers 344 and 346 carry data signals from the RAM data bus to the processor 1 data bus and processor 2 data bus respectively. Only the A inputs are coupled to active data signals and they are continuously enabled.

Multiplexer 342 remains in a high impedance output state unless enable input G is driven low by a signal $\overline{\text{PWRITE}}$ in response to the coincidence of a high or write condition on signal $\overline{\text{RAMREAD}}$ (which is generated by a processor that is active during a selected half cycle and passes through multiplexer 348) and a signal RAMENABLE which is active high only when a processor which has been enabled for a given half cycle generates no active signals on any one of the four disable outputs connected thereto. A pair of five input OR gates 350, 352 receive the four disable signals from processor 1 and processor 2 respectively as well as signals $\overline{\text{P1}}$ and $\overline{\text{P2}}$ which respond to the clock signals to activate the OR gates during the time when the processor coupled thereto does not have access to the two port memory. Thus, one input to a NAND gate 354 is always enabled and in the event that one of the disable outputs from a processor having access to the two port becomes active, NAND gate 354 becomes fully enabled to prevent generation of signal RAMENABLE which permits reading or writing of the random access memory within the two port.

Only when a processor having access to the two port memory generates a read signal through multiplexer 348 to generate signal RAMREAD does a NAND gate 356 or a NAND gate 358 become fully enabled to generate a signal $\overline{\text{P1READ}}$ or $\overline{\text{P2READ}}$ to enable the output of multiplexer 344 and 346 to permit reading by processor 1 or processor 2 respectively. The communication of information appearing on the RAM data bus to the appropriate processor 8 bit data bus is thus enabled. It is thus apparent that during the positive half cycle of 1 MHz clock signal P phase 1 processor 1 is connected to the random access memory 360 as though processor 2 did not exist. Similarly, during the negative half cycle of clock signal P phase 1, processor 2 is connected to the random access memory 360 as though processor 1 did not exist. Each processor thus has complete access to the random access memory 360 during alternate half cycles of the clock signal P phase 1.

RAM ARRAY MODULE 360

The implementation of RAM array module 360 as presented in FIG. 7 is straightforward with an 8 bit decoder being responsive to address bits 8, 9 and 10 to generate 8 chip enable signals. The RAM array 360 may thus be constructed from modular increments of 256 words with each output of the decoder enabling a different block of 256 words. The small two port adapter module 340 and the RAM array 360 together constitute a small two port buffer memory of the type which is used throughout the communication network 10. The disable inputs are not connected in the small two port configuration but are available for array selectio where multiple arrays are connected to a microprocessor module. The RAM OFF is connectable to the disable signal of the bus extender module.

MPU MODULE 370

Referring now to FIG. 8, a standard MPU module, MPUMOD 370 includes an MC6800 microprocessor 372 and a small amount of interface and control circuitry. An in/out write select decoder 374 operates to decode enable and address select inputs to provide an active signal on one of eight address selected outputs when fully enabled. Similarly, an in/out read select decoder 376 responds to the proper combination of address output signals to activate one of eight read select outputs. These write and read select outputs are connected to peripheral units such as channel input modules, channel output modules, or channel input and output modules to command the writing and reading of information relative to these input/output peripheral units.

A memory control decoder 378 responds to the three most significant address bits A13–A15 to divide the addressable memory fields into eight, 8K segments. Of these eight segments, one is connectable to select an internal random access memory array, one is connectable to select a small two port buffer memory to which the microprocessor may be connected, for example, by connection as one of the four disable inputs. Four outputs are available for selection of memory space in a large two port memory such as memory 172, one signal is available to select the input/output decoders 374, 376 and one can select a programmable read only memory. A combination microprocessor reset and deadman's stick is implemented with a pair of timing circuits including an 8 millisecond timer 380 and a 10 microsecond timer 382. An external reset signal sets timer 380 and timer 382 to cause timer 382 to generate a 10 microsecond reset signal for the MPU 372. If within 8 milliseconds, the MPU does not respond to a periodically executed program instruction (for example in case an error has occurred in program execution) by generating an input/output write select 7 signal by executing a dummy write into the corresponding address location, to reactivate timer 380, timer 380 times out and causes timer 382 to generate a 10 microsecond reset pulse. A timer 384 generates a short write gate pulse, WRITEG1 and a write pulse, WRPULSE when signal CLOCK 2 is high while a write operation is commanded by microprocessor 372.

NODE ADDRESS MODULE 390

Referring now to FIG. 9, standard module NODEADR 390 provides the mutually exclusive address for a given micronode. The address is defined in one's complement form by a pair of switch sets 392, 394. Switch set 392 contains eight switches which are coupled between ground and each of eight address lines to define a most significant byte of a 16 bit address. Similarly, switch set 394 includes eight switches, each of which is connected between ground and a different address line to define the eight bits of a least significant address byte. An eight bit two to one multiplexer 396 has eight three state inverting outputs which are connected to the data bus of an associated MPU module. An enable input signal, is connected to be activated by an in/out write select output, I/O WSEL from a connected microprocessor module with signal LSBSEL being driven by a bit zero address line of the microprocessor module to select first the most significant byte of the address and then the least significant byte of the address for reading onto the microprocessor module data lines.

BUS EXTENDER MODULE 400

Figure 10:
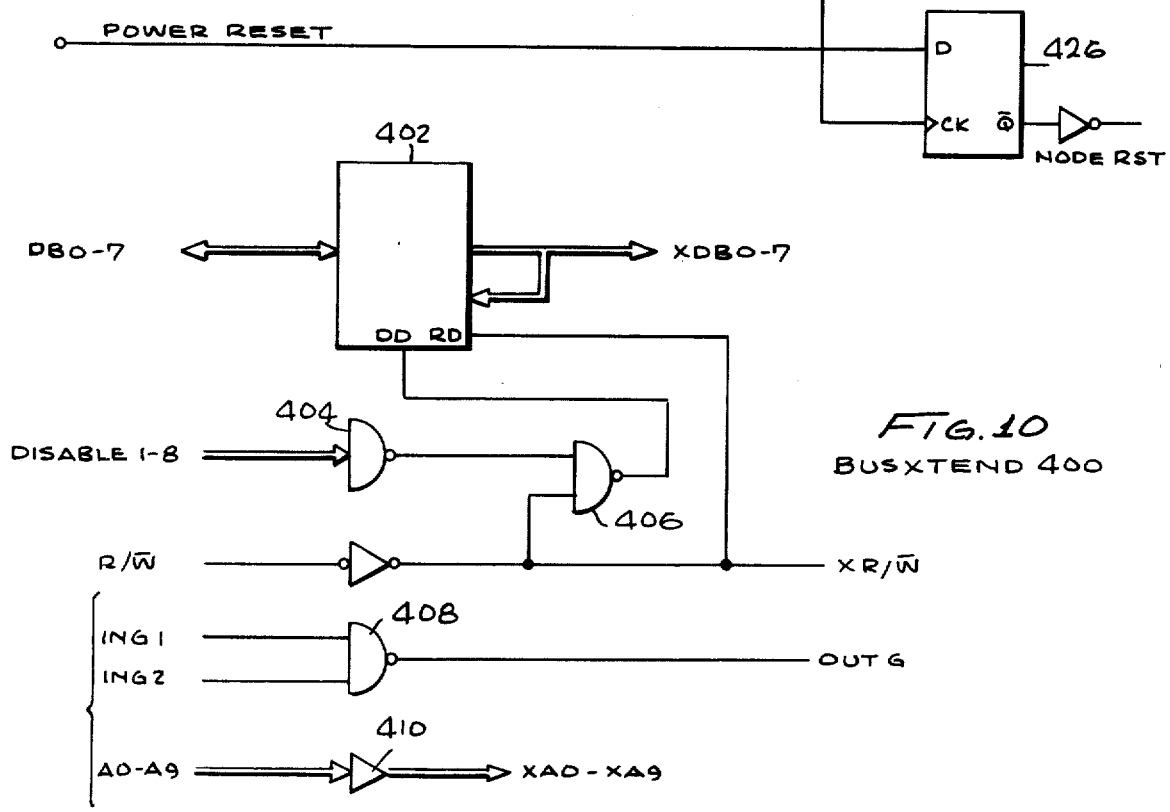
FIG. 10 is a block diagram and schematic representation of a bus extender module used in the system shown in FIG. 1.

Referring now to FIG. 10 a standard module BUSXTEND 400 includes a bidirectional bus driver 402 for the eight bit data bus, NAND gates 404, 406 connected to disable the bus and prevent the reading of information onto the processor data bus except when the read/write processor output is in a read condition, and when at least one of eight disable inputs is at logic zero. For example, the eight decoded address outputs which divide a microprocessor address field into eight parts might each be connected as a disable input. Thus, unless at least one of these outputs is low, information cannot be transferred from the extender bus to the processor data bus. Similarly, a disable input of bus driver 402 is connected to the R/$\overline{W}$ signal through NAND gate 406 to prevent data from appearing on the extender data bus from the processor data bus except during a read microprocessor operation. A NAND gate 408 receives two input gating signals and generates an output gate signal in response thereto while a buffer 410 receives address signals A0–A9 to provide a fan out of bus extender address signals XA0–XA9 in response thereto.

EXCHANGE UNIT CONTROL MODULE 414

Figure 11:
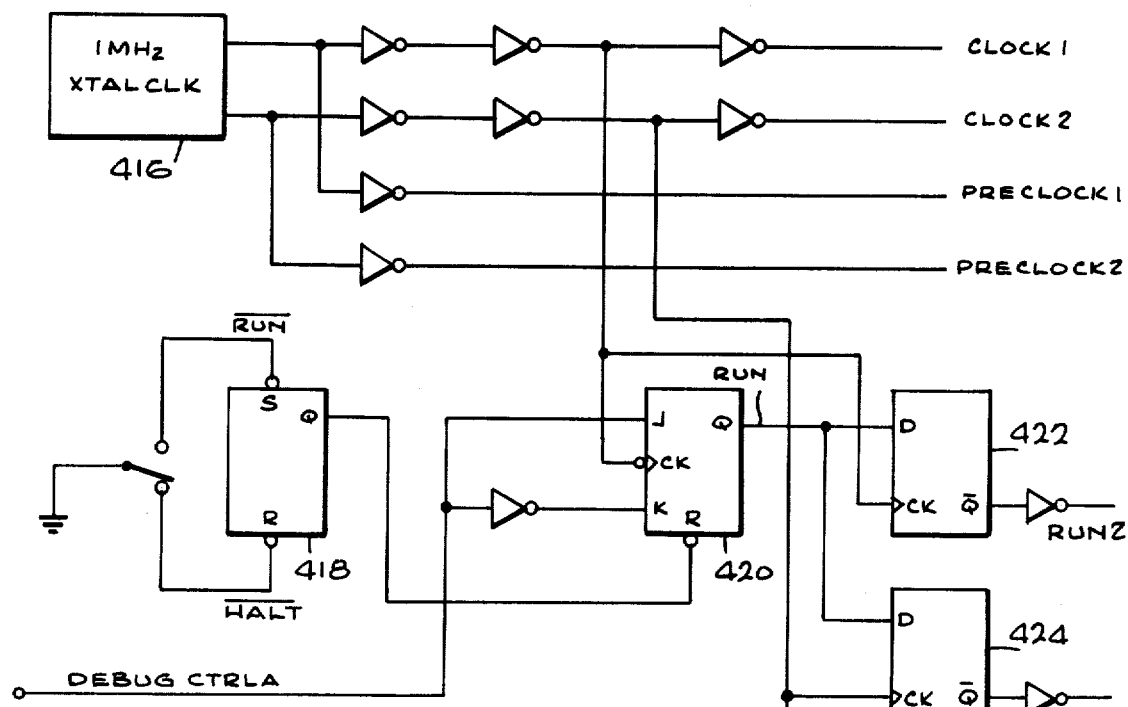
FIG. 11 is a block diagram and schematic representation of an exchange unit control module used in the system shown in FIG. 1.

Referring now to FIG. 11, the exchange unit control module, EUCONTRL 414 includes a 1 megahertz crystal clock generator 416 generating opposite phased clock signals. PRECLOCK1 and PRECLOCK2 and corresponding opposite phase clock signals CLOCK1 and CLOCK2 which lag the corresponding PRECLOCK signal by about 20 nanoseconds. The PRECLOCK signals are used to drive the two port memories to enable them to be ready for accessing by the microprocessors at the time of transitions in the clock signals CLOCK1 and CLOCK2 which drive the microprocessors. A set reset flip-flop 418 drives a JK run half flip-flop 420 in response to a manual switch to permit the selective running or stopping of the modules at an exchange unit. Flip-flop 420 provides a run command only when enabled by flip-flop 418 and the presence of a logic one debug control A signal. When enabled, flip-flop 420 generates at its Q output a RUN signal which changes from low to high with the rising edge of clock signal CLOCK1. This in turn drives flip-flop latches 422 and 424 which generate signals RUN2 and RUN1 respectively. Run halt signal RUN1 is connected to nodes in which clock input signal DATA2 is synchronous with signal CLOCK2 and signal RUN2 is connected to micronodes in which clock input DATA2 is synchronous with clock signal CLOCK1. Flip-flop latch 426 responds to a power on reset signal to provide a synchronous node reset signal.

PROGRAMMABLE READ ONLY MEMORY

The programmable read only memory, PROM[0.-5K-4K] is not explicitly shown in the drawings because of its conventional implementation. It is implemented as eight 0.5K segments, each eight bits wide. Address bits A0–A8 are connected to select one word from each segment while address bits A9–A11 are connected to a decoder which responds thereto to select one of the eight segments. The decoder has a PROM enable input which may be connected high and two PROM disable inputs, one of which may be connected low and one of which may be connected to the $\overline{\text{PROMSELECT}}$ signal from output Y7 of memory partitioning decoder 378 of a microprocessor unit.

NET MASTER INTERRUPT MODULE

The net master interrupt module is not separately shown because of its simplicity. It includes a divider circuit which receives the 1 Megahertz system clock signal and generates an output clock signal with a 16.4 millisecond period. A presetable four bit count down counter receives the 16.4 millisecond input as a clock signal and counts down toward zero. Upon counting to zero, a borrow output of the counter generates an interrupt signal, $\overline{\text{IRQ}}$, which is communicated to the netmaster node microprocessor as an interrupt request signal. The interrupt request signal also constrains the divider counter to remain in a reset condition while active and prevents the generation of further 16.4 millisecond clock signals. This condition exists until the microprocessor responds to the interrupt request by activating a load input to a presetable counter through the microprocessor input/output write select output logic to command the loading of the data appearing on the four least significant lines of the data bus into the presetable counter. This terminates the interrupt request and causes the counter to proceed to count down toward zero in response to the 16.4 millisecond clock signals.

CONSOLE INTERFACE MODULE 430

The console interface module 430, which is shown in FIG. 12, includes a programmable counter 432 and an asynchronous communication interface adapter 434 of the MC6850 type. Counter 432 receives from the five least significant inputs of a microprocessor data bus 5 bits for presetting the counter. These 5 bits are loaded into counter 432 in response to a load clock signal creseleck from an in/out write select microprocessor output. The five bit count parameter determines the rate at which an output clock signal is generated. This rate is selected under processor control to match the data exchange rate of a terminal console to which the console interface module 430 is connected. The asynchronous communication interface adapter 434 receives the clock signal and provides serial communication through a twisted pair connected receive data line and transmit data line. An eight bit parallel data input/output is connected to the microprocessor 8 bit data bus and an interrupt request signal is connected to the interrupt request of a connected microprocessor. An enable signal designated E is connected to the phase 2 clock input of the console interface node microprocessor while the read/write input is connected to the read/write output of the microprocessor. Address bit A0 drives the register select input to select one of two read registers and one of two write registers. Chip select inputs CS0 and CS1 are connected to +5V while chip select input $\overline{\text{CS2}}$ is connected to an I10 read select microprocessor output to control the accessing of the asynchronous communication interface adapter 434.

TERMINAL INTERFACE MODULE 446

The terminal interface module is shown in FIG. 13 to which reference is now made. Terminal interface module 446 provides bidirectional multiplexing between a line of the data bus such as line DB0 of a terminal matching node microprocessor and a separate input and output for a terminal. Data appearing on the data bus line may be written into a latch 448 in response to an active low hold data signal which may be conveniently connected to a write in/out select output of a connected terminal interface microprocessor. Latch 448 then holds the data and drives the terminal with the appropriate data signal. A read disable signal RDISABLE may similarly be connected to a discrete output of an in/out read select decoder of a terminal interface microprocessor to permit a data signal generated by a connected terminal to appear on the selected line of the data bus. Input and output serial communication with a connected data terminal is thus provided through the terminal interface module 446.

COAXIAL CABLE 57.6KB TRANSCEIVER 454

Figure 14B:
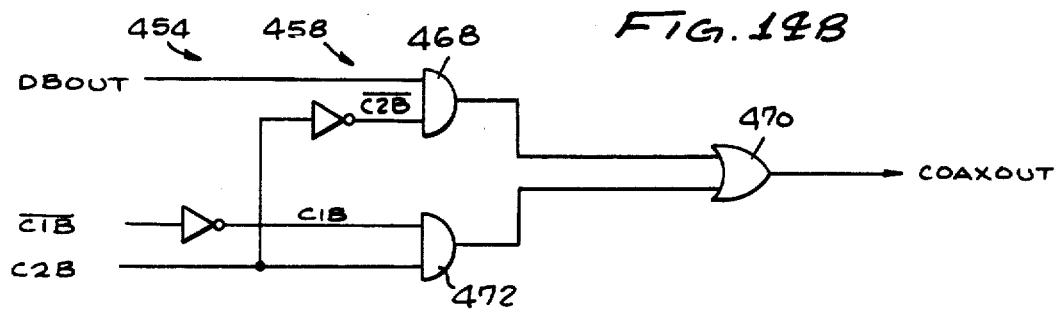
FIG. 14B is a schematic representation of a coax output module portion of a coax transceiver module used in the system shown in FIG. 1.

FIG. 14 illustrates the 57.6 KB coax transceiver 454 with FIG. 14A illustrating a receiver portion 456 and FIG. 14B illustrating a driver portion 458. Signals which are useful in understanding the operation of the transceiver 454 are illustrated in FIG. 5B.

Referring now to the input portion 456 shown in FIG. 14A, a receiver having a voltage level biasing circuit 460 connected thereto is coupled to the input of a phase locked loop 462 which is conventionally connected to provide an output signal at twice the 57.6 kilobit data frequency on the coaxial cable. This output is connected to clock a toggling flip-flop 464 at negative transitions thereof and a flip-flop 466 on positive transitions. The $\overline{Q}$ output of flip-flop 464 drives the D input to flip-flop 466 and is complemented to provide clock signal C2B. The Q output of flip-flop 466 provides a signal C2B.

These clock signals are illustrated in FIG. 5B and serve to divide each data bit period into four intervals. Data is presented on the coaxial cables in a self clocking format in which the first one-fourth of a data period is always at logic one, the second and third fourths of a data period reflect the data content of the bit being transmitted, and the fourth quarter of a data period is always at logic zero. A low to high transition always occurs therefor at the beginning of each data period. Signal $\overline{C2B}$ goes high during the second and third quarters and is ANDed with the received data signal to generate signal DBIN which indicates the received data during quarters 2 and 3 and is otherwise at logic zero.

Referring now to FIG. 14B, the output portion 458 of the coax tranceiver 454 receives data to be transmitted as signal DBOUT. An AND gate 468 receives signal $\overline{C2B}$ and the data signal which is phase shifted by one-half bit time period relative to the data input. The output therefrom is connected to an OR gate 470 to drive the OR gate with the appropriate data signal during bit time quarters two and three. An AND gate receives a signal C1B which is ANDed with signal C2B, to provide as an output from AND gate 472 a logic one during the first one-fourth of each bit time interval. This output is coupled as an input to OR gate 470 so that the coax output signal is always at logic one during the first quarter of a bit time interval, reflects the data provided through AND gate 468 during quarters two and three, and is at logic zero during quarter four. This conforms to the required data format.

CLOCK MULTIPLY MODULE

The clock multiply module, CLMX6, is not explicitly shown but is substantially identical to the portion of FIG. 14A which includes the phase locked loop 462, flip-flop 464, and flip-flop 466. One change is that the input of flip-flop 462 is connected to the low frequency 9.6 KHz signal C1A. A divide by six counter is coupled between the $\overline{Q}$ output of flip-flop 464 and the compare input of phase locked loop 462 to reflect the frequency multiplication between the input and output of the phase locked loop 462.

PHASE CONVERTER MODULE 472

Figure 15:
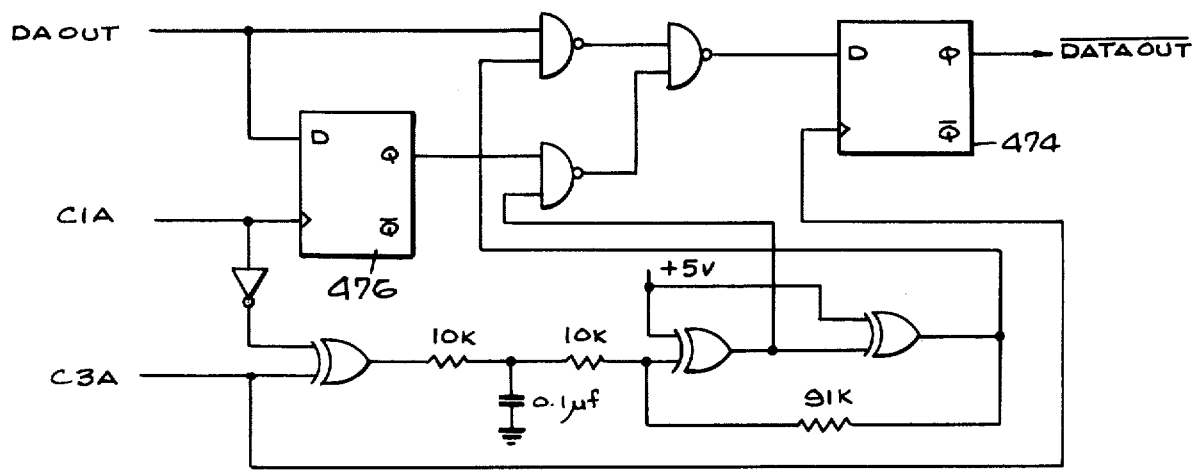
FIG. 15 is a block diagram and schematic representation of a phase converter module used in the system shown in FIG. 1.

Because of propagation delays along a transmission link, data received over a first line may not be in phase with data received over a second line. Nonetheless, it must be provided to the second line synchronously with the clock signal for the second line. The phase converter module 472 shown in FIG. 15 provides the synchronization of the data to be transmitted with the transmission clock signal, C3A for that data line. The phase converter module 472 shown in FIG. 15 includes a D-type edge triggered flip-flop 474 which receives the data input from a channel output module or channel I/O module and provides a data output synchronously with the digital data service transmission clock signal C3A.

Flip-flop 474 is clocked by the transmission clock signal C3A. It thus enters data at the beginning of each transmission bit time interval and holds that data until the beginning of the next transmission bit time interval. A flip-flop 476 has the D input thereof connected to signal DAOUT and is clocked by signal C1A at the middle of each output data valid interval to insure that the data supplied to the phase converter module 472 is held until it can be loaded into flip-flop 474. A series of exclusive OR gates are responsive to signal C1A and signal C3A to load flip-flop 474 either directly from signal DAOUT or indirectly from flip-flop 476. A delay is provided along the series connected Exclusive-OR gates to insure that the loading path for flip-flop 474 is determined according to the relative phase relationships of the two clock signals shortly before the low to high transition in signal C3A. If shortly before the low to high transition of signal C3A, signal C1A is at a high state, flip-flop 474 is loaded with the contents of flip-flop 476. On the other hand, if signal C1A is at a low state shortly before the occurrence of the low to high transition signal C3A, flip-flop 474 is loaded directly through its D input with the data signal appearing on DAOUT. Phase converter module 472 thus provides as an output a a signal DAOUT which is synchronized with the transmit clock C3A notwithstanding phase differences between signal C1A and signal C3A.

LOOPBACK MODULE

The loop back module is not separately illustrated because of its simplicity. It includes a four channel two to one multiplexer and a D-type flip-flop. The D-type flip-flop has the data input connected to a microprocessor data bus signal such as DB0 and its clock input connected to a microprocessor in/out write select signal. The outputs of the flip-flop drive the select inputs of the multiplexer to select alternately channel A when the flip-flop is reset and channel B when the flip-flop is set to place the loopback module in a loopback mode.

The multiplexer has input A1 connected to the data signal DAOUT from a first channel I/O module, input A2 connected to clock signal C1A from the first channel I/O module, input A3 connected to data DAIN from the data link, which in general will not be in phase with the C1A clock signal from the channel I/O module. Outputs D1 and D2 are coupled to the data link while outputs D3 and D4 are coupled to a second channel I/O module. Thus, during a normal, non-loopback mode of operation data and clock signals pass from the data link. In addition, inputs B1 and B2 are connected to signals DAOUT and C1A from the second channel I/O module while inputs B3 and B4 are connected to logic 0. Consequently, during a loopback mode of operation the data and clock signals from the second channel I/O module are returned as inputs to the first channel I/O module. For loopback module 244 in FIG. 5A, CHIOM 254 is the first channel I/O module and CHIOM 252 is the second channel I/O module. The first and second CHIOM's would be reversed for loopback module 246 with module 252 being the first and module 254 being the second.

Channel Input/Output Module (CHIOM)

Figure 16B:
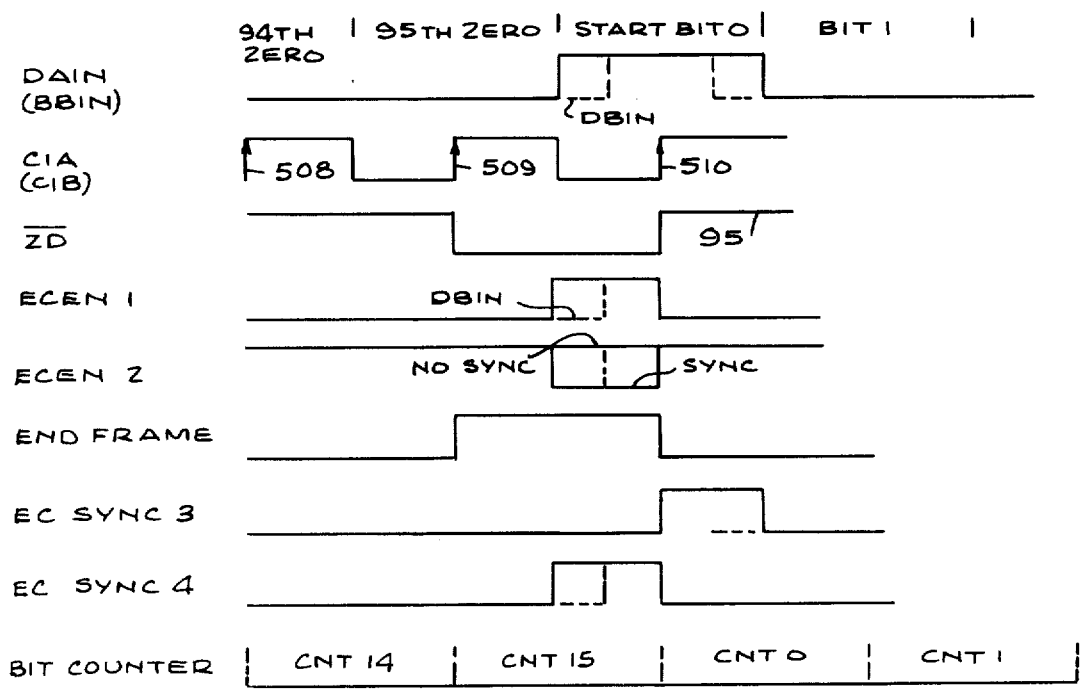
FIG. 16B is a waveform diagram of signals that are useful in understanding the operation of the channel input/output module shown in FIG. 16A.

An understanding of the operation of the channel input/output module (CHIOM) 490 is best had in conjunction with FIG. 16A and FIG. 16B to which reference is now made. The channel input/output module 490 has a synchronization circuit 492, a data input circuit 494, a data output circuit 496 and a timing and control circuit 498. The synchronization circuit includes a sync bit counter 500 and an error counter 502 while the timing and control circuit includes a control bit counter 504 and a D byte counter 506. The synchronization circuit operates to maintain and automatically synchronize the control bit counter 504 and D byte counter 506 with the incoming data stream. As shown in FIG. 16B, the incoming data stream appears as signal DAIN or DBIN depending on whether the module 490 is connected to the 9.6KB data link or the 57.6KB coaxial cable data link. The incoming data formats are nearly identical except for the frequency and for the fact that 1's appearing on signal DAIN occupy substantially an entire bit time interval while 1's appearing on signal DBIN occupy only quarters 2 and 3 of each bit time interval. However, master clocking occurs on the rising edges 508, 509 and 510 of the clock signals C1A and C1B which appear at the center of each bit time interval so that the presence or absence of a logic 1 signal during quarters 1 and 4 of a bit time interval is immaterial.

Synchronization is effected in response to empty frames carrying a logic 1 start bit followed by 95 0's and is not affected by any other data frame. Upon receipt of a logic 1 start bit sync bit counter 500 is preset to 95 through its synchronous parallel load enable input at the rising edge of a clock pulse such as rising edge 510. Any logic 1's appearing in data stream cause sync bit counter 500 to again be preset to 95 and remain ineffective. However, if an empty frame appears with 95 consecutive 0's, sync bit counter 500 counts down to reach a count of 0 upon the occurrence of a clock pulse transition 509. As a result, 0 detect output $\overline{ZD}$ goes active low during the last half of bit time 95 and during the first half of bit time 0 for the next start bit when counter 500 is clocked by rising edge 510 and preset to count 95. Signal $\overline{ZD}$ and the inverted data input signal are applied to a NOR gate 512 so that during the first half of the start bit following an empty frame the output of NOR gate 512, which is designated error counter enable 1 (ECEN1), goes high to enable a CET input to error counter 502 at the occurrence of a rising edge 510 of the clock signal.

If the control bit counter 504 and D byte counter 506 are properly synchronized, they reach a count of 15 and 5 respectively upon the occurrence of a clock transition 509 in the middle of bit position 95 to cause a NOR gate 514 to generate a logic 1 end frame signal. The concurrence of the end of frame signal and signal ECEN1 fully enable a NAND gate 516 causing it to generate at its output a logic 0 error counter enable 2 signal (ECEN2) which is coupled to activate the low active parallel enable input to counter 502 and cause counter 502 to be present to a count of 12 at the occurrence of clock transition 510 in the middle of the start bit for the next data frame. Timing and control circuit 498 then maintains control of the channel input/output module 490 operation until the next empty frame permits a test of synchronization.

In the event that the timing and control circuit 498 is not properly synchronized at the end of an empty frame, during the last half of bit 95 and the first half of the start bit for the next data frame, signal end frame will be at logic 0 instead of logic 1 and NAND gate 516 will be partially disabled to generate a logic 1 signal ECEN2. As a result, at the occurrence of the transition 510 in the clock signal, both the CEP and CET enable inputs to counter 502 are enabled and the parallel load enable input is disabled. Clock transition 510 thus causes error counter 502, which was previously set to count 12, to increment to count 13. Upon the occurrence of subsequent empty data frames while the timing and control circuit 498 remains unsynchronized, error counter 502 continues to increment to count 14 and then to count 15. Terminal count output, TC, of error counter 502 is enabled by input CET and is thus immediately disabled after error counter 502 is incremented to count 15 as signal ECEN1 goes low at the middle of the start bit for the next data frame. There is thus no effect on the timing and control circuitry 498 until the occurrence of a fourth empty frame. After the occurrence of a fourth empty frame signal ECEN1 goes high during the first half of the following start bit to enable the TC output of counter 502 so that at the occurrence of transition 510 following a fourth empty frame, signal EC sync is high to enable the synchronous reset input to control bit counter 504 and the parallel enable input to D byte counter 506, which is connected to be preset at 0. Simultaneously, the preset enable input to error counter 502 is enabled by signal EC sync for the fourth data frame and the error counter is preset to a count of 12. The timing and control circuit 498 is thus synchronized and normal operation may continue.

The synchronization circuit 492 thus permits automatic synchronization upon connection of the module 490 into a data stream or upon the loss of synchronization due to a temporary error condition. There is no need for manual intervention. At the same time, this automatic synchronization is accommodated with no need for special synchronization signals which increase hardware requirements or decrease the maximum data flow rate. Instead, the empty frames which inevitably occur in a statistically loaded network which must be capable of accommodating peak loads greater than average are used to effect automatic synchronization.

The operation of the data input circuit 494 is quite straightforward. This circuit includes a 16 bit serial in-parallel out shift register 518 which includes a latch for each shift register bit position, the latches being loaded in response to a strobe signal input from the Q output of a strobe flip-flop 520. The input circuit 494 also includes a multiplexer 522 coupled to output on the 8 bit data bus first, the most significant byte of the latched output of shift register 518 when address bit A0 is at logic 1, and then the least significant byte from the latched output of shift register 518 when the associated microprocessor address bus is incremented to force address bit A0 to logic 0. As the data inputs appear on signal DAIN, they are sequentially loaded into shift register 516 as a positive transition occurs in clock signal C1A at the middle of each incoming bit time interval. The contents of the shift register 518 thus trail the incoming data stream bit time intervals by one-half period and are synchronous with the bit time intervals indicated by control bit counter 504. As each 16 bit double or D byte of data is loaded into shift register 518, control bit counter 504 reaches a count of 15 and generates a TC output signal which clocks flip-flop 520. Flip-flop 520 is connected to always become set when clocked and generate a Q output to drive the strobe input of shift register 518 and load the contents of the shift register into the output latches. The inverter clock signal is connected to the reset input of flip-flop 520 so that at the subsequent high to low transition of the clock signal one-half bit time later, flip-flop 520 is reset to remove the strobe signal and cause the output latches of shift register 518 to retain the originally strobed 16 bits as an additional 16 bit double byte of data is loaded serially into shift register 518. The output of shift register 518 thus represents the last complete double byte of data received on signal DAIN.

The output data circuit 496 includes a 16 bit parallel in-serial out shift register 524 and a pair of latches 525, 526. The serial or parallel loading of shift register 524 is controlled by a pair of flip-flops 528, 529. If during the course of processing a double byte of data, data is loaded into latches 525 and 526 for output, flip-flop 528 is set simultaneously with the loading of latch 525. Subsequently, upon the control bit counter 504 reaching a count of 15, a signal bit count 15 (BC15) is generated shortly after the rising edge of a clock pulse such as rising edge 509. This signal BC15 clocks both flip-flop 528 and 529 thereby resetting flip-flop 528 and transferring the prior contents thereof to flip-flop 529. If flip-flop 528 had not been previously set by an I/O write operation, a 0 is loaded into flip-flop 529 and the $\overline{Q}$ output drives one input to a NOR gate 530 whose resulting logic low output drives a parallel enable input to shift register 496 and causes the shift register to load serial data from the output of input shift register 518. In this mode of operation, the data input is clocked straight through shift register 518 and then shift register 524 to drive the data output signal, DAOUT or DBOUT. However, if, as a double byte of data is being shifted through the shift registers 518 and 524, data is loaded into the latches 525 and 526, signal BC15 clocks a logic 1 into flip-flop 529 to drive the $\overline{Q}$ output to 0. Simultaneously, the normally high signal $\overline{BC15}$ goes to logic 0 during bit count 15 to fully disable NOR gate 530 and cause its output to go high during bit count 15. Thus, when a clock transition such as transition 510 occurs at the end of control bit counter interval 15 the parallel input to shift register 524 is enabled and data is loaded in parallel into shift register 524 from latches 525 and 526. As control bit counter 504 overflows from count 15 to count 0 upon the occurrence of clock transition 510, signal $\overline{BC15}$ again goes high to drive the output of NOR gate 530 low and command serial operation of output shift register 524.

An interrupt request flip-flop 532 generates an interrupt request signal, $\overline{IRQ}$, at the $\overline{Q}$ output therefrom. Flip-flop 532 has its D input connected to logic 1 and its clock signal connected to the terminal count output, $\overline{TC}$, from control bit counter 504. Thus, as control bit counter 504 overflows from count 15 to count 0, the signal $\overline{TC}$ makes a low to high transition to load a logic 1 into flip-flop 532 and indicate to an associated microprocessor that a new double byte count interval has begun. The associated microprocessor then has 16 bit times to reset flip-flop 532 by an I/O read operation and to load a double byte of data into latches 525 and 527 if it is to do so.

D byte counter 506 is coupled to be incremented as control bit counter 504 overflows from count 15 to count 0. D byte counter counts from 0 to 5 and then overflows back to 0 again. Since each data frame interval contains 12 bytes of data or 6 double bytes, D byte counter 506 maintains a double byte synchronization of the bit frames.

The contents of the D byte counter as well as the contents of the input data shift register 518 are available to be read by the I/O controls of an associated microprocessor. For example, when a drop node D96NE or D96NW is connected to the channel input/output module 490, the microprocessor contained therein can read the contents of the D byte counter 506 by executing a read operation at address location C004 (HEX). This generates a signal read counter, $\overline{READCNTR}$ which causes Q outputs Q0, Q1 and Q2 of D byte counter 506 to be placed on data bus lines DB0, DB1 and DB2 respectively.

Similarly, by reading address locations C000 and C001 the most significant and least significant bytes respectively are read from input shift register 518 through multiplexer 522. As these two address locations are read the input/output circuitry generates a signal read shift registers $\overline{READSRS}$ which enables the multiplexer 522 to drive the data bus with 8 bits of data. As address location C000 is read address bit A0 is low to enable the A input to multiplexer 522 and cause the most significant byte of data (the first byte of a double byte to be received) to be output through multiplexer 522 onto the data bus. Subsequently, as the address is incremented to C001, output A0 goes high to enable the least significant byte to be output onto the data bus.

The associated microprocessor thus has the capability of reading the D byte counter 506 to determine which double byte of information is contained in the latched output of shift register 518 and then reading both bytes of data from the latched outputs of shift register 518. It should be kept in mind that as a first double byte of data is loaded into shift register 518 and then transferred into the output latches, D byte counter 506 is incremented from 0 to 1. Thus, the count of 1 in D byte counter 506 means that the first double byte of data is being read from the shift registers while a count of 0 indicates that a last double byte of a small block of data is being read from shift register 518.

The input/output circuitry of the associated microprocessor also controls the writing of information into the latches 525 and 526 for subsequent loading into output shift register 524. The writing of data into address location C011 generates an I/O write output which is connected to generate signal load byte 1, LOADBYT1, which loads the contents of the data bus into latch 526. A subsequent write by the microprocessor into address location C012 generates a load byte 2 signal, LOADBYT2, which transfers the contents of the data bus into latch 525 and simultaneously sets flip-flop 528 to command the parallal loading of the data into shift register 524 at the beginning of the next double byte interval.

Channel Output Module (CHOM) 540

Referring now to FIG. 17, the channel output module (CHOM) 540 includes a 16 byte parallel in-serial out shift register 542, a pair of 8 bit latches 544, 546, a 4 bit counter 548 and a pair of interrupt control flip-flops 550, 552. Bit counter 548 responds to the master input clock signal to define 16 bit double byte output data intervals. Upon reaching a count of 15, a terminal count output, TC, goes high to present a logic 1 input to flip-flop 550 and enable the parallel load input to shift register 542. At the next occurrence of a low to high transition in the clock signal, bit counter 542 overflows from 15 to 0 to begin a new double byte data interval while flip-flop 550 is clocked to the set state and data is loaded in parallel into shift register 542 from the latches 544 and 546. As flip-flop 550 is set its Q output is connected to the clock input of flip-flop 552 to clock that flip-flop to the set state. The $\overline{Q}$ output thus goes active low to generate an interrupt request signal, $\overline{IRQ}$. As counter 548 overflows to 0, the TC output returns low and the next clock pulse returns flip-flop 550 to the reset state while flip-flop 552 remains unchanged.

A connected microprocessor responds to the interrupt request signal by writing data into latches 544 and 546 using its intput/output circuitry. Selection of an appropriate write output address generates a signal LOADBYT1 which selects most significant byte latch 546 to load the contents of the data bus into the latch. Next, the microprocessor selects another write output address to generate a signal LOADBYT2 to load the least significant byte from the data bus into least significant byte latch 544 and reset flip-flop 552. At the end of the current double byte bit time interval, as indicated by signal end of D byte generated by the TC output of bit counter 548, the previously loaded contents of latches 544 and 546 are transferred to shift register 542 and a new interrupt request is generated.

Input Matching Module (IM96M) and Output Matching Module (OM96M)

The input matching module, IM96M, merely provides logic inversion and voltage level buffering between the RS232 DI and CI inputs and the TTL corresponding D0 aND C0 outputs. Similarly, the output matching module, OM96M, merely provides logic inversion and logic level buffering between the RS 232 CI input and the TTL C0 output and between the TTL DI input and the corresponding RS 232 D0 output. Because of the comparative simplicity and conventional implementation of the input matching module and the output matching module these two modules are not explicitly shown in detail.

Channel Input Module (CHIM)

The channel input module may be identical to the channel input/output module 490 with the data output portion 496 thereof deleted. In fact, except for the extra expense of unused circuitry, the channel input module such as module 206 or module 212 in FIG. 4A could be implemented as a channel input/output module 490 with the output portion simply not connected. Because of the similarity between the channel input modules and the channel input/output module 490, the detailed implementation of the channel input module has not been separately shown and described.

8K × 8 RAM Array Module (RAM[8K]) 560

A maximum size 8K by 8 RAM array module 560 is illustrated in FIG. 18. RAM array 560 includes an 8 by 8 array of 1K by 1 random access memory circuits 562, an 8 bit decoder 564 and an 11 bit inverter 566. The array 562 receives 8 bit parallel data inputs DI0-7 and provides 8 bit parallel data outputs DO0-7. It receives inverted address inputs A0-9 through inverter 566 as well as a read write signal $R/\overline{W}$ from inverter 566. The chip enable inputs for each set of 8 parallel RAM 1K memories is connected to one of the $\overline{Y0}$-$\overline{Y7}$ outputs from decoder 564. The three inputs to decoder 564 are driven by address signals A10-A12 while select inputs G2A and G2B are driven by address signals A13 and A14. A select input G1 is driven by a RAM enable signal which may be driven by a RAM enable output signal from a large 2 port adapter module or may be coupled to logic 1 or to a memory selection output of a microprocessor module. Word sizes smaller than 8K may be implemented by simply omitting a portion of the memory circuits in the array 562.

Large Two Port Adapter Module (L2PADAPT) 576

Figure 19:
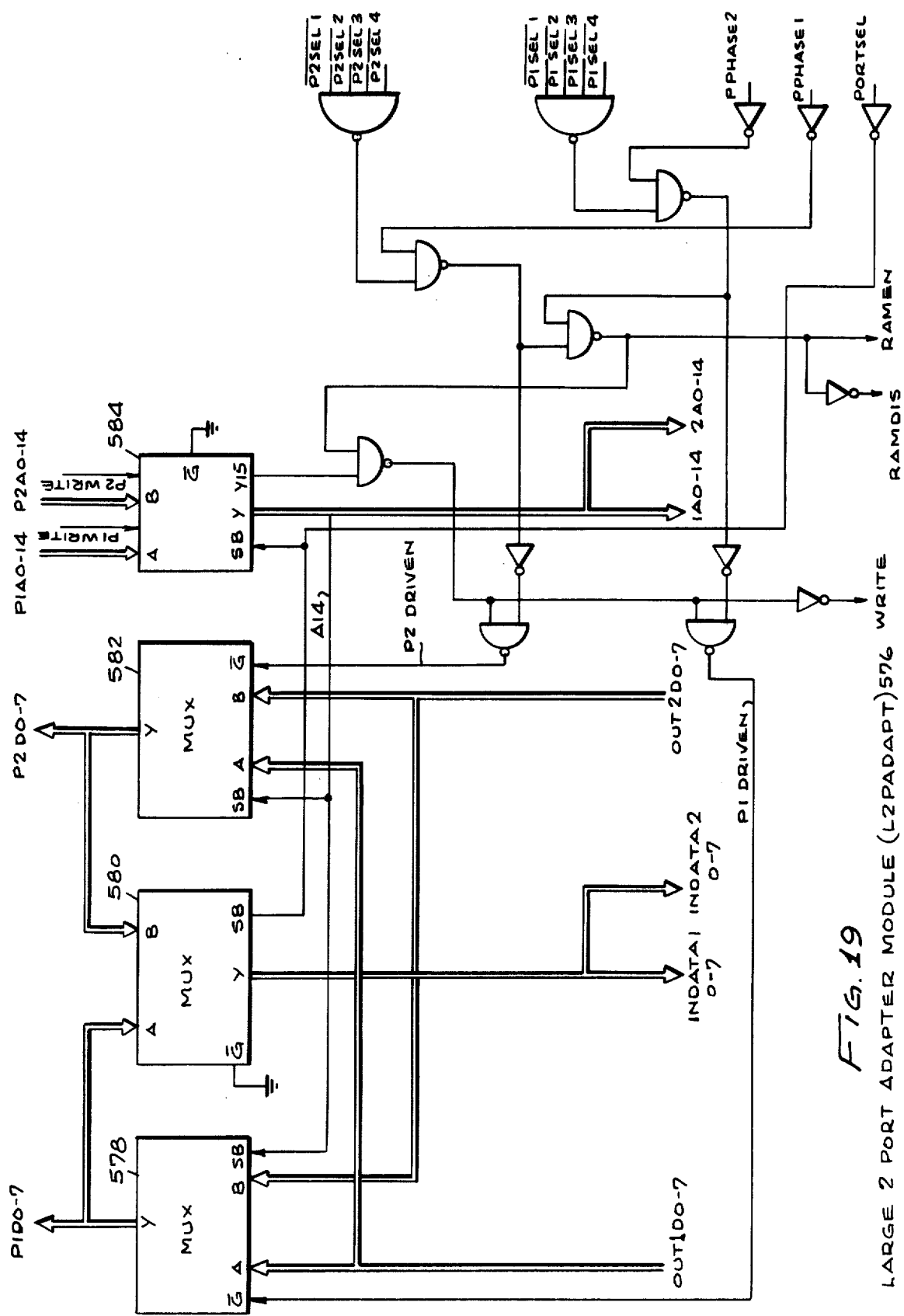
FIG. 19 is a schematic and block diagram representation of a large two port adapter module used in the system shown in FIG. 1.

Referring now to FIG. 19, there is shown therein a large 2 port adapter module (L2PADAPT) 576. This module includes 3 two to one 8 bit multiplexers 578, 580, 582 and a 12 bit two to one multiplexer 584. Because of fan out limitations, the attached 32K × 8 bits of random access memory are divided into 2 16K by 8 sections, each of which has data outputs driving the A inputs and B inputs respectively to multiplexers 578 and 582 for processor 1 and processor 2 respectively. The select inputs of these multiplexers determine whether the first or second 16K portion of the RAM is selected for reading and the enabled inputs of these multiplexers determine whether or not the information read from the RAM is placed on the processor 1 data bus or the processor 2 data bus. The RAM portions are selected in response to address signal A14 while multiplexer 582 is selected to drive processor 2 in response to a signal P2 driven that is generated in response to the concurrence of a write command and the active low enabling of processor 2 large 2 port select output signals while the phase 2 clock signal is high. Similarly, multiplexer 578 is selected to drive the processor 1 data bus in response to signal P1 driven upon the concurrence of a write pulse, a processor 1 active low large 2 port select output and a high phase 2 clock signal condition. During a write operation, a port select signal determines whether the memory input data bus and address bus is driven from the P1 processor or the P2 processor.

Processor Input Interface Module (PIINTM) 100 and Processor Input Interface Module (POINTM) 102

The processor input interface module 100 and processor output interface module 102 have not been explicitly shown in detail. These two modules merely provide an interface between the data format of the communication network and the data format of the host adapter for the host processor. The internal construction of these two modules does not represent any patentable novelty and is readily implemented by a person of ordinary skill in the art. The construction of these two modules will depend upon the data format of the host data processing system, but in the present implementation they provide a conversion between an 8 bit per byte 24 byte block format used in the network and a 12 bit byte parallel format used by the host adapter.

MESSAGE FORMATS

General

All messages, whether for internal control or for data communications between a terminal and a host, use the same standard data format. The data is arranged in the form of blocks containing 24 8 bit bytes. Of these 24 bytes 4 are utilized for overhead and distribution control while 20 contain data that is being transmitted. A message may contain from one to sixteen blocks. A maximum message length is thus 320 bytes of data. If more than 320 bytes of data are to be sent through the network for a given task, it is merely sent as a plurality of sequential messages.

Each block of data contains 24 bytes designated 0-23. Each byte contains 8 bits designated 7-0 going from most significant on the left to least significant on the right. Upon serialization, the lowest numbered byte of a block is sent first and within a byte the most significant or highest numbered bit is sent first. Thus, upon serialization of a block of data for transmission through a communication link, byte 0, bit 7 is sent first followed by byte 0, bit 6 with byte 23, bit 0 being sent last. Byte 0 is considered the least significant and byte 24 the most significant.

In each block of data, the first three bytes occupying positions 0-2 carry header or control information which will be described in greater detail below, the next 20 bytes occupying positions 3-22 carry data information and the final byte occupying position 23 carries an error detecting check sum. This check sum represents a simple byte by byte edition of the information contained within bytes 0-22 with all of the carries or overflows from the most significant bit 7 position being simply discarded.

This 24 byte format provides relatively high efficiency data communication with data being communicated through the network occupying 83% of the total information communicated through the network. However, to further improve communication efficiency in situations where less than a full 20 bytes of data are to be contained within a given block and to permit faster communication of data from a terminal to the host to improve the speed of response of the host, 24 byte blocks of data are broken down into 12 byte small blocks of data for serial communication through the serial data links. If a large 24 byte block carries more than 8 data bytes it is transformed into 2 small blocks of 12 bytes each and if it carried 8 bytes of data or less it is transformed into a single 12 byte small block of data. This use of double small blocks has little effect on large messages where most of the data positions are filled, but doubles the communication efficiency of small messages containing 8 bytes or less because only 12 bytes rather than 24 bytes need be sent through the serial communication links for a given message. At the same time, the basic information handling circuitry and software can be utilized to handle single and double small blocks of data at very little additional cost. The use of small blocks of data on the serial communication links is particularly advantageous for applications such as the keyboard entry of information wherein each message may carry only a single or double byte of data including a keystroke entered by an operator. First of all, only 12 bytes of data are required to carry the keystroke instead of 24 and second, the upward flowing small block may be inserted on the communication link between first and second small blocks of a large block of data. The maximum delay before starting a keystroke containing block of data upward from a terminal toward the host is a 12 byte communication period rather than a 24 byte communication period. A shorter time delay is thus encountered before the host is able to receive the keystroke data and respond with the beginning of a downward flowing message.

When a 24 byte large block of data is transformed to a double small block format for communication along the serial data links, the third byte of control or header information occupying byte position 2 is moved to byte position 12 and all of the bytes in byte positions 3-12 are moved ahead by one byte position. That is, byte 3 is moved up to position 2 which was formerly occupied by the third control byte, byte 4 is moved to position 3, byte 5 is moved to position 4 and so forth up to byte 12 being moved to position 11. Bytes 13-23 remain unchanged except that bytes 12-23 now represent a separate, second small block of data and are renumbered as bytes 0-11 respectively in the second small block.

If a 24 byte large block of data is to be transformed to a single 12 byte small block of data, this transformation is accomplished by merely transforming the check sum in byte position 23 to byte position 11 and then discarding byte positions 12-23. Since the empty data bytes that are discarded carry all zeros, no change in the valid check sum results from moving it from position 23 to position 11 at the end of the single small block of data.

The first header byte, which occupies byte position 0 in a large block or a first small block of data, always contains a start bit of logic 1 in bit position 7. It serves as a start bit for synchronization and detection circuitry which receives the information from along the serial data communication links. The next bit, at byte position 0, bit position 6, is designated FSTBSF or first small block signal field. It is always 0 since this byte is always contained within the first small block of data of a data block even if a second small block of data is present. Bit 5 is the block type indicator signal field designated BTISF with a logic 0 indicating a single small block data format and a logic 1 indicating a double small block format. Bit 4 is the up-down flag signal field designated ABFSF with a logic 0 indicating a type A upward flowing message and a logic 1 indicating a type B message flowing downward from a host toward a terminal. Bit position 3 is the supervision data flag signal field designated SDFSF with logic 0 indicating a data carrying message and logic 1 indicating a supervision type of message for intrnal use by the network. A supervision type of message carries an extra header byte in byte position 3. This extra byte carries a supervision type number which identifies one of many different types of supervision messages. Independent numbering systems are used for input and output messages. Bit position 3 is an unassigned spare designated SPRSF which is available for future expansion of the network, such as by increasing the address field. Bit positions 1 and 0 carry the most significant bits of a node address field designated NASF. Each addressable node is assigned a 10 bit address to permit up to 1022 (address 0 and 1023 are not used) nodes to be individually addressed within the network. Any time a node initiates a message, it includes its own node address within this address field. Thus, in upward flowing messages the address field indicates the source of the message and in downward flowing messages the address field identifies the destination node for the message. A data terminal is not assigned an address as such, but is uniquely identified by the address of a terminal node connected thereto. Thus, within the network, messages to or from a terminal are actually communicated to or from the associated terminal node with the terminal node being coupled to communicate the information to the terminal.

The second header byte in byte position 1 carries the 8 least significant node address bits 7-0 in bit positions 7-0 respectively of byte position 1. The third header byte occupies byte position 2 in the large block format and single small block format but occupies the first position designated byte position 0 of the second small block of a double block format. The most significant bit 7 is the last small block start bit signal designated LBSTSF and is logic 1 to insure a logic 1 first bit for each second small block of data. Bit position 6 is the second small block signal field designated SECBSF and is always at logic 1 to identify the second small block of a small block pair and a double small block format. These first two bits of byte 3 are superfluous when used in the third byte of a single small block format block of data. Bit 5 of the third header byte is the end of message signal field designated EOMSF. Logic 0 indicates that following data blocks are a part of the same message while a logic 1 indicates that the present large block, whether transformable as a single or double small block is the last block of a given message. Bit positions 4-0 contain a block sequence number designated BSNSF. The block of a given message are numbered sequentially from 0 up tp 15 with the sequence number being inserted in these bit positions 4-0. This sequence number permits the several blocks of a message to be assembled in the proper order by a destination terminal node even if the blocks get out of sequence as they pass through the network. The maximum 16 block message size of the present network implementation requires only a 4 bit sequence number with the fifth or most significant bit in bit position 4 of the third header byte being available for future expansion.

The 3 byte header structure permits the selection of a large number of different message types by changing the states of the variable bits within the header. A brief description of the various messages and their header bit states follows.

Abort Message (ABORTM)

There are four types of messages which reach the host data interface between network controller 50 and host adapter 32 as shown in FIG. 1. An abort message designated ABORTM carries messag No. 32 in the output supervision type field at byte positions 3 and carries no parameter in byte positions 4-22. The abort message has data states 1, 0, 0, 1, 1, 0 in byte 0 bit positions 7-2 respectively, and bit states 1, 1, 1, 0, 0, 0, 0, 0 in byte position 2, bits 7-0, respectively. The node address is the address of a terminal node for which a message stream is being aborted.

The abort message is issued by the host data processor 12 to abort messages in the process of being output through the network 10. The abort message is related through nodes POMN 100, YN 110, fan-out 54, 456 and B96BN 170 and then through master down queue 228 to node LM96M 174. Mode LM96M 174 responds by initializing the data stream records pertaining to the message being aborted, including the discarding of data in the associated buffer pair 220 by sending the host 12 a permission to send message, PRSNDM, and by relaying the abort message to the destination terminal node. Node LM96M 174 also sets a time-out timer and, until the time-out expires, discards all upward flowing traffic from the destination terminal node. The time-out period is 0.15 seconds which is sufficiently long to permit the discard of all supervision messages that are generated by the destination terminal node before receipt of the abort message.

Upon receipt of an abort message, a destination terminal node sets a 0.20 second delay timer. During the delay period any out of order data blocks reach the terminal node and at the end of the delay period any data blocks in the terminal node buffer pair are discarded and a normal acknowledge and permission to send message, ACKRPM, is sent to the node LM96N 174. Upon receipt of the acknowledge and permission to send message by node LM06N 174, tranmission of a new block set (if any) in a dedicated master buffer pair 220 may proceed. The nodes intermediate the host interface and node LM96N 174 and intermediate node LM96N 174 and the destination terminal node merely pass on the abort message in the normal manner.

Input Data Message (INDATM)

The input data message is a data message which flows upward from a terminal node to the host interface. The input data message contains in byte position 0 bits 7-2 bits 1, 0, x, 0, 0, 0,. The x is in the block type identification signal field and indicates whether the input data block should be serially transmitted as a single or double short block and in the present implementation is always 0 to indicate a single short block. The node address contains the address of the originating terminal node and the third byte contains 1, 1, 1, 0, 0, 0, 0, 0 in bit positions 7-0 respectively. Since only single block messages are sent upward through the network in the present implementation, the end of message signal field is always set to 1 and the block sequence number is always 0. Up to 8 bytes of data may be carried in byte positions 3-10 with the check sum being added in byte position 11 for the single small block format and in byte position 23 for the large block format.

The input data message originates in the terminal matching node of a terminal exchange unit and contains up to 8 bytes of data from the terminal, for example, one or more key-strokes. It flows with highest priority through the network from the terminal matching node to the Y node 110. At the Y node it is duplicated and the copy is placed in QHDAUQ 113 for transfer to processor input interface matching node 100 by processor input matching node 104. A second copy if placed in quene NMINQ 137 for net master node 134. The present application is intended for use with keyboard terminals having a relatively low volume data flow upward through the network. The maximum message input data message size is thus limited to 8 bytes, but in general it will be appreciated that for applications where a higher volume of data flow is required, full capacity messages with 16 or more large blocks of data may be utilized. The use of larger upward flowing messages would best be implemented using the same type of message error control and buffer storage that is used for downward flowing messages.

Output Data Message (OTDATM)

The format of the output data message is substantially the same as the input data message except that up to 20 bytes of data may be contained in each large block and up to 16 large blocks my be contained in each message. Byte 0 bit 5 is set to 0 to 1 to indicate a single or double small block format and bytes 0 bit 4 is set to 1 to indicate a downward flowing message, which in the present system has a lower priority than upward flowing messages. The node address contains the address of the destination terminal node and the end of message signal field at byte position 2 bit 5 carries a 0 or a 1 depending on whether the particular block is the last block of a message. The block sequence number reflects the sequential order of the block within a message. All blocks of a message except the last block are assembled as large blocks containing 20 bytes of data and pass through the serial data links in a double small block format. The format of the last block of a message depends upon the number of data bytes carried thereby as explained previously.

The output data message carries an ordered set of data bits moving from the host 12 to a terminal. The network assures integrity and proper ordering of the bits for each message. The host source must be programmed to pack the data in the proper format for a given destination terminal and it may be necessary for the data bytes to carry information which is interpreted by the terminal as control information indicating such things as the number of bytes in a message, beginning of message, end of message and so forth. The network merely functions to communicate the data portion of a message (exclusive of the header and check sum bytes) to a terminal as prepared by the host. The network is insensitive to the packing of the data bytes within an output data messsge or input data message.

Permission to Send Message (PRSNDM)

The permission to send message is a supervision message which is sent by node B96BN 170 to the host interface to indicate the availability of storage space in a master buffer pair 220 corresponding to a given destination terminal node. It is an upward flowing message and carries no parameter below byte position 3. Byte 0 contains 1, 0, 0, 1, 0 in bit positions 7-2 respectively, while byte position 2 carries 1, 1, 1, 0, 0, 0, 0, 0, in bit positions 7-0 respectively. Input supervision No. 36 is carried in byte position 3 with the node address indicating the terminal node address of the data stream to which the message applies.

The permission to send message is used in the message and block set motion feedback loop that exists between the host 12 and the large two port buffer memory 172 for messages going to a terminal node. The permission to send message originates in node B96BN 174 and flows upward to Y node 110 where it is duplicated and presented to the host 12 and to net master node 134. Net master node 134 normally discards the message. The message indicates to the host that the terminal specified in the address field has an available block set buffer in the large two port buffer 172 which can be used to receive another message block set (up to 16 large blocks) from the host. The host can respond with another block set for the specified terminal node if there are any data messages available to send. If node B96BN 170 fails to receive another block set within a fixed time out period (for example 16 sec) it resends the permission to send message. Node B96Bn 170 continues to repeat this action until the host responds with a message block set. Another group of messages establishes an error detection and control feedback loop through the line master node LM96N 174 between large two port buffer 172 and each destination terminal node connected in the subnetwork. Supervision messages move through the master up and down quenes 227, 228 independent of the data stream flow through master buffer pairs 220.

Block Set Acknowledge and Permission to Send Message (ACKPRM)

The block set acknowledgment and permission to send message is communicated from a terminal note to the line master node, LM96N 174, when a complete message has been received and the terminal node has buffer storage available for receipt of another message. Byte 0 bits 7-2 contain 1, 0, 0, 0, 1, and 0 respectively, while the node address field contains the address of the acknowledging terminal node. Byte position 2 contains in bit positions 7-0 respectively, 1, 1, 1, 0, 0, 0,0, 0. The input supervision type identified in byte position 3 is No. 32.

The ACKPRM message also contains 3 parameters in byte positions 4, 5, and 6. Byte position 4 carries a buffers available count (BACMF) which may indicate a maximum of 2 or only 1 buffer available in the present implementation for storage of a message from the line master LM96N 174. Each buffer has sufficient storage capacity for one message containing up to 16 large blocks or 24 bytes each. Byte position 5 carries an expected block sequence number (ESNMF) which indicates the expected block sequence number and would normally be 0 when the message is sent upon receipt of a completed message. Byte position 6 carries a block set sequence number (BSSNMF). This is a number that recycles between 0 and 255 and is incremented for each complete message or block set. The number indicates the number of complete block sets that have been received. This parameter provides error checking information to permit the line master to determine if a complete block set has been lost in the communication process.

Each terminal node has implemented therein a first empty cell pointer which is incremented only as complete blocks are received error free in numerical sequence. For example, while the pointer points to cell 8 of a message, a block 9 might be received followed by block 8 out of order. The pointer would remain at cell 8 until block 8 is received, at which time it would be rapidly incremented through cell 9, to cell 10 and remain at a count of 10 until block 10 is received. Upon incrementing of the first empty block cell pointer beyond No. 15 or beyond the number of a block containing an end of message value of 1 in the end of message signal field, message ACKPRM is sent by the destination terminal node if buffer storage space in available at the terminal node.

Sequence Alarm or Status Request Response Message (ALMSRM)

The sequence alarm or status request response message is sent from a dentination terminal node to line master node LM96N 174 to indicate the status of the buffers in the terminal node. It is identical in format to message ACKRPM except that the input supervision type number in byte position 3 is 33 instead of 32. Message ALMSRM is sent unsolicited if a block is received at a destination terminal node whose block sequence number is greater than the expected sequence number plus a value N. For example, it might be determined that in a given communication network a given block cannot get out of sequence during normal operation by more than 3 block positions. A number N might then be selected to be 3. If a block is then received carrying a block sequence number greater than or equal to the number indicated by the first empty cell pointer plus N equal 3, an error condition is indicated and the message ALMSRM is sent unsolicited. For example, if the first empty cell pointer contains No. 7, and the next block received contains block sequence No. 9, there would be not problem. However, if a block containing sequence No. 10 is then received before the first empty cell pointer is incremented to 8 upon receipt of sequential block No. 8, an error condition would be indicated and message ALMSRM would be sent. The first empty cell pointer field in byte position 5 would then contain the number of the first empty cell pointer to indicate to the line master the block within a message at which retransmission of the message should begin. The redundancy of retransmitting the first several blocks of a message which have been received error free is thus omitted while proper transmission of all blocks is assured even if an error condition develops.

Request Status Message (EEQSTM)

The request status message is sent by line master LM96N 174 to a designated terminal node to determine the status of the terminal node. Byte position 0 carries 1, 0, 0, 1, 1, 0 in bit positions 7-2 respectively, and the terminal node address is carried in the node address field. Byte position 2 carries 1, 1, 1, 0, 0, 0, 0, 0, in bit positions 7-0 respectively, and byte positions 3 carries an output supervision type (OTSTSF) No. 40. No parameter is carried in byte positions 4-22 and these are all set to 0. Message REQSTM is employed by LM96N 174 in block set motion management from a buffer 220 to a buffer in a terminal node when node 174 needs to determine a terminal node status relative to block set motion. One usage examle is when line master node 174 has timed out a block set acknowledgment. Before taking any action, line master 174 determines the terminal node status by sending message REQSTM and receiving message ALMSRM in response thereto. Line master node 174 then has sufficient information available to continue the transmission of information using the status information received in message ALMSRM.

Block Set Acknowledgement Message (SETAKM)

This message is identical to message ACKPRM except that the input supervision type number in byte position 3 is 34 instead of 32. This message is sent from a terminal node to the line master node LM96N 174 when the first empty cell pointer is incremented beyond a last cell in a buffer or beyond and end of message block of data and there is no block set buffer available in the terminal node into which a next block set can be received. Message SETAKM indicates to the linemaster node 174 that the destination terminal node has received a complete message or block set, but that no space is available at the terminal node for the receipt of an additional block set.

The above four error control feedback loop messages provide an elegant, yet simple and low overhead communication system to insure the error free communication of data through the error prone communication links. Error free communication requires very little hand shaking, yet if an error condition does occur, only a few superfluous data blocks are sent before the error condition is indicated to the line master and retransmission begins with the first incomplete data block to avoid the duplication of retransmitting data blocks that have been received error free. At the same time, programming at the terminal node is minimized by the relatively simple error checking, counting and storing process while the number of supervision messages is maintained quite small. It is also an advantage of the system that the supervision messages use the same information communication facilities as data messages and therefore require no separate or extra hardware. The substantial data storage in the buffers at the terminal nodes and in large two port 172 at the line master assure the continued and uninterrupted availability of data at each active terminal to permit smooth, uninterrupted data communication at a terminal itself even during short periods of maximum capacity network usage. The acknowledgement, alarm and status request messages assure that the buffer storage space is used to good advantage without buffer overflow and without an empty buffer going unusued when data is available for a destination terminal from the hose data processor 12 which communication capacity is also available from the network. While in the present arrangement, two 16 cell message buffers are implemented at each terminal node and at the line master for each terminal node, it will be appreciated that the number of buffers and the number of blocks for each buffer can be varied to optimize the communication network for any given application.

RECONFIGURATION MESSAGES

Three messages are available for controlling a full duplex communication link. As explained previously, whenever an uncorrectable error condition occurs along a full duplex data link, the link may be reconfigured as two simplex data links in such a manner that communication is maintained with a maximum number of terminals. The reconfiguration messages facilitate this procedure.

Loopback message (LPBAKM)

This message is generated by line master LM96N 174 and is communicated along a 9.6 KB line to one of the D96NX nodes such as node D96NW 260 or node D96NE 266. The message commands the designated node to configure its line exchange unit device in a loopback arrangement with messages received over on 9.6 kilobit line from the line master being sent back toward the line master on the coextending parallel data line. The lookback direction is not specified by the message but is inherent in the selection of the D96NX node and the hardware configuration of the line exchange unit device.

The data format uses 1, 0, 0, 1, 1, 0 in byte position 0 bits 7-2 respectively. The node address identifies the D96NX node within the line exchange unit device which controls the loopback function. Byte position 2 bits 7-0 respectively, contain 1, 1, 1, 0, 0, 0, 0, 0. The output supervision type identified in byte position 3 in No. 38 and the loopback message contains no parameter in byte positions 4-22.

Cancel loopback message (CLPBKM)

This message is a counterpart of the loopback message except that it contains all 1's in the node address field and commands all D96NX nodes along a communication link to configure the associated line exchange unit device in a non-loopback arrangement. This message carries 1, 0, 0, 1, 1, 0 in byte 0 bits 7-2 respectively, and 1, 1, 1, 0, 0, 0, 0, 0 in byte position 2 bits 7-0 respectively. The output supervision type number is 34. No parameters are carried in bit positions 4-22.

Loop Continuity Message (LPCNTM)

The loop continuity message is used by line master LM96N 174 after issuance of a loopback message to determine whether a loop in one direction or the other has a continuous path. The line master issues a series of these messages and tests for each return to the line master. If, over a series of 3 outputs, 3 messages are returned back to the line master, the line master assumes the loop in question has continuity. Line master LM96N 174 commands one of the OE96NX nodes such as OE96NW 184 to place the loop continuity message on the data link. The message contains the node address of the line master and moves through the data link of the network as if it were an upward flowing message from a terminal. The line master recognizes the continuity message as a supervision message does not pass it on toward the host data processor when it arrives back at the line master. The line master also periodically issues the loop continuity message normal operation, for example every second, to monitor the 9.6 KB loops for continuity to determine when to automatically reconfigure a full duplex line into two simplex facilities to isolate failed segments.

The message format includes 1, 0, 0, 0, 1, 0 in byte position 0, bit positions 7-2 respectively and 1,1,1,0,0,0,0, in byte position 2 bits 7-0 respectively. The input supervision type number in byte position 3 to 35 and no parameters are carried in byte positions 4-22.

NETWORK CONTROL MESSAGES

The network control messages provide the operating control over the communication network. They permit the net-master node, operating in response to a control console or in response to the host data processor, to read the contents of any addressable storage location at any node in the network or to write into any writable addressable storage location at any node in the network. The addressable storage locations include the RAM and ROM memories within each node itself as well as the RAMs which provide the Q's to interconnect to nodes. It thus becomes possible to send both data and program information through the network for storage at a given node. Each node can then be commanded to execute a program to operate on the data. The communication system can thus be configured as a large, selectively programmable, multi-processor system with processing capabilities, program storage and data storage distributed throughout the substantial data storage and processing capacity of the network.

Network Control Read Message (NCRDM)

This message provides a capability of reading one, two, or three contiguous words (8 bit bytes) at any start address in any addressable node in the network. The message emanates from the host in response to a host program or from the network console. If the node address fields contain address Hex 001, the netmaster node 134 is addressed and otherwise the NCRDM message is relayed through the netmaster node to a designated node in the network. A destination node for the message responds by reading the designated address locations and issuing a node control response message (NCRSPM) in response thereto. This moves the contents of the specified word locations to the netmaster node 134.

Message NCRDM contains 1, 0, 0, 1, 1, 0 in byte position 0, bits 7-2 respectively. The node address is the destination node from which stored data is being read and byte position 2 contains 1, 1, 1, 0, 0, 0, 0, 0 in bit positions 7-0 respectively. The output supervision type number at byte position 3 is 33 and several parameters are carried in byte positions 4-10. Byte position 4 carries a read start address high field (RSAMF (HI)) to identify the 8 most significant bits of a start address while byte position 5 carries a read start address low field (RSAMF (LO)) to identify the 8 least significant bits of a start address. Byte position 6 contains a number of words field (NOWMF) to indicate whether the reading of one, two, or three 8 bit words starting at the read start address is being commanded. Byte positions 7-9 contain all 0's and byte position 10 contains a message content check sum field (MCCSMF) which provides a simple byte addition check sum over the message parameters in byte positions 0-9. The usual check sum for byte positions 0-22 is carried in byte position 23 in the large block form of the message. A destination node receiving message NCRDM checks both the message content check sum and the regular check sum over the entire message and simply discards and ignores the message if an error is detected in either.

Network Control Response Message (NCRSPM)

The network control response message is issued by a designated node in response to the receipt of a network control read message NCRDM or a network control write message NCWRM in response to the net control read message, message NCRSPM carries the contents of the specified locations back to the netmaster 134 and then from there normally on to the host or to the control console. In response to a net control write message, message NCRSPM carries the contents of the specified locations (after the write operation) back to netmaster 134 and from there normally on to the host. It is utilized by the netmaster to verify a correct write operation.

Message NCRSPM carried in byte position 0 bits 7-2 respectively, 1, 0, 0, 0, 1, 0. The nodes address is that of the responding node and byte position 2 carries 1, 1, 1, 0, 0, 0, 0, 0 in bit positions 7-0 respectively. The input supervision type number in byte position 3 to 37 and the parameter content of the message is carried in byte positions 4-10. Byte positions 4 and 5 respectively, carry the most and least significant bytes of a 16 bit start read or start write address. Byte position 6 carries the number of words being read or written, which may be one, two or three. Byte positions 7-9 designated RCMFO-2 carry the first, second and third words as appropriate and byte position 10 carries a message content check sum field (MCCSMF) which is a simple byte addition over the byte positions 0-9. The usual message check sum over byte positions 0-22 is carried in byte position 23 in the long block form and the netmaster node discards and ignores the message in the event that an error is indicated by either of the check sums.

NETWORK CONTROL WRITE MESSAGE (NCWRM)

The network control write message commands the writing of up to 3 bytes of information into any addressable, writable address location at any selected node. Byte position 0, bits 7-2 contain 1, 0, 0, 1, 1, 0 respectively, and the node address identifies the designated addressable node. Byte position 2 contains 1, 1, 1, 0, 0, 0, 0, 0 and byte position 3 contains an output supervision type No. 35. Byte positions 4 and 5 contain fields (WSAMF (HI) and WSAMF (LO)) which respectively indicate the most and least significant bytes of a 16 bit address field. Byte position 6 indicates the number of words to be written in the field, NOWMF, which may vary from 1-3. Byte positions 7-9 contain fields WCMFO-2 with the up to 3 words that are to be written. Byte position 10 carries a message content check sum over byte positions 0-9 and the normal check sum over byte position 0-22 is contained in byte position 23 to indicate a simple byte addition check sum over byte positions 0-22. If an error is detected from either of the two check sums, the message is simply ignored and discarded by the destination node.

All Call Messages (ALCALM)

All call messages are issued by the netmaster node 134 on a regular periodic basis approximately every 22 seconds. The all call messages permit the netmaster node 134 to maintain in tabular storage a running account of the status of various parameters throughout the entire communication network. They also permit automatic reconfiguration of the communication network in response to call response messages. As the all call response message flows upward through the network, each node which receives the message and must make a decision about downward paths for destination messages, updates a table indicating the path over which the all call response message is received for each downstream responding node. The all call messages are also utilized as they pass around the communication links to determine the preferred link over which an upward flowing message will be sent when a choice between two different lines is available.

Byte position 0 bits 7-2 respectively contain 1, 0, 0, 1, 1, 0. The node address contains all 1's and byte position 2 contains 1, 1, 1, 0, 0, 0, 0, 0, in bit positions 7-0 respectively. Byte position 3 carries the output supervision type number which may be one of six numbers varying from 0 through 5. Each number illicits a different response parameter from a responding node in the all call response message therefrom to permit the netmaster node 134 to maintain a table of 6 double byte parameters for each node. Each time a new all call message is issued after a 22 second interval the output supervision type number is incremented so that after 6 all call messages over a period of approximately 132 seconds, the status table in the netmaster node 134 is completely updated. The parameters are as follows:

B96BN 170

0. Number of small down blocks reaching the node.
1. Number of large down blocks reaching the node.
2. Number of up blocks reaching the node.
3. Total number of block sets (messages) reaching the node.
4. Number of single small block type of block sets reaching the node.
5. Not used—all zeros.

LM96N 174

0. Number of empty buffer available signals sent to node B96BN 170 to command issuance of message PRSNDM.
1-5. Not used—all zeros.

OE96NE 192 and OE96NW 184

0. Number of small down blocks reaching the node.
1. Number of large down blocks reaching the node.
2. Number of request status messages, REQSTM, reaching the node.
3. Number of abort messages, ABORTM, reaching the node.
4-5. Not used—all zeros.

IE96NE 180 and IE96NW 188

0. Number of up blocks reaching the node and not discarded.
1. Number of up blocks reaching the node, but discarded.
2. Number of down blocks reaching the node, all are discarded.
3. Number of alarm and status response messages, ALMSRM, reaching the node.
4. Number of block set acknowledge messages, SETAKM, reaching the node.
5. Number of acknowledge and permission to send messages reaching the node.

D96NE 266 and D96NW 260

0. Number of single small down blocks reaching the node and not discarded.
1. Number of large down blocks reaching the node and not discarded.
2. Number of down blocks discarded.
3. Number of up blocks reaching the node.
4-5. Not used—all zeros.

COEN 292

0. Number of single small down blocks reaching node.
1. Number of large down blocks reaching node.
2-5. Not used—all zeros.

CIEN 272

0. Number of up blocks reaching node and not discarded.
1. Number of blocks reaching node, but discarded.
2. Number of down blocks reaching node—all are discarded.
3-5. Not used—all zeros.

TN 316

0. Number of small down blocks reaching node and not discarded.
1. Number of large down blocks reaching node and not discarded.
2. Number of down blocks discarded at node.

3. Number of up blocks reaching the node.
4. Number of alarm and status request messages, ALMSRM, reaching node.
5. Number of hesitations in the delivery of a data block to an associated terminal because of the unavailability of output data while an output data message is in the process of being received by the terminal node.

Byte position 4 contains a node position count message field (NPCMF) that is incremented by each of the line drop micronodes D96NW and D96NE as it passes along the 9.6 KB data links 196, 198. This field enables each of the line exchange devices 62 to learn its position on each line with respect to the line master exchange unit device 60. This information is then used by the CIEN 272 node to determine the preferred path for upward flowing data blocks. The node position count is also incremented by the terminal exchange unit devices and utilized to determine their position along a single 57.6 KB coaxial cable. Byte positions 5-22 contain all 0's and the usual check sum is contained in byte position 23 in the large block format.

The all call message is originated by netmaster node 134 via queues HCDQ 132 and NMONQ 138 every 22 seconds. The message is copied for distribution along all downward switch paths and is discarded at the input end nodes IE96NE 180, IE96NW 188 and CIEN 272. As the all call messages flows outward from the netmaster node it distributes timing and configuration control throughout the network. The node B96BN 170 uses this timing for deallocating a flip-flop buffer 220 from a terminal. That is, if an all call response message is not received within a selected time out period such as 176 seconds, node B96BN 170 assumes that the terminal has been disconnected and the buffer pair 220 assigned thereto is deallocated. Similarly, the netmaster node 134 times out the existence of nodes in its hierarchy data base if an all call response is not received after the generation of eight sequential all call messages.

The all call messages are delivered in synchronous parts of sub-networks as follows. Each message is taken off the 9.6 or 57.6 KB line into storage, processed and later relayed from storage via the 9.6 KB line or the 57.6 KB coaxial cable. All synchronous nodes along the coax including the terminal nodes, node CIEN 272 and node COEN 282 respond to the all call message with the all call response message after a period of time equal to 12 (A+8) F., where A is the address of the responding node and F. is the frame time in seconds. A frame time is the time required to send a short data block of 12 bytes or 96 bits along the associated data link. Nodes B96N 170, LM96N 174, the fan out nodes 54, 56, and all synchronous nodes along the 9.6 KB channels including D96NW 260, D96NE 266, IE96NE 180, IE96NW 188, and OE96NE 192 and OEN96NW 184 all respond after a time (2) (A+8) (F). The data rate is 1/6 as fast so the multiplier is decreased by a factor of 6 from 12 to 2 so that the response times are consistent and comparable for all nodes in the network whether they are along the high speed coax cable or along the slower 9.6 kilobit DDS channels. In most implementations, the YN 110 is not an addressable node and does not respond to the all call message.

All Call Response Message (ALCLRM)

The all call response message is generated by each of the addressable terminals in response to an all call message after a time delay proportional to the node address. The 0 byte position of the all call response message contains 1, 0, 0, 0, 1, 0 in bit positions 7-2 respectively. The node address field contains all 1's and byte position 2 contains 1, 1, 1, 0, 0, 0, 0, 0 in bit positions 7-0 respectively. The input supervision type number in byte position 2 reflects the output supervision type number of the all call message to which the response message relates and thus varies between 0 and 5. Byte position 4 contains a responding node position count field (RNPCMF) which is completed by nodes D96NW 260 and D96NE 266. These nodes retain the incrementing count field of the original all call message as it passes through the 9.6 kilobit line and insert it in their response message. This enables the netmaster to determine the position of the node in the network and the line master to determine the position of the node in the subnetwork.

Byte position 5 bit positions 7-4 contain a node type field designated NTYPMF with 0 not being used, 1 indicating a terminal node, 2 indicating a CIEN node, 3 indicating a COEN node, a 4 indicating a D96NE or D96NW node, a 5 indicating an IE96NE or IE96NW node, a 6 indicating an OE96NE or OE96NW node, a 7 indicating an LM96M node, and an 8 indicating a BN96BN node. An output rate value field RNORMF is implemented with bits 7 and 6 of the field contained in bit positions 3 and 2 of byte position 5 and with bit positions 5-0 contained in byte position 7, bit positions 7-2 respectively. Terminal nodes insert into this field the bit rate at which data is transferred to a connected terminal. This information is utilized indirectly by the line master node to select the dedicated buffer pair 220 from which a next block of data will be sent through the network to a destination terminal node. Nonterminal nodes insert all 0's into this field. A responding node address field (RNAMF) is implemented at byte position 5 bit position 1 and 0 and at byte position 6, bit positions 7-0. This field contains the address of the node generating the all call response message. Similarly, an upper node address field (UMAMF) in implemented at byte position 7, bit positions 1 and 0 and in byte positions 8, bit positions 7-0. This field contains the address of the node next above the responding node in the network hierarchy. The responding node places all 0's in this field and any node which receives an all call response message containing all 0's in this field places its own address in the field.

This information is utilized by the netmaster node 134 to maintain an updated mapping of the communication network structure on a dynamic basis notwithstanding reconfiguration of the network from time to time by removing existing terminals or adding terminals. Byte positions 9 and 10 contain a 2 byte parameter for the responding node statistic (RNSTMF) which varies with the type of node and with the six types of output supervision type number of the original all call message which is being responded to. 0's are inserted in byte positions 11-22 and the conventional check sum is inserted in byte position 23 in the large block format.

The Y node 110 duplicates all all call response messages and presents them to the netmaster node 134 and to the host adapter. This is part of the Y node action on all upward flowing messages and the all call response messages are discarded by the host adapter. The B96BN node 170 detects the number 1 indicating a terminal node in the NTYPMF field and responds by allocating a buffer pair 220 corresponding to the address field of the responding terminal node. The line master node LM96N 174 utilizes the responding node position count field for nodes along the 9.6 KB line to obtain information on node distribution along the 9.6 KB lines and maintain a node table for reconfiguration purposes. The LM96N 174 node uses field RNIEMF to identify the IE96NE or IE96NW node response defining the end of the reconfiguration node table.

Reinitialization Message (REINM)

The reinitialization message is issued by the line master node LM96N 174 and causes the node to which it is addressed to execute its initialization program and start operation with a fresh RAM load in which all earlier data and status information is discarded. This message is discarded by the destination node in the event of a check sum error.

Byte position 0 bits 7-2 contain 1, 0, 0, 1, 1, 0 respectively. The address of the destination node is inserted in the node address field and byte position 2 bit positions 7-0 are set to 1, 1, 1, 0, 0, 0, 0, 0. The output supervision type number is contained in byte position 3 and is 41 for the reinitialization message. Bytes 4-9 contain all 0's and byte 10 contains a redundant check sum. Bytes 11-22 for the large block format contain all 0's and byte position 23 contains the conventional check sum.

NETWORK CONTROL INTERFACE MESSAGES

These messages enable a network operator to obtain at a console terminal a display of the data base stored in netmaster node 134 (FIG. 2) which relate to the structure and operation of the communication network. A display data base message (DSBM) is generated in response to an operator command, and flows outward through the network to the netmaster node 134. The netmaster node responds to the display data base message by generating a one of a plurality of different types of response messages which communicate a desired portion of the network data base back to the originating terminal.

If the operator request is entered through the TTY control console, the display data base message is communicated from console interface node 148 upward through queue LCUQ 146 to the netmaster node 134 and the response is communicated back through LCDQ 145 to console interface node 138. On the other hand, if the display data base message originates at another terminal in the network or with the host data processor 12, the message reaches the net master node 134 through HCUQ 131 and the response is returned to the host through HCDQ 132. The netmaster node 134 maintains paired associations between each addressable node in the network and the node immediately thereabove in the hierarchy as well as 6 double byte parameters for each node. The display data base messages may command the response to provide the entire data base or selected portions thereof which depend upon the input supervision type number for the display data base message and particular parameters that are contained in the message. Each input supervision type number commands a specific response message and the requested information will be made clearer in the following discussion of the response messages. In the present implementation of the system 10, the programming has not been provided for the network control interface messages because of their redundancy to the network control messages which are used instead. However, the interface messages are somewhat more convenient to use and the required programming can readily be provided by a person of ordinary skill in the art to accomplish the functions described below.

The format of the display data base message includes at byte position 0, bit positions 7-2 respectively, 1, 0, 0, 0, 1, 0. The node address associated with a requesting terminal is placed in the node address field at byte position 0 bits 1 and 0 and at byte position 1, bits 7-0. This would typically be the address of the console interface node 148 but might also be the address for any terminal node in the network. Byte position 2 contains 1, 1, 1, 0, 0, 0, 0, 0, in bit positions 7-0 respectively. The input supervision type number appears in byte position 3 and may vary from 16 through 26 in accordance with a desired response as indicated below. Byte position 4 contains a number x which varies between 0 and 5 to identify one of the 6 double byte parameters which are stored in the netmaster node 134 data base for the addressable nodes in response to the all call message. The parameter x may or may not have any significance for a given input supervision type number and is set to 0 if it has no significance. Byte position 5, bits 1 and 0 in combination with byte position 6 carry a Y parameter which is a specific node address for which data base information is being requested. This Y parameter may or may not have significance depending upon the particular input supervision type number and is set to 0 if it does not have any significance. Byte position 7, bits 1 and 0 in combination with byte position 8 define a z parameter which is a node address of a B96BN node such as node 170. This address defines a subnet that is implemented below the given node in the hierarchial structure. In the present implementation there is only one subnet, but in general a communication network may contain several subnets and the parameter defines a particular subnet of interest. In the large block form, 0's are entered in byte positions 9-22 and the check sum is entered in byte position 23.

ALL HIERARCHY PAIR RESPONSE MESSAGE (AHPRM)

The basic message format for all of the display data base response messages is the same and includes at byte position 0 bits 7-2 respectively, 1, 0, x, 1, 1, 0. Bit 5 is the block type identification field and its contents depend upon the particular data content of the block. A 1 indicates that it must be transformed into a double small block and a 0 indicates that it may be transformed into a single small block for communication along the serial data links. In a multi-block response message, only the last block might possibly be transformable into a single small block and that would depend upon the number of data bytes in the block. The node address field reflects the node address contained in the originating display date base message. Byte position 2 bits 7 and 6 contain 1, 1 respectively. Bit position 5 is the end of message signal field and contains logic 1 for the last block of a message and logic 0 for preceding blocks of a multi-block message. The block sequence number in bit positions 4-0 sequentially number the blocks of a response message from 0-15. Byte position 3 carries the output supervision type number which reflects the input supervision type number of the display data base message to which the netmaster node 134 is responding. Similarly, byte position 4 reflects the X parameter, byte positions 5 and 6 reflect the Y parameter, and byte positions 7 and 8 reflect the Z parameter of the originating display data base message. A conventional check sum appears in byte position 23 of each data block and the intermediate data positions carry the data information in the form stored in the netmaster node 134 data base. This data will vary widely with the particular configuration of the network and with the input supervision type number of the originating display data base message.

The all hierarchy pair response message (AHPRM) is generated in response to input supervision type number 24 and carries the hierarchy pair for each node in each subnetwork as identified by the B96BN node and all nodes therebelow. The hierarchy pairs are the paired associations of a given node address and the address of the node immediately thereabove in the network hierarchy. The parameters X, Y and Z have no significance for input supervision type number 24.

The all hierarchy and statistic pair response message (AHSPRM) is generated in response to input supervision type number 25 and contains the entire netmaster node network data base. The parameters X, Y, and Z have no significance in this message.

The all subnet statistic pair response message (ASNPRM) is generated in response to input supervision type number 19 and carries 1 of 6 double byte statistics for all of the nodes of all the subnets as identified by the parameter X. X corresponds to the all call message type numbers for the data desired and thus varies between 0 and 5. The parameters Y and Z have no significance.

The all statistics pair message (ASPRM) is generated in response to input supervision type number 21 and carries the double byte statistics data for all 6 parameters associated with every addressable node in the network. The parameters X, Y and Z have no significance.

The node all statistics pair response message (NASPRM) carries the double byte statistics for each of the 6 parameters associated with a specific addressable node identified by parameter Y. The parameters X and Z have no significance.

The node hierarchy chain response message, (NHCHRM), is generated in response to input supervision type number 26 and carries the hierarchy pair for all nodes upward of a node whose address is specified by the parameter Y. The parameters X and Z have no significance.

The node hierarchy pair response message (NHPRM) is generated in response to an input supervision type number 22 and carries the hierarchy upper node pair for a specific node whose address is specified by the parameter Y. The parameters X and Z have no significance.

The node statistics pair response message (NSPRM) is generated in response to input supervision type number 16 and carries the double byte statistical parameter specified by parameter X for a specific node whose address is specified by parameter Y. Parameter Z has no significance in this response message.

The subnet all statistics pair response message (SNASRM) is generated in response to input supervision type Number 18 and carries all statistics pairs for all 6 parameters for a particular subnet identified by the address of the subnet B96BN node carried by parameter Z. Parameters X and Y have no significance for this response message.

The subnet hierarchy pair response message (SNHPRM) is generated in response to input supervision type number 23 and causes the netmaster node 134 to provide all hierarchy pairs for all addressable nodes above a given B96BN node in the network specified whose address is specified by the parameter Z. Parameters X and Y have no significance in this message.

The subnet statistics pair response message (SNSPRM) is generated in response to input supervision type number 17 and carries the double byte statistic identified by parameter X for each node in a specific subnet identified by parameter Z. The parameter Y has no significance in this response message.

The network control interface messages thus enable a person operating the communication network to rapidly obtain on a real time basis the present status of the dynamically changing communication network configuration as well as the statistical parameters relating to network operation. For convenience, the entire statistical data base may be obtained or the data base may be obtained for only specified portions of the network.

PROGRAMMING

General

The patentable novelty of this invention is deemed to lie in the disclosed method and apparatus for providing data communication rather than in the specific programs which are provided for the various programmable nodes in the system. Furthermore, the specific program load listings for each node are provided at the end of this Detailed Description. An exception is the programming for fan out nodes 54 and 56. Up to the date of filing the application for this patent alternate path 90 has been used and the programming for the fan out nodes 54, 56 has not been completed. However, it will be appreciated that the programming for the fan out nodes can be provided in accordance with the teachings herein. It is thus deemed unnecessary to provide detailed flow diagrams for each of the operating programs of the system. However, to promote a better understanding of the general operation of the communication system, a generalized discussion of system functions and programming will be provided first as to functions and programming which relate to the system generally or to a plurality of nodes in the system and then as to specific nodes.

Each programmable node is built around a separate microprocessor and has its own independent internal programming and address structure. Each node has a ring of high level programs which are executed in a sequential, recirculating manner. Each high level program relates to a different primary function such as the inputing of data from a queue or from a data channel, the outputing of data to a channel as channel capacity becomes available, maintanance of internal timing functions, and resetting of a hardware time out for implementation of a deadman's stick. Outside of the high level program ring are an initialization program and perhaps an interrupt program. The initialization program is entered only in response to a command external to the node, received either over a hardware control line or as a supervision message received as any other message flowing through the network. The initialization program is exited to one of the high level programs where recirculation through the ring commences. An interrupt program is entered in response to an interrupt request and after execution of the interrupt program, a return is made to the next instruction in a sequence of instructions that was being executed at the time of the interrupt. The high level programs may include subroutines to perform certain functions or subprograms, but the high level program exit is always to the next high level program in the ring upon completion of a high level program task. For example, the high level program task might be to sample an input such as a queue in a two port buffer memory and perform a specified operation on any block of data that appears in the input. Thus, as the high level program is executed, the input is sampled and if no data is found, an exit is made to the next high level program in the ring. On the other hand, if data is found, control might be transferred to a subprogram which tests for whether or not the data block relates to a data message passing through the network or a supervision message. Control would then be further passed to another subprogram depending upon the type of message that is being input until the proper high level program function is performed and then control would be passed to the next high level program in the ring. Subroutines may be used within any of the programs or subprograms.

Queues are used for transfer of blocks of information through two port buffer memories between nodes and for transfer of 12 byte small blocks or blockettes between programs in the same node. The communicating programs sharing a queue within a node may be on the same program level or at different levels. For example, an interrupt program may insert or remove data from a channel input/output module along a data link while a high level program positioned within the ring examines the information, performs any necessary operations, and either receives the information from a connecting two port queue or passes the information on through a connecting two port queue. Each cell of a queue is said to store a large block or small block of data and a queue may be read from or written into without affecting the status of the queue if the pointers are not changed. However, a block of data is said to be placed in a queue when the next write pointer is incremented and is said to be removed from the queue when the next read pointer is incremented. After writing into the cell or reading from the cell, the appropriate pointer is incremented and the block is then said to be placed in the queue or removed from the queue.

As explained previously, each queue has associated therewith a plurality of cells, one or two address maps, and a single control package. The cells and control packages are located in random access storage and, for a queue in a two port buffer memory, this storage is part of the memory. The address map is normally located in read only memory and if two nodes share a connecting two port, each node has an address map for the queues of the two port.

Each terminal node is provided with a buffer pair, and a buffer pair is implemented in the large two port memory of the net master node of a subnet for each terminal node. Each of the buffer pairs consists of two standard queues with 16 24 byte cells each. Each queue is thus capable of holding a maximum of on full output data message.

The output data messages are loaded into and removed from the buffer pairs in rotary. Current buffer write and current buffer read fields associated with each buffer are maintained by the sending and receiving programs. If the current write field contains 0, buffer 0 of the pair is being written into by the sending programs and if it contains a 1 then buffer 1 is being written into. Similarly, if the current read field contains a 0, the receiving program is reading from buffer 0 and if it contains a 1, the receiving program is reading from buffer 1. The buffer pair is empty when both of its queues are empty. Space is available for an additional output data message if one or both of the queues are empty. The 32 buffer pairs in the large two port memory between the B96BN node 170 and the LM96N node 174 can of course be increased in number if necessary to accommodate a larger number of terminal nodes in the subnetwork. The output data messages are moved under control of the permission to send message issued by the B96BN node 170 from the host data processor to a queue in a buffer pair of the large two port memory 172 on a per stream basis. That is, a complete, uninterrupted message is sent from the host to a queue in a buffer pair upon receipt of a permission to send message when data is to be communicated. The output messages are then moved on a per stream basis from a large two port buffer to a corresponding terminal node buffer. The data is moved on a block by block basis with the blocks being selected by a line allocation algorithm which has been explained previously.

The 24 byte large blocks of data are converted to either a single or double 12 byte small block of data for communication along the data links. Identical programs are used for block conversion and blockette motion on both the 9.6 kilobit and 57.6 kilobit loops. Therefore, in the following discussion, the term drop node refers to the D96NE, D96NW and TN nodes. The term input end node refers to the IE96NE, IE96NW and CIEN nodes and the term output end nodes refers to the OE96NE, OE96NW and COEN nodes. A small block arriving at a drop node along a channel or data link may be carried either by a single or a double small block. A double small block is used if the net data content of the block is greater than 8 bytes. In the present implementation, only type B or downward flowing messages are large enough to require a double small block, with all supervision blocks and all upward flowing blocks being represented by a single small block. Thus, all upward flowing blocks which are presented to a drop node for delivery to the channel contain 8 bytes or less of net data and are therefore transformed into a single small block before being stored in a queue for output on a channel.

Upon the arrival of the first double byte of a block of data at a drop node, the drop node utilizes the node address to access an internal table to determine whether the block should be allowed to pass along the data link or whether it should be pulled off.

An empty frame arriving at a drop node presents an opportunity to output a small block of data to the channel. This opportunity is exercised by filling the frame with a small block waiting in a queue. Similarly, a small block being switched off a channel at a drop node creates an empty output frame and presents an opportunity for the node to output a small block of data. If an arriving frame contains a small block of data and another small block of data is waiting in a queue for outputing, a priority decision must be made to determine whether the incoming small block stays in its frame and continues along the channel or whether it is to be diverted to a small block "siding" queue in internal drop node storage and replaced by the waiting upward flowing small block. The priority relationships have been established with the first or highest priority being given to an A (upward flowing) small block arriving at the drop node in a data frame along the communication link. The second priority is given to type A small blocks that have arrived or been generated at a node other than via the communication link and is awaiting output. The third priority is assigned to type B or downward flowing blocks which are waiting in a siding gueue for output.

These are small blocks which have been previously pulled off the data link to make room for higher priority upward flowing blocks. The lowest priority is assigned to type B downward flowing blocks which arrive at the drop node along the channel.

A drop node is interrupted on arrival of each double byte of data from the input channel. At the time of arrival, the hardward presents to predetermined node address locations the last 16 bits that have arrived over the channel. The hardware also presents a D byte count (0–5) at a third address location. This information is held until the next interrupt. When the double byte count is equal to 1, the second double byte is being serially entered and the hardware is presenting the first of six double bytes in parallel to the associated micronode. This is the double byte which contains header and address information. The drop node may thus examine the first double byte, and within a single double byte delay time, make a decision to pass the block along the communication link, pull the block off the communication link or substitute another block to be passed along the communication link.

The drop node program maintains an internal double byte counter which is incremented by one on a modulo six recirculating basis at each interrupt. Upon interrupt, the internal double byte is compared with the hardware double byte counter. If the two counters are equal the program continues with its normal actions. If the two counters are not equal, the program enters a loop that merely examines the hardware double byte counter and stays in this loop until the hardware counter becomes equal to the program counter. While in this loop input data from the channel is allowed to flow through the input shift register to the channel output shift register and be output on the channel. When the two counter fields become equal, the program proceeds with its normal activity. Any resulting errors due to lost double bytes are corrected by the error loop control between the LM96N node and the destination terminal nodes.

On arrival of the last double byte in a frame at a micronode as indicated by D byte count No. 0, a drop node program prepares a summary of the state of the node for use on arrival of the first dual byte of the next frame. In preparing this summary, the program selects the highest priority gueue (if any) having a small block available for output in the next frame and stages the oldest blockette of this priority in the output queue for possible output during the next frame. If no small block is available for sending, the program stages an empty frame for possible output. Any previously staged but unsent small block is returned to its queue before the new summary is prepared.

On arrival of the first double byte in the next frame, a decision is made as to whether the arriving or staged small block has highest priority and whether the address of the arriving small block specifies that it should be switched off the channel at the drop node or continued along the channel. Depending upon the priority and node address conditions, an arriving small block may be moved to the siding gueue or a local receiving gueue for small blocks being switched off the channel or may be allowed to flow through and continue along the channel. An empty frame arriving from the channel is replaced by a staged small block, which might also be an empty frame.

The drop node hardware provides a pair of bus address locations into which the program may write for output on the channel. If, after one interrupt and before the next interrupt, the program writes a double byte into these two locations, this double byte will replace the double byte that has arrived from the input channel. Thus, for a swap, the drop node program moves two bytes from the input double byte bus address locations to a cell of a selected gueue and moves two bytes from the staged small block to the output double byte address locations at each of the six interrupts which represent a frame carrying a small block of data. This process begins with interrupt No. 0 while the D byte count is 1. For outputing data only, the drop node program moves double bytes from the staged small block to the output double byte locations at each of the six interrupts representing a frame, but does not read from the input locations. If a data frame and the small block it contains are to pass through the drop node, the program takes no action in moving double bytes to or from the hardware during the six interrupts of a small block.

For moving small blocks of data from the channel to an input end node, the programming is a subset of the programming that is used at a drop node. Since an input end node cannot place data on a data link, the input portion of the program may be deleted. The input end node accepts small blocks from the channel and places them in a small block arrival queue. If, at interrupt No. 0, the incoming frame is found to be empty, the double bytes 0–5 are allowed to move through the shift register of the associated input channel and are lost. If, at interrupt 0, the incoming frame is found to be not empty, a double byte is moved at each of the interrupts 0–5 to the next write cell of the small block arrival queue.

Similarly, an output end node has no capability of removing data from a channel and the programming for an output end node is essentially a subset of the drop node programming. An output end node accepts small blocks of data from an output small block queue and places them on the channel in synchronism with the data frames. If no small block is available from the output queue, the output end node places an empty frame on the channel. As with the drop node, either a small block or an empty frame is staged in the output queue at interrupt number 5 for delivery of a double byte to the channel during each of the following six interrupts 0–5.

The deadman's stick is implemented to provide automatic reinitialization of a programmable micronode in the event that program execution thereat goes errant. For example, a bit error might cause the microprocessor to improperly interpret an instruction and almost anything can happen as a result. Since such errors may occur from time to time without any actual malfunction, it is possible that proper operation of the node can be restored merely by reinitialization. This is accomplished with a hardware one shot which is periodically reset by writing into a selected bus address location. The program for the deadman's stick is one of the high level programs in the program ring and is periodically entered to reset the one shot during normal operation. However, if a program error occurs, the deadman's stick program will not be executed and the one shot will time out. The timing out of the one shot causes a hardware commanded initialization with the microprocessor being constrained to jump to an address location defined by the hardware implementation of the microprocessor. The microprocessor than proceeds to execute the initialization program and return to normal operation.

During initialization the random access memory of each node is set to initial values by the initialization program that is resident in the node's read only memory. The initialization can be commanded by either a pushbutton switch or by the time out of the one shot of the node's deadman's stick. All nodes at a given exchange unit that are connected by two port buffer memories are commanded to start initialization procedures simultaneously upon the time out of the deadman's stick or upon reset pushbutton activation at any of the connected nodes.

A time out is implemented by a count down routine following each initialization and precedes hand over of the processor to the normal function defined by the high level program ring. The individual time counts for each of the programs of two port connected nodes are adjusted so that the time elapse between start of initialization and start of normal operation is approximately the same for all nodes in the interconnected set. For ease of implementation, a time period of one second, which is longer than is required for initialization of any of the nodes, is selected as the standard initialization period. This guarantees that initialization is complete in the multinode environment before a normal operation is commenced by any one node. To prevent redundancy and interference, the rather arbitrary rule is used that each node in the network initializes any two port buffer memory below it in the tree structure hierarchy as well as any two port buffer memory that is not connected to any other node.

Program interrupts are implemented only at nodes NMN, OE96NE, OE96NW, D96NE, D96NW, IE96NE, IE96NW, COEN, TN, and CIEN. The application of the interrupt signal to the microprocessor at a node causes the control to be passed to an interrupt vector location to start the interrupt routine. On completion of the interrupt routine, control is passed back to the interrupted program at the next instruction by a return from interrupt instruction executed by the interrupt routine as its last step. Only one interrupt level is used and the programs installed in a given node are either high level or an interrupt program which is itself not interruptable.

The source and implementation of network timing at the various nodes depends upon the location of the node within the network. At the nodes which are connected to the data link, each node is interrupted six times for each frame time period to provide the necessary internal timing. This is six times for each 10 milliseconds for nodes on the 9.6KB channel and six times for each 1.667 millisecond period for nodes on the 57.6KB channel. This is sufficient to meet internal node timing requirements.

The netmaster node requires timing to produce the all call messages at the scheduled 22 second intervals. This timing is provided by the netmaster interrupt module which is controlled to generate an interrupt every 22 milliseconds.

The line master node requires timing at a 10 millisecond rate to schedule its activities relative to frame availability on the two 9.6KB output channels serviced by the OE96NE and OE96NW modes. It receives the 10 millisecond timing redundantly from both of these nodes via the connecting two ports as follows. The OE96NE and OE96NW nodes each set a timing field in the two port connecting unit to the LM96N node to logic 1 every 10 milliseconds, using the channel interrupt timing as a source. The LM96N node contains a field which, if set to 0 specifies the OE96NE node as the source of timing, and if set to 1 specifies the OE96NW node as the source of timing. If the source pointer points at the OE96NE node, the timing field in the two port maintained by the OE96NE node is tested. If it has the value 1, a clock tick for the LM96N node is generated and the shared timing field is reset to 0. If it has the value 0, no action is taken unless it has had the value 0 for the latest n samples. In this case the source pointer field is complemented and the OE96NW node is specified as the timing source.

Sevice of the current timing field is accomplished by the program in the LM96N program set ring. By setting n large enough, a crude timeout (much greater than 10 milliseconds) of the timing source is obtained. When this time out fires the alternate timing source is accessed. Thus, failure of either one of the output channels will not deprive the LM96N 174 node of the timing it needs to service the remaining channel. Clocks maintained by the LM96N 174 node in the large two ports shared with the B96BN node provide a time out capability to the B96BN node 170.

PROCESSOR INPUT MATCHING NODE

A processor input matching node (PIMN) 104 receives input data messages, permission to send messages, the net control response messages and all call response messages. On receipt of an input data message, INDATM, from the Y node, the processor input matching node 104 constructs a data packet in the host format using the originating node address and the data from the input daa message. The new packet is communicated to the host through the matching module 100. All messages except the input data message and the permission to send message arriving from the Y node 110 are discarded with no action taken by PIMN 104. On receipt of a permission to send message, PRSNDM, from the Y node 110, node PIMN 104 constructs a permission to send packet in the host format containing the originating node address. This packet is sent to the host.

Upon receipt of a net control response message, NCRSPM, from the node NMIFN 108 through NTRQ 119, PIMN 104 constructs a supervision packet in the host format. This packet contains the net control response message and is passed to the host.

PROCESSOR OUTPUT MATCHING NODE

The processor output matching node, POMN 105, receives all of the messages flowing downward from the host through processor output interface module 102. Upon receipt of an ABORT packet in the host format, an ABORTM message in the network format containing the address of the destination terminal node is generated and passed to Y node 110. Output data messages, OTDATM, are received in the host format from the host terminal and converted to an output data message of 1 to 16 blocks and passed on to Y node 110. The longest output data message is 16 blocks times 160 bits per block equal 2,560 bits. Longer bit streams are converted into multiple messages. All blocks except the last block of an output data message are loaded with exactly 160 bits of data and identified as a large block which must be moved through the serial data channels as a double small block. If the last block of the output data message is loaded with 64 bits or less it is marked for conversion to a single small block and is otherwise marked for conversion to a double small block.

Upon receipt of a net control read or net control write packet from the host, node POMN 105 converts to the message to the proper NCRDM or NCWRM network format containing the address of the destination node and passes the message to the netmaster interface node, NMIFM 108.

NETMASTER INTERFACE NODE

The netmaster inferface node (NMIFN) 108 receives the net control response messages, NCRSPM and passes them upward from the POMN 105 to netmaster node 134. It also receives the net control read and write messages NCRDM and NCWRM and passes them up from the POMN 105 to netmaster node 108.

NETMASTER NODE

The netmaster node (NMN) 134 receives the input data messages, the permission to send messages, the network control response messages, the all call response messages, the net control read messages, the net control write messages and originates the all call messages. The input data messages, INDATM, and permission to send messages, PRSNDM, arriving at NMN 134 from Y node 110 are simply discarded without action.

A net control response message received by the netmaster node 134 from the Y node is passed to the netmaster interface node 108 or to the console interface node 148 depending upon whether network control resides in the host or in the TTY control console. The location of network control is defined by the contents of a field in the netmaster node 134. A net control response message generated at NMN 134 in response to a net control read or write message contains the contents of the storage locations specified in the requesting message (after the requested write, if any). The net control response message generated within NMN 134 is passed to the netmaster interface node or the CIFN node 148 depending upon whether control resides in the host or the TTY console. A net control read or write message arriving from the host via the netmaster interface node 108 transfers control to the host. A net control read or write message arriving from the TTY control console via the console interface node 148 transfers control to the TTY control console.

Upon receving an all call response message, ALCLRM, the netmaster node 134 places the contents of the all call response message parameter in a data base storage area associated with the node originating the response message, as defined by the node address of the message. This storage area associated with each responding node is divided into a plurality of fields storing various information parameters pertaining to each responding node. One of six node statistics fields is updated with a corresponding one of six possible parameters which is carried by the all call response message. The parameter depends upon the all call message type number of the message which generated the response and a sequential rotation through all six types occurs. A responding node type number is stored in a responding node type field. The upper node address inserted by the node immediately above the responding node in the tree structure is placed in one of two upper node address fields. Two fields are needed because there may be two nodes above a given node (D96NE and D96NW are above CIEN). If both the responding node address and the upper node address fields are empty (both contain 0) the upper node address is stored in field No. 1. If only one field is empty, the upper node address contained in the response message is compared with the contents of the non-empty field. If the comparison results in an equality, no action is taken. If the upper node address in the message is different from the non-empty stored field the upper node address from the message is placed in the empty field. If neither of the two address fields of the all call response message is empty, the upper node address of the message is compared with the contents of each of the two stored address fields. If the upper node address is equal to the contents of either field, no action is taken. If the upper node address is not equal to the contents of one of the fields, both fields are emptied (set to zero) and the upper node address is stored in field No. 1. For nodes located along the serial data channel, the node position count is stored in a node position count field. After the netmaster node data base has been updated with the contents of the all call response message, the all call response message is discarded.

An all call message, ALCALM, is generated by the netmaster node 134 approximately every 22 seconds and passed to Y node 110 for distribution to all nodes below. The six different types of all call messages carrying the supervision message type numbers 0–5 are issued in a rotary sequence. The all call message type numbers specified to the destination nodes elicit six statistic fields in the receiving node which are loaded into the all call response messages by a responding node. The all call response message generated at a responding node carries the supervision message type number of the all call message which is being responded to. If a net control read or write message, NCRDM or NCWRM, contains the address of netmaster node 134, the requested read or write is performed and the results are used ro generate a net control response message. The net control read or write message is discarded. If the net control read or write message arrives from the netmaster interface node, the network control field in the netmaster node 134 is set to point to the host. If it arrives from the console interface node 148, the net control field is set to point to the TTY control console. If the net control read or write message does not contain the address of the netmaster node, the message is passed to the Y node 110 for distribution to the network and the network control field in the netmaster 134 is set to point in the direction from which the message came.

CONSOLE INTERFACE NODE

The console interface node (CIFN) 148 handles net control read messages, net control write messages, and net control response messages. If a net control response message is received by the console interface node 148 from the netmaster node 134 in response to a net control read message, the contents of the net control read message are displayed on the TTY network console. If the requesting net control read message is not the last of a request sequence, the next net control read message is generated. If it is the last, the sequence is terminated. If a net control response message is received by console interface node 148 from the netmaster node in response to a net control write message, the contents of the net control response message are used to confirm successful completion of the write specified by the net control write message. The TTY network control console supplies the contents for the net control wrire messages sequentially with two hexidecimal characters for a single byte or four characters for a double byte write or six characters for a three byte write. The arrival of the necessary characters from the console released the net control write message.

A read command from the TTY network control console results in the console interface node 148 generating a sequence of one or more net control read messages as necessary to read the storage area specified as a start location and length in the read command. The read command requires actuation of key "R" followed by a 3digit hex node address followed by a 4digit hex internal start address followed by a 4 digit hex byte length number. A write command is similar except key "W" is depressed instead of key "R" and instead of a byte length, pairs of hex characters for sequential bytes are supplied. The write continues sequentially until a non-hex key is actuated to end the operation.. The first net control read message of the read sequence is passed on to the netmaster node on an unsolicited basis. The remaining net control read messages of the sequence are issued to the netmaster node 134 upon receipt from the netmaster node of the net control response message corresponding to the previously sent net control read message. Bytes of data are read in groups of two using the net control read message until a specified number of bytes has been read.

The TTY network control console supplies the write parameters for net control write messages six hexidecimal characters at a time (or less for the last write message). As the console interface node 148 receives each set of six hex characters it releases a net control write message to the netmaster node 134. Netmaster node 134 executes the net control response message if the write message is addressed to the netmaster node 134. Otherwise, netmaster node 134 passes the net control write message on to the Y node 110 for distribution to the network. If the network control console supplies only one or two hex characters prior to terminating the write command with a carriage return, a single byte net control write message will be generated. If three or four hex characters are supplied a two byte net control write message will be generated and if five or six hex characters are supplied a three byte net control write message will be generated. One, two or three bytes may thus be written into a node at a specified bus address location within a specified node.

Y NODE

The Y node (YN) 110 responds to receipt of input data messages, INDATAM, and permission to send messages, PRSNDM, by duplicating the messages and sending them both to the netmaster node 134 and to the processor interface matching node 104. The net control response messages received from below are also duplicated and sent to PIMN 104 and NMN 134. In the event that Y node 110 is addressable (not in the present implementation) and generates a net control response message, the internally generated response message is also duplicated and sent to PIMN 104 and NMN 134. The Y node generates an all call response message only if it is implemented as an addressable node. Similarly, the Y node 110 places its address in an empty upper node address field only if it has an address assigned thereto. All all call response messages, whether internally generated or received from below are duplicated and communicated to the NMN 134 and PIMN 104. Abort messages received by YN 110 from POMN 105 are passed through to the network below. Similarly, output data messages are received from POMN 105 and passed through to the network below. Net control read and write messages received from NMN 134 are passed through to the network below except when YN 110 is addressable and the message contains the Y node address. In this case, the control message is discarded after execution and an appropriate net control response message is generated and communicated to NMN 134.

FAN OUT NODE DEVICES

The fan out nodes 54 and 56 merely pass through network messages that are not addressed to them. They make the usual response to call call messages and generate network control response messages in response to net control read and write messages addressed to them. They maintain a table by responding node address of the path below on which a node responds and use the table to direct downward flowing messages over the proper downward path.

NODE B96BN

Node B96BN 170 receives input data messages, INDATM, passing upward through the network from MUQ 228 and communicates them through the fan out nodes to the Y node.

The permission to send message, PRSNDM, is normally generated by the mode B96BN 170. The message contains the node address of a terminal node for which a buffer store is available in large two port 172 and is sent upward through MUQ 228 to the host 112. As an output data message is sent to a terminal node and an empty buffer becomes available upon receipt of a terminal node acknowledgement message, node LM96N 174 provides a signal through large two port 172 and the node B96BN assembles and sends a permission to send message upward to the host. Node B96BN also maintains a time out counter of 16 seconds plus a period of time proportional to the node address of a terminal node to which a data stream having an empty buffer applies. When this time out expires, a new permission to send message is sent to the host. It is quite possible that 16 seconds can pass without data being sent to a terminal node in the normal course of operation. However, the passing of this time could also mean that an error has occurred and the host data processor has failed to get the permission to send a message. The time out assures that such an error is self-correcting after a short period of time.

The net control read and write messages are normally passed down to the network through MDQ 227. If the message is addressed to node B96BN 170 a proper net control response message is prepared and sent upward through the network. Similarly, net control response messages generated below node B96BN 170 are merely passed upward through the node 170.

Node B96BN 170 responds to an all call message with an all call response message in a manner similar to all other nodes. In addition, if an all call response message received from node LM96N 174 below contains an empty upper node address field, node B96BN 170 inserts its own address into this upper node address field. Otherwise, all call messages received from below are merely passed upward through the network. However, if an all call response message received from below identifies its source as a terminal node, node B96BN either creates a data stream for that terminal node (by assigning a buffer pair to the terminal node) or verifies the existence of a data stream for the responding terminal node. Node B96BN 170 maintains a node address table field associated with the address of the originating terminal node. This field indicates whether the terminal node is active with a data stream or buffer pair assigned thereto or is inactive. If eight all call messages pass through the node B96BN 170 without receipt of an all call response message for a given stream, the stream is deactivated. Upon receipt by node B96BN 170 of an abort message, ABORTM, from above, the message is merely passed downwardly through MDQ 227 to node LM96N 174.

The output data message arrives at node B96BN 170 from the host processor above one block at a time with the last block of the message containing a logic 1 in the end of message field. Node B96BN 170 stores the blocks of a message in the current write buffer or a buffer pair assigned to the destination terminal node as indicated by the address field in the output data message block. If, upon storage of the last block of a message an empty buffer of the corresponding buffer pair is available, node B96BN 170 generates a permission to send message associated with the data stream. The node address table field of the node B96BN 170 is utilized to provide an association between the terminal node address of an output data message and the corresponding buffer pair.

Upon receipt of an all call message from above, node B96BN 170 passes the message onward through MDQ 227 and generates its own appropriate response.

LINE MASTER NODE

Line master node (LM96N) 174 operates to selectively send data messages from the buffer pairs downward through the subnetwork to a terminal node on a per data stream basis. The stream with which a message is associated is identified by the terminal node address contained in the message.

The line master node 174 maintains error loop control by maintaining a parameter for each data stream, the parameter identifies one of six possible states for the data stream. State 0 is the output enable state. In this state the blocks of an output data message are moved from the current read buffer of a buffer pair in large two port 172 through the subnet to a terminal node below. The streams that are in the output enabled state are available for selection of a next block of data using the line allocation algorithm as explained above.

State No. 1 is an acknowledgement expected state. This state is entered after a last block of data of an output data message is sent to a destination terminal node. In this state, the line master node 174 awaits an acknowledgement and permission to send, ACKPRM, or block set acknowledgement, SETAKM, message from the terminal node corresponding to the data stream. As the data stream enters state 1, a time out is set and if this time out period expires without receipt of an acknowledgement message the data stream is changed to state 3. Upon receipt of an acknowledgement and permission to send message the state reverts to state 0 and upon receipt of a block set acknowledgement message the state changes to state 2.

State 2 is the space expected state. In this state a complete message has been sent and a block set acknowledgement response message has been received from the destination terminal node. This means that both buffers at the terminal node are full and the data stream awaits receipt of an acknowledgement and permission to send message, which indicates that a buffer has become available to receive additional data. Upon receipt of the acknowledgement and permission to send message, control passes to state 0. Upon entering state 2, a time out period is set and if this period passes without receipt of the acknowledgement and permission to send, control passes to state 4.

State 3 is the no acknowledgement abnormal state. The stream enters this state from state 1 as a result of a failure to receive an acknowledgement either in the form of an acknowledgement and permission to send message or a block acknowledgement message during a time out period initiated upon output of the last block of a message. Upon entering this state, status is requested and a time out is initiated. Each time a time out expires a new status request message is sent and a time out is again initiated. The data stream remains in this state until the data stream becomes inactive or until an acknowledgement message transfers control to state 0 or state 1.

State 4 is a no space abnormal state. The stream enters this state from a state 2 as a result of failure to receive an acknowledgement and permission to send message from the associated terminal node during the state 2 time out period. Upon entering state 4, a time out is set and a status request message is sent to the terminal node. Each time the time out expires, a new status request message is sent and the time out is reset. The data stream remains in state 4 until a status response message is received which indicates that control should be transferreed elsewhere.

Stage 5 is an ABORT state. The data stream enters this state upon receipt of an ABORTM from above and remains in this state until an acknowledgement with permission to send message is received from the terminal node. The acknowledgement with permission to send message indicates that the terminal node has responded to the abort message by clearing its buffer storage. Upon entering state 5 a time out period is set to count eight data frame periods and upon expiration of the time out a new abort message is sent and the time out is reset. Upon receipt of the acknowledgement with permission to send message control is transferred to state 0.

Node LM96N 174 periodically sends a loop continuity message, LPCNTM, around each of the halves of the duplex loop and if the message fails to return three times in succession for a given loop, a break in the communication link is presumed to exist. The line master node 174 then proceeds to execute the isolation and correction program as follows. Line master node 174 issues a loopback message, LPBAKM, along the east loop addressed to the D96NE drop node at the farthest end of the east loop. After a pause to allow the loopback message to be received and executed, the line master node issues a loop continuity message, LPCNTM, to the OE96NE node 192 node for delivery to the east loop output and examines the queue from the IE96NW node 188 to determine if the loop continuity message is returned to it through the reconfigured loop as previously commanded through the last D96NE node along the loop. If the loop continuity message returns to the line master node within a specified time interval the loopback is left in place and the reconfiguration procedure goes to the west loop. If the loop continuity message does not return within the specified time, a clear loopback message, CLPBKM, is issued on the east loop, followed by a loopback message, LPBAKM, to the next to the last D96NE drop node on the east loop. After another pause for execution of these commands, another loop continuity message is sent to test the reconfigured loop continuity. This procedure is followed on the east loop sending the loopback message to successively closer D96NE drop nodes within the line exchange units until continuity is established or until all of the D96NE drop nodes on the east loop are exhausted. At this time the reconfiguration procedure starts with the west loop proceeding in exactly the same way from the farthest line exchange unit from the input end toward the nearest unitl either continuity is established between the west output end node (OE96NW 184) and the east input end node (IE96NE 180) or until the attempt to establish has been made at each D96NW drop node and all attempts have failed.

If continuity is established from either east output to west input or from west output to east input or both, reconfiguration is a success and is left in place. If no continuity has been established, a clear loopback message, CLPBKM, is issued to each east and west drop nodes along both the east and west loops and another attempt is made to operate in the normal configuration. Once a reconfigured loopback continuity is established, it continues until the defect has been repaired and a net control write message causes a return to the normal state by setting a field in the line master 174 which causes one of the line master 174 programs to clear the loopback. In the event that the line master node is unable to establish any normal or reconfigured loopback continuity it continues to alternately try normal and loopback nodes until one is successful.

After completion of a successful reconfiguration loopback, within 44 seconds the next all call response messages result in an updating of the network hierarchy data maintained in the netmaster node 134 data base to reflect the change in the subnetwork configuration. The network configuration displayed on the network console is thus changed automatically in response to the reconfiguration and no special messages to a network maintenance operator are required.

Line master node 174 merely passes the input data messages, INDATM, through MUQ 228 to node B96BN 170 above. Upon receipt of an acknowledgement and permission to send message, ACKPRM, the line master node acts in accordance with the state of the associated data stream. In the acknowledgement expected state 1, the space expected state 2 or the abort state 5, stream control is passed to output enabled state 0, which enables the transmission of the next block set for this data stream to the associated terminal node. If an acknowledgement with permission to send message is received and the associated stream is not in one of these three states, the message is discarded and no action is taken.

Line master 174 receives the sequence alarm or status request response message, ALMSRM, from a terminal node when a block of data is received too far out of order or in response to a status request to the terminal node. If the data stream is in the output enabled state 0, the current output data block set is resent, starting with the block sequence number specified in the message. If the associated data stream is in the acknowledgement expected state 1, the space expected state 2 or the abort state 5, the message ALMSRM is discarded and no action is taken. If the data stream is in the no acknowledgement abnormal state 3, the action depends upon parameters contained in the ALMSRM message. If the output data message block sequence number contained in the ALMSRM message agrees with the output data message block sequence number stored for this stream in the line master node and space is available in the terminal node, transmission of the next data block of the output data message is enabled and the stream goes to the output enabled state 0.

If the output data message block sequence number contained in the ALMSRM message agrees with the message block sequence number stored for this data stream in the LM96N node, and no space is available in the terminal node according to the content of the ALMSRM message, the stream goes to the space expected state 2 and the usual timeout is initiated.

If the output data message block sequence number contained in the ALMSRM message does not agree, with the message block sequence number stored by the line master node, the current output data message block sequence number for the data stream in the line master node is reset to correspond to that contained in the ALMSRM message.

If the ALMSRM message is received while the data stream is in the no space abnormal state 4, and the ALMSRM message indicates that space is available at the terminal node, the stream goes to the output enabled state 0 which enables the transmission of the next output data message block set along this stream. If the ALMSRM message is received while the data stream is in the no space abnormal state 4 and the message indicates that space is not available at the terminal node, a request status message is sent to the terminal node and a timeout is initiated.

If a block set acknowledge message is received and the associated data stream is in the acknowledge expected state 1, the stream goes to the space expected state 2 and a timeout is initiated. If the timeout fires while the data stream is in the space expected state 2 without the arrival of an acknowledgement and permission to send message from the terminal node to indicate the availability of space at the node, a request status message is issued to the terminal node and the stream goes to the no space abnormal state 4 and a timeout is initiated. If a block set acknowledgement message is received in any state other than the acknowledgement expected state the message is discarded and no action is taken.

The network control read message, network control write message and network control response message are handled as at other nodes in the network. If the read or write message is addressed to the line master node, the appropriate action is taken and a response message is sent upward. Otherwise, the messages are passed upward or downward through the node with no action being taken.

The loop continuity message, LPCNTM, is issued and received by line master node 174 to detect continuity on either of the two simplex loops (east or west) comprising the 9.6 KB duplex loop. A loop continuity message carrying the line master node address is moved down through EDQE 191 to node OE96NE 192 once per second for delivery to the east simplex loop. Under normal conditions with no break in the east simplex loop the message will move along the loop to node IE96NE 180 where it is pulled off and transferred up through EUQE 179 to line master node 174. If timeouts maintained by the line master node 174 indicate that three sequential loop continuity messages fail to return, the line master node 174 determines that continuity has been lost on the east simplex loop and the reconfiguration procedure is initiated.

Line master node 174 similarly issues the loop continuity message once per second to the west simplex loop to test for continuity in exactly the same way as on the east simplex loop. Detection of a continuity failure in either of the east or the west simplex loops causes initiation of the reconfiguration procedure. The loop continuity message is also used to test for continuity of trial loops commanded by the line master node using the loopback message during execution of a reconfiguration procedure.

The line master node 174 responds to an all call message by preparing an all call response message and sending the message after a time delay proportional to the node address as is done by other nodes. As all call response messages are received from below, they are passed upward through the network. Messages from nodes IE96NW and IE96NE, which carry no upper node address, are operated upon by placing the address of the line master node in the upper node address field before passing the messages upward. If an all call response message is received which originated at a node along the east 9.6 KB channel including node IE96NE, a D96NE or node OE96NE, the line master node places the node addresses from the message in order in an east node sequential position table. Similarly, if the message originated at a drop node along the west 9.6 KB channel, the node address from the message is placed in order corresponding to the order of the node along the channel in a west node sequential position table within internal line master node storage. The east and west node position tables are used in reconfiguring the duplex loop in the event of a channel or node failure.

The abort message, ABORTM, is received from the B96BM node 170 above and is passed on to the addressed terminal node below. Upon receipt of an abort message, line master 174 initiates a timeout of 150 milliseconds and causes the associated data stream to go to the abort state 5. During the 150 milliseconds after initiation of the timeout and prior to the end of the timeout, the associated data stream is nonresponsive to all messages arriving from the terminal node. Also, upon receipt of the abort message, the line master node 174 empties the corresponding buffer pair associated with the stream, initializes the stream and signals the B96BN node 170 through the large two port 172 to issue a permission to send message to the host. This enables the sending of the next output data message by the host if there is any to be sent. At the end of the 150 millisecond timeout period, the data stream is again made responsive to responses from the terminal node, the abort message is passed on to the terminal node below, and a timeout is initiated. The first timeout enables the data stream path to be cleared before the abort message is sent to the terminal node. If the second timeout expires without receipt of an acknowledgement with permission to send message from the terminal node, another abort message is issued to the terminal node and the second timeout is again initiated. After eight occurrences of this timeout without a proper response, the stream is initialized at the line master node and a reinitialization message, REINM, is sent to the terminal node.

The abort message is passed down to the OE96NE or OE96NW node for eventual delivery to the addressed terminal node. Selection of the proper output node is based on the contents of the field in the node address table associated with the destination node for the abort message. Upon receipt of the acknowledgement with permission to send message during the second timeout, control is passed from abort state 5 to the output enabled state 0.

As space becomes available in the queues EDQW 183 and EDQE 191 leading to the inputs to the west and east simplex channel loops respectively, the line master node 174 selects an output message block from the output enabled data streams or from the downward flowing supervision path through MDQ 227. The downward flowing supervision blocks of data are given priority. The east or west output end node removes the selected block from the end node down queue, provides a conversion from a large block to a single or double small block format and inserts the small blocks into data time frames as they become available on the serial communication channel. The converted small blocks are placed in internal queue storage at the input end nodes while waiting for delivery to the channel. The queue control package for the private storage queue is located in the two port buffer memory 182 or 190 to make the contol information available to the line master node 174. The decision as to which, if either of the two port queues leading to the output end nodes east and west and output data message block should be placed is made as follows. If the private queue in node OE96NE contains less than three small blocks, the next block is placed in the two port queue 190 leading to node OE96NE. Otherwise, the private queue in OE96NW is examined by the line master node and if this queue contains less than three small blocks, the next block is placed in the two port queue 182 leading to the west output node. If neither internal queue contains two or less small blocks, all blocks of data are retained in the buffer pair storage in the large two port memory 172.

Each output data block is examined as it is moved from the current output buffer in the large two port buffer memory 172 to determine whether it is marked as a last block of the output data message or not. If it is a last block the stream is set to the acknowledge expected state 1. This inhibits the further transfer of blocks for that data stream.

Since the output capability represented by the two queues for the output end nodes is shared by 32 data streams corresponding to 32 terminal nodes, a line allocation algorithm is executed by the line master node 174 to determine which block of output data is to be selected next for transfer to a terminal node. The line master node estimates the number of blocks waiting in the terminal node for delivery to the associated terminal for each of the 32 terminals serviced by the line master node 174. The number of blocks of data stored at each terminal node is estimated by incrementing a per stream counter as each block is output along that stream and decrementing the counter at a fixed rate corresponding to the rate at which blocks are moved from the terminal node to the terminal. This fixed rate is obtained by the line master node 174 from the terminal node all call response messages.

The LM96N node 174 selects for output from the subset of nonempty buffer pairs corresponding to a state 0 data stream, the buffer pair having the least number of estimated blocks in the terminal node awaiting delivery to the terminal. In this way the line master node 174 operates to maintain equal amounts of data in reserve for delivery to the terminals from the local storage at the terminal node.

The request status message, REQSTM, is issued by the line master node 174 to obtain a status response message from a designated terminal node. In the acknowledgement expected state 1 the request status message is sent when a timeout expires for the data stream. The timeout indicates that the terminal node has failed to receive a complete output data message block set or that there has been a loss of the acknowledgement with permission to send or block set acknowledgement message. In space expected state 2 the request status message is sent at the expiration of the timeout, which indicates that an acknowledgement with permission to send message has not been received because space is not yet available in the terminal node or the acknowledgement message has been lost. In no acknowledgement abnormal state 3 the status request message is sent at the expiration of the timeout. This timeout indicates that a previously requested alarm and status response message has not been received from the terminal node. When a data stream is in the no space abnormal state 4 the request status message is sent at the expiration of the timeout period. This timeout indicates that a previously requested alarm or status response message has not been received from the terminal node. The status message is also sent when the data stream is in the no space abnormal state for an alarm or status response message is received which indicates that space is still not available at the terminal node. The status request message is not issued in states 0 and 5.

The loopback message, LPBAKM, is issued by the line master node 174 to command a serial data channel reconfiguration on detection of a channel failure. This reconfiguration technique has been previously described. The clear loopback message, CLPBKM, is issued by the line master node 174 to either the east or the west simplex data channel. This message is not addressed to a specific node but instead to all nodes along the channel by using the all 1's all call address in the address field. It is delivered to all input end nodes, output end nodes and drop nodes along the given east or west serial data channel and causes any drop node receiving it to remove an existing loopback.

The line master node 174 initiates a reinitialization message, REINM, for a given data stream under specific circumstances. A timeout counter is maintained in the line master node for each stream. This counter is incremented at each timeout initiation and is set to 0 when a response is received from the terminal node. If this counter has the value 8 when a timeout occurs, the following actions are substituted for the specified normal actions. A reinitialization message is sent to the terminal node for the data stream and after a 1.5 second delay, the output data message in the current buffer of the line master buffer pair for the data stream is discarded and transmission of the next output data message block set (if any) is enabled.

OUTPUT END NODES

The output end nodes OE96NE 192 and OE96NW 184 contain identical programs and function in an identical manner, except for being connected to a different east or west serial data channel. They respond to the net control read or write messages and the all call messages as any other node in the system. The messages are passed through or responded to with an appropriate net control response message or all call response message. Other messages are received from the line master node 174 and passed along the connected serial data channel. The messages are received in a large block form and converted to an appropriate single or double small block form before communication along the channel.

The output end nodes are part of a unidirectional loop with all downward flowing messages being received through EDQE 191 or EDQW 183 and all upward flowing messages passing through the channel. In the hierarchy sequence, the output end nodes are deemed to be at the lowest end of the hierarchy with all of the drop nodes and finally the input end nodes being above the output end nodes in the hierarchy. Upon receipt of an abort message, ABORTM, a request status message, REQSTM, a loopback message, LPBAKM, a cancel loopback message, CLPBAKM, a loop continuity message, LPCNTM, or a reinitialize message, REINM, from the line master above, the output end nodes generate a check sum for the block containing the message and provide the conversion of the block to a small block format, and transmit the small block along the channel as data frames become available. Similarly, upon receipt of an output data message block from the line master node above, a check sum is added by the output end node, an appropriate conversion to a small block format is made and the single or double small block of data is output on the serial data link as data time frames become available. The output end nodes also add a check sum and convert the all call messages to the small block format. The all call response messages for the output end nodes are generated in the proper small block format with check sum attached.

INPUT END NODES

The input end nodes IE96NE 180 and IE96NW 188 pull the data frames off of the serial communication channels and convert single or double small blocks of data to a large block format and communicate the large blocks to the line master node 174 through the end up queues EUQE 179 and EUQW 187. Before communicating a block of data to the line master node, the check sum is tested and the block is discarded if an error has occurred during the course of transmission. The input end nodes respond to the net control read, net control write and all call messages as do other nodes in the network. The input end nodes simply discard the messages output data message, OTDATM; request status message, REQSTM; loopback command message, LPBAKM; cancel loopback message, CLPBKM; and reinitialize message, REINM. The all call response messages that are received from the channel as a single small block are converted to a 24 byte large block format and the check sum is tested. If the check sum is invalid the all call response message is discarded with no further action being taken.

DROP NODES

The drop nodes D96NE 266 and D96NW 280 interface the 9.6 KB serial data channels with the end nodes for the coaxial cable serial data channels.

An input data message, INDATM; acknowledge and permission to send message, ACKPRM; alarm and status response message, ALMSRM; or block set acknowledge message, SETAKM, if received by a drop node along the channel, is merely left on the 9.6 KB channel and passed on. If the message is received by the drop node from the coax input end node, CIEN 272, it is output on the 9.6 KB channel as any other message. A loop continuity message, LPCNTM, arriving at a drop node along the 9.6 KB channel is merely left to continue along the channel. The net control read, net control write and all call messages are responded to as at other nodes with the net control messages being directed toward an addressed node and the all call messages being duplicated and both continued along the channel and output toward the coaxial cable. Responses to these messages are prepared and communicated along the 9.6 KB channel as appropriate. If an all call response message is received from the 57.6 KB coaxial cable channel, the check sum is tested and the message is communicated along the 9.6 KB channel if valid. Otherwise the all call response message is discarded with no action. Similarly, as an all call message is received, it is converted to a 24 byte large block format and the check sum is tested. If the check sum is faulty the all call message is discarded without duplication. If valid the message is sent to the coaxial loop below and the node position count is incremented before a duplicate of the message is passed along the 9.6 KB line.

COAX OUTPUT END NODE

The coax output end node (COEN) 242 receives data from the two east and west drop nodes and outputs the data on the coaxial cable. It responds to the net control messages and the all call messages as other nodes in the network. The node COEN receives no all call response message from any other node and passes its own all call response message onto the first terminal node along the coax loop. The abort message, ABORTM; request status message, REQSTM; and reinitialize message, REINM; are output along the coaxial cable as received from one of the two connected drop nodes. The coax output end node receives data blocks from the drop nodes in the 24 byte large block format with the blocks being transformed into the appropriate small block format. Output data messages, OUTDATM, may thus be transformed into either single or double small blocks for transmission on the coax data channel.

COAX INPUT END NODE

The coax input end node (CIEN) 272 receives blocks of data from the coax serial data channel in small block format, provides a transformation to the large block format and communicates them to one of the two east or west drop nodes. The usual response is made to the net control and all call messages as appropriate.

As the input data message, INDATM; acknowledge and permission to send message, ACKPRM; alarm or status response message, ALMSRM; or block set acknowledge message, SETAKM, are received by the coax input end node, the check sum is tested and the block is passed to one of the drop nodes if valid. The block is discarded if the check sum is invalid. Upward flowing messages are delivered to the drop node having the fewest intermediate drop nodes between it and the output end node for the 9.6 KB serial data channel. If the number of intermediate drop nodes is equal for both the east and the west channels, the east drop node, D96NE is arbitrarily chosen. An abort message, ABORTM; request status message, REQSTM; reinitialize message, REINM, or output data message OUTDATM is discarded with no action if received from the coax channel.

TERMINAL NODE

Each terminal node (TN) 316 forms the downstream end of one of the data stream error control loops for the subnet controlled by the line master node 174. The terminal node receives an output data message, ODTATM, from the coax channel a block at a time. The blocks of a given message may or may not arrive in the order of their block sequence numbers. Each block is placed in the cell of the current input buffer of a buffer pair implemented in internal terminal node storage having a cell number equal to the block sequence number contained in the output data message block. The terminal node maintains several pointers for the buffer pair including a first empty cell pointer which points to the first cell in the current buffer in numerical sequence that has not received a block of data from the line master node. Even if a block is received out of sequence, the first empty cell pointer is not incremented until a block is received for the cell that is pointed to.

The terminal node also maintains a next read pointer pointing at the next cell from which a block is to be obtained to be passed on to the terminal matching node 324. When the next read pointer is equal to the first empty cell pointer the buffer pair is deemed to be empty and no data is available for output to the terminal node.

When the terminal node receives a block having a sequence number exceeding the value of the first empty cell pointer by a value of 4, an alarm and status response message, ALMSRM, containing the value of the first empty cell pointer is output on the channel for delivery to the line master node 174. If the first empty cell pointer is advanced to a value pointing to a nonexisting cell beyond the sixteenth cell in the current input buffer of the terminal node and an empty buffer of the buffer pair is available to accept another output data message, the terminal node outputs an acknowledgement and permission to send message on the channel for delivery to the line master node 174. If an empty buffer is not available, the terminal node outputs a block set acknowledge message SETAKN, on the channeel for delivery to he line master node 174. The terminal node than tests the buffer pair at short intervals for availability of an empty buffer. When this test indicates an empty buffer is available, the terminal node outputs an acknowledge and permission to send message on the coax channel for delivery to the line master node 174.

If the terminal node 316 receives a request status message, REQSTM, along the coaxial channel it responds by outputting an alarm and status response message along the channel. This message contains the value of the first empty cell pointer, the value of the stored block set sequence number and an indication of the availability of empty buffers. If the terminal node receives a reinitialize message, REINM, from the coaxial channel, the random access memory of the terminal node is loaded with initial values from a program stored in read only memory. If the terminal node receives an abort message, ABORTM, from the coaxial channel it blinds itself and discards all output data messages, OTDATM, request status messages, REQSTM, and reinitialize messages, REINM, for 0.15 seconds. It then discards the data in both buffers of the buffer pair and outputs an acknowledge and permission to send message along the coax channel for delivery to the line master node 174.

Any message received by the terminal node from the input coaxial channel having an invalid check sum is discarded with no action.

The current output buffer is examined periodically by the terminal node to determine if any blocks are available for transmission to the terminal matching node 324 which connects the terminal node 316 to a terminal. If a block is available and if there are less than two blocks in the queue TDWBQ 320 connecting the terminal node 316 to the terminal matching node 324, a block is transferred from the current output buffer to TDWBQ 320 leading to the terminal matching node 324.

An input data message, INDATM, received by a terminal node 316 from the terminal matching node 324 through TUDAQ 322 is output on the coaxial channel for eventual delivery to the host.

If upon receipt of a block of an output data message the first empty cell pointer is updated to a value pointing to a cell one number beyond a cell containing an output data message block marked as a last block (after a last block of an output data message is received) and an empty buffer of the terminal node buffer pair is available to accept another output data message, the terminal node outputs an acknowledgement and permission to send message on the output channel for delivery to the line master node. If an empty buffer is not available a block set acknowledge message, SETAKM, is sent to the line master node. After output of a block set acknowledge message by the terminal node 316, the terminal node 316 tests the buffer periodically for availability of an empty buffer. When this test indicates an empty buffer is available, the terminal node outputs an acknowledgement and permission to send message on the coax channel for delivery to the line master node 174. On receipt of a block of the output data message having a block sequence number exceeding the value of the first empty cell pointer by a count of four or more, an alarm status response message, ALMSRM, is output on the coax channel for delivery to the line master node 174. This message notifies the line master node 174 that an output data message block has been lost on the way down. On receipt of a request status message, REQSTM, along the coaxial channel, an alarm status response message is also output on the coaxial channel for delivery to the line master node 174. The alarm and status response message contains the value of the first empty cell pointer, the value of the stored block set sequence number, and the availability status of an empty buffer. The block set sequence number is initially set to 0 and is incremented upon receipt of each block set or message. The number is incremented to a total of 255 and then overflows back to 0. The block set sequence number permits the line master 174 to determine whether any complete messages have been lost during transmission.

If on receipt of a block of an output data message the first empty cell pointer is updated to a value pointing to a cell one count beyond a cell containing a last block of a message and an empty buffer of the terminal node buffer pair is not available to accept another output data message, the terminal node outputs a block set acknowledge message, SETAKM, on the output coaxial channel for delivery to the line master node 174. Upon receipt of a net control read or net control write message, the terminal node 316 performs the required operation and generates an appropriate net control response message.

Upon receipt of the all call message, the terminal node 316 prepares an all call response message containing the appropriate one of six parameters as identified by the type of all call message.

As all call response message received along the channel by a terminal node 316 is checked for a valid check sum. If invalid, it is discarded and if valid it is queued for output on the coaxial channel.

Upon receipt of an abort message, ABORTM, from the coax channel, a terminal node discards with no action all incoming output data message blocks, request status messages and reinitialize messages for 0.15 seconds. At the end of the 0.15 seconds the terminal node 316 discards all data in both buffers of the buffer pair and outputs an acknowledgement and permission to send message along the coax channel for delivery to the line master node 174. The terminal node 316 accepts only abort messages containing the terminal nodes address and leaves all other abort messages on the coax channel. All abort messages removed from the channel and having an invalid check sum are discarded with no action.

A terminal node 316 receives an output data message, ODTATM, from the coax channel a block at a time. If the block check sum is invalid the block is discarded with no action. If the block check sum is valid the block is placed in the cell of the current input buffer having a cell number equal to the block sequence number contained in the output data message block and the first empty cell pointer is updated. The terminal node 316 accepts only output data message blocks containing the address of the terminal node with all other output message blocks being left on the channel.

On receipt of a request status message, REQSTM, along the coax channel, that is addressed to the terminal node 316, the terminal node 316 responds by outputting an alarm and status response message along the coax channel. A request status message having an incorrect check sum is discarded. Request status messages not containing the terminal node address are left on the channel.

Upon receipt of a reinitialization message along the coax channel, the random access memory of the terminal node is loaded with initial values from the read only memory. Only reinitialization messages containing the terminal node address are input to the terminal node with others being left on the channel. Reinitialization messages addressed to the terminal node 316 but containing invalid check sums are discarded with no action.

TERMINAL MATCHING NODE

The terminal matching node (TMN) 324 moves data in both directions between the terminal node 316 and the terminal console 328 through the terminal interface module 326. It also supplies a parameter to the terminal node 316 via the two port buffer memory 74 specifying the rate at which the terminal accepts data for display. This parameter is carried by an all call response message generated at the terminal node 316 and carried to the line master node 174 for use in estimating the amount of stored data at the terminal node 316.

The terminal matching node 324 accepts data from the terminal up to a maximum of 64 bits per block, places the data in an input data message, INDATM, and delivers the input data message to the queue TUADQ 322 in two port 74 for communication to the terminal node 316.

The terminal matching node 324 also accepts output data message blocks from the terminal node 316 through queue TDWBQ 320 in two port 74 and delivers the data content of the output data message blocks to the terminal console 328. Each block may contain up to 160 bits of data.

NETWORK NODE PROGRAM ADDRESS MAP

Although the particular selection of input/output and other address locations is in general of no special significance, the program load listings have been provided for a particular hardware connection arrangement. The following program address maps show these hardware connections.

Net Master Node 134

| MEMORY | | ADDRESSES | |
|---|---|---|---|
| KIND | NAME | START | END |
| RAM | PRIVATE | 0000 | 0FFF |
| RAM | 2 POERT NMN-CIFN-NMN SIDE | 2000 | 20FF |
| RAM | 2 PORT NMN-NMIFN-NMN SIDE | 2400 | 24FF |
| RAM | 2 PORT NMN-YN-NMN SIDE | 2800 | 28FF |
| I/O | DEADMAN'S STICK RESET | C01E | |
| I/O | HARDWARE CLOCK SET | C010 | |
| PROM | PRIVATE | F800 | FFFF |

Input End Node 9.6KB

| MEMORY | | ADDRESSES | |
|---|---|---|---|
| KIND | NAME | START | END |
| RAM | PRIVATE | 0000 | 00FF |
| RAM | 2 PORT IE96NX-LM96N-IE96NX SIDE | 2000 | 20FF |
| I/O | INPUT D BYTE MOST SIG. BYTE | C000 | |
| I/O | INPUT D BYTE LEAST SIG. BYTE | C001 | |
| I/O | D BYTE COUNTER | C004 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C0DE | |
| PROM | PRIVATE | F600 | FFFF |

Console Interface Node

| MEMORY | | ADDRESSES | |
|---|---|---|---|
| KIND | NAME | START | END |
| RAM | PRIVATE | 0000 | 01FF |
| RAM | 2 PORT CIFN-NMN-CIFN SIDE | 2000 | 20FF |
| I/O | ACIA STATUS & CONTROL REGISTER | C001 | |
| I/O | ACIA DATA REGISTER | C000 | |
| I/O | BAUD RATE SELECT REGISTER | C010 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | F800 | FFFF |

Drop Node 9.6KB

| MEMORY | | ADDRESSES | |
|---|---|---|---|
| KIND | NAME | START | END |
| RAM | PRIVATE | 0000 | 03FF |
| RAM | 2 PORT D96NX-CIEN-D96NX SIDE | 2000 | 20FF |
| RAM | 2 PORT D96NX-COEN-D96NX SIDE | 2400 | 24FF |
| I/O | INPUT D BYTE MOST SIG. BYTE | C000 | |
| I/O | INPUT D BYTE LEAST SIG. BYTE | C001 | |
| I/O | OUTPUT D BYTE MOST SIG. BYTE | C011 | |
| I/O | OUTPUT D BYTE LEAST SIG. BYTE | C012 | |
| I/O | LOOP BACK CONTROL | C014 | |
| I/O | D BYTE COUNTER | C004 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | F000 | FFFF |

Y Node

| MEMORY | | ADDRESSES | |
|---|---|---|---|
| KIND | NAME | START | END |
| RAM | PRIVATE | 0000 | 00FF |
| RAM | 2 PORT YN-B96BN-YN SIDE | 2000 | 22FF |
| RAM | 2 PORT YN-PIMN-YN SIDE | 2400 | 24FF |
| RAM | 2 PORT YN-NMN-YN SIDE | 2800 | 28FF |
| RAM | 2 PORT YN-POMN-YN SIDE | 2C00 | 2CFF |
| I/O | DEADMAN'S STICK RESET | C01E | |
| PROM | PRIVATE | F000 | FFFF |

B96BN Node

| MEMORY | | ADDRESSES | |
|---|---|---|---|
| KIND | NAME | START | END |
| RAM | PRIVATE | 0000 | 00FF |
| RAM | 2 PORT B96BN-YN-B96BN SIDE | 0800 | 0AFF |
| RAM | 2 PORT B96BN-LM96N-B96BN SIDE | 4000 | ABFF |
| I/O | DEADMAN'S STICK RESET | D01E | |
| I/O | NODE ADDRESS MOST SIG. BYTE | D00F | |
| I/O | NODE ADDRESS LEAST SIG. BYTE | D00E | |
| PROM | PRIVATE | E800 | FFFF |

Line Master Node

| MEMORY | | ADDRESSES | |
|---|---|---|---|
| KIND | NAME | START | END |
| RAM | PRIVATE | 0000 | 01FF |
| RAM | 2 PORT LM96N-IE96GN-LM96GN SIDE | 0800 | 08FF |
| RAM | 2 PORT LM96N-IE96NW-LM96N | 0C00 | 0CFF |
| RAM | 2 PORT LM96N-OE96NE-LM96N SIDE | 0A00 | 0AFF |
| RAM | 2 PORT LM96N-OE96NW-LM96N | 0E00 | 0EFF |
| RAM | 2 PORT LM96N-B96BN-LM96N SIDE | 4000 | ABFF |
| I/O | DEADMAN'S STICK RESET | D01E | |
| I/O | NODE ADDRESS MOST SIG. BYTE | D00F | |
| I/O | NODE ADDRESS LEAST SIG. BYTE | D00E | |
| PROM | PRIVATE | D800 | FFFF |

Output End Node 9.6KB

| MEMORY | | ADDRESSES | |
|---|---|---|---|
| KIND | NAME | START | END |
| RAM | PRIVATE | 0000 | 00FF |
| RAM | 2 PORT OE96NX-LM-96N-OE96NX | 2000 | 20FF |
| I/O | OUTPUT D BYTE MOST SIG. BYTE | C011 | |
| I/O | OUTPUT D BYTE LEAST SIG. BYTE | C012 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | F600 | FFFF |

Coax Output End Node

| MEMORY | | ADDRESSES | |
|---|---|---|---|
| KIND | NAME | START | END |
| RAM | PRIVATE | 0000 | 03FF |
| RAM | 2 PORT COEN-D96NE-COEN SIDE | 2000 | 20FF |
| RAM | 2 PORT COEN-D96NW-COEN SIDE | 2400 | 24FF |
| I/O | OUTPUT D BYTE MOST SIG. BYTE | C011 | |
| I/O | OUTPUT D BYTE LEAST SIG. BYTE | C012 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | F000 | FFFF |

Coax Input End Node

| MEMORY | | ADDRESSES | |
|---|---|---|---|
| KIND | NAME | START | END |
| RAM | PRIVATE | 0000 | 03FF |
| RAM | 2 PORT CIEN-D96NE-CIEN SIDE | 2000 | 20FF |
| RAM | 2 PORT CIEN-D96NW-CIEN SIDE | 2400 | 24FF |
| I/O | INPUT D BYTE MOST SIG. BYTE | C000 | |
| I/O | INPUT D BYTE LEAST SIG. BYTE | C001 | |
| I/O | D BYTE COUNTER | C004 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | F000 | FFFF |

Terminal Node

| MEMORY | | ADDRESSES | |
|---|---|---|---|
| KIND | NAME | START | END |
| RAM | PRIVATE | 0000 | 05FF |
| RAM | 2 PORT TN-TMN-TN SIDE | 2000 | 20FF |
| I/O | INPUT D BYTE MOST SIG. BYTE | C000 | |
| I/O | INPUT D BYTE LEAST SIG. BYTE | C001 | |
| I/O | OUTPUT D BYTE MOST SIG. BYTE | C011 | |
| I/O | OUTPUT D BYTE LEAST SIG. BYTE | C012 | |
| I/O | D BYTE COUNTER | C004 | |
| I/O | DEADMAN'S STICK RESET | C01E | |
| I/O | NODE ADDRESS MOST SIG. BYTE | C00F | |
| I/O | NODE ADDRESS LEAST SIG. BYTE | C00E | |
| PROM | PRIVATE | EC00 | FFFF |

Terminal Matching Node

| MEMORY | | ADDRESSES | |
|---|---|---|---|
| KIND | NAME | START | END |
| RAM | PRIVATE | 0000 | 00FF |
| RAM | 2 PORT TMN-TN-TMN SIDE | 2000 | 20FF |
| I/O | TERMINAL INPUT SIGNAL SAMPLE | C000 | |
| I/O | TERMINAL OUTPUT BIT | C010 | |
| I/O | DEADMAN'S STICK RESET | C01F | |
| PROM | PRIVATE | FC00 | FFFF |

NETWORK NODE PROGRAM LOAD LISTS

The following is a list by node of the data stored at each node in read only memory. The four digit lefthand column identifies in hexidecimal notation an address location and the 16 two digit columns to the right thereof each identify in hexidecimal notation the contents of the 16 sequential address locations beginning with the address location indicated in the column to the far left. For example, in the netmaster node, address location F800 stores F9, address location F801 stores AE up to address location F8FF stores D2. The programming is for the instruction set of an MC6800 microprocessor, which is commercially available.

NET MASTER NODE

```
F800  F9 AE F9 D2 F9 AE F9 D2 F9 D2 F9 D2 F9 D2 F9 D2
F810  F9 BD F9 D2 F9 CC F9 D2 F9 D2 F9 D2 F9 D2 F9 CC
F820  FA B9 FA B3 FA AD FA FE FB 15 FB 0B FB 01 FA FE
F830  7E F8 36 00 00 00 CE 05 3E DF 35 CE F8 30 DF 37
F840  CE 28 00 DF 16 BD FE 46 96 08 27 38 86 9B 97 1D
F850  86 FF 97 1E 86 E0 97 1F CE 00 00 DF 21 DF 23 DF
F860  25 DF 27 DF 29 DF 2B DF 2D DF 2F DF 31 DF 33 96
F870  39 97 20 CE 28 00 DF 16 BD FE 21 96 39 81 05 27
F880  06 7C 00 39 7E 00 00 7F 00 39 7E 00 00 7E F8 93
F890  00 00 00 96 22 84 03 97 10 96 23 97 11 96 10 26
F8A0  1F 96 11 81 18 22 19 96 10 90 42 D6 11 D0 43 24
F8B0  02 80 01 7E FF 0D 3B 97 06 D7 07 DE 06 7E F8 D6
F8C0  96 10 90 44 D6 11 D0 45 24 02 80 01 7E FF 1F 3D
F8D0  97 06 D7 07 DE 06 96 21 A7 00 96 22 46 46 46 46
F8E0  A7 01 96 20 27 14 81 01 27 23 81 02 27 32 81 03
F8F0  27 41 81 04 27 50 81 05 27 5F 96 26 D6 27 A7 06
F900  E7 07 EB 09 A9 08 A7 08 E7 09 7E F9 6C 96 26 D6
F910  27 A7 0A E7 0B EB 0D A9 0C A7 0C E7 0D 7E F9 6C
F920  96 26 D6 27 A7 0E E7 0F EB 11 A9 10 A7 10 E7 11
F930  7E F9 6C 96 26 D6 27 A7 12 E7 13 EB 15 A9 14 A7
F940  14 E7 15 7E F9 6C 96 26 D6 27 A7 16 E7 17 EB 19
F950  A9 18 A7 18 E7 19 7E F9 6C 96 26 D6 27 A7 1A E7
F960  1B EB 1D A9 1C A7 1C E7 1D 7E F9 6C 5F A6 02 26
F970  04 A6 03 27 02 CA 01 7E FE F0 84 03 A1 02 26 08
F980  96 25 A1 03 26 02 CA 01 7E FE F7 26 04 A6 05 27
F990  02 CA 01 7E FE FE 84 03 A1 04 26 08 96 25 A1 05
F9A0  26 02 CA 01 D7 08 CE F8 00 DF 0C 7E FA 4A DE 06
F9B0  96 24 84 03 A7 02 96 25 A7 03 7E FA 1F DE 06 96
F9C0  24 84 03 A7 04 96 25 A7 05 7E FA 1F 7E FF 31 04
F9D0  6F 05 7E FA 1F 7E F9 DB 00 00 00 86 01 B7 C0 10
F9E0  DE 35 27 03 09 DF 35 96 3F 27 03 4A 97 3F 36 24
F9F0  FC 26 0F B6 20 FC 27 1E 86 01 97 3A 7F 20 FC 7E
FA00  FA 16 B6 20 FC 27 09 7F 24 FC 7F 20 FC 7E FA 16
FA10  7F 00 3A 7F 24 FC 96 3A B7 20 FD B7 24 FD 3B 7E
FA20  FA 25 00 00 00 96 37 27 0D DE 35 26 09 DE 37 DF
FA30  14 7F 00 37 6E 00 96 40 27 0D 96 3F 26 09 DE 40
FA40  DF 14 7F 00 40 6E 00 7E 00 00 7E FA 4F 00 00 0C
FA50  96 08 49 97 08 9A 0D 97 15 0C 97 14 DE 14 EE
FA60  00 6E 00 7E FA 69 00 00 00 96 1D 9B 1E 9B 1F 9B
FA70  20 9B 21 9B 22 9B 23 9B 24 9B 25 9B 26 91 27 26
FA80  7D 96 3A 27 06 CE 20 06 7E FA 8E CE 24 06 DF 16
FA90  5F 96 20 81 21 27 02 CA 01 7E FF 05 23 84 03 97
FAA0  23 DA 23 D7 08 CE F8 20 DF 0C 7E FA 4A DE 21 A6
FAB0  02 97 26 DE 21 A6 01 97 25 DE 21 A6 00 97 24 96
FAC0  1D 84 EF 97 1D 86 25 97 20 96 1D 9B 1E 9B 1F 9B
FAD0  20 9B 21 9B 22 9B 23 9B 24 9B 25 9B 26 97 27 86
FAE0  00 97 28 97 29 97 2A 97 2B 97 2C 97 2D 97 2E 97
FAF0  2F 97 30 97 31 97 32 97 33 97 34 BD FE 21 7E FB
FB00  75 DE 21 96 26 A7 02 A6 02 97 26 DE 21 96 25 A7
FB10  01 A6 01 97 25 DE 21 96 24 A7 00 7E FA B9 7E FB
FB20  24 00 00 00 B6 24 01 B1 24 03 27 0B CE 24 00 DF
FB30  16 BD FD FC 7E FB C4 7E FB 75 7E FB 40 00 00 00
FB40  B6 20 01 B1 20 03 27 0B CE 20 00 DF 16 BD FD FC
FB50  7E FB C4 7E FB 75 7E FB 5C 00 00 00 CE 28 00 DF
FB60  16 BD FE 46 96 08 27 0A 96 3A 26 03 7E FB 1E 7E
FB70  FB 3A 7E FB 75 7E FB 7B 00 00 00 B6 28 07 B1 28
FB80  09 27 0B CE 28 06 DF 16 BD FD FC 7E FB E3 7E FA
FB90  1F 7E FB 97 00 00 00 CE 28 00 DF 16 BD FE 21 7E
FBA0  FB 75 7E FB A8 00 00 00 CE 24 06 DF 16 BD FE 21
FBB0  7E FA 1F 7E FB B9 00 00 00 CE 20 06 DF 16 BD FE
FBC0  21 7E FA 1F 7E FB CA 00 00 00 96 20 81 21 27 04
FBD0  81 23 26 11 96 1D 84 03 91 46 26 09 96 1E 91 47
FBE0  26 03 7E FA 63 7E FB 91 7E FB EE 00 00 00 96 1D
FBF0  84 10 26 18 96 1D 84 08 27 12 96 20 81 25 26 03
FC00  7E FC 0F 96 1E 81 FF 26 03 7E F8 8D 7E FE C2 7E
FC10  FC 15 00 00 00 96 3A 27 03 7E FB B3 7E FB A2 7E
FC20  FC 25 00 00 00 CE 00 06 86 00 A7 00 08 8C 01 21
FC30  26 F8 CE 01 E9 86 00 A7 00 08 8C 08 00 26 F8 CE
FC40  20 00 86 00 A7 00 08 8C 21 00 26 F8 CE 24 00 86
FC50  00 A7 00 08 8C 25 00 26 F8 CE 08 00 DF 3B CE 0B
FC60  00 DF 3D CE 00 01 DF 42 DF 46 CE 03 01 DF 44 CE
```

```
FC70  01 21 DF 5D CE 00 61 DF 5F CE F8 30 DF 37 CE FE
FC80  71 DF 40 CE FF BA FF 24 06 B6 24 07 B7 24 0A CE
FC90  FF B0 FF 24 06 FF 24 08 B6 24 07 B7 24 0B CE FF
FCA0  DA FF 20 06 B6 20 07 B7 20 0A CE FF D0 FF 20 06
FCB0  FF 20 08 B6 20 07 B7 20 0B CE FF C6 FF 24 00 B6
FCC0  24 01 B7 24 04 CE FF C0 FF 24 00 FF 24 02 B6 24
FCD0  01 B7 24 05 CE FF E6 FF 20 00 B6 20 01 B7 20 04
FCE0  CE FF E0 FF 20 00 FF 20 02 B6 20 01 B7 20 05 CE
FCF0  FF FF B7 C0 1E 09 26 FA 86 01 B7 C0 10 0E 7E 00
FD00  00 7E FD 07 00 00 00 8E 00 5C FE FD 21 DF 00 B6
FD10  FD 23 97 02 FE FD 24 DF 03 B6 FD 26 97 05 7E FD
FD20  27 B7 C0 1E 7E FB 56 7E FC 1F 7E FD 30 00 00 00
FD30  DE 09 96 1D A7 00 96 1E A7 01 96 1F A7 02 96 20
FD40  A7 03 96 21 A7 04 96 22 A7 05 96 23 A7 06 96 24
FD50  A7 07 96 25 A7 08 96 26 A7 09 96 27 A7 0A 96 28
FD60  A7 0B 96 29 A7 0C 96 2A A7 0D 96 2B A7 0E 96 2C
FD70  A7 0F 96 2D A7 10 96 2E A7 11 96 2F A7 12 96 30
FD80  A7 13 96 31 A7 14 96 32 A7 15 96 33 A7 16 96 34
FD90  A7 17 39 7E FD 99 00 00 00 DE 18 A6 00 97 1D A6
FDA0  01 97 1E A6 02 97 1F A6 03 97 20 A6 04 97 21 A6
FDB0  05 97 22 A6 06 97 23 A6 07 97 24 A6 08 97 25 A6
FDC0  09 97 26 A6 0A 97 27 A6 0B 97 28 A6 0C 97 29 A6
FDD0  0D 97 2A A6 0E 97 2B A6 0F 97 2C A6 10 97 2D A6
FDE0  11 97 2E A6 12 97 2F A6 13 97 30 A6 14 97 31 A6
FDF0  15 97 32 A6 16 97 33 A6 17 97 34 39 7E FE 02 00
FE00  00 00 DE 16 EE 00 EE 00 DF 18 BD FD 93 DE 16 A6
FE10  01 A1 04 27 07 8B 02 A7 01 7E FE 20 A6 05 A7 01
FE20  39 7E FE 27 00 00 00 DE 16 EE 02 EE 00 DF 09 BD
FE30  FD 2A DE 16 A6 03 A1 04 27 07 8B 02 A7 03 7E FE
FE40  45 A6 05 A7 03 39 7E FE 4C 00 00 00 7F 00 08 DE
FE50  16 A6 03 A1 04 27 05 8B 02 7E FE 5E A6 05 A1 04
FE60  27 05 8B 02 7E FE 69 A6 05 A1 01 27 03 7C 00 08
FE70  39 7E FE 77 00 00 00 CE FE 71 DF 40 7E FF 3C DF
FE80  16 BD FE 46 96 08 27 2B DE 5D A6 18 97 3F DE 5D
FE90  DF 18 BD FD 93 CE 28 00 DF 16 BD FE 21 DE 5D 8C
FEA0  01 D0 27 16 96 5D D6 5E CB 19 89 00 97 5D D7 5E
FEB0  7E FF 4A 86 01 97 3F 7E 00 00 CE 01 21 DF 5D 7E
FEC0  FF 4A 7E FF 56 00 00 00 DE 5F DF 09 BD FD 2A DE
FED0  5F 8C 01 09 27 0F 96 5F D6 60 CB 18 89 00 97 5F
FEE0  D7 60 7E FA 1F CE 00 61 DF 5F 7E FA 1F 3F 00 00
FEF0  0C 59 96 24 7E F9 7A 0C 59 A6 04 7E F9 8B 0C 59
FF00  96 24 7E F9 96 0C 59 59 96 23 7E FA 9D 0C 59 49
FF10  59 49 59 49 59 49 DB 3C 99 3B 7E F8 B7 0C
FF20  59 49 59 49 59 49 59 49 DB 3E 99 3D 7E F8
FF30  D0 DE 06 6F 02 6F 03 6F 04 7E F9 D0 B6 02 00 26
FF40  03 7E FE B3 CE 28 00 7E FE 7F 96 3F 81 FF 26 03
FF50  7F 02 00 7E 00 00 96 1D 84 08 27 0C 96 20 81 24
FF60  26 06 B7 02 00 7F 00 3F 7E FE C8 00 00 00 00 00
FF70  00 00 00 00 00 00 00 00 00 00 00 00 00 00 00 00
FF80  00 00 00 00 00 00 00 00 00 00 00 00 00 00 00 00
FF90  28 6C 28 84 28 9C 28 B4 28 CC 28 E4 00 00 00 00
FFA0  28 0C 28 24 28 3C 28 54 00 00 00 00 00 00 00 00
FFB0  24 6C 24 84 24 9C 24 B4 24 CC 24 E4 00 00 00 00
FFC0  24 0C 24 24 24 3C 24 54 00 00 00 00 00 00 00 00
FFD0  20 6C 20 84 20 9C 20 B4 20 CC 20 E4 00 00 00 00
FFE0  20 0C 20 24 20 3C 20 54 00 00 00 00 00 00 00 00
FFF0  CD 00 7E FF F2 7E FF F5 F9 D5 FF F2 FF F5 FD 01
```

B96BN NODE

```
E800  44 00 44 24 44 48 44 6C 44 90 44 B4 44 D8 44 FC
E810  45 20 45 44 45 68 45 8C 45 B0 45 D4 45 F8 46 1C
E820  46 40 46 64 46 88 46 AC 46 D0 46 F4 47 18 47 3C
E830  47 60 47 84 47 A8 47 CC 47 F0 48 14 48 38 48 5C
E840  EC 0E EC 08 EC 02 EC 53 EC 6A EC 60 EC 56 EC 53
E850  7E E8 56 00 00 00 DE 1D DF 36 DE 1F DF 38 DE 21
E860  DF 3A DE 23 DF 3C DE 25 DF 3E DE 27 DF 40 DE 29
E870  DF 42 DE 2B DF 44 DE 2D DF 46 DE 2F DF 48 DE 31
E880  DF 4A DE 33 DF 4C 96 5A 0C 49 D6 5B 59 89 00 CB
```

```
E890  08 89 00 B7 AB BC F7 AB BD CE E8 A2 FF AB BE 7E
E8A0  ED 16 7E E8 A8 00 00 00 DE 36 DF 1D DE 38 DF 1F
E8B0  DE 3A DF 21 DE 3C DF 23 DE 3E DF 25 DE 40 DF 27
E8C0  DE 42 DF 29 DE 44 DF 2B DE 46 DF 2D DE 48 DF 2F
E8D0  DE 4A DF 31 DE 4C DF 33 96 20 27 1C 81 01 27 24
E8E0  81 02 27 2C 81 03 27 34 81 04 27 3C DE 58 DF 26
E8F0  CE 00 00 DF 58 7E E9 34 DE 4E DF 26 CE 00 00 DF
E900  4E 7E E9 34 DE 50 DF 26 CE 00 00 DF 50 7E E9 34
E910  DE 52 DF 26 CE 00 00 DF 52 7E E9 34 DE 54 DF 26
E920  CE 00 00 DF 54 7E E9 34 DE 56 DF 26 CE 00 00 DF
E930  56 7E E9 34 96 1D 84 EF 97 1D DE 5A DF 22 7F 00
E940  21 CE 00 00 DF 24 CE 08 06 DF 16 BD F5 28 7E E9
E950  62 7E E9 57 00 00 00 DE 09 86 80 AA 05 A7 05 7E
E960  00 00 7E E9 68 00 00 00 CE 44 00 DF 06 EE 00 27
E970  09 DE 06 A6 03 27 0F 44 A7 03 DE 06 EE 22 27 03
E980  7E E9 6B 7E E9 51 EE 00 DF 1D BD F5 EF DE 12 86
E990  FF A7 00 DE 06 86 00 A7 00 A7 01 7E E9 7A 7E E9
E9A0  A4 00 00 00 7E E9 A7 7E E9 AD 00 00 00 7F 00 5E
E9B0  DE 24 26 08 DE 5A DF 24 86 01 97 5E 7E E9 C2 7E
E9C0  EA 62 7E E9 C8 00 00 00 96 22 84 F0 81 10 26 EF
E9D0  DE 1D 96 22 D6 23 DF 22 97 1D D7 1E BD F5 EF DE
E9E0  1D 96 22 D6 23 DF 22 97 1D D7 1E 96 1A 81 1F 23
E9F0  48 CE 44 00 DF 06 7F 00 1A EE 00 26 54 DE 06 96
EA00  22 84 03 D6 23 A7 00 E7 01 A6 17 A7 13 A7 15 A6
EA10  1D A7 19 A7 1B 86 00 A7 1F A7 20 A7 05 A7 04 A7
EA20  11 A7 0C A7 0B A7 09 A7 08 A7 02 A7 07 A7 21 86
EA30  FF A7 0F DE 12 96 1A A7 00 DE 06 86 FF A7 03 CE
EA40  EA C4 DF 14 DE 06 96 14 D6 15 A7 0C E7 0D 7E EA
EA50  62 DE 06 EE 22 DF 06 27 06 7C 00 1A 7E E9 F9 7E
EA60  EA 62 7E EA 68 00 00 00 7E ED 27 7E EA 71 00 00
EA70  00 DE 5C C6 08 7E EA 83 A6 0C 27 04 A6 0B 27 10
EA80  5A 27 21 EE 22 27 03 7E EA 78 CE 44 00 7E EA 78
EA90  DF 5C A6 0C E6 0D 97 14 D7 15 6F 0C DE 5C DF 06
EAA0  DE 14 6E 00 DF 5C B6 AB BE 27 05 FE AB BC 27 03
EAB0  7E EC 73 B6 AB BE F6 AB BF 97 14 D7 15 7F AB BE
EAC0  DE 14 6E 00 7E EA CA 00 00 00 DE 06 A6 13 A0 17
EAD0  26 1D A6 15 A0 17 26 17 A6 19 A0 1D 26 11 A6 1B
EAE0  A0 1D 26 0B BD F5 AA CE 08 06 DF 16 BD F5 28 DE
EAF0  06 96 5B 84 7F 8A 80 A7 0B CE EA C4 DF 14 DE 06
EB00  96 14 D6 15 A7 0C E7 0D 7E EC 73 7E EB 11 00 00
EB10  00 DE 06 A6 13 A0 17 26 06 A6 15 A0 17 27 11 A6
EB20  19 A0 1D 26 06 A6 1B A0 1D 27 05 6F 0C 7E 00 00
EB30  BD F5 AA CE 08 06 DF 16 BD F5 28 DE 06 96 5B 84
EB40  7F 8A 80 A7 0B CE EA C4 DF 14 DE 06 96 14 D6 15
EB50  A7 0C E7 0D 7E 00 00 7E EB 5D 00 00 96 08 0C
EB60  49 97 08 9A 0D 97 15 96 0C 97 14 DE 14 EE 00 6E
EB70  00 7E EB 77 00 00 00 96 1D 84 60 27 08 DE 50 08
EB80  DF 50 7E EB 8A DE 4E 08 DF 4E 7E ED 38 7E EB 93
EB90  00 00 00 DE 54 08 DF 54 DE 09 A6 00 84 60 26 10
EBA0  DE 16 A6 03 A0 05 44 81 01 26 05 DE 56 08 DF 56
EBB0  7E EB 0B 7E EB B9 00 00 00 DE 52 08 DF 52 7E ED
EBC0  96 7E EB C7 00 00 00 96 1D 9B 1E 9B 1F 9B 20 9B
EBD0  21 9B 22 9B 23 9B 24 9B 25 9B 26 91 27 26 74 CE
EBE0  08 06 DF 16 5F 96 20 81 21 27 02 CA 01 0C 59 59
EBF0  96 23 84 03 97 23 DA 23 D7 08 CE E8 40 DF 0C 7E
EC00  EB 57 DE 21 A6 02 97 26 DE 21 A6 01 97 25 DE 21
EC10  A6 00 97 24 96 1D 84 EF 97 1D 86 25 97 20 96 1D
EC20  9B 1E 9B 1F 9B 20 9B 21 9B 22 9B 23 9B 24 9B 25
EC30  9B 26 97 27 86 00 97 28 97 29 97 2A 97 2B 97 2C
EC40  97 2D 97 2E 97 2F 97 33 97 34
EC50  BD F5 28 7E 00 00 DE 21 96 26 A7 02 A6 02 97 26
EC60  DE 21 96 25 A7 01 A6 01 97 25 DE 21 96 24 A7 00
EC70  7E EC 0E 7E EC 79 00 00 00 B6 08 01 B1 08 03 27
EC80  0B CE 08 00 DF 16 BD F4 A6 7E EB 71 7E 00 00 F6
EC90  08 09 F1 08 0A 27 05 CB 02 7E EC 9F F6 08 0B F1
ECA0  08 07 27 13 B6 48 87 B1 48 89 27 0B CE 48 86 DF
ECB0  16 BD F4 A6 7E EB B3 7E EA 6B 7E EC C0 00 00 00
ECC0  DE 06 DF 16 A6 20 27 0F 96 16 D6 17 CB 18 89 00
ECD0  97 16 D7 17 7E EC E3 96 16 D6 17 CB 12 89 00 97
ECE0  16 D7 17 BD F5 28 DE 16 DE 06 A6 11 A7 0F DE 09
ECF0  A6 02 84 20 26 0E DE 16 A6 03 A0 05 44 81 10 27
ED00  03 7E 00 00 DE 06 A6 20 27 05 6F 20 7E EB 8D 86
ED10  01 A7 20 7E EB 8D 7E ED 1C 00 00 00 CE 48 80 DF
```

```
ED20 16 BD F5 28 7E 00 00 7E ED 2D 00 00 00 CE 08 06
ED30 DF 16 BD F5 28 7E EC 73 7E ED 3E 00 00 00 96 1E
ED40 81 FF 26 09 96 1D 84 10 26 22 7E ED 69 96 1D 84
ED50 03 91 5A 26 14 96 1E 91 5B 26 0E 96 20 81 29 27
ED60 0E 81 21 27 0D 81 23 27 09 7E ED 75 7E E8 50 7E
ED70 ED CA 7E EB C1 7E ED 7B 00 00 00 96 1D 84 08 27
ED80 06 96 20 81 64 23 09 BD F5 EF 96 1A 81 1F 23 03
ED90 7E ED 16 7E EC BA 7E ED 9C 00 00 00 96 1E 81 FF
EDA0 26 09 96 1D 84 10 26 03 7E E9 9E 7E ED AE 7E ED
EDB0 B4 00 00 00 96 35 27 0C 96 1D 84 08 27 09 96 20
EDC0 81 64 22 03 7E ED 27 7E EC 73 7E ED D0 00 00 00
EDD0 96 1D 9B 1E 9B 1F 9B 20 9B 21 9B 22 9B 23 9B 24
EDE0 9B 25 9B 26 91 27 26 03 7E ED E8 7E 00 00 8E 00
EDF0 FF FE EE 08 DF 00 B6 EE 0A 97 02 FE EE 0B DF 03
EE00 B6 EE 0D 97 05 7E EE 0E B7 D0 1E 7E EC 8F 7E EE
EE10 11 7E EE 17 00 00 00 CE 00 06 86 00 A7 00 08 8C
EE20 00 FF 26 F8 CE 40 00 86 00 A7 00 08 8C BF FF 26
EE30 F8 CE 40 00 86 FF A7 00 08 8C 44 00 26 F8 CE EA
EE40 E4 FF AB C0 CE 44 24 FF 44 22 CE 44 48 FF 44 46
EE50 CE 44 6C FF 44 6A CE 44 90 FF 44 8E CE 44 B4 FF
EE60 44 B2 CE 44 D8 FF 44 D6 CE 44 FC FF 44 FA CE 45
EE70 20 FF 45 1E CE 45 44 FF 45 42 CE 45 68 FF 45 66
EE80 CE 45 8C FF 45 8A CE 45 B0 FF 45 AE CE 45 D4 FF
EE90 45 D2 CE 45 F8 FF 45 F6 CE 46 1C FF 46 1A CE 46
EEA0 40 FF 46 3E CE 46 64 FF 46 62 CE 46 88 FF 46 86
EEB0 CE 46 AC FF 46 AA CE 46 D0 FF 46 CE CE 46 F4 FF
EEC0 46 F2 CE 47 18 FF 47 16 CE 47 3C FF 47 3A CE 47
EED0 60 FF 47 5E CE 47 84 FF 47 82 CE 47 A8 FF 47 A6
EEE0 CE 47 CC FF 47 CA CE 47 F0 FF 47 EE CE 48 14 FF
EEF0 48 12 CE 48 38 FF 48 36 CE 48 5C FF 48 5A CE FE
EF00 EE FF 48 80 B6 48 81 B7 48 34 CE FE C0 FF 48 80
EF10 FF 48 82 B6 48 81 B7 48 85 CE FF 12 FF 48 86 B6
EF20 48 87 B7 48 8A CE FF 00 FF 48 86 FF 48 88 B6 48
EF30 87 B7 48 8B CE F6 E0 FF 44 15 CE F6 C0 FF 44 12
EF40 FF 44 14 B6 44 13 B7 44 17 CE F7 00 FF 44 39 CE
EF50 F6 E0 FF 44 36 FF 44 38 B6 44 37 B7 44 3B CE F7
EF60 20 FF 44 5D CE F7 00 FF 44 5A FF 44 5C B6 44 5B
EF70 B7 44 5F CE F7 40 FF 44 81 CE F7 20 FF 44 7E FF
EF80 44 80 B6 44 7F B7 44 83 CE F7 60 FF 44 A5 CE F7
EF90 40 FF 44 A2 FF 44 A4 B6 44 A3 B7 44 A7 CE F7 80
EFA0 FF 44 C9 CE F7 60 FF 44 C6 FF 44 C8 B6 44 C7 B7
EFB0 44 CB CE F7 A0 FF 44 ED CE F7 80 FF 44 EA FF 44
EFC0 EC B6 44 EB B7 44 EF CE F7 C0 FF 45 11 CE F7 A0
EFD0 FF 45 0E FF 45 10 B6 45 0F B7 45 13 CE F7 E0 FF
EFE0 45 35 CE F7 C0 FF 45 32 FF 45 34 B6 45 33 B7 45
EFF0 37 CE F8 00 FF 45 59 CE F7 E0 FF 45 56 FF 45 58
F000 B6 45 57 B7 45 5B CE F8 20 FF 45 7D CE F8 00 FF
F010 45 7A FF 45 7C B6 45 7B B7 45 7F CE F8 40 FF 45
F020 A1 CE F8 20 FF 45 9E FF 45 A0 B6 45 9F B7 45 A3
F030 CE F8 60 FF 45 C5 CE F8 40 FF 45 C2 FF 45 C4 B6
F040 45 C3 B7 45 C7 CE F8 80 FF 45 E9 CE F8 60 FF 45
F050 E6 FF 45 E8 B6 45 E7 B7 45 EB CE F8 A0 FF 46 0D
F060 CE F8 80 FF 46 0A FF 46 0C B6 46 0B B7 46 0F CE
F070 F8 C0 FF 46 31 CE F8 A0 FF 46 2E FF 46 30 B6 46
F080 2F B7 46 33 CE F8 E0 FF 46 55 CE F8 C0 FF 46 52
F090 FF 46 54 B6 46 53 B7 46 57 CE F9 00 FF 46 79 CE
F0A0 F8 E0 FF 46 76 FF 46 78 B6 46 77 B7 46 7B CE F9
F0B0 20 FF 46 9D CE F9 00 FF 46 9A FF 46 9C B6 46 9B
F0C0 B7 46 9F CE F9 40 FF 46 C1 CE F9 20 FF 46 BE FF
F0D0 46 C0 B6 46 BF B7 46 C3 CE F9 60 FF 46 E5 CE F9
F0E0 40 FF 46 E2 FF 46 E4 B6 46 E3 B7 46 E7 CE F9 80
F0F0 FF 47 09 CE F9 60 FF 47 06 FF 47 08 B6 47 07 B7
F100 47 0B CE F9 A0 FF 47 2D CE F9 80 FF 47 2A FF 47
F110 2C B6 47 2B B7 47 2F CE F9 C0 FF 47 51 CE F9 A0
F120 FF 47 4E FF 47 50 B6 47 4F B7 47 53 CE F9 E0 FF
F130 47 75 CE F9 C0 FF 47 72 FF 47 74 B6 47 73 B7 47
F140 77 CE FA 00 FF 47 99 CE F9 E0 FF 47 96 FF 47 98
F150 B6 47 97 B7 47 9B CE FA 20 FF 47 BD CE FA 00 FF
F160 47 BA FF 47 BC B6 47 BB B7 47 BF CE FA 40 FF 47
F170 E1 CE FA 20 FF 47 DE FF 47 E0 B6 47 DF B7 47 E3
F180 CE FA 60 FF 48 05 CE FA 40 FF 48 02 FF 48 04 B6
F190 48 03 B7 48 07 CE FA 80 FF 48 29 CE FA 60 FF 48
F1A0 26 FF 48 28 B6 48 27 B7 48 2B CE FA A0 FF 48 4D
F1B0 CE FA 80 FF 48 4A FF 48 4C B6 48 4B B7 48 4F CE
```

```
F1C0  FA C0 FF 48 71 CE FA A0 FF 48 6E FF 48 70 B6 48
F1D0  6F B7 48 73 CE FA E0 FF 44 1B CE FA C0 FF 44 18
F1E0  FF 44 1A B6 44 19 B7 44 1D CE FB 00 FF 44 3F CE
F1F0  FA E0 FF 44 3C FF 44 3E B6 44 3D B7 44 41 CE FB
F200  20 FF 44 63 CE FB 00 FF 44 60 FF 44 62 B6 44 61
F210  B7 44 65 CE FB 40 FF 44 87 CE FB 20 FF 44 84 FF
F220  44 86 B6 44 85 B7 44 89 CE FB 60 FF 44 AB CE FB
F230  40 FF 44 A8 FF 44 AA B6 44 A9 B7 44 AD CE FB 80
F240  FF 44 CF CE FB 60 FF 44 CC FF 44 CE B6 44 CD B7
F250  44 D1 CE FB A0 FF 44 F3 CE FB 80 FF 44 F0 FF 44
F260  F2 B6 44 F1 B7 44 F5 CE FB C0 FF 45 17 CE FB A0
F270  FF 45 14 FF 45 16 B6 45 15 B7 45 19 CE FB E0 FF
F280  45 3B CE FB C0 FF 45 38 FF 45 3A B6 45 39 B7 45
F290  3D CE FC 00 FF 45 5F CE FB E0 FF 45 5C FF 45 5E
F2A0  B6 45 5D B7 45 61 CE FC 20 FF 45 83 CE FC 00 FF
F2B0  45 80 FF 45 82 B6 45 81 B7 45 85 CE FC 40 FF 45
F2C0  A7 CE FC 20 FF 45 A4 FF 45 A6 B6 45 A5 B7 45 A9
F2D0  CE FC 60 FF 45 CB CE FC 40 FF 45 C8 FF 45 CA B6
F2E0  45 C9 B7 45 CD CE FC 80 FF 45 EF CE FC 60 FF 45
F2F0  EC FF 45 EE B6 45 ED B7 45 F1 CE FC A0 FF 46 13
F300  CE FC 80 FF 46 10 FF 46 12 B6 46 11 B7 46 15 CE
F310  FC C0 FF 46 37 CE FC A0 FF 46 34 FF 46 36 B6 46
F320  35 B7 46 39 CE FC E0 FF 46 5B CE FC C0 FF 46 58
F330  FF 46 5A B6 46 59 B7 46 5D CE FD 00 FF 46 7F CE
F340  FC E0 FF 46 7C FF 46 7E B6 46 7D B7 46 81 CE FD
F350  20 FF 46 A3 CE FD 00 FF 46 A0 FF 46 A2 B6 46 A1
F360  B7 46 A5 CE FD 40 FF 46 C7 CE FD 20 FF 46 C4 FF
F370  46 C6 B6 46 C5 B7 46 C9 CE FD 60 FF 46 EB CE FD
F380  40 FF 46 E8 FF 46 EA B6 46 E9 B7 46 ED CE FD 80
F390  FF 47 0F CE FD 60 FF 47 0C FF 47 0E B6 47 0D B7
F3A0  47 11 CE FD A0 FF 47 33 CE FD 80 FF 47 30 FF 47
F3B0  32 B6 47 31 B7 47 35 CE FD C0 FF 47 57 CE FD A0
F3C0  FF 47 54 FF 47 56 B6 47 55 B7 47 59 CE FD E0 FF
F3D0  47 7B CE FD C0 FF 47 78 FF 47 7A B6 47 79 B7 47
F3E0  7D CE FE 00 FF 47 9F CE FD E0 FF 47 9C FF 47 9E
F3F0  B6 47 9D B7 47 A1 CE FE 20 FF 47 C3 CE FE 00 FF
F400  47 C0 FF 47 C2 B6 47 C1 B7 47 C5 CE FE 40 FF 47
F410  E7 CE FE 20 FF 47 E4 FF 47 E6 B6 47 E5 B7 47 E9
F420  CE FE 60 FF 48 0B CE FE 40 FF 48 08 FF 48 0A B6
F430  48 09 B7 48 0D CE FE 80 FF 48 2F CE FE 60 FF 48
F440  2C FF 48 2E B6 48 2D B7 48 31 CE FE A0 FF 48 53
F450  CE FE 80 FF 48 50 FF 48 52 B6 48 51 B7 48 55 CE
F460  FE C0 FF 48 77 CE FE A0 FF 48 74 FF 48 76 B6 48
F470  75 B7 48 79 86 FF 97 0E CE 44 00 86 FF C6 0D A7
F480  0F E7 10 EE 22 26 F8 CE 48 5C A7 0F E7 10 B6 D0
F490  0F 84 03 97 5A B6 D0 0E 97 5B CE A0 00 B7 D0 1E
F4A0  09 26 FA 7E 00 00 7E F4 AC 00 00 00 DE 16 EE 00
F4B0  EE 00 DF 18 A6 00 97 1D A6 01 97 1E A6 02 97 1F
F4C0  A6 03 97 20 A6 04 97 21 A6 05 97 22 A6 06 97 23
F4D0  A6 07 97 24 A6 08 97 25 A6 09 97 26 A6 0A 97 27
F4E0  A6 0B 97 28 A6 0C 97 29 A6 0D 97 2A A6 0E 97 2B
F4F0  A6 0F 97 2C A6 10 97 2D A6 11 97 2E A6 12 97 2F
F500  A6 13 97 30 A6 14 97 31 A6 15 97 32 A6 16 97 33
F510  A6 17 97 34 DE 16 A6 01 A1 04 27 07 8B 02 A7 01
F520  7E F5 27 A6 05 A7 01 39 7E F5 2E 00 00 00 DE 16
F530  EE 02 EE 00 DF 09 96 1D A7 00 96 1E A7 01 96 1F
F540  A7 02 96 20 A7 03 96 21 A7 04 96 22 A7 05 96 23
F550  A7 06 96 24 A7 07 96 25 A7 08 96 26 A7 09 96 27
F560  A7 0A 96 28 A7 0B 96 29 A7 0C 96 2A A7 0D 96 2B
F570  A7 0E 96 2C A7 0F 96 2D A7 10 96 2E A7 11 96 2F
F580  A7 12 96 30 A7 13 96 31 A7 14 96 32 A7 15 96 33
F590  A7 16 96 34 A7 17 DE 16 A6 03 A1 04 27 07 8B 02
F5A0  A7 03 7E F5 A9 A6 05 A7 03 39 7E F5 B0 00 00 00
F5B0  DE 06 EE 00 DF 1D 96 1D 8A 88 97 1D 86 E0 97 1F
F5C0  86 24 97 20 86 00 97 21 97 22 97 23 97 24 97 25
F5D0  97 26 97 27 97 28 97 29 97 2A 97 2B 97 2C 97 2D
F5E0  97 2E 97 2F 97 30 97 31 97 32 97 33 97 34 39 7E
F5F0  F5 F5 00 00 00 96 1D 84 03 97 10 96 1E 97 11 CE
F600  40 00 DF 12 96 10 9A 12 97 12 96 11 97 13 DE 12
F610  A6 00 97 1A CE E8 00 DF 1B 96 1A 0C 49 9A 1C 97
F620  1C DE 1B EE 00 DF 06 39 00 00 00 00 00 00 00 00
F630  00 00 00 00 00 00 00 00 00 00 00 00 00 00 00 00
F640  00 00 00 00 00 00 00 00 00 00 00 00 00 00 00 00
F650  00 00 00 00 00 00 00 00 00 00 00 00 00 00 00 00
```

```
F660 00 00 00 00 00 00 00 00 00 00 00 00 00 00 00 00
F670 00 00 00 00 00 00 00 00 00 00 00 00 00 00 00 00
F680 00 00 00 00 00 00 00 00 00 00 00 00 00 00 00 00
F690 00 00 00 00 00 00 00 00 00 00 00 00 00 00 00 00
F6A0 00 00 00 00 00 00 00 00 00 00 00 00 00 00 00 00
F6B0 00 00 00 00 00 00 00 00 00 00 00 00 00 00 00 00
F6C0 48 8C 48 A4 48 BC 48 D4 48 EC 49 04 49 1C 49 34
F6D0 49 4C 49 64 49 7C 49 94 49 AC 49 C4 49 DC 49 F4
F6E0 4A 0C 4A 24 4A 3C 4A 54 4A 6C 4A 84 4A 9C 4A B4
F6F0 4A CC 4A E4 4A FC 4B 14 4B 2C 4B 44 4B 5C 4B 74
F700 4B 8C 4B A4 4B BC 4B D4 4B EC 4C 04 4C 1C 4C 34
F710 4C 4C 4C 64 4C 7C 4C 94 4C AC 4C C4 4C DC 4C F4
F720 4D 0C 4D 24 4D 3C 4D 54 4D 6C 4D 84 4D 9C 4D B4
F730 4D CC 4D E4 4D FC 4E 14 4E 2C 4E 44 4E 5C 4E 74
F740 4E 8C 4E A4 4E BC 4E D4 4E EC 4F 04 4F 1C 4F 34
F750 4F 4C 4F 64 4F 7C 4F 94 4F AC 4F C4 4F DC 4F F4
F760 50 0C 50 24 50 3C 50 54 50 6C 50 84 50 9C 50 B4
F770 50 CC 50 E4 50 FC 51 14 51 2C 51 44 51 5C 51 74
F780 51 8C 51 A4 51 BC 51 D4 51 EC 52 04 52 1C 52 34
F790 52 4C 52 64 52 7C 52 94 52 AC 52 C4 52 DC 52 F4
F7A0 53 0C 53 24 53 3C 53 54 53 6C 53 84 53 9C 53 B4
F7B0 53 CC 53 E4 53 FC 54 14 54 2C 54 44 54 5C 54 74
F7C0 54 8C 54 A4 54 BC 54 D4 54 EC 55 04 55 1C 55 34
F7D0 55 4C 55 64 55 7C 55 94 55 AC 55 C4 55 DC 55 F4
F7E0 56 0C 56 24 56 3C 56 54 56 6C 56 84 56 9C 56 B4
F7F0 56 CC 56 E4 56 FC 57 14 57 2C 57 44 57 5C 57 74
F800 57 8C 57 A4 57 BC 57 D4 57 EC 58 04 58 1C 58 34
F810 58 4C 58 64 58 7C 58 94 58 AC 58 C4 58 DC 58 F4
F820 59 0C 59 24 59 3C 59 54 59 6C 59 84 59 9C 59 B4
F830 59 CC 59 E4 59 FC 5A 14 5A 2C 5A 44 5A 5C 5A 74
F840 5A 8C 5A A4 5A BC 5A D4 5A EC 5B 04 5B 1C 5B 34
F850 5B 4C 5B 64 5B 7C 5B 94 5B AC 5B C4 5B DC 5B F4
F860 5C 0C 5C 24 5C 3C 5C 54 5C 6C 5C 84 5C 9C 5C B4
F870 5C CC 5C E4 5C FC 5D 14 5D 2C 5D 44 5D 5C 5D 74
F880 5D 8C 5D A4 5D BC 5D D4 5D EC 5E 04 5E 1C 5E 34
F890 5E 4C 5E 64 5E 7C 5E 94 5E AC 5E C4 5E DC 5E F4
F8A0 5F 0C 5F 24 5F 3C 5F 54 5F 6C 5F 84 5F 9C 5F B4
F8B0 5F CC 5F E4 5F FC 60 14 60 2C 60 44 60 5C 60 74
F8C0 60 8C 60 A4 60 BC 60 D4 60 EC 61 04 61 1C 61 34
F8D0 61 4C 61 64 61 7C 61 94 61 AC 61 C4 61 DC 61 F4
F8E0 62 0C 62 24 62 3C 62 54 62 6C 62 84 62 9C 62 B4
F8F0 62 CC 62 E4 62 FC 63 14 63 2C 63 44 63 5C 63 74
F900 63 8C 63 A4 63 BC 63 D4 63 EC 64 04 64 1C 64 34
F910 64 4C 64 64 64 7C 64 94 64 AC 64 C4 64 DC 64 F4
F920 65 0C 65 24 65 3C 65 54 65 6C 65 84 65 9C 65 B4
F930 65 CC 65 E4 65 FC 66 14 66 2C 66 44 66 5C 66 74
F940 66 8C 66 A4 66 BC 66 D4 66 EC 67 04 67 1C 67 34
F950 67 4C 67 64 67 7C 67 94 67 AC 67 C4 67 DC 67 F4
F960 68 0C 68 24 68 3C 68 54 68 6C 68 84 68 9C 68 B4
F970 68 CC 68 E4 68 FC 69 14 69 2C 69 44 69 5C 69 74
F980 69 8C 69 A4 69 BC 69 D4 69 EC 6A 04 6A 1C 6A 34
F990 6A 4C 6A 64 6A 7C 6A 94 6A AC 6A C4 6A DC 6A F4
F9A0 6B 0C 6B 24 6B 3C 6B 54 6B 6C 6B 84 6B 9C 6B B4
F9B0 6B CC 6B E4 6B FC 6C 14 6C 2C 6C 44 6C 5C 6C 74
F9C0 6C 8C 6C A4 6C BC 6C D4 6C EC 6D 04 6D 1C 6D 34
F9D0 6D 4C 6D 64 6D 7C 6D 94 6D AC 6D C4 6D DC 6D F4
F9E0 6E 0C 6E 24 6E 3C 6E 54 6E 6C 6E 84 6E 9C 6E B4
F9F0 6E CC 6E E4 6E FC 6F 14 6F 2C 6F 44 6F 5C 6F 74
FA00 6F 8C 6F A4 6F BC 6F D4 6F EC 70 04 70 1C 70 34
FA10 70 4C 70 64 70 7C 70 94 70 AC 70 C4 70 DC 70 F4
FA20 71 0C 71 24 71 3C 71 54 71 6C 71 84 71 9C 71 B4
FA30 71 CC 71 E4 71 FC 72 14 72 2C 72 44 72 5C 72 74
FA40 72 8C 72 A4 72 BC 72 D4 72 EC 73 04 73 1C 73 34
FA50 73 4C 73 64 73 7C 73 94 73 AC 73 C4 73 DC 73 F4
FA60 74 0C 74 24 74 3C 74 54 74 6C 74 84 74 9C 74 B4
FA70 74 CC 74 E4 74 FC 75 14 75 2C 75 44 75 5C 75 74
FA80 75 8C 75 A4 75 BC 75 D4 75 EC 76 04 76 1C 76 34
FA90 76 4C 76 64 76 7C 76 94 76 AC 76 C4 76 DC 76 F4
FAA0 77 0C 77 24 77 3C 77 54 77 6C 77 84 77 9C 77 B4
FAB0 77 CC 77 E4 77 FC 78 14 78 2C 78 44 78 5C 78 74
FAC0 78 8C 78 A4 78 BC 78 D4 78 EC 79 04 79 1C 79 34
FAD0 79 4C 79 64 79 7C 79 94 79 AC 79 C4 79 DC 79 F4
FAE0 7A 0C 7A 24 7A 3C 7A 54 7A 6C 7A 84 7A 9C 7A B4
FAF0 7A CC 7A E4 7A FC 7B 14 7B 2C 7B 44 7B 5C 7B 74
```

```
FB00 7B 8C 7B A4 7B BC 7B D4 7B EC 7C 04 7C 1C 7C 34
FB10 7C 4C 7C 64 7C 7C 7C 94 7C AC 7C C4 7C DC 7C F4
FB20 7D 0C 7D 24 7D 3C 7D 54 7D 6C 7D 84 7D 9C 7D B4
FB30 7D CC 7D E4 7D FC 7E 14 7E 2C 7E 44 7E 5C 7E 74
FB40 7E 8C 7E A4 7E BC 7E D4 7E EC 7F 04 7F 1C 7F 34
FB50 7F 4C 7F 64 7F 7C 7F 94 7F AC 7F C4 7F DC 7F F4
FB60 80 0C 80 24 80 3C 80 54 80 6C 80 84 80 9C 80 B4
FB70 80 CC 80 E4 80 FC 81 14 81 2C 81 44 81 5C 81 74
FB80 81 8C 81 A4 81 BC 81 D4 81 EC 82 04 82 1C 82 34
FB90 82 4C 82 64 82 7C 82 94 82 AC 82 C4 82 DC 82 F4
FBA0 83 0C 83 24 83 3C 83 54 83 6C 83 84 83 9C 83 B4
FBB0 83 CC 83 E4 83 FC 84 14 84 2C 84 44 84 5C 84 74
FBC0 84 8C 84 A4 84 BC 84 D4 84 EC 85 04 85 1C 85 34
FBD0 85 4C 85 64 85 7C 85 94 85 AC 85 C4 85 DC 85 F4
FBE0 86 0C 86 24 86 3C 86 54 86 6C 86 84 86 9C 86 B4
FBF0 86 CC 86 E4 86 FC 87 14 87 2C 87 44 87 5C 87 74
FC00 87 8C 87 A4 87 BC 87 D4 87 EC 88 04 88 1C 88 34
FC10 88 4C 88 64 88 7C 88 94 88 AC 88 C4 88 DC 88 F4
FC20 89 0C 89 24 89 3C 89 54 89 6C 89 84 89 9C 89 B4
FC30 89 CC 89 E4 89 FC 8A 14 8A 2C 8A 44 8A 5C 8A 74
FC40 8A 8C 8A A4 8A BC 8A D4 8A EC 8B 04 8B 1C 8B 34
FC50 8B 4C 8B 64 8B 7C 8B 94 8B AC 8B C4 8B DC 8B F4
FC60 8C 0C 8C 24 8C 3C 8C 54 8C 6C 8C 84 8C 9C 8C B4
FC70 8C CC 8C E4 8C FC 8D 14 8D 2C 8D 44 8D 5C 8D 74
FC80 8D 8C 8D A4 8D BC 8D D4 8D EC 8E 04 8E 1C 8E 34
FC90 8E 4C 8E 64 8E 7C 8E 94 8E AC 8E C4 8E DC 8E F4
FCA0 8F 0C 8F 24 8F 3C 8F 54 8F 6C 8F 84 8F 9C 8F B4
FCB0 8F CC 8F E4 8F FC 90 14 90 2C 90 44 90 5C 90 74
FCC0 90 8C 90 A4 90 BC 90 D4 90 EC 91 04 91 1C 91 34
FCD0 91 4C 91 64 91 7C 91 94 91 AC 91 C4 91 DC 91 F4
FCE0 92 0C 92 24 92 3C 92 54 92 6C 92 84 92 9C 92 B4
FCF0 92 CC 92 E4 92 FC 93 14 93 2C 93 44 93 5C 93 74
FD00 93 8C 93 A4 93 BC 93 D4 93 EC 94 04 94 1C 94 34
FD10 94 4C 94 64 94 7C 94 94 94 AC 94 C4 94 DC 94 F4
FD20 95 0C 95 24 95 3C 95 54 95 6C 95 84 95 9C 95 B4
FD30 95 CC 95 E4 95 FC 96 14 96 2C 96 44 96 5C 96 74
FD40 96 8C 96 A4 96 BC 96 D4 96 EC 97 04 97 1C 97 34
FD50 97 4C 97 64 97 7C 97 94 97 AC 97 C4 97 DC 97 F4
FD60 98 0C 98 24 98 3C 98 54 98 6C 98 84 98 9C 98 B4
FD70 98 CC 98 E4 98 FC 99 14 99 2C 99 44 99 5C 99 74
FD80 99 8C 99 A4 99 BC 99 D4 99 EC 9A 04 9A 1C 9A 34
FD90 9A 4C 9A 64 9A 7C 9A 94 9A AC 9A C4 9A DC 9A F4
FDA0 9B 0C 9B 24 9B 3C 9B 54 9B 6C 9B 84 9B 9C 9B B4
FDB0 9B CC 9B E4 9B FC 9C 14 9C 2C 9C 44 9C 5C 9C 74
FDC0 9C 8C 9C A4 9C BC 9C D4 9C EC 9D 04 9D 1C 9D 34
FDD0 9D 4C 9D 64 9D 7C 9D 94 9D AC 9D C4 9D DC 9D F4
FDE0 9E 0C 9E 24 9E 3C 9E 54 9E 6C 9E 84 9E 9C 9E B4
FDF0 9E CC 9E E4 9E FC 9F 14 9F 2C 9F 44 9F 5C 9F 74
FE00 9F 8C 9F A4 9F BC 9F D4 9F EC A0 04 A0 1C A0 34
FE10 A0 4C A0 64 A0 7C A0 94 A0 AC A0 C4 A0 DC A0 F4
FE20 A1 0C A1 24 A1 3C A1 54 A1 6C A1 84 A1 9C A1 B4
FE30 A1 CC A1 E4 A1 FC A2 14 A2 2C A2 44 A2 5C A2 74
FE40 A2 8C A2 A4 A2 BC A2 D4 A2 EC A3 04 A3 1C A3 34
FE50 A3 4C A3 64 A3 7C A3 94 A3 AC A3 C4 A3 DC A3 F4
FE60 A4 0C A4 24 A4 3C A4 54 A4 6C A4 84 A4 9C A4 B4
FE70 A4 CC A4 E4 A4 FC A5 14 A5 2C A5 44 A5 5C A5 74
FE80 A5 8C A5 A4 A5 BC A5 D4 A5 EC A6 04 A6 1C A6 34
FE90 A6 4C A6 64 A6 7C A6 94 A6 AC A6 C4 A6 DC A6 F4
FEA0 A7 0C A7 24 A7 3C A7 54 A7 6C A7 84 A7 9C A7 B4
FEB0 A7 CC A7 E4 A7 FC A8 14 A8 2C A8 44 A8 5C A8 74
FEC0 A8 8C A8 A4 A8 BC A8 D4 A8 EC A9 04 A9 1C A9 34
FED0 A9 4C A9 64 A9 7C A9 94 A9 AC A9 C4 A9 DC A9 F4
FEE0 AA 0C AA 24 AA 3C AA 54 AA 6C AA 84 AA 9C AA B4
FEF0 00 00 00 00 00 00 00 00 00 00 00 00 00 00 00 00
FF00 AA CC AA E4 AA FC AB 14 AB 2C AB 44 AB 5C AB 74
FF10 AB 8C AB A4 00 00 00 00 00 00 00 00 00 00 00 00
FF20 00 00 00 00 00 00 00 00 00 00 00 00 00 00 00 00
FF30 00 00 00 00 00 00 00 00 00 00 00 00 00 00 00 00
FF40 08 0C 08 24 08 3C 08 54 08 6C 08 84 08 9C 08 B4
FF50 08 CC 08 E4 08 FC 09 14 09 2C 09 44 09 5C 09 74
FF60 09 8C 09 A4 09 BC 09 D4 09 EC 0A 04 0A 1C 0A 34
FF70 00 00 00 00 00 00 00 00 00 00 00 00 00 00 00 00
FF80 0A 4C 0A 64 0A 7C 0A 94 0A AC 0A C4 00 00 00 00
FF90 00 00 00 00 00 00 00 00 00 00 00 00 00 00 00 00
```

```
FFA0  00 00 00 00 00 00 00 00 00 00 00 00 00 00 00 00
FFB0  00 00 00 00 00 00 00 00 00 00 00 00 00 00 00 00
FFC0  00 00 00 00 00 00 00 00 00 00 00 00 00 00 00 00
FFD0  00 00 00 00 00 00 00 00 00 00 00 00 00 00 00 00
FFE0  00 00 00 00 00 00 00 00 00 00 00 00 00 00 00 7E
FFF0  FF EF 7E FF F2 7E FF F5 FF EF FF F2 FF F5 ED EE
```

<u>LM96N NODE</u>

```
D800  DC 87 DC A0 DC 93 DC A0 DC 87 DC AD DC 93 DC AD
D810  DC 87 DC A0 DC 93 DC A0 DC 87 DC 87 DC 93 DC 87
D820  DC 87 DC A0 DC 93 DC A0 DC 87 DC 93 DC 93 DC 93
D830  DC 90 DC 90 DC 90 DC 90 DC 90 DC 90 DC 90 DC 90
D840  44 00 44 24 44 48 44 6C 44 90 44 B4 44 D8 44 FC
D850  45 20 45 44 45 68 45 8C 45 B0 45 D4 45 F8 46 1C
D860  46 40 46 64 46 88 46 AC 46 D0 46 F4 47 18 47 3C
D870  47 60 47 84 47 A8 47 CC 47 F0 48 14 48 38 48 5C
D880  DB F6 DC 26 DC 36 DC 26 DB F6 DC 26 DB F6 DC 26
D890  DC 0E DC 26 DC 0E DC 26 DC 0E DC 26 DC 4B DC 26
D8A0  DF 4D DF 4D DF 4D DF 4D DF 4D DF 4D DF 50 DF 69
D8B0  DF 18 DF 31 DF 4D DF 4D DF 18 DF 31 DF 50 DF 69
D8C0  E1 79 E1 79 E0 DE E1 C3 E1 79 E1 79 E0 DE E1 C3
D8D0  E1 DC E1 C3 E1 DC E1 C3 E1 31 E1 31 E1 31 E1 31
D8E0  DF C9 DF C9 DF C9 DF C9 DF AF DF AF DF B5 DF B5
D8F0  DF D4 DF D4 DF D4 DF D4 DF AF DF BF DF AF DF BF
D900  DC E8 DC E8 DD 39 DD 39 DC FD DD 2B DD 4C DD 2B
D910  DE 9D DE 9D DE A9 DE A0 DE B9 DE B0 DE C0 DE C0
D920  E3 1D E3 17 E3 11 E3 62 E3 79 E3 6F E3 65 E3 62
D930  7E D9 36 00 00 00 BD EA EC DE 06 A6 17 A7 13 A7
D940  15 A6 1D A7 19 A7 1B 86 00 A7 1F A7 20 A7 05 A7
D950  04 A7 11 A7 0C A7 0B 86 FF A7 0F 86 05 A7 02 86
D960  01 A7 21 CE D9 7C DF 14 96 14 D6 15 DE 06 A7 09
D970  E7 0A 86 0F A7 08 BD EB 56 7E E6 02 7E D9 82 00
D980  00 00 DE 06 6F 21 CE E2 7D DF 14 96 14 D6 15 DE
D990  06 A7 09 E7 0A 86 14 A7 08 7E DF 85 7E D9 A2 00
D9A0  00 00 DE 1D DF 38 DE 1F DF 3A DE 21 DF 3C DE 23
D9B0  DF 3E DE 25 DF 40 DE 27 DF 42 DE 29 DF 44 DE 2B
D9C0  DF 46 DE 2D DF 48 DE 2F DF 4A DE 31 DF 4C DE 33
D9D0  DF 4E 96 5C 0C 49 D6 5D 59 89 00 CB 08 89 00 97
D9E0  B6 D7 B7 CE D9 EB DF B8 7E E5 56 7E D9 F1 00 00
D9F0  00 DE 38 DF 1D DE 3A DF 1F DE 3C DF 21 DE 3E DF
DA00  23 DE 40 DF 25 DE 42 DF 27 DE 44 DF 29 DE 46 DF
DA10  2B DE 48 DF 2D DE 4A DF 2F DE 4C DF 31 DE 4E DF
DA20  33 96 20 27 1C 81 01 27 24 81 02 27 2C 81 03 27
DA30  34 81 04 27 3C DE 5A DF 26 CE 00 00 DF 5A 7E DA
DA40  7D DE 50 DF 26 CE 00 00 DF 50 7E DA 7D DE 52 DF
DA50  26 CE 00 00 DF 52 7E DA 7D DE 54 DF 26 CE 00 00
DA60  DF 54 7E DA 7D DE 56 DF 26 CE 00 00 DF 56 7E DA
DA70  7D DE 58 DF 26 CE 00 00 DF 58 7E DA 7D 96 1D 84
DA80  EF 97 1D DE 5C DF 22 7F 00 21 CE 00 00 DF 24 CE
DA90  48 86 DF 16 BD E8 DF 7E DA 9A 7E DA A0 00 00 00
DAA0  DE 09 86 70 AA 05 A7 05 7E DF 85 7E DA B1 00 00
DAB0  00 7E DA B4 7E DA BA 00 00 00 7F 00 C9 DE 24 26
DAC0  08 DE 5C DF 24 86 01 97 C9 7E DA CC 7E DA D2 00
DAD0  00 00 DE 1D 96 22 D6 23 DF 22 97 1D D7 1E BD EA
DAE0  EC DE 1D 96 22 D6 23 DF 22 97 1D D7 1E 96 22 84
DAF0  F0 81 10 27 36 96 C9 27 5D 96 63 26 6F CE 00 6A
DB00  DF 5E 96 21 0C 49 9A 5F 97 5F DE 5E 96 22 84 03
DB10  D6 23 A7 00 E7 01 DE 12 86 FE A7 00 96 22 84 F0
DB20  81 50 26 04 DE 5E DF AA 7E DB 9B 96 1A 81 1F 22
DB30  1B DE 06 96 63 A7 06 96 22 84 0C 0C 49 49 49 49
DB40  A7 10 96 24 84 FC 44 44 AA 10 A7 10 96 63 27 03
DB50  7E DB A4 7E DB 9B 96 63 27 09 DE 12 86 FD A7 00
DB60  7E DB A4 DE 12 86 FE A7 00 7E DB 9B CE 00 CB DF
DB70  61 96 21 0C 49 9A 62 97 62 DE 61 96 22 84 03 D6
DB80  23 A7 00 E7 01 DE 12 86 FD A7 00 96 22 84 F0 81
DB90  50 26 05 DE 61 FF 01 0B 7E DB A4 7E DB A1 00 00
DBA0  00 7E E5 91 7E DB AA 00 00 00 7E E5 A2 7E DB B3
DBB0  00 00 00 86 64 97 BF CE DB AD DF C0 96 60 27 07
```

| | | | | | | | | | | | | | | | | |
|---|---|---|---|---|---|---|---|---|---|---|---|---|---|---|---|---|
| DBC0 | | 96 | 67 | 26 | 06 | 7E | DC | 5F | 7E | DF | 85 | D6 | C2 | 0C | 59 | 96 | BC |
| DBD0 | 27 | 02 | CA | 01 | 59 | 96 | BA | 27 | 02 | CA | 01 | 59 | 96 | 69 | 91 | 64 |
| DBE0 | 23 | 02 | CA | 01 | 96 | CA | 91 | 64 | 23 | 02 | CA | 01 | D7 | 08 | CE | D8 |
| DBF0 | 80 | DF | 0C | 7E | E2 | B6 | 7C | 00 | 69 | 86 | 01 | 97 | C2 | BD | EA | 26 |
| DC00 | CE | 0A | 00 | DF | 16 | BD | E8 | DF | 7F | 00 | BA | 7E | DC | 5F | 7C | 00 |
| DC10 | CA | 86 | 01 | 97 | C2 | BD | EA | 26 | CE | 0E | 00 | DF | 16 | BD | E8 | DF |
| DC20 | 7F | 00 | BA | 7E | DC | 5F | 7F | 00 | 69 | 7F | 00 | CA | 86 | 01 | 97 | C6 |
| DC30 | 7F | 00 | BA | 7E | DC | 5F | 86 | 01 | 97 | C2 | BD | EA | 26 | CE | 0A | 00 |
| DC40 | DF | 16 | BD | E8 | DF | 7F | 00 | BA | 7E | DC | 5F | 7F | 00 | C2 | BD | EA |
| DC50 | 26 | CE | 0E | 00 | DF | 16 | BD | E8 | DF | 7F | 00 | BA | 7E | DC | 5F | 7E |
| DC60 | DC | 65 | 00 | 00 | 00 | 0C | D6 | 68 | 59 | 96 | C6 | 27 | 02 | CA | 01 | 59 |
| DC70 | 96 | C5 | 27 | 02 | CA | 01 | 59 | 96 | 67 | 27 | 02 | CA | 01 | D7 | 08 | CE |
| DC80 | D8 | 00 | DF | 0C | 7E | E2 | B6 | 7F | 00 | C6 | 7F | 00 | C5 | 7F | 00 | 67 |
| DC90 | 7E | DF | 85 | 7F | 00 | C6 | 7F | 00 | C5 | 86 | 01 | 97 | 67 | 7E | DE | 37 |
| DCA0 | 7F | 00 | C6 | 7F | 00 | C5 | 86 | 01 | 97 | 67 | 7E | DF | 85 | 7E | DC | B0 |
| DCB0 | 7E | DC | B6 | 00 | 00 | 00 | 86 | 01 | 97 | B2 | DE | AA | DF | B0 | 7F | 00 |
| DCC0 | AF | D6 | B2 | 0C | 59 | 96 | AF | 27 | 02 | CA | 01 | 59 | DE | B0 | 09 | 09 |
| DCD0 | 8C | 00 | 6A | 23 | 02 | CA | 01 | 8C | 00 | CB | 23 | 02 | CA | 01 | D7 | 08 |
| DCE0 | CE | D9 | 00 | DF | 0C | 7E | E2 | B6 | FE | 01 | 0B | DF | B0 | 86 | 01 | 97 |
| DCF0 | AF | 7F | 00 | AC | 86 | 01 | 97 | B2 | 97 | 68 | 7E | DC | C1 | FE | 01 | 0B |
| DD00 | DF | B0 | 86 | 01 | 97 | AF | 7F | 00 | AC | 86 | 01 | 97 | B2 | 86 | 02 | 97 |
| DD10 | 68 | BD | E9 | A2 | CE | 0A | 00 | DF | 16 | BD | E8 | DF | BD | E8 | DF | 86 |
| DD20 | 14 | 97 | B3 | CE | DC | C1 | DF | B4 | 7E | DE | 7A | DE | B0 | 09 | 09 | DF |
| DD30 | B0 | 7F | 00 | AC | EE | 00 | 7E | DD | 6D | DE | AA | DF | B0 | 7F | 00 | AF |
| DD40 | DF | B0 | 7F | 00 | AC | 86 | 01 | 97 | B2 | 97 | 68 | 7E | DB | AD | DE | AA | DF | B0 |
| DD50 | 7F | 00 | AF | BD | E9 | A2 | CE | 0E | 00 | DF | 16 | BD | E8 | DF | BD | E8 |
| DD60 | DF | 86 | 14 | 97 | B3 | CE | DB | AD | DF | B4 | 7E | DE | 7A | 96 | AF | 26 |
| DD70 | 54 | BD | E9 | A2 | CE | 0A | 00 | DF | 16 | BD | E8 | DF | BD | E8 | DF | 86 |
| DD80 | 14 | 97 | B3 | CE | DD | 8B | DF | B4 | 7E | DE | 7A | BD | E9 | E3 | CE | 0A |
| DD90 | 00 | DF | 16 | BD | E8 | DF | BD | E8 | DF | 86 | 14 | 97 | B3 | CE | DD | A5 |
| DDA0 | DF | B4 | 7E | DE | 7A | BD | EA | 26 | CE | 0A | 00 | DF | 16 | 7F | 00 | BB |
| DDB0 | BD | E8 | DF | BD | E8 | DF | BD | E8 | DF | 86 | 14 | 97 | B3 | CE | DE | 19 |
| DDC0 | DF | B4 | 7E | DE | 7A | BD | E9 | A2 | CE | 0E | 00 | DF | 16 | BD | E8 | DF |
| DDD0 | BD | E8 | DF | 86 | 14 | 97 | B3 | CE | DD | DF | DF | B4 | 7E | DE | 7A | BD |
| DDE0 | E9 | E3 | CE | 0E | 00 | DF | 16 | BD | E8 | DF | BD | E8 | DF | 86 | 14 | 97 |
| DDF0 | B3 | CE | DD | F9 | DF | B4 | 7E | DE | 7A | BD | EA | 26 | CE | 0E | 00 | DF |
| DE00 | 16 | 7F | 00 | BB | BD | E8 | DF | BD | E8 | DF | BD | E8 | DF | 86 | 14 | 97 |
| DE10 | B3 | CE | DE | 19 | DF | B4 | 7E | DE | 7A | 96 | BB | 81 | 03 | 27 | 06 | 7C |
| DE20 | 00 | AC | 7E | DE | 2B | 7F | 00 | B2 | 7E | DC | C1 | 96 | AC | 81 | 03 | 27 |
| DE30 | 03 | 7E | DD | 6D | 7E | DC | C1 | 7E | DE | 3D | 00 | 00 | 00 | BD | E9 | A2 |
| DE40 | CE | 0A | 00 | DF | 16 | BD | E8 | DF | BD | E8 | DF | CE | 0E | 00 | DF | 16 |
| DE50 | BD | E8 | DF | BD | E8 | DF | 86 | 14 | 97 | B3 | CE | DB | AD | DF | B4 | 7E |
| DE60 | DE | 7A | 7E | DE | 68 | 00 | 00 | 00 | 86 | 01 | 97 | BA | 96 | 63 | 97 | BC |
| DE70 | 96 | 63 | 27 | 03 | 7E | E3 | 9E | 7E | DF | 85 | 7E | DE | 80 | 00 | 00 | 00 |
| DE80 | 0C | F6 | 0A | FC | 59 | B6 | 0E | FC | 27 | 02 | CA | 01 | 59 | 96 | B3 | 27 |
| DE90 | 02 | CA | 01 | D7 | 08 | CE | D9 | 10 | DF | 0C | 7E | E2 | B6 | 7E | DE | C9 |
| DEA0 | 7F | 0E | FC | 7A | 00 | B3 | 7E | DE | C9 | 7F | 0E | FC | DE | B4 | 6E | 00 |
| DEB0 | 7F | 0A | FC | 7A | 00 | B3 | 7E | DE | C9 | 7F | 0A | FC | DE | B4 | 6E | 00 |
| DEC0 | 7F | 0A | FC | 7A | 00 | B3 | 7E | DE | 80 | 7E | DE | CF | 00 | 00 | 00 | 7F |
| DED0 | 00 | 08 | CE | 08 | 00 | DF | 16 | BD | EB | 25 | CE | 0C | 00 | DF | 16 | BD |
| DEE0 | EB | 25 | D6 | 08 | 0C | 59 | 96 | AF | 27 | 02 | CA | 01 | 59 | 96 | AF | 27 |
| DEF0 | 10 | FE | 0C | 00 | EE | 00 | A6 | 03 | 81 | 23 | 26 | 02 | CA | 01 | 7E | DF |
| DF00 | 0E | FE | 08 | 00 | EE | 00 | A6 | 03 | 81 | 23 | 26 | 02 | CA | 01 | D7 | 08 |
| DF10 | CE | D8 | A0 | DF | 0C | 7E | E2 | B6 | B6 | 08 | 01 | B1 | 08 | 04 | 27 | 08 |
| DF20 | 8B | 02 | B7 | 08 | 01 | 7E | DF | 2E | B6 | 08 | 05 | B7 | 08 | 01 | 7E | DE |
| DF30 | 7A | 7C | 00 | BB | B6 | 08 | 01 | B1 | 08 | 04 | 27 | 08 | 8B | 02 | B7 | 08 |
| DF40 | 01 | 7E | DF | 4A | B6 | 08 | 05 | B7 | 08 | 01 | 7E | DE | 7A | 7E | DE | 7A |
| DF50 | B6 | 0C | 01 | B1 | 0C | 04 | 27 | 08 | 8B | 02 | B7 | 0C | 01 | 7E | DF | 66 |
| DF60 | B6 | 0C | 05 | B7 | 0C | 01 | 7E | DE | 7A | 7C | 00 | BB | B6 | 0C | 01 | B1 |
| DF70 | 0C | 04 | 27 | 08 | 8B | 02 | B7 | 0C | 01 | 7E | DF | 82 | B6 | 0C | 05 | B7 |
| DF80 | 0C | 01 | 7E | DE | 7A | 7E | DF | 8B | 00 | 00 | 00 | 0C | D6 | C7 | 59 | 96 |
| DF90 | C8 | 27 | 02 | CA | 01 | 59 | B6 | 0A | FC | 27 | 02 | CA | 01 | 59 | B6 | 0E |
| DFA0 | FC | 27 | 02 | CA | 01 | D7 | 08 | CE | D8 | E0 | DF | 0C | 7E | E2 | B6 | 7A |
| DFB0 | 00 | C8 | 7E | E3 | EF | 7F | 0A | FC | 86 | FF | 97 | C8 | 7E | DF | DB | 7F |
| DFC0 | 0E | FC | 86 | FF | 97 | C8 | 7E | DF | DB | 86 | 01 | 97 | C7 | 86 | FF | 97 |
| DFD0 | C8 | 7E | DF | DB | 7F | 00 | C7 | 86 | FF | 97 | C8 | 96 | 35 | 27 | 06 | 7A |
| DFE0 | 00 | 35 | 7E | DF | ED | 86 | 0B | 97 | 35 | 86 | 01 | 97 | 36 | 7E | A3 | BC |
| DFF0 | 27 | 07 | FE | A3 | BC | 09 | FF | A3 | BC | DE | B6 | 27 | 05 | DE | B6 | 09 |
| E000 | DF | B6 | 96 | BF | 27 | 03 | 7A | 00 | BF | CE | 44 | 00 | A6 | 08 | 27 | 02 |
| E010 | 6A | 08 | A6 | 0B | 27 | 06 | A6 | 0B | 90 | 36 | A7 | 0B | A6 | 11 | 27 | 14 |
| E020 | A6 | 0E | 26 | 1A | A6 | 10 | A7 | 0E | 6A | 11 | A6 | 0F | 81 | FF | 27 | 04 |
| E030 | A6 | 11 | A7 | 0F | EE | 22 | 26 | D4 | 7F | 00 | 36 | 7E | E3 | EF | 6A | 0E |
| E040 | 7E | E0 | 34 | 7E | E0 | 49 | 00 | 00 | 00 | DE | BD | C6 | 08 | 7E | E0 | 5B |
| E050 | A6 | 09 | 27 | 04 | A6 | 08 | 27 | 10 | 5A | 27 | 21 | EE | 22 | 27 | 03 | 7E |

```
E060  E0 50 CE 44 00 7E E0 50 DF BD A6 09 E6 0A 97 14
E070  D7 15 6F 09 DE BD DF 06 DE 14 6E 00 DF BD 96 B8
E080  27 04 DE B6 27 0E 96 C0 27 28 96 BF 27 03 7E DF
E090  85 7E E0 A3 96 B8 D6 B9 97 14 D7 15 7F 00 B8 DE
E0A0  14 6E 00 96 C0 D6 C1 97 14 D7 15 7F 00 C0 DE 14
E0B0  6E 00 7E DF 85 7E E0 BB 00 00 00 BD EA EC DE 06
E0C0  A6 21 26 10 96 20 81 21 27 5B 81 20 27 34 A6 02
E0D0  81 01 27 0A 96 63 27 03 7E E3 9E 7E DF 85 86 FF
E0E0  A7 08 CE E2 11 DF 14 DE 06 96 14 D6 15 A7 09 E7
E0F0  0A 86 02 A7 02 96 63 27 03 7E E3 9E 7E DF 85 7E
E100  E1 F4 A6 02 27 F9 81 02 22 F5 96 23 A7 07 BD E9
E110  88 BD EB D0 6F 02 6F 09 BD EB 56 96 63 27 03 7E
E120  E3 9E 7E DF 85 A6 02 81 02 22 64 A6 04 91 C3 26
E130  48 86 29 97 0F BD EB 74 DE 09 A6 00 AB 01 AB 02
E140  AB 03 AB 04 AB 05 AB 06 AB 07 AB 08 AB 09 A7 0A
E150  AB 17 A7 17 BD E9 88 BD EB 56 DE 06 86 FF A7 08
E160  CE E2 6B DF 14 DE 06 96 14 D6 15 A7 09 E7 0A 96
E170  63 27 03 7E E3 9E 7E DF 85 BD EB DF BD EB 3C 6C
E180  04 6F 02 6F 09 96 63 27 03 7E E3 9E 7E DF 85 C6
E190  00 A6 02 81 03 27 06 81 04 26 EA CA 01 0C 59 A6
E1A0  05 91 C4 26 02 CA 01 0C 59 96 23 A1 07 26 02 CA
E1B0  01 0C 59 96 21 27 02 CA 01 D7 08 CE D8 C0 DF 0C
E1C0  7E E2 B6 BD E9 88 BD EB D0 DE 06 6F 02 6F 09 BD
E1D0  EB 56 96 63 27 03 7E E3 9E 7E DF 85 86 28 97 0F
E1E0  BD EB 74 BD E9 6C DE 06 6C 05 96 63 27 03 7E E3
E1F0  9E 7E DF 85 81 05 26 0F 96 21 81 02 26 09 BD EB
E200  D0 6F 1F 6F 02 6F 09 96 63 27 03 7E E3 9E 7E DF
E210  85 7E E2 17 00 00 00 DE 06 A6 11 81 09 22 13 86
E220  28 97 0F BD EB 74 BD E9 6C DE 06 86 04 A7 02 7E
E230  DF 85 7F 00 63 7E E0 DE 7E E2 3E 00 00 00 DE 06
E240  A6 05 91 C4 27 06 7F 00 63 7E E1 DC 7F 00 63 7E
E250  E1 31 7E E2 58 00 00 00 86 28 97 0F BD EB 74 BD
E260  E9 6C DE 06 86 03 A7 02 7E DF 85 7E E2 71 00 00
E270  00 BD EB D0 DE 06 6F 02 6F 07 7E DF 85 7E E2 83
E280  00 00 00 DE 06 A6 05 91 C4 27 25 86 20 97 0F BD
E290  EB 74 DE 06 6C 05 86 01 A7 21 86 0F A7 08 CE D9
E2A0  7C DF 14 DE 06 96 14 D6 15 A7 09 E7 0A 7E DF 85
E2B0  7F 00 63 7E E1 31 7E E2 BC 00 00 00 96 08 0C 49
E2C0  97 08 9A 0D 97 15 96 0C 97 14 DE 14 EE 00 6E 00
E2D0  7E E2 D6 00 00 00 96 1D 9B 1E 9B 1F 9B 20 9B 21
E2E0  9B 22 9B 23 9B 24 9B 25 9B 26 91 27 26 74 CE 48
E2F0  86 DF 16 5F 96 20 81 21 27 02 CA 01 0C 59 59 96
E300  23 84 03 97 23 DA 23 D7 08 CE D9 20 DF 0C 7E E2
E310  B6 DE 21 A6 02 97 26 DE 21 A6 01 97 25 DE 21 A6
E320  00 97 24 96 1D 84 EF 97 1D 86 25 97 20 96 1D 9B
E330  1E 9B 1F 9B 20 9B 21 9B 22 9B 23 9B 24 9B 25 9B
E340  26 97 27 86 00 97 28 97 29 97 2A 97 2B 97 2C 97
E350  2D 97 2E 97 2F 97 30 97 31 97 32 97 33 97 34 BD
E360  E8 DF 7E DF 85 DE 21 96 26 A7 02 A6 02 97 26 DE
E370  21 96 25 A7 01 A6 01 97 25 DE 21 96 24 A7 00 7E
E380  E3 1D 7E E3 88 00 00 00 B6 48 81 B1 9B 27 0B
E390  CE 48 80 DF 16 BD E8 5D 7E E5 B3 7E E0 43 7E E3
E3A0  A4 00 00 00 B6 08 01 B1 08 03 27 0B CE 08 00 DF
E3B0  16 BD E8 5D 7E E3 D6 7E E3 82 7E E3 C0 00 00 00
E3C0  B6 0C 01 B1 0C 03 27 0B CE 0C 00 DF 16 BD E8 5D
E3D0  7E E3 E2 7E E3 9E 7E E3 DC 00 00 00 7F 00 63 7E
E3E0  E6 48 7E E3 E8 00 00 00 86 01 97 63 7E E6 48 7E
E3F0  E3 F5 00 00 00 B6 0A 03 B1 0A 01 26 14 B6 0A 09
E400  B1 0A 07 27 02 23 0D B0 0A 07 81 02 22 03 7E E4
E410  21 7E E4 A2 B1 0A 0B 26 F8 B6 0A 07 B1 0A 0A 26
E420  F0 7F 00 0B BD EA 69 96 0E 81 FF 27 E4 DE 16 A6
E430  01 A0 05 44 81 0F 27 42 DE 18 A6 02 84 20 26 3A
E440  BD E7 F4 DE 16 A6 01 A0 05 44 D6 1F C4 E0 D7 1F
E450  9A 1F 97 1F A6 01 8B 02 A7 01 CE 0A 00 DF 16 BD
E460  E8 DF DE 06 A6 13 A1 15 26 2E A6 19 A1 1B 26 28
E470  BD E9 61 86 FF A7 0F 7E E4 A2 DE 06 86 01 A7 02
E480  86 14 A7 08 CE E2 52 DF 14 DE 06 96 14 D6 15 A7
E490  09 E7 0A 6C 07 7E E4 40 DE 06 BD E9 61 A7 0F 7E
E4A0  E4 A2 7E E4 A8 00 00 00 B6 0E 03 B1 0E 01 26 14
E4B0  B6 0E 09 B1 0E 07 27 02 23 0D B0 0E 07 81 02 22
E4C0  03 7E E4 D4 7E 00 00 B1 0E 0B 26 F8 B6 0E 07 B1
E4D0  0E 0A 26 F0 86 01 97 0B BD EA 69 96 0E 81 FF 27
E4E0  E3 DE 16 A6 01 A0 05 44 81 0F 27 42 DE 18 A6 02
E4F0  84 10 26 3A BD E7 F4 DE 16 A6 01 A0 05 44 D6 1F
```

```
E500  C4 E0 D7 1F 9A 1F 97 1F A6 01 8B 02 A7 01 CE 0E
E510  00 DF 16 BD E8 DF DE 06 A6 13 A1 15 26 2E A6 19
E520  A1 1B 26 28 BD E9 61 86 FF A7 0F 7E 00 00 DE 06
E530  86 01 A7 02 86 14 A7 08 CE E2 52 DF 14 DE 06 96
E540  14 D6 15 A7 09 E7 0A 6C 07 7E E4 F4 DE 06 BD E9
E550  61 A7 0F 7E 00 00 7E E5 5C 00 00 00 CE 0A 00 DF
E560  16 BD E8 DF CE 0E 00 DF 16 BD E8 DF 7E DF 85 7E
E570  E5 75 00 00 00 CE 0A 00 DF 16 BD E8 DF 7E DF 85
E580  7E E5 86 00 00 00 CE 0E 00 DF 16 BD E8 DF 7E DF
E590  85 7E E5 97 00 00 00 CE 48 86 DF 16 BD E8 DF 7E
E5A0  DF 85 7E E5 A8 00 00 00 CE 48 86 DF 16 BD E8 DF
E5B0  7E E3 9E 7E E5 B9 00 00 00 96 1E 81 FF 26 09 96
E5C0  1D 84 10 26 22 7E E5 E4 96 1D 84 03 91 5C 26 14
E5D0  96 1E 91 5D 26 0E 96 20 81 29 27 0E 81 21 27 0D
E5E0  81 23 27 09 7E E5 F0 7E D9 9C 7E E6 B9 7E E2 D0
E5F0  7E E5 F6 00 00 00 96 20 81 20 27 03 7E E6 02 7E
E600  D9 30 7E E6 08 00 00 00 BD EA EC 96 1A 81 FE 27
E610  11 81 FD 27 10 81 1F 23 03 7E DF 85 DE 06 A6 06
E620  26 03 7E E5 6F 7E E5 80 7E E6 2E 00 00 00 96 63
E630  27 03 7E E6 9D 7E E6 81 7E E6 3E 00 00 00 96 63
E640  27 03 7E DB A4 7E DB 9B 7E E6 4E 00 00 00 96 1E
E650  81 FF 26 09 96 1D 84 10 26 03 7E DA AB 7E E6 60
E660  7E E6 66 00 00 00 96 20 81 23 27 0F 81 20 27 0E
E670  81 21 27 0A 81 22 27 06 7E E6 28 7E DE 62 7E E0
E680  B5 7E E6 87 00 00 00 96 37 27 0C 96 1D 84 08 27
E690  09 96 20 81 64 22 03 7E E5 91 7E DF 85 7E E6 A3
E6A0  00 00 00 96 37 27 0C 96 1D 84 08 27 09 96 20 81
E6B0  64 22 03 7E E5 A2 7E E3 9E 7E E6 BF 00 00 00 96
E6C0  1D 9B 1E 9B 1F 9B 20 9B 21 9B 22 9B 23 9B 24 9B
E6D0  25 9B 26 91 27 26 03 7E E6 D7 7E DF 85 8E 01 FF
E6E0  FE E6 F7 DF 00 B6 E6 F9 97 02 FE E6 FA DF 03 B6
E6F0  E6 FC 97 05 7E E6 FD B7 D0 1E 7E E3 BA 7E E7 00
E700  7E E7 06 00 00 00 CE 00 06 86 00 A7 00 08 8C 02
E710  00 26 F8 CE 08 00 86 00 A7 00 08 8C 09 00 26 F8
E720  CE 0A 0C 86 00 A7 00 08 8C 0B 00 26 F8 CE 0C 00
E730  86 00 A7 00 08 8C 0D 00 26 F8 CE 0E 00 86 00 A7
E740  00 08 8C 0F 00 26 F8 CE 00 6C DF AA CE 44 00 DF
E750  BD CE DB AD DF C0 CE 00 CD FF 01 0B CE FF 92 FF
E760  08 00 B6 08 01 B7 08 04 CE FF 80 FF 08 00 FF 08
E770  02 B6 08 01 B7 08 05 CE FF B2 FF 0C 00 B6 0C 01
E780  B7 0C 04 CE FF A0 FF 0C 00 FF 0C 02 B6 0C 01 B7
E790  0C 05 CE FF 52 FF 0A 00 B6 0A 01 B7 0A 04 CE FF
E7A0  40 FF 0A 00 FF 0A 02 B6 0A 01 B7 0A 05 CE FF 72
E7B0  FF 0E 00 B6 0E 01 B7 0E 04 CE FF 60 FF 0E 00 FF
E7C0  0E 02 B6 0E 01 B7 0E 05 86 FF 97 0E 97 C8 86 10
E7D0  97 64 86 01 97 67 86 08 97 C3 97 C4 B6 D0 0F 84
E7E0  03 97 5C B6 D0 0E 97 5D CE FF FF B7 D0 1E 09 26
E7F0  FA 7E 00 00 7E E7 FA 00 00 00 DE 18 A6 00 97 1D
E800  A6 01 97 1E A6 02 97 1F A6 03 97 20 A6 04 97 21
E810  A6 05 97 22 A6 06 97 23 A6 07 97 24 A6 08 97 25
E820  A6 09 97 26 A6 0A 97 27 A6 0B 97 28 A6 0C 97 29
E830  A6 0D 97 2A A6 0E 97 2B A6 0F 97 2C A6 10 97 2D
E840  A6 11 97 2E A6 12 97 2F A6 13 97 30 A6 14 97 31
E850  A6 15 97 32 A6 16 97 33 A6 17 97 34 39 7E E8 63
E860  00 00 00 DE 16 EE 00 EE 00 DF 18 A6 00 97 1D A6
E870  01 97 1E A6 02 97 1F A6 03 97 20 A6 04 97 21 A6
E880  05 97 22 A6 06 97 23 A6 07 97 24 A6 08 97 25 A6
E890  09 97 26 A6 0A 97 27 A6 0B 97 28 A6 0C 97 29 A6
E8A0  0D 97 2A A6 0E 97 2B A6 0F 97 2C A6 10 97 2D A6
E8B0  11 97 2E A6 12 97 2F A6 13 97 30 A6 14 97 31 A6
E8C0  15 97 32 A6 16 97 33 A6 17 97 34 DE 16 A6 01 A1
E8D0  04 27 07 8B 02 A7 01 7E E8 DE A6 05 A7 01 39 7E
E8E0  E8 E5 00 00 00 DE 16 EE 02 EE 00 DF 09 96 1D A7
E8F0  00 96 1E A7 01 96 1F A7 02 96 20 A7 03 96 21 A7
E900  04 96 22 A7 05 96 23 A7 06 96 24 A7 07 96 25 A7
E910  08 96 26 A7 09 96 27 A7 0A 96 28 A7 0B 96 29 A7
E920  0C 96 2A A7 0D 96 2B A7 0E 96 2C A7 0F 96 2D A7
E930  10 96 2E A7 11 96 2F A7 12 96 30 A7 13 96 31 A7
E940  14 96 32 A7 15 96 33 A7 16 96 34 A7 17 DE 16 A6
E950  03 A1 04 27 07 8B 02 A7 03 7E E9 60 A6 05 A7 03
E960  39 DE 06 A6 11 81 20 22 02 6C 11 39 7E E9 72 00
E970  00 00 DE 06 86 1E A7 08 CE E2 38 DF 65 DE 06 96
E980  65 D6 66 A7 09 E7 0A 39 7E E9 8E 00 00 00 DE 06
E990  A6 1F 26 07 A6 17 A7 13 A7 15 39 A6 1D A7 19 A7
```

```
E9A0  1B 39 7E E9 A8 00 00 00 86 FF 97 1E 86 9B 97 1D
E9B0  86 E0 97 1F 86 22 97 20 86 00 97 21 97 22 97 23
E9C0  97 24 97 25 97 26 97 27 97 28 97 29 97 2A 97 2B
E9D0  97 2C 97 2D 97 2E 97 2F 97 30 97 31 97 32 97 33
E9E0  97 34 39 7E E9 E9 00 00 00 DE AD DF 1D 96 1D 8A
E9F0  98 97 1D 86 E0 97 1F 86 26 97 20 86 00 97 21 97
EA00  22 97 23 97 24 97 25 97 26 97 27 97 28 97 29 97
EA10  2A 97 2B 97 2C 97 2D 97 2E 97 2F 97 30 97 31 97
EA20  32 97 33 97 34 39 7E EA 2C 00 00 00 DE 5C DF 1D
EA30  96 1D 8A 8B 97 1D 86 E0 97 1F 86 23 97 20 86 00
EA40  97 21 97 22 97 23 97 24 97 25 97 26 97 27 97 28
EA50  97 29 97 2A 97 2B 97 2C 97 2D 97 2E 97 2F 97 30
EA60  97 31 97 32 97 33 97 34 39 7E EA 6F 00 00 00 CE
EA70  44 00 C6 FF 96 67 27 3E E1 0F 27 02 23 08 A6 02
EA80  26 04 E6 0F DF 06 EE 22 26 EE D7 0E DE 06 A6 1F
EA90  26 15 96 06 D6 07 CB 12 89 00 97 16 D7 17 DE 16
EAA0  EE 00 EE 00 DF 18 39 96 06 D6 07 CB 18 89 00 97
EAB0  16 D7 17 7E EA 9E 96 0B 26 19 E1 0F 27 02 23 0C
EAC0  A6 06 26 08 A6 02 26 04 E6 0F DF 06 EE 22 26 EA
EAD0  7E EA 8A E1 0F 27 02 23 0C A6 06 26 08 A6 02 26
EAE0  04 E6 0F DF 06 EE 22 26 EA 7E EA 8A 7E EA F2 00
EAF0  00 00 96 1D 84 03 97 10 96 1E 97 11 CE 40 00 DF
EB00  12 96 10 9A 12 97 12 96 11 97 13 DE 12 A6 00 97
EB10  1A CE D8 40 DF 1B 96 1A 0C 49 9A 1C 97 1C DE 1B
EB20  EE 00 DF 06 39 7E EB 2B 00 00 00 D6 08 0C 59 DE
EB30  16 A6 01 A1 03 27 02 CA 01 D7 08 39 7E EB 42 00
EB40  00 00 D6 22 0C 59 DE 06 A6 1F 26 05 EA 17 E7 13
EB50  39 EA 1D E7 19 39 7E EB 5C 00 00 00 DE 06 A6 0C
EB60  26 0C 6F 0B B6 AB C0 F6 AB C1 A7 0C E7 0D DE 50
EB70  08 DF 50 39 7E EB 7A 00 00 00 DE 06 EE 00 DF 1D
EB80  96 1D 8A 98 97 1D 86 E0 97 1F 96 0F 97 20 86 00
EB90  97 21 97 22 97 23 97 24 97 25 97 26 97 27 97 28
EBA0  97 29 97 2A 97 2B 97 2C 97 2D 97 2E 97 2F 97 30
EBB0  97 31 97 32 97 33 97 34 DE 06 A6 06 26 09 CE 0A
EBC0  00 DF 16 BD E8 DF 39 CE 0E 00 DF 16 BD E8 DF 39
EBD0  7E EB D6 00 00 00 DE 06 63 1F 6F 05 6F 04 39 7E
EBE0  EB E5 00 00 00 DE 06 A6 1F 26 12 A6 13 A0 17 44
EBF0  90 22 E6 11 A7 11 E0 11 25 0B E7 0F 39 A6 19 A0
EC00  1D 44 7E EB F0 86 00 A7 0F A7 11 39 00 00 00 00
EC10  00 00 00 00 00 00 00 00 00 00 00 00 00 00 00 00
EC20  00 00 00 00 00 00 00 00 00 00 00 00 00 00 00 00
EC30  00 00 00 00 00 00 00 00 00 00 00 00 00 00 00 00
EC40  00 00 00 00 00 00 00 00 00 00 00 00 00 00 00 00
EC50  00 00 00 00 00 00 00 00 00 00 00 00 00 00 00 00
EC60  00 00 00 00 00 00 00 00 00 00 00 00 00 00 00 00
EC70  00 00 00 00 00 00 00 00 00 00 00 00 00 00 00 00
EC80  00 00 00 00 00 00 00 00 00 00 00 00 00 00 00 00
EC90  00 00 00 00 00 00 00 00 00 00 00 00 00 00 00 00
ECA0  00 00 00 00 00 00 00 00 00 00 00 00 00 00 00 00
ECB0  00 00 00 00 00 00 00 00 00 00 00 00 00 00 00 00
ECC0  00 00 00 00 00 00 00 00 00 00 00 00 00 00 00 00
ECD0  00 00 00 00 00 00 00 00 00 00 00 00 00 00 00 00
ECE0  00 00 00 00 00 00 00 00 00 00 00 00 00 00 00 00
ECF0  00 00 00 00 00 00 00 00 00 00 00 00 00 00 00 00
ED00  00 00 00 00 00 00 00 00 00 00 00 00 00 00 00 00
ED10  00 00 00 00 00 00 00 00 00 00 00 00 00 00 00 00
ED20  00 00 00 00 00 00 00 00 00 00 00 00 00 00 00 00
ED30  00 00 00 00 00 00 00 00 00 00 00 00 00 00 00 00
ED40  00 00 00 00 00 00 00 00 00 00 00 00 00 00 00 00
ED50  00 00 00 00 00 00 00 00 00 00 00 00 00 00 00 00
ED60  00 00 00 00 00 00 00 00 00 00 00 00 00 00 00 00
ED70  00 00 00 00 00 00 00 00 00 00 00 00 00 00 00 00
ED80  00 00 00 00 00 00 00 00 00 00 00 00 00 00 00 00
ED90  00 00 00 00 00 00 00 00 00 00 00 00 00 00 00 00
EDA0  00 00 00 00 00 00 00 00 00 00 00 00 00 00 00 00
EDB0  00 00 00 00 00 00 00 00 00 00 00 00 00 00 00 00
EDC0  00 00 00 00 00 00 00 00 00 00 00 00 00 00 00 00
EDD0  00 00 00 00 00 00 00 00 00 00 00 00 00 00 00 00
EDE0  00 00 00 00 00 00 00 00 00 00 00 00 00 00 00 00
EDF0  00 00 00 00 00 00 00 00 00 00 00 00 00 00 00 00
EE00

F600  00 00 00 00 00 00 00 00 00 00 00 00 00 00 00 00
F610  00 00 00 00 00 00 00 00 00 00 00 00 00 00 00 00
```

```
F620 00 00 00 00 00 00 00 00 00 00 00 00 00 00 00 00
F630 00 00 00 00 00 00 00 00 00 00 00 00 00 00 00 00
F640 00 00 00 00 00 00 00 00 00 00 00 00 00 00 00 00
F650 00 00 00 00 00 00 00 00 00 00 00 00 00 00 00 00
F660 00 00 00 00 00 00 00 00 00 00 00 00 00 00 00 00
F670 00 00 00 00 00 00 00 00 00 00 00 00 00 00 00 00
F680 00 00 00 00 00 00 00 00 00 00 00 00 00 00 00 00
F690 00 00 00 00 00 00 00 00 00 00 00 00 00 00 00 00
F6A0 00 00 00 00 00 00 00 00 00 00 00 00 00 00 00 00
F6B0 00 00 00 00 00 00 00 00 00 00 00 00 00 00 00 00
F6C0 48 8C 48 A4 48 BC 48 D4 48 EC 49 04 49 1C 49 34
F6D0 49 4C 49 64 49 7C 49 94 49 AC 49 C4 49 DC 49 F4
F6E0 4A 0C 4A 24 4A 3C 4A 54 4A 6C 4A 84 4A 9C 4A B4
F6F0 4A CC 4A E4 4A FC 4B 14 4B 2C 4B 44 4B 5C 4B 74
F700 4B 8C 4B A4 4B BC 4B D4 4B EC 4C 04 4C 1C 4C 34
F710 4C 4C 4C 64 4C 7C 4C 94 4C AC 4C C4 4C DC 4C F4
F720 4D 0C 4D 24 4D 3C 4D 54 4D 6C 4D 84 4D 9C 4D B4
F730 4D CC 4D E4 4D FC 4E 14 4E 2C 4E 44 4E 5C 4E 74
F740 4E 8C 4E A4 4E BC 4E D4 4E EC 4F 04 4F 1C 4F 34
F750 4F 4C 4F 64 4F 7C 4F 94 4F AC 4F C4 4F DC 4F F4
F760 50 0C 50 24 50 3C 50 54 50 6C 50 84 50 9C 50 B4
F770 50 CC 50 E4 50 FC 51 14 51 2C 51 44 51 5C 51 74
F780 51 8C 51 A4 51 BC 51 D4 51 EC 52 04 52 1C 52 34
F790 52 4C 52 64 52 7C 52 94 52 AC 52 C4 52 DC 52 F4
F7A0 53 0C 53 24 53 3C 53 54 53 6C 53 84 53 9C 53 B4
F7B0 53 CC 53 E4 53 FC 54 14 54 2C 54 44 54 5C 54 74
F7C0 54 8C 54 A4 54 BC 54 D4 54 EC 55 04 55 1C 55 34
F7D0 55 4C 55 64 55 7C 55 94 55 AC 55 C4 55 DC 55 F4
F7E0 56 0C 56 24 56 3C 56 54 56 6C 56 84 56 9C 56 B4
F7F0 56 CC 56 E4 56 FC 57 14 57 2C 57 44 57 5C 57 74
F800 57 8C 57 A4 57 BC 57 D4 57 EC 58 04 58 1C 58 34
F810 58 4C 58 64 58 7C 58 94 58 AC 58 C4 58 DC 58 F4
F820 59 0C 59 24 59 3C 59 54 59 6C 59 84 59 9C 59 B4
F830 59 CC 59 E4 59 FC 5A 14 5A 2C 5A 44 5A 5C 5A 74
F840 5A 8C 5A A4 5A BC 5A D4 5A EC 5B 04 5B 1C 5B 34
F850 5B 4C 5B 64 5B 7C 5B 94 5B AC 5B C4 5B DC 5B F4
F860 5C 0C 5C 24 5C 3C 5C 54 5C 6C 5C 84 5C 9C 5C B4
F870 5C CC 5C E4 5C FC 5D 14 5D 2C 5D 44 5D 5C 5D 74
F880 5D 8C 5D A4 5D BC 5D D4 5D EC 5E 04 5E 1C 5E 34
F890 5E 4C 5E 64 5E 7C 5E 94 5E AC 5E C4 5E DC 5E F4
F8A0 5F 0C 5F 24 5F 3C 5F 54 5F 6C 5F 84 5F 9C 5F B4
F8B0 5F CC 5F E4 5F FC 60 14 60 2C 60 44 60 5C 60 74
F8C0 60 8C 60 A4 60 BC 60 D4 60 EC 61 04 61 1C 61 34
F8D0 61 4C 61 64 61 7C 61 94 61 AC 61 C4 61 DC 61 F4
F8E0 62 0C 62 24 62 3C 62 54 62 6C 62 84 62 9C 62 B4
F8F0 62 CC 62 E4 62 FC 63 14 63 2C 63 44 63 5C 63 74
F900 63 8C 63 A4 63 BC 63 D4 63 EC 64 04 64 1C 64 34
F910 64 4C 64 64 64 7C 64 94 64 AC 64 C4 64 DC 64 F4
F920 65 0C 65 24 65 3C 65 54 65 6C 65 84 65 9C 65 B4
F930 65 CC 65 E4 65 FC 66 14 66 2C 66 44 66 5C 66 74
F940 66 8C 66 A4 66 BC 66 D4 66 EC 67 04 67 1C 67 34
F950 67 4C 67 64 67 7C 67 94 67 AC 67 C4 67 DC 67 F4
F960 68 0C 68 24 68 3C 68 54 68 6C 68 84 68 9C 68 B4
F970 68 CC 68 E4 68 FC 69 14 69 2C 69 44 69 5C 69 74
F980 69 8C 69 A4 69 BC 69 D4 69 EC 6A 04 6A 1C 6A 34
F990 6A 4C 6A 64 6A 7C 6A 94 6A AC 6A C4 6A DC 6A F4
F9A0 6B 0C 6B 24 6B 3C 6B 54 6B 6C 6B 84 6B 9C 6B B4
F9B0 6B CC 6B E4 6B FC 6C 14 6C 2C 6C 44 6C 5C 6C 74
F9C0 6C 8C 6C A4 6C BC 6C D4 6C EC 6D 04 6D 1C 6D 34
F9D0 6D 4C 6D 64 6D 7C 6D 94 6D AC 6D C4 6D DC 6D F4
F9E0 6E 0C 6E 24 6E 3C 6E 54 6E 6C 6E 84 6E 9C 6E B4
F9F0 6E CC 6E E4 6E FC 6F 14 6F 2C 6F 44 6F 5C 6F 74
FA00 6F 8C 6F A4 6F BC 6F D4 6F EC 70 04 70 1C 70 34
FA10 70 4C 70 64 70 7C 70 94 70 AC 70 C4 70 DC 70 F4
FA20 71 0C 71 24 71 3C 71 54 71 6C 71 84 71 9C 71 B4
FA30 71 CC 71 E4 71 FC 72 14 72 2C 72 44 72 5C 72 74
FA40 72 8C 72 A4 72 BC 72 D4 72 EC 73 04 73 1C 73 34
FA50 73 4C 73 64 73 7C 73 94 73 AC 73 C4 73 DC 73 F4
FA60 74 0C 74 24 74 3C 74 54 74 6C 74 84 74 9C 74 B4
FA70 74 CC 74 E4 74 FC 75 14 75 2C 75 44 75 5C 75 74
FA80 75 8C 75 A4 75 BC 75 D4 75 EC 76 04 76 1C 76 34
FA90 76 4C 76 64 76 7C 76 94 76 AC 76 C4 76 DC 76 F4
FAA0 77 0C 77 24 77 3C 77 54 77 6C 77 84 77 9C 77 B4
FAB0 77 CC 77 E4 77 FC 78 14 78 2C 78 44 78 5C 78 74
```

```
FAC0  78 8C  78 A4  78 BC  78 D4  78 EC  79 04  79 1C  79 34
FAD0  79 4C  79 64  79 7C  79 94  79 AC  79 C4  79 DC  79 F4
FAE0  7A 0C  7A 24  7A 3C  7A 54  7A 6C  7A 84  7A 9C  7A B4
FAF0  7A CC  7A E4  7A FC  7B 14  7B 2C  7B 44  7B 5C  7B 74
FB00  7B 8C  7B A4  7B BC  7B D4  7B EC  7C 04  7C 1C  7C 34
FB10  7C 4C  7C 64  7C 7C  7C 94  7C AC  7C C4  7C DC  7C F4
FB20  7D 0C  7D 24  7D 3C  7D 54  7D 6C  7D 84  7D 9C  7D B4
FB30  7D CC  7D E4  7D FC  7E 14  7E 2C  7E 44  7E 5C  7E 74
FB40  7E 8C  7E A4  7E BC  7E D4  7E EC  7F 04  7F 1C  7F 34
FB50  7F 4C  7F 64  7F 7C  7F 94  7F AC  7F C4  7F DC  7F F4
FB60  80 0C  80 24  80 3C  80 54  80 6C  80 84  80 9C  80 B4
FB70  80 CC  80 E4  80 FC  81 14  81 2C  81 44  81 5C  81 74
FB80  81 8C  81 A4  81 BC  81 D4  81 EC  82 04  82 1C  82 34
FB90  82 4C  82 64  82 7C  82 94  82 AC  82 C4  82 DC  82 F4
FBA0  83 0C  83 24  83 3C  83 54  83 6C  83 84  83 9C  83 B4
FBB0  83 CC  83 E4  83 FC  84 14  84 2C  84 44  84 5C  84 74
FBC0  84 8C  84 A4  84 BC  84 D4  84 EC  85 04  85 1C  85 34
FBD0  85 4C  85 64  85 7C  85 94  85 AC  85 C4  85 DC  85 F4
FBE0  86 0C  86 24  86 3C  86 54  86 6C  86 84  86 9C  86 B4
FBF0  86 CC  86 E4  86 FC  87 14  87 2C  87 44  87 5C  87 74
FC00  87 8C  87 A4  87 BC  87 D4  87 EC  88 04  88 1C  88 34
FC10  88 4C  88 64  88 7C  88 94  88 AC  88 C4  88 DC  88 F4
FC20  89 0C  89 24  89 3C  89 54  89 6C  89 84  89 9C  89 B4
FC30  89 CC  89 E4  89 FC  8A 14  8A 2C  8A 44  8A 5C  8A 74
FC40  8A 8C  8A A4  8A BC  8A D4  8A EC  8B 04  8B 1C  8B 34
FC50  8B 4C  8B 64  8B 7C  8B 94  8B AC  8B C4  8B DC  8B F4
FC60  8C 0C  8C 24  8C 3C  8C 54  8C 6C  8C 84  8C 9C  8C B4
FC70  8C CC  8C E4  8C FC  8D 14  8D 2C  8D 44  8D 5C  8D 74
FC80  8D 8C  8D A4  8D BC  8D D4  8D EC  8E 04  8E 1C  8E 34
FC90  8E 4C  8E 64  8E 7C  8E 94  8E AC  8E C4  8E DC  8E F4
FCA0  8F 0C  8F 24  8F 3C  8F 54  8F 6C  8F 84  8F 9C  8F B4
FCB0  8F CC  8F E4  8F FC  90 14  90 2C  90 44  90 5C  90 74
FCC0  90 8C  90 A4  90 BC  90 D4  90 EC  91 04  91 1C  91 34
FCD0  91 4C  91 64  91 7C  91 94  91 AC  91 C4  91 DC  91 F4
FCE0  92 0C  92 24  92 3C  92 54  92 6C  92 84  92 9C  92 B4
FCF0  92 CC  92 E4  92 FC  93 14  93 2C  93 44  93 5C  93 74
FD00  93 8C  93 A4  93 BC  93 D4  93 EC  94 04  94 1C  94 34
FD10  94 4C  94 64  94 7C  94 94  94 AC  94 C4  94 DC  94 F4
FD20  95 0C  95 24  95 3C  95 54  95 6C  95 84  95 9C  95 B4
FD30  95 CC  95 E4  95 FC  96 14  96 2C  96 44  96 5C  96 74
FD40  96 8C  96 A4  96 BC  96 D4  96 EC  97 04  97 1C  97 34
FD50  97 4C  97 64  97 7C  97 94  97 AC  97 C4  97 DC  97 F4
FD60  98 0C  98 24  98 3C  98 54  98 6C  98 84  98 9C  98 B4
FD70  98 CC  98 E4  98 FC  99 14  99 2C  99 44  99 5C  99 74
FD80  99 8C  99 A4  99 BC  99 D4  99 EC  9A 04  9A 1C  9A 34
FD90  9A 4C  9A 64  9A 7C  9A 94  9A AC  9A C4  9A DC  9A F4
FDA0  9B 0C  9B 24  9B 3C  9B 54  9B 6C  9B 84  9B 9C  9B B4
FDB0  9B CC  9B E4  9B FC  9C 14  9C 2C  9C 44  9C 5C  9C 74
FDC0  9C 8C  9C A4  9C BC  9C D4  9C EC  9D 04  9D 1C  9D 34
FDD0  9D 4C  9D 64  9D 7C  9D 94  9D AC  9D C4  9D DC  9D F4
FDE0  9E 0C  9E 24  9E 3C  9E 54  9E 6C  9E 84  9E 9C  9E B4
FDF0  9E CC  9E E4  9E FC  9F 14  9F 2C  9F 44  9F 5C  9F 74
FE00  9F 8C  9F A4  9F BC  9F D4  9F EC  A0 04  A0 1C  A0 34
FE10  A0 4C  A0 64  A0 7C  A0 94  A0 AC  A0 C4  A0 DC  A0 F4
FE20  A1 0C  A1 24  A1 3C  A1 54  A1 6C  A1 84  A1 9C  A1 B4
FE30  A1 CC  A1 E4  A1 FC  A2 14  A2 2C  A2 44  A2 5C  A2 74
FE40  A2 8C  A2 A4  A2 BC  A2 D4  A2 EC  A3 04  A3 1C  A3 34
FE50  A3 4C  A3 64  A3 7C  A3 94  A3 AC  A3 C4  A3 DC  A3 F4
FE60  A4 0C  A4 24  A4 3C  A4 54  A4 6C  A4 84  A4 9C  A4 B4
FE70  A4 CC  A4 E4  A4 FC  A5 14  A5 2C  A5 44  A5 5C  A5 74
FE80  A5 8C  A5 A4  A5 BC  A5 D4  A5 EC  A6 04  A6 1C  A6 34
FE90  A6 4C  A6 64  A6 7C  A6 94  A6 AC  A6 C4  A6 DC  A6 F4
FEA0  A7 0C  A7 24  A7 3C  A7 54  A7 6C  A7 84  A7 9C  A7 B4
FEB0  A7 CC  A7 E4  A7 FC  A8 14  A8 2C  A8 44  A8 5C  A8 74
FEC0  A8 8C  A8 A4  A8 BC  A8 D4  A8 EC  A9 04  A9 1C  A9 34
FED0  A9 4C  A9 64  A9 7C  A9 94  A9 AC  A9 C4  A9 DC  A9 F4
FEE0  AA 0C  AA 24  AA 3C  AA 54  AA 6C  AA 84  AA 9C  AA B4
FEF0  00 00  00 00  00 00  00 00  00 00  00 00  00 00  00 00
FF00  AA CC  AA E4  AA FC  AB 14  AB 2C  AB 44  AB 5C  AB 74
FF10  AB 8C  AB A4  00 00  00 00  00 00  00 00  00 00  00 00
FF20  00 00  00 00  00 00  00 00  00 00  00 00  00 00  00 00
FF30  00 00  00 00  00 00  00 00  00 00  00 00  00 00  00 00
FF40  0A 0C  0A 24  0A 3C  0A 54  0A 6C  0A 84  0A 9C  0A B4
FF50  0A CC  0A E4  00 00  00 00  00 00  00 00  00 00  00 00
```

```
FF60 0E 0C 0E 24 0E 3C 0E 54 0E 6C 0E 84 0E 9C 0E B4
FF70 0E CC 0E E4 00 00 00 00 00 00 00 00 00 00 00 00
FF80 08 06 08 1E 08 36 08 4E 08 66 08 7E 08 96 08 AE
FF90 08 C6 08 DE 00 00 00 00 00 00 00 00 00 00 00 00
FFA0 0C 06 0C 1E 0C 36 0C 4E 0C 66 0C 7E 0C 96 0C AE
FFB0 0C C6 0C DE 00 00 00 00 00 00 00 00 00 00 00 00
FFC0 00 00 00 00 00 00 00 00 00 00 00 00 00 00 00 00
FFD0 00 00 00 00 00 00 00 00 00 00 00 00 00 00 00 00
FFE0 00 00 00 00 00 00 00 00 00 00 00 00 00 00 00 7E
FFF0 FF EF 7E FF F2 7E FF F5 FF EF FF F2 FF F5 E6 DD
0000
```

OE96NE AND OE96NW NODES

```
F500 80 00 00 00 00 00 00 00 00 00 00 00 00 00 00 00
F510 F8 8F F8 89 F8 83 F8 D1 F8 E8 F8 DE F8 D4 F8 D1
F520 00 CF 00 D3 00 E7 00 F3 00 70 00 80 00 00 DE 1D
F530 DF 39 DE 1F DF 33 DE 21 DF 3D DE 23 DF 3F DE 25
F540 DF 41 DE 27 DF 43 DE 29 DF 45 DE 2B DF 47 DE 2D
F550 DF 49 DE 2F DF 4B DE 31 DF 4D DE 33 DF 4F 7E FC
F560 10 D6 5E 59 89 00 CB 08 89 00 97 5F D7 60 CE F6
F570 87 DF 61 7E F6 76 7E F6 7C 00 00 00 96 21 37 20
F580 FD 7C 00 21 7E F9 0D 7E F6 8D 00 00 00 DE 39 DF
F590 1D DE 3B DF 1F DE 3D DF 21 DE 3F DF 23 DE 41 DF
F5A0 25 DE 43 DF 27 DE 45 DF 29 DE 47 DF 2B DE 49 DF
F5B0 2D DE 4B DF 2F DE 4D DF 31 DE 4F DF 33 96 20 27
F5C0 1C 81 01 27 24 81 02 27 2C 81 03 27 34 81 04 27
F5D0 3C DE 5B DF 26 CE 00 00 DF 5B 7E F7 19 DE 51 DF
F5E0 25 CE 00 00 DF 51 7E F7 19 DE 53 DF 25 CE 00 00
F5F0 DF 53 7E F7 19 DE 55 DF 26 CE 00 00 DF 55 7E F7
F600 19 DE 57 DF 26 CE 00 00 DF 57 7E F7 19 DE 59 DF
F610 26 CE 00 00 DF 59 7E F7 19 96 1D 84 EF 97 1D DE
F620 5D DF 22 7F 00 21 CE 00 00 DF 24 BD FB 48 CE 20
F630 05 DF 16 BD F9 F0 7E F7 39 7E F7 3F 00 00 00 DE
F640 09 B6 20 FD A7 04 A3 0B A7 0B 7E F7 4D 7E F7 53
F650 00 00 00 DE 09 A6 05 8A 60 A7 05 A6 0B 83 60 A7
F660 03 7E 00 00 7E F7 6A 00 00 00 DE 35 EE 00 FF C0
F670 11 96 36 83 02 97 36 96 37 81 05 27 31 81 00 26
F680 34 7E FC 00 F6 0C 27 16 36 20 07 31 20 0A 27 05
F690 83 02 B7 20 07 7E F7 9E B6 20 0B B7 20 07 36 20
F6A0 09 B1 20 07 27 13 FE 20 06 EE 00 DF 35 33 7F 00
F6B0 37 7E FC 4B 33 7C 00 37 33 CE F6 00 DF 35 33 7E
F6C0 F7 C5 00 00 00 B6 00 63 27 0C DE 5F 27 05 DE 5F
F6D0 09 DF 5F 7F 00 63 7E F8 F1 7E F7 DF 00 00 00 96
F6E0 61 27 04 DE 5F 27 03 7E 00 00 DE 61 DF 14 7F 00
F6F0 61 6E 00 7E F7 F8 00 00 0C 98 49 97 03 9A 0D
F700 97 15 96 0C 97 14 DE 14 EE 00 6E 00 7E F8 12 00
F710 00 00 96 1D 84 60 27 08 DE 53 08 DF 53 7E F8 25
F720 DE 51 08 DF 51 7E F8 28 7E F8 2E 00 00 00 96 20
F730 81 28 27 0C 81 20 26 05 DE 57 08 DF 57 7E F9 21
F740 DE 55 08 DF 55 7E F9 21 7E F8 4E 00 00 00 96 1D
F750 93 1E 93 1F 93 20 93 21 93 22 93 23 93 24 93 25
F760 93 26 91 27 26 6B 5F 96 20 81 21 27 02 CA 01 7E
F770 FC 17 23 84 03 97 23 DA 23 D7 08 CE F6 10 DF 0C
F780 7E F7 F3 DE 21 A6 02 97 25 DE 21 A6 01 97 25 DE
F790 21 A6 00 97 24 96 1D 84 EF 97 1D 85 25 97 20 96
F7A0 1D 93 1E 93 1F 93 20 93 21 93 22 93 23 93 24 93
F7B0 25 93 26 97 27 86 00 97 28 97 29 97 2A 97 2B 97
F7C0 2C 97 2D 97 2E 97 2F 97 30 97 31 97 32 97 33 97
F7D0 34 7E F9 0D DE 21 96 26 A7 02 A6 02 97 25 DE 21
F7E0 96 25 A7 01 A6 01 97 25 DE 21 96 24 A7 00 7E F3
F7F0 8F 7E FC 43 00 00 00 B6 20 01 B1 20 03 27 0B CE
F800 20 00 DF 16 BD FA C6 7E F8 0C 7E F7 D9 7E F9 13
F810 00 00 00 BD F3 48 CE 20 05 DF 16 BD F9 F0 7E F7
F820 D9 7E F9 27 00 00 00 96 1E 81 FF 26 09 96 1D 84
F830 10 26 22 7E F9 52 96 1D 84 03 91 5D 25 14 96 1E
F840 91 5E 26 0E 96 20 81 29 27 0E 81 21 27 0D 81 23
F850 27 09 7E F9 0D 7E F6 2E 7E F9 5E 7E F8 43 7E F9
```

```
F960 64 00 00 00 96 1D 93 1E 93 1F 93 20 93 21 93 22
F970 9B 23 93 24 93 25 93 26 91 27 26 03 7E F9 7C 7E
F980 F7 D9 8E 00 CE FE F9 9C DF 00 B6 F9 9E 97 02 7E
F990 F9 9F DF 03 B6 F9 A1 97 05 7E F9 A2 37 C0 1E 7E
F9A0 F7 BF 7E F9 A5 7E F9 A3 00 00 00 CE 00 06 86 00
F9B0 A7 00 08 8C 02 00 26 F8 CE F6 2A FF 20 03 35 20
F9C0 07 37 20 0A CE F6 20 FF 20 06 FF 20 08 36 20 07
F9D0 B7 20 03 85 FF 97 0E 36 C0 0F 84 03 97 5D 35 C0
F9E0 0E 97 5E CE FF FF 37 C0 1E 09 26 FA 0E 7E 00 00
F9F0 7E F9 F6 00 00 00 DE 16 EE 02 EE 00 DF 09 96 1D
FA00 34 60 26 44 96 1D A7 00 96 1E A7 01 96 1F A7 02
FA10 96 20 A7 03 96 21 A7 04 96 22 A7 05 96 23 A7 06
FA20 96 24 A7 07 96 25 A7 08 96 26 A7 09 96 27 A7 0A
FA30 96 34 A7 0B DE 16 A6 03 A1 04 27 07 89 02 A7 03
FA40 7E FA 47 A6 05 A7 03 39 96 1D A7 00 96 1E A7 01
FA50 96 20 A7 02 96 21 A7 03 96 22 A7 04 96 23 A7 05
FA60 96 24 A7 06 96 25 A7 07 96 26 A7 08 96 27 A7 09
FA70 96 28 A7 0A 96 29 A7 0B DE 16 A6 03 A1 04 27 07
FA80 83 02 A7 03 7E FA 8B A6 05 A7 03 DE 16 EE 02 EE
FA90 00 DF 09 96 1F A7 00 96 2A A7 01 96 2B A7 02 96
FAA0 2C A7 03 96 2D A7 04 96 2E A7 05 96 2F A7 06 96
FAB0 30 A7 07 96 31 A7 08 96 32 A7 09 96 33 A7 0A 96
FAC0 34 A7 0B 7E FA 34 7E FA CC 00 00 00 DE 16 EE 00
FAD0 EE 00 DF 15 A6 00 97 1D A6 01 97 1E A6 02 97 1F
FAE0 A6 03 97 20 A6 04 97 21 A6 05 97 22 A6 06 97 23
FAF0 A6 07 97 24 A6 08 97 25 A6 09 97 26 A6 0A 97 27
FB00 A6 0B 97 28 A6 0C 97 29 A6 0D 97 2A A6 0E 97 2B
FB10 A6 0F 97 2C A6 10 97 2D A6 11 97 2E A6 12 97 2F
FB20 A6 13 97 30 A6 14 97 31 A6 15 97 32 A6 16 97 33
FB30 A6 17 97 34 DE 16 A6 01 A1 04 27 07 8B 02 A7 01
FB40 7E FB 47 A6 05 A7 01 39 7E FB 4E 00 00 00 96 1D
FB50 9B 1E 9B 1F 9B 20 9B 21 9B 22 9B 23 9B 24 9B 25
FB60 9B 26 9B 27 9B 28 9B 29 9B 2A 9B 2B 9B 2C 9B 2D
FB70 9B 2E 9B 2F 9B 30 9B 31 9B 32 9B 33 97 34 39 B9
FB80 00 00 00 00 00 00 00 00 00 00 00 00 00 00 00 00
FB90 00 00 00 00 00 00 00 00 00 00 00 00 00 00 00 00
FBA0 00 00 00 00 00 00 00 00 00 00 00 00 00 00 00 00
FBB0 00 00 00 00 00 00 00 00 00 00 00 00 00 00 00 00
FBC0 00 00 00 00 00 00 00 00 00 00 00 00 00 00 00 00
FBD0 00 00 00 00 00 00 00 00 00 00 00 00 00 00 00 00
FBE0 00 00 00 00 00 00 00 00 00 00 00 00 00 00 00 00
FBF0 00 00 00 00 00 00 00 00 00 00 00 00 00 00 00 00
FC00 7C 00 37 DE 35 8C F6 0C 27 03 7E F7 88 7E F7 9E
FC10 96 5D 0C 49 7E F6 61 0C 59 59 96 23 7E F8 73 B5
FC20 20 09 B1 00 05 27 02 23 0A B1 20 05 B1 02 22 10
FC30 7E FC 3D B1 20 03 26 03 B1 20 0A 26 03 7E F8 F7
FC40 7E F9 0A B5 20 07 97 05 7E FC 1F 86 01 B7 20 FC
FC50 97 63 7E F7 B4 00 00 00 00 00 00 00 00 00 00 00
FC60 00 00 00 00 00 00 00 00 00 00 00 00 00 00 00 00
FC70 00 00 00 00 00 00 00 00 00 00 00 00 00 00 00 00
FC80 00 00 00 00 00 00 00 00 00 00 00 00 00 00 00 00
FC90 00 00 00 00 00 00 00 00 00 00 00 00 00 00 00 00
FCA0 00 00 00 00 00 00 00 00 00 00 00 00 00 00 00 00
FCB0 00 00 00 00 00 00 00 00 00 00 00 00 00 00 00 00
FCC0 00 00 00 00 00 00 00 00 00 00 00 00 00 00 00 00
FCD0 00 00 00 00 00 00 00 00 00 00 00 00 00 00 00 00
FCE0 00 00 00 00 00 00 00 00 00 00 00 00 00 00 00 00
FCF0 00 00 00 00 00 00 00 00 00 00 00 00 00 00 00 00
FD00 00 00 00 00 00 00 00 00 00 00 00 00 00 00 00 00
FD10 00 00 00 00 00 00 00 00 00 00 00 00 00 00 00 00
FD20 00 00 00 00 00 00 00 00 00 00 00 00 00 00 00 00
FD30 00 00 00 00 00 00 00 00 00 00 00 00 00 00 00 00
FD40 00 00 00 00 00 00 00 00 00 00 00 00 00 00 00 00
FD50 00 00 00 00 00 00 00 00 00 00 00 00 00 00 00 00
FD60 00 00 00 00 00 00 00 00 00 00 00 00 00 00 00 00
FD70 00 00 00 00 00 00 00 00 00 00 00 00 00 00 00 00
FD80 00 00 00 00 00 00 00 00 00 00 00 00 00 00 00 00
FD90 00 00 00 00 00 00 00 00 00 00 00 00 00 00 00 00
FDA0 00 00 00 00 00 00 00 00 00 00 00 00 00 00 00 00
FDB0 00 00 00 00 00 00 00 00 00 00 00 00 00 00 00 00
FDC0 00 00 00 00 00 00 00 00 00 00 00 00 00 00 00 00
FDD0 00 00 00 00 00 00 00 00 00 00 00 00 00 00 00 00
FDE0 00 00 00 00 00 00 00 00 00 00 00 00 00 00 00 00
FDF0 00 00 00 00 00 00 00 00 00 00 00 00 00 00 00 00
```

```
FE00 00 00 00 00 00 00 00 00 00 00 00 00 00 00 00 00
FE10 00 00 00 00 00 00 00 00 00 00 00 00 00 00 00 00
FE20 00 00 00 00 00 00 00 00 00 00 00 00 00 00 00 00
FE30 00 00 00 00 00 00 00 00 00 00 00 00 00 00 00 00
FE40 00 00 00 00 00 00 00 00 00 00 00 00 00 00 00 00
FE50 00 00 00 00 00 00 00 00 00 00 00 00 00 00 00 00
FE60 00 00 00 00 00 00 00 00 00 00 00 00 00 00 00 00
FE70 00 00 00 00 00 00 00 00 00 00 00 00 00 00 00 00
FE80 00 00 00 00 00 00 00 00 00 00 00 00 00 00 00 00
FE90 00 00 00 00 00 00 00 00 00 00 00 00 00 00 00 00
FEA0 00 00 00 00 00 00 00 00 00 00 00 00 00 00 00 00
FEB0 00 00 00 00 00 00 00 00 00 00 00 00 00 00 00 00
FEC0 00 00 00 00 00 00 00 00 00 00 00 00 00 00 00 00
FED0 00 00 00 00 00 00 00 00 00 00 00 00 00 00 00 00
FEE0 00 00 00 00 00 00 00 00 00 00 00 00 00 00 00 00
FEF0 00 00 00 00 00 00 00 00 00 00 00 00 00 00 00 00
FF00 00 00 00 00 00 00 00 00 00 00 00 00 00 00 00 00
FF10 00 00 00 00 00 00 00 00 00 00 00 00 00 00 00 00
FF20 00 00 00 00 00 00 00 00 00 00 00 00 00 00 00 00
FF30 00 00 00 00 00 00 00 00 00 00 00 00 00 00 00 00
FF40 20 0C 20 24 20 3C 20 54 20 6C 20 84 20 9C 20 B4
FF50 20 CC 20 E4 00 00 00 00 00 00 00 00 00 00 00 00
FF60 20 0C 20 24 20 3C 20 54 20 6C 20 84 20 9C 20 B4
FF70 20 CC 20 E4 00 00 00 00 00 00 00 00 00 00 00 00
FF80 8D 00 00 00 00 00 00 00 00 00 00 00 00 00 00 00
FF90 00 00 00 00 00 00 00 00 00 00 00 00 00 00 00 00
FFA0 00 00 00 00 00 00 00 00 00 00 00 00 00 00 00 00
FFB0 00 00 00 00 00 00 00 00 00 00 00 00 00 00 00 00
FFC0 00 00 00 00 00 00 00 00 00 00 00 00 00 00 00 00
FFD0 00 00 00 00 00 00 00 00 00 00 00 00 00 00 00 00
FFE0 00 00 00 00 00 00 00 00 00 00 00 00 00 00 00 00
FFF0 00 00 7E FF F2 7E FF F5 F7 64 FF F2 FF F5 F9 82
0000
```

IE96NE AND IE96NW NODES

```
F500 F8 34 F8 2E F8 28 F8 76 F8 8D F8 83 F8 79 F8 76
F510 00 CF 00 DB 00 E7 00 F3 7E F6 1E 00 00 00 DE 1D
F520 DF 3F DE 1F DF 41 DE 21 DF 43 DE 23 DF 45 DE 25
F530 DF 47 DE 27 DF 49 DE 29 DF 4B DE 23 DF 4D DE 2D
F540 DF 4F DE 2F DF 51 DE 31 DF 53 DE 33 DF 55 7E FC
F550 36 D6 64 59 89 00 CB 08 89 00 97 65 D7 66 CE F6
F560 77 DF 67 7E F6 66 7E F6 6C 00 00 00 96 21 B7 20
F570 F7 7C 00 21 7E F7 47 7E F6 7D 00 00 00 DE 3F DF
F580 1D DE 41 DF 1F DE 43 DF 21 DE 45 DF 23 DE 47 DF
F590 25 DE 49 DF 27 DE 4B DF 29 DE 4D DF 23 DE 4F DF
F5A0 2D DE 51 DF 2F DE 53 DF 31 DE 55 DF 33 96 20 27
F5B0 1C 81 01 27 24 81 02 27 2C 81 03 27 34 81 04 27
F5C0 3C DE 61 DF 25 CE 00 00 DF 61 7E F7 09 DE 57 DF
F5D0 26 CE 00 00 DF 57 7E F7 09 DE 59 DF 26 CE 00 00
F5E0 DF 59 7E F7 09 DE 5B DF 26 CE 00 00 DF 5B 7E F7
F5F0 09 DE 5D DF 26 CE 00 00 DF 5D 7E F7 09 DE 5F DF
F700 26 CE 00 00 DF 5F 7E F7 09 96 1D 84 EF 97 1D DE
F710 63 DF 22 7F 00 21 CE 00 00 DF 24 CE 20 00 DF 16
F720 BD FA 4E 7E F7 25 7E F7 2C 00 00 00 DE 09 36 20
F730 F7 A7 04 7E F7 36 7E F7 3C 00 00 00 DE 09 86 50
F740 AA 05 A7 05 7E F7 47 7E F7 4D 00 00 00 B6 20 F6
F750 27 0C DE 65 27 05 DE 65 09 DF 65 7F 20 F6 7E F8
F760 96 7E F7 57 00 00 00 96 67 27 04 DE 65 27 03 7E
F770 00 00 DE 67 DF 14 7F 00 67 6E 00 7E F7 80 00 00
F780 0C 96 08 49 97 08 9A 0D 97 15 96 0C 97 14 DE 14
F790 EE 00 6E 00 7E F7 9A 00 00 00 DE 53 08 DF 53 7E
F7A0 F7 61 7E F7 A8 00 00 00 DE 57 08 DF 57 7E F7 BE
F7B0 7E F7 B6 00 00 00 DE 59 08 DF 59 7E F7 61 7E F7
F7C0 C4 00 00 00 96 20 81 21 27 03 81 22 27 0F 81 20
F7D0 27 13 7E F8 C3 DE 5D 08 DF 5D 7E F8 C3 DE 5F 08
F7E0 DF 5F 7E F8 C3 DE 61 08 DF 61 7E F8 C3 7E F7 F3
F7F0 00 00 00 96 1D 9B 1E 9B 1F 9B 20 9B 21 9B 22 9B
```

```
F800 23 9B 24 9B 25 9B 26 91 27 26 6B 5F 95 20 81 21
F810 27 02 CA 01 7E FC 3D 23 84 03 97 23 DA 23 D7 03
F820 CE F6 00 DF 0C 7E F7 7B DE 21 A6 02 97 26 DE 21
F830 A6 01 97 25 DE 21 A6 00 97 24 96 1D 84 EF 97 1D
F840 86 25 97 20 96 1D 9B 1E 9B 1F 9B 20 9B 21 9B 22
F850 9B 23 9B 24 9B 25 9B 26 97 27 86 00 97 28 97 29
F860 97 2A 97 2B 97 2C 97 2D 97 2E 97 2F 97 30 97 31
F870 97 32 97 33 97 34 7E F8 BA DE 21 96 25 A7 02 A6
F880 02 97 25 DE 21 96 25 A7 01 A6 01 97 25 DE 21 96
F890 24 A7 00 7E F8 34 7E F8 9C 00 00 00 96 39 91 33
F8A0 27 12 CE 00 33 DF 16 BD FB 12 BD FA D0 96 08 26
F8B0 06 7E F7 A2 7E F7 61 7E F7 B0 7E F8 C0 00 00 00
F8C0 CE 20 00 DF 16 BD FA 4E 7E F7 61 7E F8 D1 00 00
F8D0 00 96 1E 81 FF 26 09 96 1D 84 10 26 22 7E FB FC
F8E0 96 1D 84 03 91 63 26 14 96 1E 91 64 26 0E 96 20
F8F0 81 29 27 0E 81 21 27 0D 81 23 27 09 7E F9 08 7E
F900 F6 18 7E F9 36 7E F7 ED 7E F9 0E 00 00 00 96 1D
F910 84 10 26 03 7E F9 1A 7E F7 94 7E F9 20 00 00 00
F920 96 3E 27 0C 96 1D 84 08 27 09 96 20 81 64 22 03
F930 7E F8 BA 7E F7 61 7E F9 3C 00 00 00 96 1D 9B 1E
F940 9B 1F 9B 20 9B 21 9B 22 9B 23 9B 24 9B 25 9B 26
F950 91 27 26 03 7E F9 54 7E F7 61 8E 00 CE FE F9 74
F960 DF 00 B6 F9 76 97 02 FE F9 77 DF 03 B6 F9 79 97
F970 05 7E F9 7A B7 C0 1E 7E F7 47 7E F9 7D 7E F9 83
F980 00 00 00 CE 00 06 86 00 A7 00 08 8C 02 00 26 F8
F990 CE F6 16 DF 38 96 39 97 3C CE F6 10 DF 3B DF 3A
F9A0 96 39 97 3D 86 FF 97 0E B6 C0 0F 84 03 97 63 B6
F9B0 C0 0E 97 64 CE FF FF B7 C0 1E 09 26 FA 0E 7E 00
F9C0 00 7E FA 19 7E F9 CA 00 00 00 44 26 F4 7E FC 21
F9D0 B6 C0 00 F6 C0 01 02 02 DE 3A EE 00 A7 00 E7 01
F9E0 08 08 DF 35 3B CE 00 00 DF 35 7E F9 C4 7E F9
F9F0 F4 00 00 00 96 37 26 F3 7C 00 37 7E FC 02 14 36
FA00 C0 00 F6 C0 01 A7 00 E7 01 96 3B 91 3C 27 05 8B
FA10 02 97 3B 95 3D 97 3B 3B 7E FA 1F 00 00 00 7E
FA20 FC 0D 0E B6 C0 00 F6 C0 01 A7 00 E7 01 08 08 DF
FA30 35 96 37 81 05 27 04 7C 00 37 3B 7F 00 37 36 C0
FA40 04 B7 C0 1E 84 07 81 05 26 F4 7E FC 1A 3B 7E FA
FA50 54 00 00 00 DE 16 EE 02 EE 00 DF 09 96 1D A7 00
FA60 96 1E A7 01 96 1F A7 02 96 20 A7 03 96 21 A7 04
FA70 96 22 A7 05 96 23 A7 06 96 24 A7 07 96 25 A7 08
FA80 96 26 A7 09 96 27 A7 0A 96 28 A7 0B 96 29 A7 0C
FA90 96 2A A7 0D 96 2B A7 0E 96 2C A7 0F 96 2D A7 10
FAA0 96 2E A7 11 96 2F A7 12 96 30 A7 13 96 31 A7 14
FAB0 96 32 A7 15 96 33 A7 16 96 34 A7 17 DE 16 A6 03
FAC0 A1 04 27 07 8B 02 A7 03 7E FA CF A6 05 A7 03 39
FAD0 7E FA D6 00 00 00 7F 00 08 96 1D 9B 1E 9B 1F 9B
FAE0 20 9B 21 9B 22 9B 23 9B 24 9B 25 9B 26 9B 27 9B
FAF0 28 9B 29 9B 2A 9B 2B 9B 2C 9B 2D 9B 2E 9B 2F 9B
FB00 30 9B 31 9B 32 9B 33 91 34 26 03 7E FB 11 7C 00
FB10 08 39 7E FB 1B 00 00 00 7E FB CF DE 16 EE 00 EE
FB20 00 DF 18 A6 00 84 60 27 4A 84 40 26 EB A6 00 97
FB30 1D A6 01 97 1E A6 02 97 20 96 03 97 21 A6 04 97
FB40 22 A6 05 97 23 A6 06 97 24 A6 07 97 25 A6 08 97
FB50 26 A6 09 97 27 A6 0A 97 28 A6 0B 97 29 DE 16 A6
FB60 01 A1 04 27 07 8B 02 A7 01 7E FB 1B A6 05 A7 01
FB70 7E FB 1B A6 00 97 1D A6 01 97 1E A6 02 97 1F A6
FB80 03 97 20 A6 04 97 21 A6 05 97 22 A6 06 97 23 A6
FB90 07 97 24 A6 08 97 25 A6 09 97 26 A6 0A 97 27 A6
FBA0 0B 97 28 86 00 97 29 97 2A 97 2B 97 2C 97 2D 97
FBB0 2D 97 2E 97 2F 97 30 97 31 97 32 97 33 DE 16 A6
FBC0 01 A1 04 27 05 8B 02 A7 01 39 A6 05 A7 01 39 A6
FBD0 00 97 1F A6 01 97 2A A6 02 97 2B A6 03 97 2C A6
FBE0 04 97 2D A6 05 97 2E A6 06 97 2F A6 07 97 30 A6
FBF0 08 97 31 A6 09 97 32 A6 0A 97 33 A6 0B 97 34 7E
FC00 FB BD DE 35 26 04 B6 C0 00 3B 7E F9 FF DE 35 25
FC10 06 36 C0 00 7E FA 31 7E FA 23 7C 2B F6 B6 C0 00
FC20 33 7C 00 37 B6 C0 00 81 30 26 05 36 C0 01 27 03
FC30 7E F9 D0 7E F9 E5 96 63 0C 49 7E F6 51 0C 59 59
FC40 96 23 7E F8 18 00 00 00 00 00 00 00 00 00 00 00
FC50 00 00 00 00 00 00 00 00 00 00 00 00 00 00 00 00
FC60 00 00 00 00 00 00 00 00 00 00 00 00 00 00 00 00
FC70 00 00 00 00 00 00 00 00 00 00 00 00 00 00 00 00
FC80 00 00 00 00 00 00 00 00 00 00 00 00 00 00 00 00
FC90 00 00 00 00 00 00 00 00 00 00 00 00 00 00 00 00
```

```
FCA0 00 00 00 00 00 00 00 00 00 00 00 00 00 00 00 00
FCB0 00 00 00 00 00 00 00 00 00 00 00 00 00 00 00 00
FCC0 00 00 00 00 00 00 00 00 00 00 00 00 00 00 00 00
FCD0 00 00 00 00 00 00 00 00 00 00 00 00 00 00 00 00
FCE0 00 00 00 00 00 00 00 00 00 00 00 00 00 00 00 00
FCF0 00 00 00 00 00 00 00 00 00 00 00 00 00 00 00 00
FD00 00 00 00 00 00 00 00 00 00 00 00 00 00 00 00 00
FD10 00 00 00 00 00 00 00 00 00 00 00 00 00 00 00 00
FD20 00 00 00 00 00 00 00 00 00 00 00 00 00 00 00 00
FD30 00 00 00 00 00 00 00 00 00 00 00 00 00 00 00 00
FD40 00 00 00 00 00 00 00 00 00 00 00 00 00 00 00 00
FD50 00 00 00 00 00 00 00 00 00 00 00 00 00 00 00 00
FD60 00 00 00 00 00 00 00 00 00 00 00 00 00 00 00 00
FD70 00 00 00 00 00 00 00 00 00 00 00 00 00 00 00 00
FD80 00 00 00 00 00 00 00 00 00 00 00 00 00 00 00 00
FD90 00 00 00 00 00 00 00 00 00 00 00 00 00 00 00 00
FDA0 00 00 00 00 00 00 00 00 00 00 00 00 00 00 00 00
FDB0 00 00 00 00 00 00 00 00 00 00 00 00 00 00 00 00
FDC0 00 00 00 00 00 00 00 00 00 00 00 00 00 00 00 00
FDD0 00 00 00 00 00 00 00 00 00 00 00 00 00 00 00 00
FDE0 00 00 00 00 00 00 00 00 00 00 00 00 00 00 00 00
FDF0 00 00 00 00 00 00 00 00 00 00 00 00 00 00 00 00
FE00 00 00 00 00 00 00 00 00 00 00 00 00 00 00 00 00
FE10 00 00 00 00 00 00 00 00 00 00 00 00 00 00 00 00
FE20 00 00 00 00 00 00 00 00 00 00 00 00 00 00 00 00
FE30 00 00 00 00 00 00 00 00 00 00 00 00 00 00 00 00
FE40 00 00 00 00 00 00 00 00 00 00 00 00 00 00 00 00
FE50 00 00 00 00 00 00 00 00 00 00 00 00 00 00 00 00
FE60 00 00 00 00 00 00 00 00 00 00 00 00 00 00 00 00
FE70 00 00 00 00 00 00 00 00 00 00 00 00 00 00 00 00
FE80 00 00 00 00 00 00 00 00 00 00 00 00 00 00 00 00
FE90 00 00 00 00 00 00 00 00 00 00 00 00 00 00 00 00
FEA0 00 00 00 00 00 00 00 00 00 00 00 00 00 00 00 00
FEB0 00 00 00 00 00 00 00 00 00 00 00 00 00 00 00 00
FEC0 00 00 00 00 00 00 00 00 00 00 00 00 00 00 00 00
FED0 00 00 00 00 00 00 00 00 00 00 00 00 00 00 00 00
FEE0 00 00 00 00 00 00 00 00 00 00 00 00 00 00 00 00
FEF0 00 00 00 00 00 00 00 00 00 00 00 00 00 00 00 00
FF00 00 00 00 00 00 00 00 00 00 00 00 00 00 00 00 00
FF10 00 00 00 00 00 00 00 00 00 00 00 00 00 00 00 00
FF20 00 00 00 00 00 00 00 00 00 00 00 00 00 00 00 00
FF30 00 00 00 00 00 00 00 00 00 00 00 00 00 00 00 00
FF40 00 00 00 00 00 00 00 00 00 00 00 00 00 00 00 00
FF50 00 00 00 00 00 00 00 00 00 00 00 00 00 00 00 00
FF60 00 00 00 00 00 00 00 00 00 00 00 00 00 00 00 00
FF70 00 00 00 00 00 00 00 00 00 00 00 00 00 00 00 00
FF80 20 06 20 1E 20 36 20 4E 20 66 20 7E 20 96 20 AE
FF90 20 C6 20 DE 00 00 00 00 00 00 00 00 00 00 00 00
FFA0 20 06 20 1E 20 36 20 4E 20 66 20 7E 20 96 20 AE
FFB0 20 C6 20 DE 00 00 00 00 00 00 00 00 00 00 00 00
FFC0 59 00 00 00 00 00 00 00 00 00 00 00 00 00 00 00
FFD0 00 00 00 00 00 00 00 00 00 00 00 00 00 00 00 00
FFE0 00 00 00 00 00 00 00 00 00 00 00 00 00 00 00 00
FFF0 00 00 7E FF F2 7E FF F5 F9 EE FF F2 FF F3 F9 5A
0000
```

D96NE AND D96NW NODES

```
F000 00 00 00 00 00 00 08 08 00 00 00 00 00 00 08 08
F010 00 00 02 02 00 00 08 08 00 00 02 02 00 00 08 08
F020 00 00 00 00 00 00 08 08 00 00 00 00 00 00 08 08
F030 00 00 04 04 00 00 08 08 00 00 04 04 00 00 08 08
F040 00 0C 00 0C 00 0C 00 0C 00 0C 00 0C 00 0C 00 0C
F050 00 0C 00 0C 00 0C 00 0C 00 0C 00 0C 00 0C 00 0C
F060 00 0C 00 0C 00 0C 00 0C 00 0C 00 0C 00 0C 00 0C
F070 00 0C 00 0C 00 0C 00 0C 00 0C 00 0C 00 0C 00 0C
F080 0A 0A 00 00 00 00 08 08 0A 0A 00 00 00 00 08 08
F090 0A 0A 02 02 06 06 08 08 0A 0A 02 02 06 06 08 08
```

```
F0A0  0A 0A 00 00 00 00 08 08 0A 0A 00 00 00 00 08 08
F0B0  0A 0A 04 04 06 06 08 08 0A 0A 04 04 06 06 08 08
F0C0  06 0C 06 0C 06 0C 06 0C 06 0C 06 0C 06 0C 06 0C
F0D0  06 0C 06 0C 06 0C 06 0C 06 0C 06 0C 06 0C 06 0C
F0E0  06 0C 06 0C 06 0C 06 0C 06 0C 06 0C 06 0C 06 0C
F0F0  06 0C 06 0C 06 0C 06 0C 06 0C 06 0C 06 0C 06 0C
F100  01 00 01 0C 01 18 01 24 01 30 01 3C 01 48 01 54
F110  01 60 01 6C 01 78 01 84 01 90 01 9C 01 A8 01 B4
F120  01 C0 01 CC 01 D8 01 E4 01 F0 00 00 00 00 00 00
F130  00 00 00 00 00 00 00 00 00 00 00 00 00 00 00 00
F140  02 00 02 0C 02 18 02 24 02 30 02 3C 02 48 02 54
F150  02 60 02 6C 02 78 02 84 02 90 02 9C 02 A8 02 B4
F160  02 C0 02 CC 02 D8 02 E4 02 F0 02 FC 03 08 03 14
F170  00 00 00 00 00 00 00 00 00 00 00 00 00 00 00 00
F180  F7 C1 F7 CE F8 25 F7 EE F7 FC F8 3B F7 DF F7 CD
F190  80 00 00 00 00 00 00 00 00 00 00 00 00 00 00 00
F1A0  F4 8D F4 87 F4 81 F4 D5 F4 EC F4 E2 F4 D6 F4 D5
F1B0  00 B8 00 C4 00 D0 00 DC 00 E8 00 F4 7E F1 C2 00
F1C0  00 00 DE 1D DF 67 DE 1F DF 69 DE 21 DF 6B DE 23
F1D0  DF 6D DE 25 DF 6F DE 27 DF 71 DE 29 DF 73 DE 2B
F1E0  DF 75 DE 2D DF 77 DE 2F DF 79 DE 31 DF 7B DE 33
F1F0  DF 7D 7E FC 15 D6 8C 59 89 00 C3 08 89 00 97 8D
F200  D7 8E CE F2 1B DF 8F 7E F2 0A 7E F2 10 00 00 00
F210  96 21 37 20 F6 7C 00 21 7E F3 04 7E F2 21 00 00
F220  00 DE 67 DF 1D DE 69 DF 1F DE 6B DF 21 DE 6D DF
F230  23 DE 6F DF 25 DE 71 DF 27 DE 73 DF 29 DE 75 DF
F240  2B DE 77 DF 2D DE 79 DF 2F DE 7B DF 31 DE 7D DF
F250  33 96 20 27 1C 81 01 27 24 81 02 27 2C 81 03 27
F260  34 81 04 27 3C DE 89 DF 26 CE 00 00 DF 89 7E F2
F270  AD DE 7F DF 26 CE 00 00 DF 7F 7E F2 AD DE 81 DF
F280  26 CE 00 00 DF 81 7E F2 AD DE 83 DF 26 CE 00 00
F290  DF 83 7E F2 AD DE 85 DF 26 CE 00 00 DF 85 7E F2
F2A0  AD DE 87 DF 26 CE 00 00 DF 87 7E F2 AD 96 1D 84
F2B0  EF 97 1D DE 8B DF 22 7F 00 21 CE 00 00 DF 24 BD
F2C0  FA E5 CE 00 60 DF 16 BD F9 4D 7E F2 CD 7E F2 D3
F2D0  00 00 00 DE 09 B5 20 F6 A7 04 A3 03 A7 03 7E F2
F2E0  E1 7E F2 E7 00 00 00 DE 09 A5 05 8A 40 A7 05 A6
F2F0  03 83 40 A7 03 7E 00 00 7E F2 FE 00 00 00 7F 00
F300  21 7E F5 58 7E F3 0A 00 00 00 BD FA E5 CE 00 60
F310  DF 16 BD F9 4D 7E F2 F8 7E F3 1E 00 00 00 7E F3
F320  2A 7E F3 27 00 00 00 7E F3 92 7E F3 30 00 00 00
F330  7F 00 91 7E FC 2D 08 DE 8B DF 24 86 01 97 91 7E
F340  F3 42 7E F3 48 00 00 00 CE 03 00 DF 12 96 23 97
F350  13 D6 22 C4 03 DE 12 A6 00 C1 00 27 11 C1 01 27
F360  16 C1 02 27 1B 84 3F 8A 40 A7 00 7E F3 89 84 FC
F370  8A 01 A7 00 7E F3 89 84 F3 8A 04 A7 00 7E F3 89
F380  84 CF 8A 10 A7 00 7E F3 89 7E F3 8F 00 00 00 7E
F390  F5 69 7E F3 98 00 00 00 CE 00 60 DF 16 BD F9 4D
F3A0  7E F3 D6 7E F3 A9 00 00 00 96 20 81 26 27 06 7F
F3B0  C0 14 7E F3 D6 86 01 B7 C0 14 7E F3 D6 7E F3 C3
F3C0  00 00 00 96 92 27 0C DE 8D 27 05 DE 8D 09 DF 8D
F3D0  7F 00 92 7E F5 3C 7E F3 DC 00 00 00 96 8F 27 04
F3E0  DE 8D 27 03 7E 00 00 DE 8F DF 14 7F 00 8F 6E 00
F3F0  7E F3 F5 00 00 0C 96 08 49 97 08 9A 0D 97 15 96
F400  0C 97 14 DE 14 EE 00 6E 00 7E F4 0F 00 00 00 96
F410  1D 84 60 27 08 DE 81 08 DF 81 7E F4 22 DE 7F 08
F420  DF 7F 7E F5 7D 7E F4 23 00 00 00 DE 83 08 DF 83
F430  7E F3 D6 7E F4 39 00 00 00 DE 85 08 DF 85 7E F6
F440  00 7E F4 47 00 00 00 96 1D 9B 1E 9B 1F 9B 20 9B
F450  21 9B 22 9B 23 9B 24 9B 25 9B 26 91 27 26 76 CE
F460  00 60 DF 16 5F 96 20 81 21 27 02 CA 01 7E FC 1C
F470  23 84 03 97 23 DA 23 D7 08 CE F1 A0 DF 0C 7E F3
F480  F0 DE 21 A6 02 97 26 DE 21 A6 01 97 25 DE 21 A5
F490  00 97 24 96 1D 84 EF 97 1D 86 25 97 20 96 1D 9B
F4A0  1E 9B 1F 9B 20 9B 21 9B 22 9B 23 9B 24 9B 25 9B
F4B0  26 97 27 86 00 97 28 97 29 97 2A 97 2B 97 2C 97
F4C0  2D 97 2E 97 2F 97 30 97 31 97 32 97 33 97 34 BD
F4D0  FA E5 BD F9 4D 7E F3 D6 DE 21 96 26 A7 02 A6 02
F4E0  97 26 DE 21 96 25 A7 01 A6 01 97 25 DE 21 96 24
F4F0  A7 00 7E F4 8D 7E F4 F3 00 00 00 96 55 91 57 27
F500  12 CE 00 54 DF 16 BD FB 1C BD FA A3 96 08 26 06
F510  7E F4 09 7E F5 19 7E F4 25 7E F5 1F 00 00 00 96
F520  53 91 5D 27 11 7E FC 0D 16 BD FB 1C BD FA A3 96
F530  08 26 06 7E F4 09 7E F3 D6 7E F4 25 7E F5 42 00
```

```
F540  00 00 B6 20 01 B1 20 03 27 03 CE 20 00 DF 16 BD
F550  F9 9F 7E F5 D0 7E F4 F5 7E F5 5E 00 00 00 CE 24
F560  00 00 DF 16 BD FA 21 7E F3 D6 7E F5 6F 00 00 00 BD
F570  FA E5 CE 00 60 DF 16 BD F9 4D 7E F4 F5 7E F5 83
F580  00 00 00 96 1E 81 FF 26 09 96 1D 84 10 26 22 7E
F590  F5 AE 96 1D 84 03 91 8B 26 14 96 1E 91 8C 26 0E
F5A0  96 20 81 29 27 0E 81 21 27 0D 81 23 27 09 7E F5
F5B0  BA 7E F1 BC 7E F6 1C 7E F4 41 7E F5 C0 00 00 00
F5C0  96 20 81 25 27 07 81 22 27 03 7E F5 E8 7E F3 A3
F5D0  7E F5 D6 00 00 00 96 1E 81 FF 26 09 96 1D 84 10
F5E0  26 03 7E F3 18 7E F4 33 7E F5 EE 00 00 00 96 1E
F5F0  81 FF 26 09 96 1D 84 10 26 03 7E F3 21 7E F5 58
F600  7E F6 06 00 00 00 96 66 27 0C 96 1D 84 08 27 09
F610  96 20 81 64 22 03 7E F5 69 7E F4 F5 7E F6 22 00
F620  00 00 96 1D 9B 1E 9B 1F 9B 20 9B 21 9B 22 9B 23
F630  9B 24 9B 25 9B 26 91 27 26 03 7E F6 3A 7E F3 D5
F640  8E 00 B7 FE F6 5A DF 00 B6 F6 5C 97 02 FE F6 5D
F650  DF 03 B6 F6 5F 97 05 7E F6 60 B7 C0 1E 7E F3 BD
F660  7E F6 63 7E F6 69 00 00 00 7E F6 76 86 00 A7 00
F670  08 8C 25 00 26 F8 CE 00 06 86 00 A7 00 08 8C 04
F680  00 26 F8 7E F6 90 86 00 A7 00 08 8C 21 00 26 F8
F690  CE 03 00 86 AA A7 00 08 8C 04 00 26 F8 CE F1 80
F6A0  DF 35 CE F0 00 DF 48 CE 03 00 DF 48 CE F1 68 DF
F6B0  60 96 61 97 64 CE F1 40 DF 60 DF 62 96 61 97 65
F6C0  CE F1 B6 DF 54 96 55 97 58 CE F1 B0 DF 54 DF 56
F6D0  96 55 97 59 CE F1 BA DF 5A 96 5B 97 5E CE F1 B8
F6E0  DF 5A DF 5C 96 5B 97 5F CE F1 28 DF 4E 96 4F 97
F6F0  52 CE F1 00 DF 4E DF 50 96 4F 97 53 86 FF 97 0E
F700  86 FF B7 03 FF 86 00 B7 03 00 96 36 97 37 86 00
F710  B7 C0 14 B6 C0 0F 84 03 97 8B B6 C0 0E 97 8C 96
F720  8C 97 4C 7E FC 24 89 81 03 26 07 C4 3F CA 40 7E
F730  F7 4C 81 02 26 07 C4 CF CA 10 7E F7 4C 81 01 26
F740  07 C4 F3 CA 04 7E F7 4C C4 FC CA 01 E7 00 CE FF
F750  FF B7 C0 1E 09 26 FA 0E 7E 00 00 7E F8 E6 7E F7
F760  64 00 00 00 44 26 F4 7C 00 4D B6 C0 00 97 4A F6
F770  C0 01 D7 4C 84 78 97 49 DE 48 96 4A 84 03 E6 00
F780  81 00 26 05 C4 03 59 7E F7 AB 81 01 26 06 C4 0C
F790  56 7E F7 AB 81 02 26 08 C4 30 56 56 56 7E F7 AB
F7A0  C4 C0 59 59 59 59 7E F7 AB 59 59 DA 49 DA 3F DA
F7B0  47 D7 49 DE 48 A6 00 9A 37 97 36 DE 35 EE 00 6E
F7C0  00 CE 00 00 DF 3A CE 00 00 DF 38 DF 41 3B DE 56
F7D0  EE 00 DF 38 CE 00 54 DF 3D 7F 00 47 7E F8 07 DE
F7E0  43 EE 00 DF 38 7C 00 3C 7F 00 47 7E F8 07 DE 50
F7F0  EE 00 DF 38 CE 00 4E DF 3D 7E F8 07 DE 5C EE 00
F800  DF 38 CE 00 5A DF 3D DE 38 96 4A A7 00 96 4C A7
F810  01 96 39 8B 02 97 39 DE 41 EE 00 FF C0 11 96 42
F820  8B 02 97 42 3B DE 56 EE 00 DF 38 CE 00 54 DF 3D
F830  86 01 97 47 DE 3D DF 3A 7E F8 07 CE 00 00 DF 38
F840  DF 3A 7E F8 17 7E F7 5E 7E F8 4E 00 00 00 96 4D
F850  26 F3 B6 C0 00 7C 00 4D DE 38 27 30 B6 C0 00 A7
F860  00 B6 C0 01 A7 01 DE 3D A6 03 97 40 A1 04 27 07
F870  8B 02 A7 03 7E F8 7B A6 05 A7 03 DE 3A 27 0D 7E
F880  FC 45 EE 02 DF 43 DE 3D 96 40 A7 03 DE 41 27 05
F890  EE 00 FF C0 11 96 3C 27 18 7F 00 3C DE 3D 96 44
F8A0  A7 03 A1 04 27 07 8B 02 A7 03 7E F8 B1 A6 05 EE
F8B0  03 96 61 91 63 26 16 96 4F 91 51 27 20 DE 4E EE
F8C0  00 DF 41 CE 00 4E DF 45 86 80 97 3F 3B DE 60 EE
F8D0  00 DF 41 CE 00 60 DF 45 86 80 97 3F 3B CE F1 90
F8E0  DF 41 7F 00 3F 3B 7E F8 EC 00 00 00 B6 C0 00 DE
F8F0  38 27 10 B6 C0 00 A7 00 B6 C0 01 A7 01 96 39 8B
F900  02 97 39 DE 41 27 0B EE 00 FF C0 11 96 42 8B 02
F910  97 42 96 4D 81 05 27 04 7C 00 4D 3B 7F 00 4D 96
F920  3F 27 17 DE 41 27 13 DE 45 A6 01 A1 04 27 07 8B
F930  02 A7 01 7E F9 3A A6 05 A7 01 B6 C0 04 B7 C0 1E
F940  84 07 81 05 26 F4 7C 00 92 B6 C0 00 3B 7E F9 53
F950  00 00 00 DE 16 EE 02 EE 00 DF 09 96 1D A7 00 96
F960  1E A7 01 96 1F A7 02 96 20 A7 03 96 21 A7 04 96
F970  22 A7 05 96 23 A7 06 96 24 A7 07 96 25 A7 08 96
F980  26 A7 09 96 27 A7 0A 96 34 A7 0B DE 16 A6 03 A1
F990  04 27 08 B 02 A7 03 7E F9 9E A6 05 A7 03 39 7E
F9A0  F9 A5 00 00 00 DE 16 EE 00 EE 00 DF 18 A6 00 97
F9B0  1D A6 01 97 1E A6 02 97 1F A6 03 97 20 A6 04 97
F9C0  21 A6 05 97 22 A6 06 97 23 A6 07 97 24 A6 08 97
F9D0  25 A6 09 97 26 A6 0A 97 27 A6 0B 97 28 A6 0C 97
```

```
F9E0 29 A6 0D 97 2A A6 0E 97 2B A6 0F 97 2C A6 10 97
F9F0 2D A6 11 97 2E A6 12 97 2F A6 13 97 30 A6 14 97
FA00 31 A6 15 97 32 A6 16 97 33 A6 17 97 34 DE 16 A6
FA10 01 A1 04 27 07 8B 02 A7 01 7E FA 20 A6 05 A7 01
FA20 39 7E FA 27 00 00 00 DE 16 EE 02 EE 00 DF 09 96
FA30 1D A7 00 96 1E A7 01 96 1F A7 02 96 20 A7 03 96
FA40 21 A7 04 96 22 A7 05 96 23 A7 06 96 24 A7 07 96
FA50 25 A7 08 96 26 A7 09 96 27 A7 0A 96 28 A7 0B 96
FA60 29 A7 0C 96 2A A7 0D 96 2B A7 0E 96 2C A7 0F 96
FA70 2D A7 10 96 2E A7 11 96 2F A7 12 96 30 A7 13 96
FA80 31 A7 14 96 32 A7 15 96 33 A7 16 96 34 A7 17 DE
FA90 16 A6 03 A1 04 27 07 8B 02 A7 03 7E FA A2 A6 05
FAA0 A7 03 39 7E FA A9 00 00 00 7F 00 08 96 1D 9B 1E
FAB0 9B 1F 9B 20 9B 21 9B 22 9B 23 9B 24 9B 25 9B 26
FAC0 9B 27 9B 28 9B 29 9B 2A 9B 2B 9B 2C 9B 2D 9B 2E
FAD0 9B 2F 9B 30 9B 31 9B 32 9B 33 91 34 26 03 7E FA
FAE0 E4 7C 00 08 39 7E FA E8 00 00 00 96 1D 9B 1E 9B
FAF0 1F 9B 20 9B 21 9B 22 9B 23 9B 24 9B 25 9B 26 9B
FB00 27 9B 28 9B 29 9B 2A 9B 2B 9B 2C 9B 2D 9B 2E 9B
FB10 2F 9B 30 9B 31 9B 32 9B 33 97 34 39 7E FB 25 00
FB20 00 00 7E FB D9 DE 16 EE 00 EE 00 DF 18 A6 00 84
FB30 60 27 4A 84 40 26 EB A6 00 97 1D A6 01 97 1E A6
FB40 02 97 20 A6 03 97 21 A6 04 97 22 A6 05 97 23 A6
FB50 06 97 24 A6 07 97 25 A6 08 97 26 A6 09 97 27 A6
FB60 0A 97 28 A6 0B 97 29 DE 16 A6 01 A1 04 27 07 8B
FB70 02 A7 01 7E FB 25 A6 05 A7 01 7E FB 25 A6 00 97
FB80 1D A6 01 97 1E A6 02 97 1F A6 03 97 20 A6 04 97
FB90 21 A6 05 97 22 A6 06 97 23 A6 07 97 24 A6 08 97
FBA0 25 A6 09 97 26 A6 0A 97 27 A6 0B 97 34 86 00 97
FBB0 28 97 29 97 2A 97 2B 97 2C 97 2D 97 2E 97 2F 97
FBC0 30 97 31 97 32 97 33 DE 16 A6 01 A1 04 27 05 8B
FBD0 02 A7 01 39 A6 05 A7 01 39 A6 00 97 1F A6 01 97
FBE0 2A A6 02 97 2B A6 03 97 2C A6 04 97 2D A6 05 97
FBF0 2E A6 06 97 2F A6 07 97 30 A6 08 97 31 A6 09 97
FC00 32 A6 0A 97 33 A6 0B 97 34 7E FB C7 8C CE 00 5A
FC10 DF 16 7E F5 29 96 8B 0C 49 7E F1 F5 0C 59 59 96
FC20 23 7E F4 71 DE 4B E6 00 96 83 7E F7 27 96 24 84
FC30 03 9A 25 26 0D 96 24 9A 8B 97 24 96 8C 97 25 7E
FC40 F3 3B 7E F3 3F 7F 00 3A 7F 00 3B 7E F8 82 00 00
FC50 00 00 00 00 00 00 00 00 00 00 00 00 00 00 00 00
FC60 00 00 00 00 00 00 00 00 00 00 00 00 00 00 00 00
FC70 00 00 00 00 00 00 00 00 00 00 00 00 00 00 00 00
FC80 00 00 00 00 00 00 00 00 00 00 00 00 00 00 00 00
FC90 00 00 00 00 00 00 00 00 00 00 00 00 00 00 00 00
FCA0 00 00 00 00 00 00 00 00 00 00 00 00 00 00 00 00
FCB0 00 00 00 00 00 00 00 00 00 00 00 00 00 00 00 00
FCC0 00 00 00 00 00 00 00 00 00 00 00 00 00 00 00 00
FCD0 00 00 00 00 00 00 00 00 00 00 00 00 00 00 00 00
FCE0 00 00 00 00 00 00 00 00 00 00 00 00 00 00 00 00
FCF0 00 00 00 00 00 00 00 00 00 00 00 00 00 00 00 00
FD00 00 00 00 00 00 00 00 00 00 00 00 00 00 00 00 00
FD10 00 00 00 00 00 00 00 00 00 00 00 00 00 00 00 00
FD20 00 00 00 00 00 00 00 00 00 00 00 00 00 00 00 00
FD30 00 00 00 00 00 00 00 00 00 00 00 00 00 00 00 00
FD40 00 00 00 00 00 00 00 00 00 00 00 00 00 00 00 00
FD50 00 00 00 00 00 00 00 00 00 00 00 00 00 00 00 00
FD60 00 00 00 00 00 00 00 00 00 00 00 00 00 00 00 00
FD70 00 00 00 00 00 00 00 00 00 00 00 00 00 00 00 00
FD80 00 00 00 00 00 00 00 00 00 00 00 00 00 00 00 00
FD90 00 00 00 00 00 00 00 00 00 00 00 00 00 00 00 00
FDA0 00 00 00 00 00 00 00 00 00 00 00 00 00 00 00 00
FDB0 00 00 00 00 00 00 00 00 00 00 00 00 00 00 00 00
FDC0 00 00 00 00 00 00 00 00 00 00 00 00 00 00 00 00
FDD0 00 00 00 00 00 00 00 00 00 00 00 00 00 00 00 00
FDE0 00 00 00 00 00 00 00 00 00 00 00 00 00 00 00 00
FDF0 00 00 00 00 00 00 00 00 00 00 00 00 00 00 00 00
FE00 00 00 00 00 00 00 00 00 00 00 00 00 00 00 00 00
FE10 00 00 00 00 00 00 00 00 00 00 00 00 00 00 00 00
FE20 00 00 00 00 00 00 00 00 00 00 00 00 00 00 00 00
FE30 00 00 00 00 00 00 00 00 00 00 00 00 00 00 00 00
FE40 00 00 00 00 00 00 00 00 00 00 00 00 00 00 00 00
FE50 00 00 00 00 00 00 00 00 00 00 00 00 00 00 00 00
FE60 00 00 00 00 00 00 00 00 00 00 00 00 00 00 00 00
FE70 00 00 00 00 00 00 00 00 00 00 00 00 00 00 00 00
```

```
FE80  00 00 00 00 00 00 00 00 00 00 00 00 00 00 00 00
FE90  00 00 00 00 00 00 00 00 00 00 00 00 00 00 00 00
FEA0  00 00 00 00 00 00 00 00 00 00 00 00 00 00 00 00
FEB0  00 00 00 00 00 00 00 00 00 00 00 00 00 00 00 00
FEC0  00 00 00 00 00 00 00 00 00 00 00 00 00 00 00 00
FED0  00 00 00 00 00 00 00 00 00 00 00 00 00 00 00 00
FEE0  00 00 00 00 00 00 00 00 00 00 00 00 00 00 00 00
FEF0  00 00 00 00 00 00 00 00 00 00 00 00 00 00 00 00
FF00  00 00 00 00 00 00 00 00 00 00 00 00 00 00 00 00
FF10  00 00 00 00 00 00 00 00 00 00 00 00 00 00 00 00
FF20  00 00 00 00 00 00 00 00 00 00 00 00 00 00 00 00
FF30  00 00 00 00 00 00 00 00 00 00 00 00 00 00 00 00
FF40  00 00 00 00 00 00 00 00 00 00 00 00 00 00 00 00
FF50  00 00 00 00 00 00 00 00 00 00 00 00 00 00 00 00
FF60  24 06 24 1E 24 36 24 4E 24 66 24 7E 24 96 24 AE
FF70  24 C6 24 DE 00 00 00 00 00 00 00 00 00 00 00 00
FF80  20 06 20 1E 20 36 20 4E 20 66 20 7E 20 96 20 AE
FF90  20 C6 20 DE 00 00 00 00 00 00 00 00 00 00 00 00
FFA0  24 06 24 1E 24 36 24 4E 24 66 24 7E 24 96 24 AE
FFB0  24 C6 24 DE 00 00 00 00 00 00 00 00 00 00 00 00
FFC0  20 06 20 1E 20 36 20 4E 20 66 20 7E 20 96 20 AE
FFD0  20 C6 20 DE 00 00 00 00 00 00 00 00 00 00 00 00
FFE0  39 00 00 00 00 00 00 00 00 00 00 00 00 00 00 00
FFF0  00 00 7E FF F2 7E FF F5 F8 48 FF F2 FF F5 F6 40
0000
```

COAX OUTPUT END NODE

```
F000  03 87 03 93 03 9F 03 AB 03 B7 03 C3 03 CF 03 DB
F010  03 E7 03 F3 00 00 00 00 00 00 00 00 00 00 00 00
F020  80 00 00 00 00 00 00 00 00 00 00 00 00 00 00 00
F030  F2 A3 F2 9D F2 97 F2 E5 F2 FC F2 F2 F2 E8 F2 E5
F040  7E F0 46 00 00 00 DE 1D DF 3F DE 1F DF 41 DE 21
F050  DF 43 DE 23 DF 45 DE 25 DF 47 DE 27 DF 49 DE 29
F060  DF 4B DE 2B DF 4D DE 2D DF 4F DE 2F DF 51 DE 31
F070  DF 53 DE 33 DF 55 7E F6 A4 D6 64 59 89 00 CB 08
F080  89 00 97 65 D7 66 CE F0 9F DF 67 7E F0 8E 7E F0
F090  94 00 00 00 96 21 B7 20 F6 7C 00 21 7E F4 17 7E
F0A0  F0 A5 00 00 00 DE 3F DF 1D DE 41 DF 1F DE 43 DF
F0B0  21 DE 45 DF 23 DE 47 DF 25 DE 49 DF 27 DE 4B DF
F0C0  29 DE 4D DF 2B DE 4F DF 2D DE 51 DF 2F DE 53 DF
F0D0  31 DE 55 DF 33 96 20 27 1C 81 01 27 24 81 02 27
F0E0  2C 81 03 27 34 81 04 27 3C DE 61 DF 26 CE 00 00
F0F0  DF 61 7E F1 31 DE 57 DF 26 CE 00 00 DF 57 7E F1
F100  31 DE 59 DF 26 CE 00 00 DF 59 7E F1 31 DE 5B DF
F110  26 CE 00 00 DF 5B 7E F1 31 DE 5D DF 26 CE 00 00
F120  DF 5D 7E F1 31 DE 5F DF 26 CE 00 00 DF 5F 7E F1
F130  31 96 1D 84 EF 97 1D DE 63 DF 22 7F 00 21 CE 00
F140  00 DF 24 BD F6 40 CE 00 38 DF 16 BD F4 E8 7E F1
F150  51 7E F1 57 00 00 00 DE 09 36 20 F6 A7 04 A3 03
F160  A7 0B 7E F1 65 7E F1 6B 00 00 00 DE 09 A6 05 8A
F170  30 A7 05 A6 03 8B 30 A7 0B 7E 00 00 7E F1 82 00
F180  00 00 DE 35 EE 00 FF C0 11 96 36 8B 02 97 36 96
F190  37 81 05 27 2C 81 00 26 2F 7C 00 37 DE 35 8C F0
F1A0  2C 27 11 96 39 91 3C 27 07 83 02 97 39 7E F1 B4
F1B0  96 3D 97 39 96 3B 91 39 27 12 DE 3B EE 00 DF 35
F1C0  3B 7F 00 37 7C 20 F7 3B 7C 00 37 3B CE F0 20 DF
F1D0  35 3B 7E F1 D8 00 00 00 B6 20 F7 81 06 27 05 22
F1E0  03 7E F1 EE DE 65 27 03 09 DF 65 7F 20 F7 7E F3
F1F0  05 7E F1 F7 00 00 00 96 67 27 04 DE 65 27 03 7E
F200  00 00 DE 67 DF 14 7F 00 67 6E 00 7E F2 10 00 00
F210  0C 96 08 49 97 08 9A 0D 97 15 96 0C 97 14 DE 14
F220  EE 00 6E 00 7E F2 2A 00 00 00 96 1D 84 60 27 08
F230  DE 59 08 DF 59 7E F2 3D DE 57 08 DF 57 7E F3 55
F240  7E F2 46 00 00 00 96 1D 84 60 27 08 DE 59 08 DF
F250  59 7E F2 59 DE 57 08 DF 57 7E F3 61 7E F2 62 00
F260  00 00 96 1D 9B 1E 9B 1F 9B 20 9B 21 9B 22 9B 23
F270  9B 24 9B 25 9B 26 91 27 26 6B 5F 96 20 81 21 27
F280  02 CA 01 7E F6 AB 23 84 03 97 23 DA 23 D7 03 CE
```

```
F290 F0 30 DF 0C 7E F2 0B DE 21 A6 02 97 26 DE 21 A6
F2A0 01 97 25 DE 21 A6 00 97 24 96 1D 84 EF 97 1D 86
F2B0 25 97 20 96 1D 9B 1E 9B 1F 9B 20 93 21 9B 22 93
F2C0 23 9B 24 9B 25 9B 26 97 27 86 00 97 28 97 29 97
F2D0 2A 97 2B 97 2C 97 2D 97 2E 97 2F 97 30 97 31 97
F2E0 32 97 33 97 34 7E F4 17 DE 21 96 25 A7 02 A6 02
F2F0 97 26 DE 21 96 25 A7 01 A6 01 97 25 DE 21 96 24
F300 A7 00 7E F2 A3 7E F3 0B 00 00 00 36 20 01 31 20
F310 03 27 17 CE 00 38 DF 16 BD F6 77 96 03 27 03 CE
F320 20 00 DF 16 BD F5 3E 7E F2 24 7E F3 2D 7E F3 33
F330 00 00 00 36 24 01 31 24 03 27 17 CE 00 38 DF 16
F340 BD F6 77 96 08 27 0B CE 24 00 DF 16 BD F5 3E 7E
F350 F2 40 7E F1 F1 7E F3 5B 00 00 00 7F 00 6A 7E F3
F360 D3 7E F3 67 00 00 00 86 01 97 6A 7E F3 F5 7E F3
F370 74 00 00 00 BD F6 40 CE 00 38 DF 16 BD F4 E8 7E
F380 F3 2D 7E F3 88 00 00 00 BD F6 40 CE 00 38 DF 16
F390 BD F4 E8 7E F1 F1 7E F3 9C 00 00 00 96 1E 81 FF
F3A0 26 09 96 1D 84 10 26 22 7E F3 C7 96 1D 84 03 91
F3B0 63 26 14 96 1E 91 64 26 0E 96 20 81 29 27 0E 81
F3C0 21 27 0D 81 23 27 09 7E F4 17 7E F0 40 7E F4 27
F3D0 7E F2 5C 7E F3 D9 00 00 00 96 1E 81 FF 26 13 96
F3E0 1D 84 10 27 0D 96 69 27 06 7F 00 69 7E F3 2D 7C
F3F0 00 69 7E F3 96 7E F3 FB 00 00 00 96 1E 81 FF 26
F400 13 96 1D 84 10 27 0D 96 69 27 06 7F 00 69 7E F1
F410 F1 7C 00 69 7E F3 96 7E F4 1D 00 00 00 96 6A 27
F420 03 7E F3 82 7E F3 6E 7E F4 2D 00 00 00 96 1D 9B
F430 1E 9B 1F 9B 20 9B 21 9B 22 9B 23 9B 24 9B 25 9B
F440 26 91 27 26 03 7E F4 45 7E F3 2D 8E 03 86 FE F4
F450 65 DF 00 B6 F4 67 97 02 FE F4 68 DF 03 B6 F4 6A
F460 97 05 7E F4 6B B7 C0 1E 7E F1 D2 7E F4 6E 7E F4
F470 74 00 00 00 CE 00 06 86 00 A7 00 08 8C 04 00 26
F480 F8 CE FF 72 FF 20 00 B6 20 01 B7 20 04 CE FF 60
F490 FF 20 00 FF 20 02 B6 20 01 37 20 05 CE FF B2 FF
F4A0 24 00 B6 24 01 B7 24 04 CE FF A0 FF 24 00 FF 24
F4B0 02 B6 24 01 B7 24 05 CE F0 12 DF 38 96 39 97 3C
F4C0 CE F0 00 DF 38 DF 3A 96 39 97 3D 86 FF 97 0E B5
F4D0 C0 0F 84 03 97 63 B6 C0 0E 97 64 CE FF FF B7 C0
F4E0 1E 09 26 FA 0E 7E 00 00 7E F4 EE 00 00 00 DE 16
F4F0 EE 02 EE 00 DF 09 96 1D 84 60 26 44 96 1D A7 00
F500 96 1E A7 01 96 1F A7 02 96 20 A7 03 96 21 A7 04
F510 96 22 A7 05 96 23 A7 06 96 24 A7 07 96 25 A7 08
F520 96 26 A7 09 96 27 A7 0A 96 34 A7 0B DE 16 A6 03
F530 A1 04 27 07 8B 02 A7 03 7E F5 3F A6 05 A7 03 39
F540 96 1D A7 00 96 1E A7 01 96 20 A7 02 96 21 A7 03
F550 96 22 A7 04 96 23 A7 05 96 24 A7 06 96 25 A7 07
F560 96 26 A7 08 96 27 A7 09 96 28 A7 0A 96 29 A7 0B
F570 DE 16 A6 03 A1 04 27 07 8B 02 A7 03 7E F5 83 A6
F580 05 A7 03 DE 16 EE 02 EE 00 DF 09 96 1F A7 00 96
F590 2A A7 01 96 2B A7 02 96 2C A7 03 96 2D A7 04 96
F5A0 2E A7 05 96 2F A7 06 96 30 A7 07 96 31 A7 08 96
F5B0 32 A7 09 96 33 A7 0A 96 34 A7 0B 7E F5 2C 7E F5
F5C0 C4 00 00 00 DE 16 EE 00 EE 00 DF 18 A6 00 97 1D
F5D0 A6 01 97 1E A6 02 97 1F A6 03 97 20 A6 04 97 21
F5E0 A6 05 97 22 A6 06 97 23 A6 07 97 24 A6 08 97 25
F5F0 A6 09 97 26 A6 0A 97 27 A6 0B 97 28 A6 0C 97 29
F600 A6 0D 97 2A A6 0E 97 2B A6 0F 97 2C A6 10 97 2D
F610 A6 11 97 2E A6 12 97 2F A6 13 97 30 A6 14 97 31
F620 A6 15 97 32 A6 16 97 33 A6 17 97 34 DE 15 A6 01
F630 A1 04 27 07 8B 02 A7 01 7E F6 3F A6 05 A7 01 39
F640 7E F6 46 00 00 00 96 1D 93 1E 9B 1F 93 20 93 21
F650 9B 22 9B 23 9B 24 9B 25 9B 26 97 27 93 28 9B 29
F660 9B 2A 9B 2B 9B 2C 9B 2D 9B 2E 9B 2F 9B 30 9B 31
F670 9B 32 9B 33 97 34 39 7E F6 7D 00 00 00 7F 00 08
F680 DE 16 A6 03 A1 04 27 05 8B 02 7E F6 8F A6 05 A1
F690 04 27 05 8B 02 7E F6 9A A6 05 A1 01 27 03 7C 00
F6A0 08 39 23 00 96 63 0C 49 7E F0 79 0C 59 59 96 23
F6B0 7E F2 87 00 00 00 00 00 00 00 00 00 00 00 00 00
F6C0 00 00 00 00 00 00 00 00 00 00 00 00 00 00 00 00
F6D0 00 00 00 00 00 00 00 00 00 00 00 00 00 00 00 00
F6E0 00 00 00 00 00 00 00 00 00 00 00 00 00 00 00 00
F6F0 00 00 00 00 00 00 00 00 00 00 00 00 00 00 00 00
F700 00 00 00 00 00 00 00 00 00 00 00 00 00 00 00 00
F710 00 00 00 00 00 00 00 00 00 00 00 00 00 00 00 00
```

```
F720 00 00 00 00 00 00 00 00 00 00 00 00 00 00 00 00
F730 00 00 00 00 00 00 00 00 00 00 00 00 00 00 00 00
F740 00 00 00 00 00 00 00 00 00 00 00 00 00 00 00 00
F750 00 00 00 00 00 00 00 00 00 00 00 00 00 00 00 00
F760 00 00 00 00 00 00 00 00 00 00 00 00 00 00 00 00
F770 00 00 00 00 00 00 00 00 00 00 00 00 00 00 00 00
F780 00 00 00 00 00 00 00 00 00 00 00 00 00 00 00 00
F790 00 00 00 00 00 00 00 00 00 00 00 00 00 00 00 00
F7A0 00 00 00 00 00 00 00 00 00 00 00 00 00 00 00 00
F7B0 00 00 00 00 00 00 00 00 00 00 00 00 00 00 00 00
F7C0 00 00 00 00 00 00 00 00 00 00 00 00 00 00 00 00
F7D0 00 00 00 00 00 00 00 00 00 00 00 00 00 00 00 00
F7E0 00 00 00 00 00 00 00 00 00 00 00 00 00 00 00 00
F7F0 00 00 00 00 00 00 00 00 00 00 00 00 00 00 00 00
F800

FE00 00 00 00 00 00 00 00 00 00 00 00 00 00 00 00 00
FE10 00 00 00 00 00 00 00 00 00 00 00 00 00 00 00 00
FE20 00 00 00 00 00 00 00 00 00 00 00 00 00 00 00 00
FE30 00 00 00 00 00 00 00 00 00 00 00 00 00 00 00 00
FE40 00 00 00 00 00 00 00 00 00 00 00 00 00 00 00 00
FE50 00 00 00 00 00 00 00 00 00 00 00 00 00 00 00 00
FE60 00 00 00 00 00 00 00 00 00 00 00 00 00 00 00 00
FE70 00 00 00 00 00 00 00 00 00 00 00 00 00 00 00 00
FE80 00 00 00 00 00 00 00 00 00 00 00 00 00 00 00 00
FE90 00 00 00 00 00 00 00 00 00 00 00 00 00 00 00 00
FEA0 00 00 00 00 00 00 00 00 00 00 00 00 00 00 00 00
FEB0 00 00 00 00 00 00 00 00 00 00 00 00 00 00 00 00
FEC0 00 00 00 00 00 00 00 00 00 00 00 00 00 00 00 00
FED0 00 00 00 00 00 00 00 00 00 00 00 00 00 00 00 00
FEE0 00 00 00 00 00 00 00 00 00 00 00 00 00 00 00 00
FEF0 00 00 00 00 00 00 00 00 00 00 00 00 00 00 00 00
FF00 00 00 00 00 00 00 00 00 00 00 00 00 00 00 00 00
FF10 00 00 00 00 00 00 00 00 00 00 00 00 00 00 00 00
FF20 00 00 00 00 00 00 00 00 00 00 00 00 00 00 00 00
FF30 00 00 00 00 00 00 00 00 00 00 00 00 00 00 00 00
FF40 00 00 00 00 00 00 00 00 00 00 00 00 00 00 00 00
FF50 00 00 00 00 00 00 00 00 00 00 00 00 00 00 00 00
FF60 20 06 20 1E 20 36 20 4E 20 66 20 7E 20 96 20 AE
FF70 20 C6 20 DE 00 00 00 00 00 00 00 00 00 00 00 00
FF80 99 00 00 00 00 00 00 00 00 00 00 00 00 00 00 00
FF90 00 00 00 00 00 00 00 00 00 00 00 00 00 00 00 00
FFA0 24 06 24 1E 24 36 24 4E 24 66 24 7E 24 96 24 AE
FFB0 24 C6 24 DE 00 00 00 00 00 00 00 00 00 00 00 00
FFC0 51 00 00 00 00 00 00 00 00 00 00 00 00 00 00 00
FFD0 00 00 00 00 00 00 00 00 00 00 00 00 00 00 00 00
FFE0 00 00 00 00 00 00 00 00 00 00 00 00 00 00 00 00
FFF0 00 00 7E FF F2 7E FF F5 F1 7C FF F2 FF F5 F4 43
0000
```

COAX INPUT END NODE

```
F000 F2 FA F2 F4 F2 EE F3 3C F3 53 F3 49 F3 3F F3 3C
F010 03 CF 03 DB 03 E7 03 F3 7E F0 1E 00 00 00 DE 1D
F020 DF 3F DE 1F DF 41 DE 21 DF 43 DE 23 DF 45 DE 25
F030 DF 47 DE 27 DF 49 DE 29 DF 4B DE 2B DF 4D DE 2D
F040 DF 4F DE 2F DF 51 DE 31 DF 53 DE 33 DF 55 7E F7
F050 68 D6 64 59 89 00 CB 08 89 00 97 65 D7 66 CE F1
F060 F6 DF 67 7E F0 66 7E F0 69 73 00 69 96 21 B7 20
F070 F7 7C 00 21 7E F2 56 7E F0 7D 00 00 00 DE 3F DF
F080 1D DE 41 DF 1F DE 43 DF 21 DE 45 DF 23 DE 47 DF
F090 25 DE 49 DF 27 DE 4B DF 29 DE 4D DF 2B DE 4F DF
F0A0 2D DE 51 DF 2F DE 53 DF 31 DE 55 DF 33 96 20 27
F0B0 1C 81 01 27 24 81 02 27 2C 81 03 27 34 81 04 27
F0C0 3C DE 61 DF 26 CE 00 00 DF 61 7E F1 09 DE 57 DF
F0D0 26 CE 00 00 DF 57 7E F1 09 DE 59 DF 26 CE 00 00
F0E0 DF 59 7E F1 09 DE 5B DF 26 CE 00 00 DF 5B 7E F1
F0F0 09 DE 5D DF 26 CE 00 00 DF 5D 7E F1 09 DE 5F DF
```

```
F100  26 CE 00 00 DF 5F 7E F1 09 96 1D 84 EF 97 1D DE
F110  63 DF 22 7F 00 21 CE 00 00 DF 24 CE 20 00 DF 16
F120  BD F5 B3 7E F1 D5 7E F1 2C 00 00 00 DE 3F DF 1D
F130  DE 41 DF 1F DE 43 DF 21 DE 45 DF 23 DE 47 DF 25
F140  DE 49 DF 27 DE 4B DF 29 DE 4D DF 2B DE 4F DF 2D
F150  DE 51 DF 2F DE 53 DF 31 DE 55 DF 33 96 20 27 1C
F160  81 01 27 24 81 02 27 2C 81 03 27 34 81 04 27 3C
F170  DE 61 DF 26 CE 00 00 DF 61 7E F1 B8 DE 57 DF 26
F180  CE 00 00 DF 57 7E F1 B8 DE 59 DF 26 CE 00 00 DF
F190  59 7E F1 B8 DE 5B DF 26 CE 00 00 DF 5B 7E F1 B8
F1A0  DE 5D DF 26 CE 00 00 DF 5D 7E F1 B8 DE 5F DF 26
F1B0  CE 00 00 DF 5F 7E F1 B8 96 1D 84 EF 97 1D DE 63
F1C0  DF 22 7F 00 21 CE 00 00 DF 24 CE 24 00 DF 16 BD
F1D0  F5 B3 7E F1 D5 7E F1 DB 00 00 00 DE 09 B6 20 F7
F1E0  A7 04 7E F1 E5 7E F1 EB 00 00 00 DE 09 B6 20 AA
F1F0  05 A7 05 7E 00 00 7E F1 FC 00 00 00 FF FF FE 96
F200  69 26 03 7E F1 26 7E F0 77 7E F2 0F 00 00 00 FF
F210  FF FE 96 69 26 03 7E F2 2E 7E F2 25 7E F2 22 00
F220  00 00 7E F2 09 7E F2 2B 00 00 00 7E F3 80 7E F2
F230  34 00 00 00 7E F3 91 7E F2 3D 00 00 00 B6 20 F8
F240  81 06 27 05 22 03 7E F2 53 DE 65 27 03 09 DF 65
F250  7F 20 F8 7E F3 5C 7E F2 5C 00 00 00 96 67 27 04
F260  DE 65 27 03 7E 00 00 DE 67 DF 14 7F 00 67 6E 00
F270  7E F2 75 00 00 0C 96 08 49 97 08 9A 0D 97 15 96
F280  0C 97 14 DE 14 EE 00 6E 00 7E F2 8F 00 00 00 DE
F290  5B 08 DF 5B 7E F2 56 7E F2 9D 00 00 00 DE 57 08
F2A0  DF 57 7E F3 A2 7E F2 AB 00 00 00 DE 59 08 DF 59
F2B0  7E F2 56 7E F2 B9 00 00 00 96 1D 9B 1E 9B 1F 9B
F2C0  20 9B 21 9B 22 9B 23 9B 24 9B 25 9B 26 91 27 26
F2D0  6B 5F 96 20 81 21 27 02 CA 01 7E F7 6F 23 34 03
F2E0  97 23 DA 23 D7 08 CE F0 00 DF 0C 7E F2 70 DE 21
F2F0  A6 02 97 26 DE 21 A6 01 97 25 DE 21 A6 00 97 24
F300  96 1D 84 EF 97 1D 86 25 97 20 96 1D 9B 1E 9B 1F
F310  9B 20 9B 21 9B 22 9B 23 9B 24 9B 25 9B 26 97 27
F320  86 00 97 28 97 29 97 2A 97 2B 97 2C 97 2D 97 2E
F330  97 2F 97 30 97 31 97 32 97 33 97 34 7E F4 09 DE
F340  21 96 26 A7 02 A6 02 97 26 DE 21 96 25 A7 01 A5
F350  01 97 25 DE 21 96 24 A7 00 7E F2 FA 7E F3 62 00
F360  00 00 96 39 91 3B 27 12 CE 00 38 DF 16 BD F6 77
F370  BD F6 35 96 08 26 06 7E F2 97 7E F2 56 7E F2 A5
F380  7E F3 86 00 00 00 CE 20 00 DF 16 BD F5 B3 7E F2
F390  56 7E F3 97 00 00 00 CE 24 00 DF 16 BD F5 B3 7E
F3A0  F2 56 7E F3 A8 00 00 00 96 1E 81 FF 26 09 96 1D
F3B0  84 10 26 22 7E F3 D3 96 1D 84 03 91 63 26 14 96
F3C0  1E 91 64 26 0E 96 20 81 29 27 0E 81 21 27 0D 81
F3D0  23 27 09 7E F3 F1 7E F0 18 7E F4 55 7E F2 B3 7E
F3E0  F3 E5 00 00 00 96 1D 84 10 26 03 7E F4 39 7E F2
F3F0  39 7E F3 F7 00 00 00 96 1E 81 FF 26 09 96 1D 84
F400  10 26 03 7E F2 1C 7E F3 DF 7E F4 0F 00 00 00 96
F410  1E 81 FF 26 16 96 1D 84 10 26 10 96 69 27 06 73
F420  00 69 7E F3 91 73 00 69 7E F3 80 B6 20 F6 81 24
F430  F6 23 03 7E F3 91 7E F3 80 7E F4 3F 00 00 00 96
F440  3E 27 0C 96 1D 84 08 27 09 96 20 81 64 22 03 7E
F450  F4 09 7E F2 56 7E F4 5B 00 00 00 96 1D 9B 1E 9B
F460  1F 9B 20 9B 21 9B 22 9B 23 9B 24 9B 25 9B 26 91
F470  27 26 03 7E F4 73 7E F2 56 8E 03 CE FE F4 93 DF
F480  00 B6 F4 95 97 02 FE F4 96 DF 03 B6 F4 98 97 05
F490  7E F4 99 B7 C0 1E 7E F2 37 7E F4 9C 7E F4 A2 00
F4A0  00 00 CE 00 06 86 00 A7 00 08 8C 04 00 26 F8 CE
F4B0  F0 16 DF 38 96 39 97 3C CE F0 10 DF 38 DF 3A 96
F4C0  39 97 3D CE FF 92 FF 20 00 B6 20 01 B7 20 04 CE
F4D0  FF 80 FF 20 00 FF 20 02 B6 20 01 B7 20 05 CE FF
F4E0  D2 FF 24 00 B6 24 01 B7 24 04 CE FF C0 FF 24 00
F4F0  FF 24 02 B6 24 01 B7 24 05 86 FF 97 0E B6 C0 0F
F500  84 03 97 63 B6 C0 0E 97 64 CE FF FF B7 C0 1E 09
F510  26 FA 0E 7E 00 00 7E F5 73 7E F5 1F 00 00 00 44
F520  26 F4 7C 00 37 B6 C0 00 81 80 26 05 B6 C0 01 27
F530  13 B6 C0 00 F6 C0 01 DE 3A EE 00 A7 00 E7 01 08
F540  08 DF 35 3B CE 00 00 00 DF 35 7E F5 19 7E F5 53
F550  00 00 00 B6 C0 00 96 37 26 F0 7C 00 37 DE 35 27
F560  14 B6 C0 00 F6 C0 01 A7 00 E7 01 96 3B 91 3C 27
F570  05 8B 02 97 3B 3B 96 3D 97 3B 33 7E F5 81 00 00
F580  00 DE 35 27 0E B6 C0 00 F6 C0 01 A7 00 E7 01 08
F590  08 DF 35 96 37 81 05 27 04 7C 00 37 3B 7F 00 37
```

```
F5A0  B6 C0 04 B7 C0 1E 84 07 81 05 26 F4 7C 20 F8 B6
F5B0  C0 00 3B 7E F5 B9 00 00 00 DE 16 EE 02 EE 00 DF
F5C0  09 96 1D A7 00 96 1E A7 01 96 1F A7 02 96 20 A7
F5D0  03 96 21 A7 04 96 22 A7 05 96 23 A7 06 96 24 A7
F5E0  07 96 25 A7 08 96 26 A7 09 96 27 A7 0A 96 28 A7
F5F0  0B 96 29 A7 0C 96 2A A7 0D 96 2B A7 0E 96 2C A7
F600  0F 96 2D A7 10 96 2E A7 11 96 2F A7 12 96 30 A7
F610  13 96 31 A7 14 96 32 A7 15 96 33 A7 16 96 34 A7
F620  17 DE 16 A6 03 A1 04 27 07 83 02 A7 03 7E F6 34
F630  A6 05 A7 03 39 7E F6 3B 00 00 00 7F 00 08 96 1D
F640  9B 1E 9B 1F 9B 20 9B 21 9B 22 9B 23 9B 24 9B 25
F650  9B 26 9B 27 9B 28 9B 29 9B 2A 9B 2B 9B 2C 9B 2D
F660  9B 2E 9B 2F 9B 30 9B 31 9B 32 9B 33 91 34 26 03
F670  7E F6 76 7C 00 08 39 7E F6 80 00 00 00 7E F7 34
F680  DE 16 EE 00 EE 00 DF 18 A6 00 84 60 27 4A 84 40
F690  26 E3 A6 00 97 1D A6 01 97 1E A6 02 97 20 A6 03
F6A0  97 21 A6 04 97 22 A6 05 97 23 A6 06 97 24 A6 07
F6B0  97 25 A6 08 97 26 A6 09 97 27 A6 0A 97 28 A6 0B
F6C0  97 29 DE 16 A6 01 A1 04 27 07 83 02 A7 01 7E F6
F6D0  80 A6 05 A7 01 7E F6 80 A6 00 97 1D A6 01 97 1E
F6E0  A6 02 97 1F A6 03 97 20 A6 04 97 21 A6 05 97 22
F6F0  A6 06 97 23 A6 07 97 24 A6 08 97 25 A6 09 97 26
F700  A6 0A 97 27 A6 0B 97 34 86 00 97 28 97 29 97 2A
F710  97 2B 97 2C 97 2D 97 2E 97 2F 97 30 97 31 97 32
F720  97 33 DE 16 A6 01 A1 04 27 05 83 02 A7 01 39 A6
F730  05 A7 01 39 A6 00 97 1F A6 01 97 2A A6 02 97 2B
F740  A6 03 97 2C A6 04 97 2D A6 05 97 2E A6 06 97 2F
F750  A6 07 97 30 A6 08 97 31 A6 09 97 32 A6 0A 97 33
F760  A6 0B 97 34 7E F7 22 83 96 63 0C 49 7E F0 51 0C
F770  59 59 96 23 7E F2 DE 00 00 00 00 00 00 00 00 00
F780  00 00 00 00 00 00 00 00 00 00 00 00 00 00 00 00
F790  00 00 00 00 00 00 00 00 00 00 00 00 00 00 00 00
F7A0  00 00 00 00 00 00 00 00 00 00 00 00 00 00 00 00
F7B0  00 00 00 00 00 00 00 00 00 00 00 00 00 00 00 00
F7C0  00 00 00 00 00 00 00 00 00 00 00 00 00 00 00 00
F7D0  00 00 00 00 00 00 00 00 00 00 00 00 00 00 00 00
F7E0  00 00 00 00 00 00 00 00 00 00 00 00 00 00 00 00
F7F0  00 00 00 00 00 00 00 00 00 00 00 00 00 00 00 00
F800

FE00  00 00 00 00 00 00 00 00 00 00 00 00 00 00 00 00
FE10  00 00 00 00 00 00 00 00 00 00 00 00 00 00 00 00
FE20  00 00 00 00 00 00 00 00 00 00 00 00 00 00 00 00
FE30  00 00 00 00 00 00 00 00 00 00 00 00 00 00 00 00
FE40  00 00 00 00 00 00 00 00 00 00 00 00 00 00 00 00
FE50  00 00 00 00 00 00 00 00 00 00 00 00 00 00 00 00
FE60  00 00 00 00 00 00 00 00 00 00 00 00 00 00 00 00
FE70  00 00 00 00 00 00 00 00 00 00 00 00 00 00 00 00
FE80  00 00 00 00 00 00 00 00 00 00 00 00 00 00 00 00
FE90  00 00 00 00 00 00 00 00 00 00 00 00 00 00 00 00
FEA0  00 00 00 00 00 00 00 00 00 00 00 00 00 00 00 00
FEB0  00 00 00 00 00 00 00 00 00 00 00 00 00 00 00 00
FEC0  00 00 00 00 00 00 00 00 00 00 00 00 00 00 00 00
FED0  00 00 00 00 00 00 00 00 00 00 00 00 00 00 00 00
FEE0  00 00 00 00 00 00 00 00 00 00 00 00 00 00 00 00
FEF0  00 00 00 00 00 00 00 00 00 00 00 00 00 00 00 00
FF00  00 00 00 00 00 00 00 00 00 00 00 00 00 00 00 00
FF10  00 00 00 00 00 00 00 00 00 00 00 00 00 00 00 00
FF20  00 00 00 00 00 00 00 00 00 00 00 00 00 00 00 00
FF30  00 00 00 00 00 00 00 00 00 00 00 00 00 00 00 00
FF40  00 00 00 00 00 00 00 00 00 00 00 00 00 00 00 00
FF50  00 00 00 00 00 00 00 00 00 00 00 00 00 00 00 00
FF60  00 00 00 00 00 00 00 00 00 00 00 00 00 00 00 00
FF70  00 00 00 00 00 00 00 00 00 00 00 00 00 00 00 00
FF80  20 06 20 1E 20 36 20 4E 20 66 20 7E 20 96 20 AE
FF90  20 C6 20 DE 00 00 00 00 00 00 00 00 00 00 00 00
FFA0  79 00 00 00 00 00 00 00 00 00 00 00 00 00 00 00
FFB0  00 00 00 00 00 00 00 00 00 00 00 00 00 00 00 00
FFC0  24 06 24 1E 24 36 24 4E 24 66 24 7E 24 96 24 AE
FFD0  24 C6 24 DE 00 00 00 00 00 00 00 00 00 00 00 00
FFE0  31 00 00 00 00 00 00 00 00 00 00 00 00 00 00 00
FFF0  00 00 7E FF F2 7E FF F5 F5 4D FF F2 FF F5 F4 79
0000
```

TERMINAL NODE

```
EC00 00 00 00 00 00 00 08 08 00 00 00 00 00 00 08 08
EC10 00 00 02 02 00 00 08 08 00 00 02 02 00 00 08 08
EC20 00 00 00 00 00 00 08 08 00 00 00 00 00 00 08 08
EC30 00 00 04 04 00 00 08 08 00 00 04 04 00 00 08 08
EC40 00 0C 00 0C 00 0C 00 0C 00 0C 00 0C 00 0C 00 0C
EC50 00 0C 00 0C 00 0C 00 0C 00 0C 00 0C 00 0C 00 0C
EC60 00 0C 00 0C 00 0C 00 0C 00 0C 00 0C 00 0C 00 0C
EC70 00 0C 00 0C 00 0C 00 0C 00 0C 00 0C 00 0C 00 0C
EC80 0A 0A 00 00 00 00 08 08 0A 0A 00 00 00 00 08 08
EC90 0A 0A 02 02 06 06 08 08 0A 0A 02 02 06 06 08 08
ECA0 0A 0A 00 00 00 00 08 08 0A 0A 00 00 00 00 08 08
ECB0 0A 0A 04 04 06 06 08 08 0A 0A 04 04 06 06 08 08
ECC0 06 0C 06 0C 06 0C 06 0C 06 0C 06 0C 06 0C 06 0C
ECD0 06 0C 06 0C 06 0C 06 0C 06 0C 06 0C 06 0C 06 0C
ECE0 06 0C 06 0C 06 0C 06 0C 06 0C 06 0C 06 0C 06 0C
ECF0 06 0C 06 0C 06 0C 06 0C 06 0C 06 0C 06 0C 06 0C
ED00 00 AC 00 C4 00 DC 00 F4 01 0C 01 24 01 3C 01 54
ED10 01 6C 01 84 01 9C 01 B4 01 CC 01 E4 01 FC 02 14
ED20 02 2C 02 44 02 5C 00 00 00 00 00 00 00 00 00 00
ED30 00 00 00 00 00 00 00 00 00 00 00 00 00 00 00 00
ED40 02 74 02 8C 02 A4 02 BC 02 D4 02 EC 03 04 03 1C
ED50 03 34 03 4C 03 64 03 7C 03 94 03 AC 03 C4 03 DC
ED60 03 F4 04 0C 04 24 00 00 00 00 00 00 00 00 00 00
ED70 00 00 00 00 00 00 00 00 00 00 00 00 00 00 00 00
ED80 F6 F1 F6 FE F7 55 F7 1E F7 2C F7 63 F7 0F F6 FD
ED90 04 40 04 4C 04 58 04 64 04 70 00 00 00 00 00 00
EDA0 04 C4 04 D0 04 DC 04 E8 04 F4 00 00 00 00 00 00
EDB0 80 00 00 00 00 00 00 00 00 00 00 00 00 00 00 00
EDC0 F1 D8 F1 D2 F1 CC F2 20 F2 37 F2 2D F2 23 F2 20
EDD0 04 7C 04 88 04 94 04 A0 04 AC 04 B8 7E ED E2 00
EDE0 00 00 86 14 97 93 CE ED F2 DF 94 86 02 97 91 7E
EDF0 F3 32 7E ED F8 00 00 00 7F 00 97 7F 00 99 7F 00
EE00 9D 7F 00 9F 86 00 97 AC 97 C4 97 DC 97 F4 B7 01
EE10 0C B7 01 24 B7 01 3C B7 01 54 B7 01 6C B7 01 84
EE20 B7 01 9C B7 01 B4 B7 01 CC B7 01 E4 B7 01 FC B7
EE30 02 14 B7 02 2C B7 02 44 B7 02 5C B7 02 74 B7 02
EE40 8C B7 02 A4 B7 02 BC B7 02 D4 B7 02 EC B7 03 04
EE50 B7 03 1C B7 03 34 B7 03 4C B7 03 64 B7 03 7C B7
EE60 03 94 B7 03 AC B7 03 C4 B7 03 DC B7 03 F4 B7 04
EE70 0C B7 04 24 97 91 97 A9 97 92 96 A3 97 AA 86 02
EE80 97 A5 86 20 97 0F BD FB A5 7E FC C3 7E EE 92 00
EE90 00 00 DE 1D DF 67 DE 1F DF 69 DE 21 DF 6B DE 23
EEA0 DF 6D DE 25 DF 6F DE 27 DF 71 DE 29 DF 73 DE 2B
EEB0 DF 75 DE 2D DF 77 DE 2F DF 79 DE 31 DF 7B DE 33
EEC0 DF 7D 96 8B 0C 49 D6 8C 59 89 00 CB 89 00 97
EED0 8D D7 8E CE EE EC DF 8F 7E EE D3 7E EE E1 00 00
EEE0 00 96 21 37 20 FD 7C 00 21 7E EF F8 7E EE F2 00
EEF0 00 00 DE 67 DF 1D DE 69 DF 1F DE 6B DF 21 DE 6D
EF00 DF 23 DE 6F DF 25 DE 71 DF 27 DE 73 DF 73 DE 75
EF10 DF 2B DE 77 DF 2D DE 79 DF 2F DE 7B DF 31 DE 7D
EF20 DF 33 96 20 27 1C 81 01 27 24 81 02 27 2C 81 03
EF30 27 34 81 04 27 3C DE 89 DF 25 CE 00 00 DF 89 7E
EF40 EF 7E DE 7F DF 26 CE 00 00 DF 7F 7E EF 7E DE 81
EF50 DF 26 CE 00 00 DF 81 7E EF 7E DE 83 DF 26 CE 00
EF60 00 DF 83 7E EF 7E DE 85 DF 26 CE 00 00 DF 85 7E
EF70 EF 7E DE 87 DF 26 CE 00 00 DF 87 7E EF 7E 96 1D
EF80 84 EF 97 1D DE 8B DF 22 7F 00 21 CE 00 00 DF 24
EF90 BD FA 7E CE 00 60 DF 16 3D F8 E6 7E EF 9E 7E EF
EFA0 A4 00 00 00 DE 09 B5 20 FD A7 04 AB 03 A7 03 7E
EFB0 EF 82 7E EF 83 00 00 00 F6 20 FE C4 C0 54 54 54
EFC0 54 17 DE 09 EA 05 E7 05 A3 0B A7 0B F6 20 FE C4
EFD0 3F 0C 59 59 5D 17 EA 07 E7 07 AB 0B A7 0B 7E EF
EFE0 E1 7E EF E7 00 00 00 DE 09 A6 05 8A 10 A7 05 A6
EFF0 03 83 10 A7 0B 7E 00 00 7E EF FE 00 00 00 3D FA
F000 7E CE 00 60 DF 16 3D F8 E6 7E F3 32 7E F0 12 00
F010 00 00 7E EF F8 7E F0 1B 00 00 00 B6 20 FC 81 06
F020 27 05 22 03 7E F0 38 DE 8D 27 03 09 DF 8D 96 93
F030 27 03 4A 97 93 7F 20 FC 7E F2 88 7E F0 41 00 00
F040 00 96 8F 27 0D DE 8D 26 09 DE 8F DF 14 7F 00 8F
F050 6E 00 96 94 27 0D 96 93 26 09 DE 94 DF 14 7F 00
F060 94 6E 00 7E 00 00 7E F0 6C 00 00 00 96 91 81 02
F070 27 07 86 21 97 0F 7E FC 79 7E F3 32 7E F3 32 7E
F080 F0 85 00 00 00 96 91 81 02 27 F1 96 91 26 ED 96
F090 1F 84 1F 91 AA 23 0F 96 A4 26 0B 86 21 97 0F 7E
```

```
F0A0 FC 82 86 01 97 A4 96 A3 26 05 DE 98 7E F0 B1 DE
F0B0 9E EE 00 A6 00 27 C5 7F 00 A4 96 A3 26 09 96 99
F0C0 8B 02 97 99 7E F0 CD 96 9F 8B 02 97 9F 90 9B 44
F0D0 81 10 27 06 A6 02 84 20 27 22 7A 00 A5 7F 00 A9
F0E0 7C 00 92 96 AB 97 AA 73 00 A3 96 A5 26 1A 86 22
F0F0 97 0F BD FB A5 36 01 97 91 7E F3 32 7C 00 A9 96
F100 A9 9B AB 97 AA 7E F0 A6 86 20 97 0F BD FB A5 7E
F110 F3 32 7E F1 18 00 00 00 96 91 81 01 26 0A 7F 00
F120 91 86 20 97 0F BD FB A5 7E F0 3B 7E F1 31 00 00
F130 00 96 08 0C 49 97 08 9A 0D 97 15 96 0C 97 14 DE
F140 14 EE 00 6E 00 7E F1 4B 00 00 00 96 1D 84 60 27
F150 08 DE 81 08 DF 81 7E F1 5E DE 7F 08 DF 7F 7E FC
F160 1B 7E F1 67 00 00 00 DE 83 08 DF 83 7E F3 32 7E
F170 F1 75 00 00 00 DE 89 08 DF 89 7E F0 3B 7E F1 83
F180 00 00 00 DE 85 08 DF 85 7E F4 98 7E F1 91 00 00
F190 00 96 1D 9B 1E 9B 1F 9B 20 9B 21 9B 22 93 23 93
F1A0 24 9B 25 9B 26 91 27 26 77 CE 00 60 DF 16 5F 96
F1B0 20 81 21 27 02 CA 01 0C 59 59 96 23 84 03 97 23
F1C0 DA 23 D7 08 CE ED C0 DF 0C 7E F1 23 DE 21 A6 02
F1D0 97 26 DE 21 A6 01 97 25 DE 21 A6 00 97 24 96 1D
F1E0 84 EF 97 1D 86 25 97 20 96 1D 9B 1E 9B 1F 9B 20
F1F0 9B 21 9B 22 9B 23 9B 24 9B 25 9B 26 97 27 86 00
F200 97 28 97 29 97 2A 97 2B 97 2C 97 2D 97 2E 97 2F
F210 97 30 97 31 97 32 97 33 F8 BD FA 7E BD F8 E6
F220 7E F3 32 DE 21 96 26 A7 02 A6 02 97 26 DE 21 96
F230 25 A7 01 A6 01 97 25 DE 21 96 24 A7 00 7E F1 D8
F240 7E F2 46 00 00 00 96 55 91 57 27 12 CE 00 54 DF
F250 16 BD FA B5 BD F9 BA 96 08 26 06 7E F1 45 7E F2
F260 64 7E F1 61 7E F2 6A 00 00 00 96 53 91 5D 27 12
F270 CE 00 5A DF 16 BD FA B5 BD F9 BA 96 08 26 06 7E
F280 F1 45 7E F3 32 7E F1 61 7E F2 8E 00 00 00 B6 A0
F290 07 B1 20 09 27 0B CE 20 06 DF 16 BD F9 38 7E F1
F2A0 7D 7E F2 40 7E F2 AA 00 00 00 D6 1F C4 1F C1 0F
F2B0 23 03 7E F3 32 7E FC 10 27 0B DE 9E DF A6 9A A1
F2C0 97 A7 7E F2 CD DE 98 DF A6 9A 9B 97 A7 7E FC 07
F2D0 1D A7 00 96 1E A7 01 96 1F A7 02 96 20 A7 03 96
F2E0 21 A7 04 96 22 A7 05 96 23 A7 06 96 24 A7 07 96
F2F0 25 A7 08 96 26 A7 09 96 27 A7 0A 96 28 A7 0B 96
F300 29 A7 0C 96 2A A7 0D 96 2B A7 0E 96 2C A7 0F 96
F310 2D A7 10 96 2E A7 11 96 2F A7 12 96 30 A7 13 96
F320 31 A7 14 96 32 A7 15 96 33 A7 16 96 34 A7 17 7E
F330 F0 7F 7E F3 38 00 00 00 96 91 81 02 26 03 7E F0
F340 33 36 20 03 81 20 01 27 02 23 0A 30 20 01 81 02
F350 22 EC 7E F3 62 B1 20 05 26 E4 B6 20 01 81 20 04
F360 26 DC 7E FC 3D 09 96 9D 91 9F 26 30 7E F3 75 96
F370 97 91 99 26 27 96 A2 27 0E 96 A3 26 19 7F 00 A2
F380 86 01 97 A8 7E F3 62 96 A8 26 03 86 01 97 A2 86
F390 01 97 A8 7E F3 62 7F 00 A8 7E F0 3B 96 A2 27 0D
F3A0 96 9D 91 9F 26 11 90 A1 26 69 7E F3 37 96 97 91
F3B0 99 26 04 90 9B 26 5C 96 A2 27 05 DE 9C 7E F3 C2
F3C0 DE 96 EE 00 DF 18 7E FC 30 CE 20 00 DF 16 BD F9
F3D0 FC 96 A2 27 09 96 9D 8B 02 97 9D 7E F3 E4 96 97
F3E0 8B 02 97 97 90 9B 44 81 10 27 05 DE 09 A6 02 84
F3F0 20 27 A6 7C 00 A5 96 A2 26 0D 96 9B 97 97 97 99
F400 35 01 97 A2 7E F1 12 96 A1 97 9D 97 9F 7F 00 A2
F410 7E F1 12 7E F1 6F 7E F4 1C 00 00 00 BD FA 7E CE
F420 00 60 DF 15 BD F8 E6 7E F2 40 7E F4 30 00 00 00
F430 96 1E 81 FF 26 09 96 1D 84 10 26 22 7E F4 53 96
F440 1D 84 03 91 8B 26 14 96 1E 91 8C 26 0E 96 20 81
F450 29 27 0E 81 21 27 0D 81 23 27 09 7E F4 80 7E EE
F460 8C 7E F4 34 7E F1 83 7E F4 6D 00 00 00 96 20 81
F470 20 27 07 81 23 27 06 7E F2 A4 7E ED DC 7E F0 66
F480 7E F4 85 00 00 00 96 1E 81 FF 26 09 96 1D 84 10
F490 26 03 7E F0 0C 7E F4 57 7E F4 9E 00 00 00 96 66
F4A0 27 0C 96 1D 84 08 27 09 96 20 81 64 22 03 7E F4
F4B0 16 7E F2 40 7E F4 BA 00 00 00 96 1D 9B 1E 9B 1F
F4C0 9B 20 9B 21 9B 22 93 23 93 24 9B 25 9B 26 91 27
F4D0 25 03 7E FC 38 7E F3 32 8E 04 3F FE F4 F2 DF 00
F4E0 B6 F4 F4 97 02 FE F4 F5 DF 03 B6 F4 F7 97 05 7E
F4F0 F4 F8 B7 C0 1E 7E F0 15 7E F4 FB 7E F5 01 00 00
F500 00 CE 00 06 86 00 A7 00 08 8C 06 00 26 F8 CE 20
F510 00 86 00 A7 00 08 8C 21 00 26 F8 CE 05 00 86 AA
F520 A7 00 08 8C 06 00 26 F8 CE ED 80 DF 35 CE EC 00
F530 DF 48 CE 05 00 DF 4B CE FF DA DF 20 06 B6 20 07
F540 B7 20 0A CE FF D0 FF 20 06 FF 20 08 B6 20 07 B7
F550 20 03 CE ED A8 DF 60 96 61 97 64 CE ED A0 DF 60
F560 DF 62 96 61 97 65 CE ED D6 DF 54 96 55 97 53 CE
```

```
F570 ED D0 DF 54 DF 56 96 55 97 59 CE ED DA DF 5A 96
F580 5B 97 5E CE ED D8 DF 5A DF 5C 96 5B 97 5F CE FF
F590 E6 FF 20 00 B6 20 01 B7 20 04 CE FF E0 FF 20 00
F5A0 FF 20 02 B6 20 01 B7 20 05 CE ED 93 DF 4E 96 4F
F5B0 97 52 CE ED 90 DF 4E DF 50 96 4F 97 53 CE ED 24
F5C0 DF 96 96 97 97 9A CE ED 00 DF 96 DF 98 96 97 97
F5D0 9B CE ED 64 DF 9C 96 9D 97 A0 CE ED 40 DF 9C DF
F5E0 9E 96 9D 97 A1 86 FF 97 0E 86 FF B7 05 FF 86 00
F5F0 B7 05 00 86 0D B7 20 FE 86 02 97 A5 86 04 97 AB
F600 96 36 97 37 96 AB 97 AA 36 C0 0F 84 03 97 8B B5
F610 C0 0E 97 8C 86 80 9A 8B B7 20 6C B7 20 84 B7 20
F620 9C B7 20 B4 B7 20 CC B7 20 E4 96 3C B7 20 6D B7
F630 20 85 B7 20 9D B7 20 B5 B7 20 CD B7 20 E5 86 E0
F640 B7 20 6E B7 20 86 B7 20 9E B7 20 B6 B7 20 CE B7
F650 20 E6 96 8C 97 4C DE 4B E6 00 96 8B 81 03 26 07
F660 C4 3F CA 40 7E F6 81 81 02 26 07 C4 CF CA 10 7E
F670 F6 81 81 01 26 07 C4 F3 CA 04 7E F6 81 C4 FC CA
F680 01 E7 00 CE FF FF B7 C0 1E 09 26 FA 0E 7E 00 00
F690 7E F8 16 7E F6 99 00 00 00 44 DE F4 7C 00 4D B6
F6A0 C0 00 97 4A F6 C0 01 D7 4C 84 78 97 49 DE 43 96
F6B0 4A 84 03 E6 00 81 00 26 06 C4 03 59 7E F6 D3 81
F6C0 01 26 06 C4 0C 56 7E F6 D3 81 02 26 08 C4 30 56
F6D0 56 56 7E F6 D3 C4 C0 59 59 59 59 DA 49 DA 3F DA
F6E0 47 D7 49 DE 43 A6 00 9A 37 97 36 DE 35 EE 00 6E
F6F0 00 CE 00 00 DF 3A CE 00 00 DF 38 DF 41 33 DE 56
F700 EE 00 DF 38 CE 00 54 DF 3D 7F 00 47 7E F7 37 DE
F710 43 EE 00 DF 33 7C 00 3C 7F 00 47 7E F7 37 DE 50
F720 EE 00 DF 38 CE 00 4E DF 3D 7E F7 37 DE 5C EE 00
F730 DF 38 CE 00 5A DF 3D DE 38 96 4A A7 00 96 4C A7
F740 01 96 39 8B 02 97 39 DE 41 EE 00 FF C0 11 96 42
F750 8B 02 97 42 33 DE 56 EE 00 DF 38 CE 00 54 DF 3D
F760 86 01 97 47 DE 3D DF 3A 7E F7 37 CE 00 00 DF 38
F770 DF 3A 7E F7 47 7E F6 93 7E F7 7E 00 00 00 96 4D
F780 26 F3 B6 C0 00 7C 00 4D DE 38 27 30 B6 C0 00 A7
F790 00 B6 C0 01 A7 01 DE 3D A6 03 97 40 A1 04 27 07
F7A0 83 02 A7 03 7E F7 AB A6 05 A7 03 DE 3A 27 0D 7F
F7B0 00 3A EE 02 DF 43 DE 3D 96 40 A7 03 DE 41 27 05
F7C0 EE 00 FF C0 11 96 3C 27 18 7F 00 3C DE 3D 96 44
F7D0 A7 03 A1 04 27 07 83 02 A7 03 7E F7 E1 A6 05 A7
F7E0 03 96 61 91 63 26 16 96 4F 91 51 27 20 DE 4E EE
F7F0 00 DF 41 CE 00 4E DF 45 86 80 97 3F 33 DE 60 EE
F800 00 DF 41 CE 00 60 DF 45 86 80 97 3F 3B CE ED B0
F810 DF 41 7F 00 3F 3B 7E F8 1C 00 00 00 B6 C0 00 DE
F820 38 27 10 B6 C0 00 A7 00 B6 C0 01 A7 01 96 39 8B
F830 02 97 39 DE 41 27 0B EE 00 FF C0 11 96 42 8B 02
F840 97 42 96 4D 81 05 27 04 7C 00 4D 33 7F 00 4D 96
F850 3F 27 17 DE 41 27 13 DE 45 A6 01 A1 04 27 07 83
F860 02 A7 01 7E F8 6A A6 05 A7 01 36 C0 04 B7 C0 1E
F870 84 07 81 05 26 F4 7C 20 FC B6 C0 00 3B 7E 83 83
F880 00 00 00 DE 18 A6 00 97 1D A6 01 97 1E A6 02 97
F890 1F A6 03 97 20 A6 04 97 21 A6 05 97 22 A6 06 97
F8A0 23 A6 07 97 24 A6 08 97 25 A6 09 97 26 A6 0A 97
F8B0 27 A6 0B 97 28 A6 0C 97 29 A6 0D 97 2A A6 0E 97
F8C0 2B A6 0F 97 2C A6 10 97 2D A6 11 97 2E A6 12 97
F8D0 2F A6 13 97 30 A6 14 97 31 A6 15 97 32 A6 16 97
F8E0 33 A6 17 97 34 39 7E F8 EC 00 00 00 DE 16 EE 02
F8F0 EE 00 DF 09 96 1D A7 00 96 1E A7 01 96 1F A7 02
F900 96 20 A7 03 96 21 A7 04 96 22 A7 05 96 23 A7 06
F910 96 24 A7 07 96 25 A7 08 96 26 A7 09 96 27 A7 0A
F920 96 34 A7 0B DE 16 A6 03 A1 04 27 07 83 02 A7 03
F930 7E F9 37 A6 05 A7 03 39 7E F9 3E 00 00 00 DE 16
F940 EE 00 EE 00 DF 18 A6 00 97 1D A6 01 97 1E A6 02
F950 97 1F A6 03 97 20 A6 04 97 21 A6 05 97 22 A6 06
F960 97 23 A6 07 97 24 A6 08 97 25 A6 09 97 22 A6 0A
F970 97 27 A6 0B 97 28 A6 0C 97 29 A6 0D 97 2A A6 0E
F980 97 2B A6 0F 97 2C A6 10 97 2D A6 11 97 2E A6 12
F990 97 2F A6 13 97 30 A6 14 97 31 A6 15 97 32 A6 16
F9A0 97 33 A6 17 97 34 DE 16 A6 01 A1 04 27 07 8B 02
F9B0 A7 01 7E F9 B9 A6 05 A7 01 39 7E F9 C0 00 00 00
F9C0 7F 00 08 96 1D 9B 1E 9B 1F 9B 20 9B 21 9B 22 9B
F9D0 23 9B 24 9B 25 9B 26 9B 27 9B 28 9B 29 9B 2A 9B
F9E0 2B 9B 2C 9B 2D 9B 2E 9B 2F 9B 30 9B 31 9B 32 9B
F9F0 33 91 34 26 03 7E F9 F3 7C 00 08 39 7E FA 02 00
FA00 00 00 DE 16 EE 02 EE 00 DF 09 96 1D A7 00 96 1E
FA10 A7 01 96 1F A7 02 96 20 A7 03 96 21 A7 04 96 22
FA20 A7 05 96 23 A7 06 96 24 A7 07 96 25 A7 08 96 26
```

```
FA30 A7 09 96 27 A7 0A 96 28 A7 0B 96 29 A7 0C 96 2A
FA40 A7 0D 96 2B A7 0E 96 2C A7 0F 96 2D A7 10 96 2E
FA50 A7 11 96 2F A7 12 96 30 A7 13 96 31 A7 14 96 32
FA60 A7 15 96 33 A7 16 96 34 A7 17 DE 16 A6 03 A1 04
FA70 27 07 8B 02 A7 03 7E FA 7D A6 05 A7 03 39 7E FA
FA80 84 00 00 00 96 1D 9B 1E 9B 1F 9B 20 9B 21 9B 22
FA90 9B 23 9B 24 9B 25 9B 26 9B 27 9B 28 9B 29 9B 2A
FAA0 9B 2B 9B 2C 9B 2D 9B 2E 9B 2F 9B 30 9B 31 9B 32
FAB0 9B 33 97 34 39 7E FA BE 00 00 00 7E FB 72 DE 16
FAC0 EE 00 EE 00 DF 18 A6 00 84 60 27 4A 84 40 26 EB
FAD0 A6 00 97 1D A6 01 97 1E A6 02 97 20 A6 03 97 21
FAE0 A6 04 97 22 A6 05 97 23 A6 06 97 24 A6 07 97 25
FAF0 A6 08 97 26 A6 09 97 27 A6 0A 97 28 A6 0B 97 29
FB00 DE 16 A6 01 A1 04 27 07 8B 02 A7 01 7E FA BE A6
FB10 05 A7 01 7E FA BE A6 00 97 1D A6 01 97 1E A6 02
FB20 97 1F A6 03 97 20 A6 04 97 21 A6 05 97 22 A6 06
FB30 97 23 A6 07 97 24 A6 08 97 25 A6 09 97 26 A6 0A
FB40 97 27 A6 0B 97 34 86 00 97 28 97 29 97 2A 97 2B
FB50 97 2C 97 2D 97 2E 97 2F 97 30 97 31 97 32 97 33
FB60 DE 16 A6 01 A1 04 27 05 8B 02 A7 01 39 A6 05 A7
FB70 01 39 A6 00 97 1F A6 01 97 2A A6 02 97 2B A6 03
FB80 97 2C A6 04 97 2D A6 05 97 2E A6 06 97 2F A6 07
FB90 97 30 A6 08 97 31 A6 09 97 32 A6 0A 97 33 A6 0B
FBA0 97 34 7E FB 60 7E FB A8 00 00 DE 8B DF 1D 96
FBB0 1D 8A 88 97 1D 86 E0 97 1F 96 0F 97 20 96 A5 97
FBC0 21 96 A9 97 22 96 92 97 23 86 00 97 24 97 25 97
FBD0 26 97 27 97 28 97 29 97 2A 97 2B 97 2C 97 2D 97
FBE0 2E 97 2F 97 30 97 31 97 32 97 33 97 34 BD FA 7E
FBF0 CE 00 60 DF 16 BD F8 E6 DE 09 A6 03 81 21 25 05
FC00 DE 87 08 DF 87 39 EE DE A6 EE 00 95 1D 7E F2 D1
FC10 0C 59 17 D6 A3 7E F2 B8 95 1D 84 08 27 09 96 20
FC20 81 64 22 03 7E F4 2A 7E F2 A4 00 00 00 00 00 00
FC30 3D F8 7D 6F 00 7E F3 C9 01 0F 7E F4 D2 96 A2 27
FC40 0D 96 9D 91 9F 26 14 90 A1 26 16 7E F3 75 96 97
FC50 91 99 26 07 90 9B 26 09 7E F3 75 7F 04 2A 7E F3
FC60 B7 B6 04 2A 26 06 7C 04 2A 7E F4 13 7E F0 3B 00
FC70 00 00 00 00 00 00 00 00 3D FB A5 BD FC 83 7E
FC80 F0 79 BD FB A5 BD FC 83 7E F0 A2 95 A3 25 03 DE
FC90 98 DF 06 96 9A 97 0E 7E FC A2 DE 9E DF 06 95 A0
FCA0 97 0E DE 06 EE 00 6F 00 DE 06 03 08 DF 06 95 07
FCB0 91 0E 27 02 23 01 39 7E FC A2 00 00 00 00 00 00
FCC0 00 00 00 96 9B 97 97 97 99 95 A1 97 9D 97 9F 7E
FCD0 00 00 00 00 00 00 00 00 00 00 00 00 00 00 00 00
FCE0 00 00 00 00 00 00 00 00 00 00 00 00 00 00 00 00
FCF0 00 00 00 00 00 00 00 00 00 00 00 00 00 00 00 00
FD00 00 00 00 00 00 00 00 00 00 00 00 00 00 00 00 00
FD10 00 00 00 00 00 00 00 00 00 00 00 00 00 00 00 00
FD20 00 00 00 00 00 00 00 00 00 00 00 00 00 00 00 00
FD30 00 00 00 00 00 00 00 00 00 00 00 00 00 00 00 00
FD40 00 00 00 00 00 00 00 00 00 00 00 00 00 00 00 00
FD50 00 00 00 00 00 00 00 00 00 00 00 00 00 00 00 00
FD60 00 00 00 00 00 00 00 00 00 00 00 00 00 00 00 00
FD70 00 00 00 00 00 00 00 00 00 00 00 00 00 00 00 00
FD80 00 00 00 00 00 00 00 00 00 00 00 00 00 00 00 00
FD90 00 00 00 00 00 00 00 00 00 00 00 00 00 00 00 00
FDA0 00 00 00 00 00 00 00 00 00 00 00 00 00 00 00 00
FDB0 00 00 00 00 00 00 00 00 00 00 00 00 00 00 00 00
FDC0 00 00 00 00 00 00 00 00 00 00 00 00 00 00 00 00
FDD0 00 00 00 00 00 00 00 00 00 00 00 00 00 00 00 00
FDE0 00 00 00 00 00 00 00 00 00 00 00 00 00 00 00 00
FDF0 00 00 00 00 00 00 00 00 00 00 00 00 00 00 0C 00
FE00 00 00 00 00 00 00 00 00 00 00 00 00 00 00 00 00
FE10 00 00 00 00 00 00 00 00 00 00 00 00 00 00 00 00
FE20 00 00 00 00 00 00 00 00 00 00 00 00 00 00 00 00
FE30 00 00 00 00 00 00 00 00 00 00 00 00 00 00 00 00
FE40 00 00 00 00 00 00 00 00 00 00 00 00 00 00 00 00
FE50 00 00 00 00 00 00 00 00 00 00 00 00 00 00 00 00
FE60 00 00 00 00 00 00 00 00 00 00 00 00 00 00 00 00
FE70 00 00 00 00 00 00 00 00 00 00 00 00 00 00 00 00
FE80 00 00 00 00 00 00 00 00 00 00 00 00 00 00 00 00
FE90 00 00 00 00 00 00 00 00 00 00 00 00 00 00 00 00
```

```
FEA0 00 00 00 00 00 00 00 00 00 00 00 00 00 00 00 00
FEB0 00 00 00 00 00 00 00 00 00 00 00 00 00 00 00 00
FEC0 00 00 00 00 00 00 00 00 00 00 00 00 00 00 00 00
FED0 00 00 00 00 00 00 00 00 00 00 00 00 00 00 00 00
FEE0 00 00 00 00 00 00 00 00 00 00 00 00 00 00 00 00
FEF0 00 00 00 00 00 00 00 00 00 00 00 00 00 00 00 00
FF00 00 00 00 00 00 00 00 00 00 00 00 00 00 00 00 00
FF10 00 00 00 00 00 00 00 00 00 00 00 00 00 00 00 00
FF20 00 00 00 00 00 00 00 00 00 00 00 00 00 00 00 00
FF30 00 00 00 00 00 00 00 00 00 00 00 00 00 00 00 00
FF40 00 00 00 00 00 00 00 00 00 00 00 00 00 00 00 00
FF50 00 00 00 00 00 00 00 00 00 00 00 00 00 00 00 00
FF60 00 00 00 00 00 00 00 00 00 00 00 00 00 00 00 00
FF70 00 00 00 00 00 00 00 00 00 00 00 00 00 00 00 00
FF80 00 00 00 00 00 00 00 00 00 00 00 00 00 00 00 00
FF90 00 00 00 00 00 00 00 00 00 00 00 00 00 00 00 00
FFA0 00 00 00 00 00 00 00 00 00 00 00 00 00 00 00 00
FFB0 00 00 00 00 00 00 00 00 00 00 00 00 00 00 00 00
FFC0 00 00 00 00 00 00 00 00 00 00 00 00 00 00 00 00
FFD0 20 6C 20 84 20 9C 20 B4 20 CC 20 E4 00 00 00 00
FFE0 20 0C 20 24 20 3C 20 54 D5 00 00 00 00 00 00 00
FFF0 00 00 7E FF F2 7E FF F5 F7 78 FF F2 FF F5 F4 D8
0000
```

The following program load listings for nodes NMIFN, CIFN, YN and TMN have a slightly different format. The four left most digits of each line contain a 4 digit word pertaining to an assembler program which generated the load listings. The next 4 digits contain a beginning hexidecimal address location and the next 16 pairs of hexidecimal characters define the contents of 16 sequential address locations beginning with the defined address and the last pair of characters are of no interest. Some corrections or "patches" have been made in these load lists subsequent to their printout. The corrections for each node follow the node load list.

NET MASTER INTERFACE NODE

```
S00600004844521B
S113FA007EFA06000000DE20DF1DDE22DF1FDE247A
S113FA10DF21DE26DF23DE28DF25DE2ADF27CE00F6
S113FA2000DF29DF2BDF2DDF2FDF31DF33860187A6
S113FA3020FC7EFA6D7EFA3B000000B62401B1245E
S113FA40032703CE2400DF16BDFB307EFA007E00B8
S113FA50007EFA57000000B62007B12009270BCE1C
S113FA602006DF163DFB307EFB277EFA357EFA7357
S113FA70000000CE2000DF16BDFB327E00007EFA3F
S113FA8084000000CE2C00DF16BDFB327EFA357E6A
S113FA90FA950000008E0049FEFAAFDF00B6FA3115
S113FAA09702FEFAB2DF03B6FAB497057EFAB5B749
S113FAB0C01E7EFA517EFAB87EFABE000000CE0067
S113FAC00SB600A700033C00FF26F8CE24008500D6
S113FAD0A7000B8C250026F8CE2C00B600A7000B75
S113FAE08C2D0026F8CEFFA2FF2400B62401B724F3
S113FAF004CEFF90FF2400FF2402B624013724059E
S113FB00CEFFE2FF2C00B62C01B72C04CEFFD0FFB1
S113FB102C00FF2C02B52C01B72C05CEFFFB7C07A
S113FB201E0926FA7E00007EFB2D0000007EFA7E70
S113FB307EFB36000000DE16EE00EE00DF18A500A5
S113FB40971DA601971EA602971FA6039720A60439
S113FB509721A5059722A5069723A6079724A50809
S113FB609725A5099726A50A9727A6039728A50CD9
S113FB709729A60D972AA60E972BA60F972CA610A9
S113FB80972DA611972EA612972FA6139730A51479
S113FB909731A6159732A6169733A6179734DE1613
S113FBA0A601A10427078B02A7017EFBB1A505A726
S113FBB001397EFB33000000DE16EE02EE00DF091C
S113FBC0961DA700961EA701961FA7029620A703BD
S113FBD09621A7049622A7059623A7069624A7078D
S113FBE09625A7089625A7099627A70A9628A7035D
S113FBF09529A70C952AA70D952BA70E952CA70F20
S113FC00962DA710962EA711962FA7129630A713FC
S113FC109631A7149632A7159633A7169634A717CC
S113FC20DE16A603A10427078B02A7037EFC33A6D5
S113FC3005A70339000000000000000000000000D8
S113FC40000000000000000000000000000000030
S113FC500000000000000000000000000000000A0
S113FC6000000000000000000000000000000000090
```

```
S113FC70000000000000000000000000000000080
S113FC80000000000000000000000000000000070
S113FC90000000000000000000000000000000060
S113FCA0000000000000000000000000000000050
S113FCB0000000000000000000000000000000040
S113FCC0000000000000000000000000000000030
S113FCD0000000000000000000000000000000020
S113FCE0000000000000000000000000000000010
S113FCF0000000000000000000000000000000000
S113FD00000000000000000000000000000000EF
S113FD10000000000000000000000000000000DF
S113FD20000000000000000000000000000000CF
S113FD300000000000000000000000000000003F
S113FD40000000000000000000000000000000AF
S113FD500000000000000000000000000000009F
S113FD600000000000000000000000000000003F
S113FD700000000000000000000000000000007F
S113FD800000000000000000000000000000006F
S113FD900000000000000000000000000000005F
S113FDA00000000000000000000000000000004F
S113FDB00000000000000000000000000000003F
S113FDC00000000000000000000000000000002F
S113FDD00000000000000000000000000000001F
S113FDE00000000000000000000000000000000F
S113FDF0000000000000000000000000000000FF
S113FE000000000000000000000000000000000EE
S113FE10000000000000000000000000000000DE
S113FE20000000000000000000000000000000CE
S113FE30000000000000000000000000000000BE
S113FE40000000000000000000000000000000AE
S113FE500000000000000000000000000000009E
S113FE600000000000000000000000000000008E
S113FE700000000000000000000000000000007E
S113FE800000000000000000000000000000006E
S113FE900000000000000000000000000000005E
S113FEA00000000000000000000000000000004E
S113FEB00000000000000000000000000000003E
S113FEC00000000000000000000000000000002E
S113FED00000000000000000000000000000001E
S113FEE00000000000000000000000000000000E
S113FEF0000000000000000000000000000000FE
S113FF00000000000000000000000000000000ED
S113FF10000000000000000000000000000000DD
S113FF20000000000000000000000000000000CD
S113FF300000000000000000000000000000003D
S113FF40000000000000000000000000000000AD
S113FF500000000000000000000000000000009D
S113FF600000000000000000000000000000008D
S113FF700000000000000000000000000000007D
S113FF800000000000000000000000000000005D
S113FF9024062241E24362442E2466247E249624AE5D
S113FFA024C624DE0000000000000000000000051
S113FFB0206C2084209C20B420CC20E400000000003D
S113FFC0200C2024203C205400000000000000000ED
S113FFD02C062C1E2C362C4E2C662C7E2C952CAEED
S113FFE02CC62CDE00000000000000000000000011
S113FFF020FE7EFFF27EFFF5FFF0FFF2FFF5FA959B
S9030000FC
```

CONSOLE INTERFACE NODE

```
S006000043445213
S113F8009520312525F951D84FC51332557951F85
S113F81031E02661955231042553DE24DF35953623
S113F82097103DFD51960E9739950F973A963797C4
S113F330103DFD61960E9733950F973CCE0039DFC5
S113F84013BDFE44CE0033DF133DFE44DE40272831
S113F850BDFE0ACE2G00DF16BDFCC5DE40SC0001D3
S113F860260509DF407EF85C09D9DF40DE4C0303F3
S113F870DF4C7EFC9D7EF3727F00523DFE2F7EF329
S113F88072BDDDF960327333DFDEC3DFEAC95527C
S113F89027173101271531022715310327143103434
S113F8A027133105271127F0052723EF33E7EF8D27E90
S113F8B0F92D7EF9C07EFA9E7EFAA37EF397DFDE4
S113F8C0359603270A7F003560013720FC97527E5A
S113F8D0F397963F315327 1A510D2715DFD3F95C9
```

```
S113F3E005270F3DFEF596353102270F7C00357E72
S113F3F0F3977F0052BDFE2F7EF3EF7F003593493F
S113F9009710BDFDA2951A9747964A97103DFDA27F
S113F910961A0C494949499743954397103DFDA240
S113F920961A9A439743350297527EF3EF963F3135
S113F9300D2755315327613DFD3F9503275A3DFF75
S113F940039635310325A7F0035964E97103DFDE3
S113F950A2951A0C494949499740964F97103DFDF3
S113F960A2951A9A40974C9550971030FDA2951ADF
S113F9700C494949499740955197103DFDA2951AD5
S113F9609A40974D9653271FCE0000DF39DF3DF9A
S113F9903D350597527EF3977F00523DFE2F7EF970
S113F9A0957C00357EF3957F00427F00437F004433
S113F9B07F0045350397527EF9957EFA5F7EFA93EA
S113F9C0953F315327F431DD271D3FD3F96D32737
S113F9DDE93DFEE59535310325E395422700971D9D
S113F9E03DFDA2951A0C494949499740964327D9F7
S113F9F09710BDFDA2951A9A40974D9644270CF7FB
S113FA0010BDFDA2951A0C494949499741964527CC
S113FA10A99710BDFDA2951A9A4197413DFE0ACE40
S113FA202000DF163DFCC586049752DE403C000220
S113FA3027062204097EFA3AD909DF40964C9710FA
S113FA40BDFD61950E974E950F974F964D97103D3C
S113FA50FD619502975095DF9751860D3DFEA48634
S113FA60DABDFEA485FF3DFEA4964E3DFEA4964F1D
S113FA70BDFEA496503DFEA496513DFEA43620BD35
S113FA80FEA4362F9746DE4C0803DF4C7EF3977F4A
S113FA900052BDFE2F7EFA3C7C00357EFA3CDE5F20
S113FAA0DF71BDFE2F7F00527EF397963F31532762
S113FAB01A31DD271F3DFDBF9603270F9635310535
S113FAC0271B3DFECC7C00357EF3947F00526DFE22
S113FAD02F7EF3947F00523DFE2F3DFEC0963927AE
S113FAE00C97103DFDA2951A0C494949499736950C0
S113FAF03A270997103DFDA2951A9A359736953377
S113FB30027DC97103DFDA2951A0C494949499737D0D
S113FB10963C270997103DFDA2951A9A37973795F7
S113FB203D27DC97103DFDA2951A0C49494949737E7
S113FB3033953227597103DFDA2951A9A33973335A4
S113FB403DFE0A36239729953510122056003975
S113FB5023963397247EF3735103220335D1972317
S113FB60DE37DF247EF37350297230E350F24959E
S113FB7035972630F0F3CE2000DF16BDFCC50E4C54
S113FB80D60303DF4CCE0000DF39DF3BDF3D7F0093
S113FB90D357EF3947EF397DE7190CF251D5320D79F
S113FBA0312DD927DB6E2DDSDF163DF137EF3D019
S113FB307EFC9D7EF339000000060035EFBD5DF57
S113FBC0036F3D59702FEFBD5DF0335FBD397D53C
S113FBD07EF3D937C01E7EFC2D7EFBDCED0D5A7C3
S113FBE0003600202625F5CE0157DF5995A975D53
S113FBF0E01E0DF59DF5B966A976ECE01FFD5F9F
S113FC003970977306601D56DF6FDF71957D977435F4
S113FC101A37C01D55FF3C001D502B7C001D0F5E37
S113FC202FC0FFFFF37C001E09267A7E0000360001D22
S113FC30D4012735360009714560013440252D2F
S113FC40961431DA27279614973F3DFD3F95032670
S113FC501F96143157271D6152227153151271D13125
S113FC60D53270D310D27097EFC5A7EF3317EFC5A37
S113FC70DE339614A700955C916D27D73301975C29
S113FC807EFC379663973C96143DFEA43100260AA1
S113FC90D35DA3DFEA435FF3DFEA47EFC6A95709112
S113FCA0722F1F3500013402271BDE5FA500037C0F2
S113FCB00096709173270733D1977D7EFC0C2957425
S113FCC0D97707E00007EFCCB00000DE16EE02EE94
S113FCD000DF099610A700961EA701951FA702968E
S113FCE02DA70395221A7049622A7059523A7069534
S113FCF024A7079525A7039525A7099527A7DA2E0C
S113FD0016A503A1D427073302A7D37EFDF2A505EE
S113FD10A70339F7EFD190000006E16EE00EE00DF39
S113FD2013A5009710A501971EA602971FA5039753
S113FD3020A6049721A6059722A5069723A507972F
S113FD4024A5039725A609972SA50A9727DE16A5AD
S113FD5001A10427073302A7017EFD6A505A70168
S113FD5D399610444444443109221113A30D970E95EE
S113FD7010340F3100220A3A009700F395A07EFD45
S113FD80DE0A407EFD797F00037F0035953F313243
S113FD90270531572705397000033970000370C039
```

```
S113FCA05339961054F05130270531402705399500
S113FD3010540F971A399610340F3309971A397F7C
S113FDC00003963F313027032201393139230C3131
S113FDD041270322013931452301397C0003397FF5
S113FDE000030E59906B27037C000339DE59A500E5
S113FDF0973F39951D931E931F93209321932393F3
S113FE0DE393249325932597273DDE47DF1D539355
S113FE109A1D971D35E0971F35219720DE4CDF21CF
S113FE20550197230E0000DF24DF263DFDF3393543
S113FE300D3DFEA4350A3DFEA435FF3DFEA43521D3
S113FE403DFEA439DE1BA6003DFEA4DE13A5013DC1
S113FE50FEA436203DFEA49545310227422240354 7
S113FE600D3DFEA4360A3DFEA436FF3DFEA4DE2150
S113FE7003DF239623971030DFD51960E3DFEA49555
S113FE8303F3DFEA4952997103DFD51930E3DFEA47C
S113FE9095DF3DFEA48520BDFEA4352F974539300A
S113FEAD0397453 9DE71A7003DFE3C39955A915091
S113FEB027053301976A39956E975A399672917302
S113FEC02705330197723996749772399533A973943
S113FED09533973A9530973953D9730953E973D3A
S113FEE0963F973E3995439742964497439545 9753
S113FEF04495 3F97453 9954A97499643974A953F79
S113FF009743 39954F974E96509749551975095D3
3107FF103F97513959
S113FFD0205C208420 9C20342 0CC25E40000050005D
S113FFE020002024203C205403000003000003000CC
S113FFF020FE7EFFF27EFFF5FFF0FFF2FFF5F3337C
S903000FC
```

| CIFN Node Patches | | |
|---|---|---|
| ADDRESS | NEW VALUE | OLD VALUE |
| FBDC | 7E | CE |
| FBDD | FF | 00 |
| FBDE | 16 | 06 |
| FF16 | CE | 00 |
| FF17 | 00 | 00 |
| FF18 | 06 | 00 |
| FF19 | 86 | 00 |
| FF1A | 00 | 00 |
| FF1B | 7E | 00 |
| FF1C | FB | 00 |
| FF1D | DF | 00 |
| FC10 | 12 | 1A |
| FD7F | FF | FD |
| FD80 | 1E | 6D |
| FD84 | FF | FD |
| FD85 | 23 | 79 |
| FF1E | 80 | 00 |
| FF1F | 09 | 00 |
| FF20 | 7E | 00 |
| FF21 | FD | 00 |
| FF22 | 6D | 00 |
| FF23 | 80 | 00 |
| FF24 | 09 | 00 |
| FF25 | 7E | 00 |
| FF26 | FD | 00 |

-continued

| CIFN Node Patches | | |
|---|---|---|
| ADDRESS | NEW VALUE | OLD VALUE |
| FF27 | 79 | 00 |
| FE5B | 26 | 27 |
| FE5D | 26 | 22 |
| FE70 | 7E | 08 |
| FE71 | FF | DF |
| FE72 | 28 | 28 |
| FF28 | 08 | 00 |
| FF29 | 08 | 00 |
| FF2A | DF | 00 |
| FF2B | 28 | 00 |
| FF2C | 7E | 00 |
| FF2D | EE | 00 |
| FF2E | 73 | 00 |
| FAD7 | 7E | BD |
| FAD8 | FF | FE |
| FF2F | BD | 00 |
| FF30 | FE | 00 |
| FF31 | 2F | 00 |
| FF32 | 7A | 00 |
| FF33 | 00 | 00 |
| FF34 | 35 | 00 |
| FF35 | 7E | 00 |
| FF36 | FA | 00 |
| FF37 | DD | 00 |

Y NODE

```
S00600004844521B
S113FC00F62003F120042705CB027EFC10F6200524
S113FC10F120012713B62C01B12C03270BCE2C00A5
S113FC20DF16BDFDF87EFC817EFC2BF62003F1205F
S113FC30042705CB027EFC3BF62005F120012713A7
S113FC40B62801B128032709CE2800DF16BDFDF826
S113FC507EFC927E0000F62403F124042705CB02E7
S113FC607EFC66F62405F124012713B62007B12093
S113FC7009270BCE2006DF16BDFDF87EFCA37EFC13
S113FC80007EFC87000000CE2000DF16BDFE7A7ED9
S113FC90FC2B7EFC98000000CE2000DF16BDFE7A0F
S113FCA07E00007EFCA9000000CE2400DF16BDFE0D
S113FCB07A7EFCB47EFCBA000000CE2806DF16BDB6
S113FCC0FE7A7EFC007EFCC9000000961D931E9BF2
S113FCD01F9B209B219B229B239B249B259B26913E
S113FCE02726037EFCE37EFC568E05FFFEFD03DF24
```

```
S113FCF000B6FD059702FEFD06DF03B6FD08970575
S113FD007EFD0937C01E7EFC567EFD0C7EFD1200F2
S113FD100000CE00068600A700088C060026F8CE58
S113FD2020008600A700088C240026F8CE24008634
S113FD3000A700088C250026F8CE28008600A7001E
S113FD40088C290026F8CEFF8AFF2006B62007B7C4
S113FD50200ACEFF80FF2006FF2008B62007B72028
S113FD6003CEFFC2FF2400B62401B72404CEFFB09B
S113FD70FF2400FF24023624201B72405CEFF9AFF16
S113FD802806B62807B7280ACEFF90FF2806FF28C2
S113FD9008B62807B7280BCEFFE2FF2C00B62C01C3
S113FDA0B72C04CEFFD0FF2C00FF2C02B62C01B7D9
S113FDB02C05CEFFA6FF28003628201B72804CEFFE5
S113FDC0A0FF2800FF2802B62801B72805CEFF6E41
S113FDD0FF2000B62001B72004CEFF40FF2000FF23
S113FDE02002B62001B7200586FF970ECEFFFFB78D
S113FDF0C01E0926FA7E00007EFDFE000000DE160D
S113FE00EE00EE00DF18A600971DA601971EA602BD
S113FE10971FA6039720A6049721A6059722A60656
S113FE209723A6079724A6089725A6099726A60A26
S113FE309727A6039728A60C9729A60D972AA60EF6
S113FE40972BA60F972CA610972DA611972EA612C6
S113FE50972FA6139730A6149731A6159732A61696
S113FE609733A6179734DE16A601A1042707B30241
S113FE70A7017EFE79A605A701397EFE8000000059
S113FE80DE16EE02EE00DF09961DA700961EA701FE
S113FE90961FA7029620A7039621A7049622A705DA
S113FEA09523A7059524A7079525A7089526A709AA
S113FEB09627A70A9628A70B9629A70C962AA70D7A
S113FEC0962BA70E962CA70F962DA710962EA7114A
S113FED0962FA7129530A7139531A7149532A7151A
S113FEE09533A7159534A717DE16A603A104270790
S113FEF08B02A7037EFEF9A605A703390000000C2
S113FF00000000000000000000000000000000ED
S113FF10000000000000000000000000000000DD
S113FF20000000000000000000000000000000CD
S113FF30000000000000000000000000000000BD
S113FF40200C0242203C2054206C2084209C2034AD
S113FF5020CC20E420FC2114212C2144215C217498
S113FF60218C21A421BC21D421EC2204221C223482
S113FF7000000000000000000000000000000007D
S113FF90236C2884289C283428CC28E40000007D
S113FFA0230C2824283C2854000000000000000ED
S113FFB02405241E2435244E2465247E249524AE4D
S113FFC024C624DE0000000000000000000000041
S113FFD02C052C1E2C352C4E2C662C7E2C962CAEED
S113FFE02CC62CDE0000000000000000000000011
S113FFF020FE7EFFF27EFFF5FFF0FFF2FFF5FCE945
S9030000FC
```

TERMINAL MATCHING NODE

```
FC00  4F B7 C0 10 CE 00 00 A7 00 08 8C 01 00 26 F8 F8
FC10  FD 95 DF 06 C6 14 D7 13 CE 02 8B 4A 26 FD 09 26
FC20  FA FE 20 00 DF 0A 8E 00 7F 7E FC 2C B6 C0 00 84
FC30  80 D6 00 27 0C 5C 26 26 C6 FD D7 00 97 01 01 FC
FC40  5C 95 02 27 09 C6 C6 D7 00 D6 00 7E FC 5C 97 02
FC50  D7 03 20 08 FF C0 1F D7 00 7E FC 5C 96 00 81 FD
FC60  26 4E 96 01 16 DB 19 D7 19 D6 03 5C D7 03 C1 0C
FC70  26 15 D6 19 58 58 2E 96 04 46 46 46 DE 1A A7 04
FC80  D7 02 D7 01 7E FD 10 49 96 96 49 C0 09 27 0C 97
FC90  04 FE 20 20 EE 00 DF 1A 7E FC 84 DE 1A A7 03 D7
FCA0  04 E1 00 20 DF 5F 86 FF 97 03 D7 19 96 04 20 D0
FCB0  D6 03 C0 0C 26 28 DE 1A A6 03 5F 84 E0 81 C0 27
FCC0  3C B6 20 09 B1 20 0A 26 11 B6 20 0B 01 B1 20 07
FCD0  27 1A B7 20 09 D7 00 7E FD 10 8B 02 20 EF F7 C0
FCE0  1F D6 03 2B 0E 86 06 4A 26 FD 20 EB D7 00 E1 00
FCF0  7E FD 10 7F 00 00 86 05 4A 26 FD 20 DA A6 04 E6
FD00  03 48 59 48 59 CA 80 D7 05 08 01 E1 00 7E FD 10
```

```
FD10  DE 06 6E 00 7C 00 08 81 09 2A 3C 01 DE 0A EE 06
FD20  DF 0C 4A 16 50 CB 08 D7 09 16 47 58 1B 9B 0D 97
FD30  0D 7F 00 00 C5 02 27 16 DE 0C A6 00 01 48 48 48
FD40  97 0E 08 DF 0C 86 05 97 0F E1 00 7E FE FE 97 86 01
FD50  97 0F 86 05 7E FE B4 96 09 27 0C DE 0A EE 06 DF
FD60  0C 40 8B 08 7E FD 29 CE FD 73 DF 06 91 05 86 0D
FD90  0A 08 7E FE B4 CE FE CC 96 05 26 57 96 0B B1 20
FDA0  03 27 0C DF 06 D6 08 86 05 4A 26 FD 7E FE 6C 86
FDB0  86 08 7E FE B4 D6 0B C0 04 F0 20 05 25 05 FB 20
FDC0  05 20 06 CB 02 FB 20 04 04 D7 0B 16 16 12 CB 02
FDD0  54 D7 05 97 10 97 11 11 12 80 02 C6 01 D7 0F 44
FDE0  97 97 CE 00 13 DF 0C CE FE CC DF 06 08 09 08 09
FDF0  7E FE 97 08 09 01 4D 2A 43 48 91 11 2B 27 91 10
FE00  2A 16 D6 0B F1 20 05 26 0B F1 20 04 01 D7 0B 16
FE10  D0 11 20 BA C0 02 20 F5 16 D0 10 C1 08 2A 0E 08
FE20  09 D1 D1 20 ED 91 12 2A 8C 08 09 96 08 96 08 08
FE30  48 48 64 D7 05 C6 03 5A 27 A1 20 FB 7E FD 14 CE
FE40  FD FD DF 06 86 86 01 7E FE B4 CE FE CC DF 06 96
FE50  16 26 6D 96 05 26 A0 D6 08 DB 17 C4 7F D7 08 7A
FE60  00 09 27 62 96 0E 2A 52 08 09 A1 00 86 08 97 09
FE70  86 01 97 0F 96 0B B1 20 20 27 C4 DE 10 DF 11 58
FE80  D7 10 B1 20 04 27 1A 4C 4C B7 20 01 DE 0A 97 0B
FE90  EE 00 DF 0C 7E FE 97 E1 00 86 02 4A 26 26 7E FC
FEA0  FC B6 20 05 B7 20 01 DE 0A 97 97 EE 00 DF 0C 7E
FEB0  7E 97 86 0C 4A 26 FD 7E 7E 97 86 0D 08 08 08 B4
FEC0  86 13 08 7E FE B4 08 09 08 09 20 A0 CE FF 60 DF
FED0  06 96 16 16 EB CE FF AC DF 06 86 15 97 16 DE 0C
FEE0  4F 97 17 4C D6 0F 5A 26 3E E6 00 C1 00 27 28 97
FEF0  97 C4 F4 C1 14 27 05 86 0A 7E FE B4 D6 08 A6 00
FF00  44 44 58 58 49 58 49 A7 00 00 01 84 07 1B A7 01
FF10  E1 00 86 02 7E FE B4 E6 02 C4 E0 EA 01 27 06 97
FF20  17 86 08 20 D4 20 FA D6 0E 58 27 0C 97 17 C1 10
FF30  27 17 86 86 08 7E FE B4 E6 01 C4 FE EA 00 27 07
FF40  97 17 86 09 7E FE B4 20 F9 E6 01 58 96 08 44 56
FF50  E7 01 E6 00 C4 C0 1B A7 00 00 04 E1 00 7E FE B4
FF60  CE FE 4A DF 06 96 18 7A 00 16 27 1E 7A 00 0F 27
FF70  2D 08 09 08 09 08 09 D6 0E F7 C0 10 84 80 1B 97
FF80  18 18 D7 0E 86 09 01 7E FE B4 B4 18 86 04 4D 4D
FF90  26 26 F7 C0 10 7A 00 00 86 0A 08 7E FE B4 DE 0C
FFA0  C6 08 D7 0F E6 00 08 DF 0C 7E FF 79 CE FE 4A DF
FFB0  06 7A 00 16 78 00 0E 86 80 7F 00 18 08 09 08 09
FFC0  08 09 08 01 B7 C0 10 86 0E 09 7E FE B4 B4 00 00
FFD0  20 6C 20 84 20 9C 20 B4 20 CC 20 E4 00 00 00 00
FFE0  20 0F 20 27 20 3F 20 57 20 0F 20 27 20 3F 3F 00
FFF0  00 00 00 00 00 00 20 FE FF F6 FF F6 FF F6 FC 00
```

While there have been shown and described above a particular example of a communication system and distributed multiprocessor system in accordance with the invention for the purpose of enabling a person of ordinary skill in the art to make and use the invention, it will be appreciated that the invention is not limited to the particular example. Accordingly, any modifications, variations or equivalent arrangements within the scope of the attached claims should be considered to be within the scope of the invention.

What is claimed is:

1. A communication system providing communication between a central processing location and a plurality of terminal devices that are physically remote from the central processing location, the communication system extending to a physical site of each of the plurality of terminal devices and providing communication with each of the terminal devices in a given fixed length data block format in which each data block carries information associated with only one terminal device and destination indicating information, the communication system comprising a first closed communication loop having a plurality of channel segments extending between exchange devices, and a plurality of exchange unit devices interconnecting channel segments, the exchange unit devices in the first loop including a different terminal exchange unit device connected to each terminal device of said plurality of terminal devices, each terminal exchange unit device being at the same physical location as its connected terminal device and receiving blocks of data from one channel segment and providing blocks of data to a next channel segment in a continuous sequence of time frames having a capacity of one data block, each terminal exchange unit device providing communication between the first loop and its connected terminal of data from the terminal and data blocks from the loop which indicate the connected terminal as a destination with other data blocks being passed along the first loop with no change in the contents thereof, the channel further including a second closed communication loop including a plurality of channel segments extending between exchange unit devices and a plurality of exchange unit devices interconnecting the channel segments of the second loop, one of said second loop exchange unit devices providing to the first communication loop a continuous series of time frames for carrying data blocks, data blocks being communicated between the central processing location and a terminal node device through the first and second loops with no intermediate changes in format or information content thereof and with each intermediate exchange unit device receiving a data block being operable to determine the forwarding route for the received data block in accordance with the destination indicating information therein.

2. The communication system according to claim 1 above, further comprising a line master exchange unit device coupling the second loop of the communication system to the central processing location, the communication system including a loop beginning and ending with the line master exchange unit device.

3. The communication system according to claim 2 above, wherein the line master exchange unit device includes a plurality of programmable micronodes and at least one read/write memory coupled to provide data communication between a pair of micronodes of the line master exchange device.

4. The communication system according to claim 3 above, wherein the read/write memory is a random access multi-port memory having each port coupled to a different programmable micronode and means for enabling the ports in a predetermined sequence to provide a micronode coupled to an enabled port read/write access to the memory.

5. The communication system according to claim 1 above, wherein each channel segment of the second communication loop comprises a pair of opposite direction serial data links.

6. The communication system according to claim 5 above, wherein each exchange unit device in the second loop includes means for communicating data between the second communication loop and the first communication loop and means for selectively controlling data flow along the second loop to provide either normal continued flow along a serial data link of a block of data in the direction from which it is received toward a next exchange unit device along the second loop or a loopback return flow of a block of data along the opposite serial data link of a pair from the one on which the block is received back toward the exchange unit device from which a block has been received.

7. The communication system according to claim 6 above, wherein each second loop exchange unit device includes loopback control circuitry responsive to data blocks received over the second communication loop containing loopback control supervision data to selectively provide normal or loopback flow of data along the second communication loop.

8. The communication system according to claim 7 above, wherein each second loop exchange unit device has an address associated therewith and provides a loopback data flow only in response to a data block containing said associated address and a loopback flow supervision message but provides normal data flow in response to any data block containing a normal flow supervision message even if the data block does not contain the associated address.

9. A communication system providing communication between a central processing location and a plurality of terminal devices that are physically remote from the central processing location, the communication system comprising a communication channel that extends to a physical site of each of the plurality of terminal devices and provides communication with each of the terminal devices in a given fixed length data block format in which each data block carries information associated with only one terminal device, the channel including a plurality of different channel segments, each capable of carrying information that is independent of the information carried by the other channel segments at any given instant in time, the communication system further comprising a line master exchange unit device coupled to provide communication between the channels and the central processing location and including buffer storage for at least one message for each of the terminal devices which includes a plurality of ordered data blocks, each of the data blocks including a number field indicating a proper sequential order of the data block within a message, the channel including a plurality of terminal exchange unit devices, each of which is associated with a different terminal device and is coupled to provide data communication between the channel and the associated terminal device, each terminal exchange unit device including buffer storage for a multi-block message, means for storing in the buffer data blocks destined for the associated terminal device in a sequential order indicated by the number field therein, means for indicating the last data block received in complete sequential order, and means for sending to the line master exchange unit device an error message in an error message block format when a data block is received out of order by more than a given amount as indicated by the received data block number field and the means for indicating.

10. The communication system according to claim 9 above, wherein said error message is originated only by a terminal exchange unit device connected to a terminal receiving a message in which an error occurs and is communicated through the channel as at least one data block in the error message block format.

11. The communication system according to claim 10 above, wherein each terminal exchange unit device includes means for including in the error message an indication of the last data block received in complete sequential order in response to the indicating means, and wherein the line master exchange unit device includes means for responding to said error message by resending the data message beginning with the data block following the indicated last data block received in complete sequence.

12. The communication system according to claim 9 above, further comprising a line exchange unit device coupled to provide communication between the channel and the line master exchange unit device and wherein the channel includes a plurality of terminal exchange unit devices which are serially coupled for communication of data in the given fixed length data block format with the line exchange unit device, each terminal exchange unit device being coupled to a different terminal device and being operative to receive data over the channel and selectively communicate the received data on to the next terminal exchange unit device along the channel or to a coupled terminal device in response to the received data contents of a data block.

13. The communication system according to claim 12 above, wherein said fixed length given data block format includes a large block format wherein each large block includes address information indicating a terminal device to which data information carried by the large block pertains and data information, and a small block format in which all of the information of a large block of data is carried by a plurality of small blocks of data with the address information included in the large block format being included in only a first small block of said plurality of small blocks carrying the data of a large block.

14. The communication system according to claim 13 above, wherein the line exchange unit device includes means for assembling data in a large block format and communicating data over the communication channel in a small block format.

15. The communication system according to claim 14 above, wherein the line exchange unit device further includes means for determining the amount of actual data information carried by a large block and communicating the information over the channel as a minimum integral number of small blocks required to carry all of the data.

16. The communication system according to claim 15 above, wherein the address information is carried by the first portion of the first small block and wherein each terminal exchange unit device along the channel includes means for examining the address information of a data block before the entire first small block is received and if the data block is to be communicated to a next serially coupled terminal exchange unit device along the channel as indicated by the address information, beginning said communication before the entire first small block is completely received.

17. The communication system according to claim 16 above, wherein each small block of information comprises less than 100 bits of information.

18. The communication system according to claim 17 above, wherein the line exchange unit device is operative to communicate small blocks of data continuously over the channel with no pause between consecutive small blocks.

19. The communication system according to claim 18 above, wherein each small block comprises a start bit of a given state at the beginning of the small block as it is carried on the communication channel between devices.

20. The communication system according to claim 19 above, wherein empty blocks are communicated in the channel as a start bit followed by bits consisting entirely of a state opposite the given state of the start bit.

21. The communication system according to claim 20 above, wherein each terminal exchange unit device includes an input/output module coupled to receive small blocks of data along the channel in serial form and to output small blocks of data in serial form to a next device along the channel, the input/output module including circuitry coupled to count the maximum number of bits of a state opposite the given state in an empty small data block and to synchronize the input/output module to the received data upon receipt of a bit of a given state after counting in uninterrupted sequence the maximum number of bits of the opposite state.

22. The communication system according to claim 21 above, wherein the input/output module includes an input register coupled to receive incoming bits of data, an output register coupled to hold data bits that are being output to the channel and means for generating an interrupt signal when the input register is full, each terminal exchange unit device further including a programmable processor node coupled to sample the input register in response to an interrupt request from an associated input/output module and to selectively control communication of received data to an associated terminal device or through the output register to a next exchange unit device along the channel or both in response to the address information of a first portion of a first small data block of a large data block.

23. The communication system according to claim 22 above, wherein each large block of data includes a direction signal field indicating whether the large block of data is being communicated to or from a terminal device and wherein the data processor responds to said direction signal field to control the sending of small blocks of data in accordance with the following sequential priority, the highest priority being first, small blocks of data from a terminal device received over the channel; second, small blocks of data received from the coupled terminal device; and third, small blocks of data to a terminal device received over the channel.

24. The communication system according to claim 9 above, wherein said fixed length data block format includes a fixed length large block format and a fixed length small block format in which information contained in a large block is carried by a first small block and a minimum number of additional small blocks that is required to carry all of the data of the large block.

25. The communication system according to claim 24 above, further comprising a plurality of line exchange unit devices coupled in serial sequence to form a second communication channel, each line exchange unit device coupling the second channel to another channel of which one is the first mentioned channel and each line exchange unit device including a plurality of programmable processor modules with a first processor module contolling data flow along a coupled other channel and a second processor module controlling data flow along the second channel, said processor modules being coupled to provide communication between modules of the same exchange unit device on a complete block by block basis and communication along a second or other channel on a serial thread through basis wherein a first portion of a communicated small block is received and transmitted along an appropriate path before receipt of a last portion of the communicated small block.

26. The communication system according to claim 25 above, further comprising a plurality of two port read write memories, each having the ports thereof coupled to different processor modules and providing the sole means of data communication between the processor modules coupled thereto.

27. A communication system providing communication between a central processing location and a plurality of terminal devices that are physically remote from the central processing location, the communication system comprising a communication channel that extends to a physical site of each of the plurality of terminal devices and provides communication with each of the terminal devices in a given fixed length data block format in which each data block carries information associated with only one terminal device, the channel including a plurality of different channel segments, each capable of carrying information that is independent of the information carried by the other channel segments at any given instant in time, the communication system further comprising a plurality of read write data stores and a plurality of programmable processor modules coupled to provide system functions as data moves between a terminal device and a communicating facility, each processor module having a read write data store coupled thereto, having a defined address, being operative to recognize the address in an address field of a block of data received thereby, and being operative to recognize a network control indication in a message type indicator field of a message received thereby, each processor module being further operative upon recognition of a message containing the address and a net control write indication to write into the read write data storage a quantity of data specified in the message beginning at an address location specified in the message.

28. The communication system according to claim 27 above, wherein each programmable processor module is operable to execute program information received through the communication system and stored in the read write data store.

29. A communication system providing communication between a central processing location and a plurality of terminal devices that are physically remote from the central processing location, the communication system comprising a communication channel that extends to a physical site of each of the plurality of terminal devices and provides communication with each of the terminal devices in a given fixed length data block format in which each data block carries information associated with only one terminal device, the channel including a plurality of different channel segments, each capable of carrying information that is independent of the information carried by the other channel segments at any given instant in time, the communication system further comprising data storage and a plurality of programmable processor modules coupled to provide system functions as data moves between a terminal device and a communicating facility, each processor module having an information store coupled thereto, having a defined address, being operative to recognize the address in an address field of a block of data received by the module, and being operative to recognize a network control indication in a message type indicator field of a message received by the module, each processor module being further operative upon recognition of a message containing the address thereof and a net control read indication to read from the information store a quantity of data specified by the message starting with a storage location specified by the message, to assemble the read data into a response message bearing the address of the processor module, and to communicate the assembled message through the communication system in the given format as any other message.

30. The communication system according to claim 29 above, wherein said information store coupled to each processor module is a read write information store, the given fixed length data block format including an address field carrying an address, and for system control messages a message type field indicating a type of control message, read and write control messages further including a start address field identifying a processor node address start location, a data length field indicating a number of processor node address locations, and write control messages further including a write data field carrying a number of words to be written as defined by the data length field, each processor module being responsive to a read or write control message bearing the address thereof to respectively read from or write into the information store the specificed number of words beginning with the specified address, the data of the write data field being sequentially written into the read write information store in response to a write control message including the address thereof.

31. The communication system according to claim 30 above, wherein each programmable processor module further includes means responsive to a read or write control message for generating and communicating a control response message bearing the address of the module, the commanded start module address location, the number of words and the data stored in the specified module address locations after the commanded read or write operation.

32. The communication system according to claim 29 above, wherein each exchange unit device includes at least one addressable processor node, each node having a unique address associated therewith, the processor node being operative to control the flow of information along the communication channel and between the communication channel and the central processing location with at least a plurality of the processor nodes performing a switching function by requiring data to proceed over a selected one of a plurality of possible paths and with one of the processor nodes being a netmaster node which is operative to maintain a data base table of active nodes and to periodically generate and communicate through the system an all call message in the given fixed length data block format, the all call message including information uniquely identifying the message as an all call message, each of the processor nodes being operative in response to receipt of an all call message to forward the message in duplicate form over all possible communication paths and to generate and send toward the netmaster node an all call response message in the given fixed length format and including information uniquely identifying the message as an all call response message and indicating the address associated with the sending node, the netmaster node being operative in response to receipt of each all call response message to update the data base table to indicate that the sending node is in an active status.

33. The communication system according to claim 32 above, wherein each responding processor node is further operative to include in each all call response message an empty upper node address field and is operative upon receipt of an all call response message generated by another node and having an empty upper node address field to insert its own associated address into the empty upper node address field before forwarding the all call response message toward the netmaster node, the netmaster node being further operative to maintain in the data base table the upper node address contained in the all call response message for each responding node.

34. The communication system according to claim 33 wherein the netmaster node is operative to maintain in the data base table first and second upper node address fields for each node responding to an all call message, the netmaster node being operative to respond to an all call response message having a nonempty upper node address field therein by writing the message upper node address into the first table field if both table fields are empty, writing the message upper node address into the second table field if the second table field is empty and the first table field is nonempty and unequal to the message upper node address, taking no action if the upper node address equals either the first or second table field, and writing the message upper node address into one of the first and second table fields and emptying the other if the message upper node address does not equal either of the table fields.

35. The communication system according to claim 32 above, wherein each processor node performing a switching function is operative to maintain for each node responding to an all call message through the switching node a table indicating a path over which an all call response message is received, the table being updated each time an all call response message is received and being used to determine a selected one of a plurality of possible paths over which a message addressed to a responding node is to be forwarded.

36. The communication system according to claim 32 above, wherein each terminal exchange unit device includes a terminal node coupled between the first loop and a terminal device, each terminal node including in each all call response message unique information identifying the response message as originating with a terminal node and including in a data rate field an indication of the maximum rate at which information can be transferred from the terminal node to the coupled terminal device.

37. The communication system according to claim 36 above, wherein one of the nodes is a line master node operating to maintain a table of indicated data rates for responding terminal nodes sending all call response messages through the line master node, the line master node updating the data rate table each time an all call response message is received from a terminal node, using the table data rate information to predict the amount of terminal data stored at a terminal node, and selecting a terminal node with a least amount of stored data for receipt of a next block of data.

38. The communication system according to claim 32 above, wherein the netmaster node is further operative to include in each all call message a message type parameter identifying one of a plurality of all call message types, the different all call message types being generated in a revolving sequence, and wherein each of the responding nodes is operative to include in the all call message a statistical parameter relating to the operation of the node, the statistic parameter varying with the type of all call message that is being responded to.

39. The communication system according to claim 38 above, wherein the netmaster node is further operative to maintain a data base of statistical parameters for responding processor nodes and to update the data base of statistical parameters each time an all call response message is received.

40. The communication system according to claim 32 above, wherein each processor node generating an all call response message includes means for waiting a period of time after receipt of an all call message before sending through the communication system the all call response message, the period of time being selectively varied among the processor nodes to assure a time distribution of receipt of all call response messages by the netmaster node.

41. A rapid response communication network comprising:
a network controller coupled for bidirectional communication with a host data processing system;
a plurality of subnetworks coupled to the network controller for bidirectional communication with the host data processing system, each subnetwork including:
a line master exchange unit device coupled to provide bidirectional communication of data between the network controller and at least one first communication channel;
at least one first communication channel coupled to provide bidirectional communication of data between at least one second communication channel and the line master exchange unit device; and
at least one second communication channel extending to the physical site of each of a plurality of terminals and being coupled to provide bidirectional communication of data between each of the terminals and the first communication channel, all data being carried on the second communication channel in a standard fixed length block format, the second communication channel including a plurality of terminal exchange unit devices, each located at a physical site of a terminal and coupling a terminal to a second communication channel, the terminal exchange unit devices including data processing apparatus coupled to examine data blocks destined for a terminal coupled thereto, to communicate to the linemaster exchange unit device through the subnetwork an acknowledgement of passage of a information through the network for the coupled terminal, no other acknowledgement being provided by the linemaster exchange unit device, and to communicate to the coupled terminal in a form compatible therewith data received through the subnetwork destined for said terminal.

42. A communication system comprising:
a plurality of terminals, each coupled through a communication network node point at the physical site of the terminal for communication through the communication network;
a communication network including a serial data communication channel extending to the physical site of each of the terminals and coupled for communication with each of the terminals, the serial data communication channel carrying data in a fixed length standard data block format including a single synchronization bit for each block followed by an address occupying predetermined address locations in a data block and uniquely identifying a node point coupling a terminal to the communication channel followed by data occupying predetermined data locations in a data block and relating to a single terminal coupled at a node point identified by the address to the communication channel; and
a plurality of nodes disposed along the communication channel at node points, each node coupling a terminal to the communication channel.

43. A communication system comprising:
a line master exchange unit device coupled for bidirectional communication with a host data processing system and for communication with a plurality of addressable terminal node units through a communication medium using a communication format in which a single message for a single terminal node unit comprises at least one standard length data block each data block including data information being communicated and control informaton indicating an address of a destination terminal node unit, a sequence code indicating the sequential position of the block among other blocks of a message and an error checking code permitting detection of an error in a block of communicated data, the line master exchange unit device retransmitting a message upon the occurrance of an indication of a error in transmitting a message to a terminal node unit, a communication medium coupled to carry messages in serial digital form between the line master exchange unit device and a plurality of line exchange unit devices, each line exchange unit device receiving blocks of data and selectively routing each block of data in accordance with control information contained therein; and a plurality of addressable terminal node devices, each receiving blocks of data containing an address thereof and assembling received blocks of data into messages in the sequential order indicated by said sequence code, each sending an acknowledgement message through the communication medium to the line master exchange unit device upon receipt of a complete error free message, and each communicating messages received from the host to a terminal device connected thereto.

44. The communication system according to claim 43 above, wherein each message includes at least one and not more than 16 data blocks.

45. The communication system according to claim 43 above, wherein the communication medium includes means for converting each block to a plurality of fixed length small blocks and means for carrying only the small blocks along the communication medium in serial digital form, means for inhibiting the sending of small blocks containing no meaningful data because the blocks of data from which they are converted contain less than a maximum amount of data, and means for reconverting at least one small block received through the communication medium back to a block form which existed prior to conversion by the converting means.

46. The communication system according to claim 43 above, wherein the line master exchange unit device includes error indication apparatus coupled to detect the completion of transmission of a message by the line master exchange unit device and the receipt of a corresponding acknowledgement message from a terminal node device, the error indication apparatus generating an indication of an error when a corresponding acknowledgement message is not received within a predetermined time period after completion of transmission of a message.

47. The communication system according to claim 46 above, wherein each terminal node device includes means for detecting an error in the receipt of a message from the line master exchange unit device and means responsive to the detection of an error by the detecting means for communicating through the system to the line master exchange unit device an error message.

48. The communication system according to claim 47 above, wherein the line master exchange unit device error indication apparatus is coupled to generate an indication of an error upon receipt of an error message from a terminal node device.

49. The communication system according to claim 46 above, wherein the line master exchange unit device is coupled to respond to said indication of an eror by resending at least a portion of a message that was not properly received by a terminal node device.

50. A communication network comprising:
a network controller adapted for bidirectional communication with a host, the network controller providing bidirectional communication of fixed length blocks of data between the host and at least one subnetwork;
a subnetwork including a line master exchange unit device coupled for bidirectional communication of fixed length blocks of data with the network controller;
the line master exchange unit device including buffer storage for a multiblock message for a terminal, the line master exchange unit device being operable to store in the buffer storage a plurality of blocks of data received from the network controller and destined for the terminal and to communicate sequentially to the terminal over a communication link fixed length blocks of data carrying said multiblock message, said sequentially communicated fixed length blocks of data each including information identifying the destination terminal, information indicating a proper sequential order therefore, and information permitting determination of a last block of a message; and
a communication link coupled to communicate said fixed length blocks of data from the line master exchange unit device to the terminal, the communication link including a terminal node coupled for communication with the terminal and having buffer storage for a multiblock message for the terminal and being operative to assemble in said storage blocks of data for the terminal as they are received from the host in the sequential order indicated by the proper sequential order indicating information and being operative to send to the line master exchange unit device over the communication link an acknowledgement message upon receipt in the terminal node buffer storage of a complete message as indicated by the sequential order indicating information and the last block determination information.

51. A communication system providing bidirectional communication between a host data processor and a plurality of terminals, the system comprising a modular system having a plurality of exchange unit devices which are operable to provide a data communication coupling among a plurality of communication channels, a plurality of communication channels, each coupled to carry information between two exchange unit devices, each exchange unit device including a plurality of programmable micronodes each of which is operable to perform a selected portion of the operating function of the exchange unit device and at least one multi-port read-write memory having a first port coupled to a first micronode and a second port coupled to a second micronode, the first and second micronodes communicating with one another solely by writing into the memory information that is read by the other, and the exchange unit devices communicating with one another solely through a communication channel coupled therebetween.

52. A communication system providing bidirectional communication between a host data processor and a plurality of terminals, the network comprising a modular system of node devices, channels and memories, the channels and memories each being connected between at least two different node devices and providing the sole means of data communication therebetween, at least one of said nodes comprising a plurality of micronodes, each of which is addressable and is coupled for data communication with another addressable micronode solely through a memory which is shared by both micronodes.

53. The communication system according to claim 52 above, further comprising a network controller coupled between the host data processing system and the terminals and carrying all terminal messages, the network controller being a node, and wherein all memory locations available to each addressable micronode are accessible by the network controller through that addressable micronode.

54. The communication system according to claim 53 above, wherein the network controller includes means for selectively modifying the operation of an addressable micronode by accessing memory locations available to the addressable micronode.

55. The communication system according to claim 54 above, wherein the network controller is operable to cause an additional program to operate in the micronode by accessing memory locations available to the micronode by writing therein at least one program to be executed by the micronode.

56. A modular communication system comprising:
- a network controller connected to control the flow of information from a host data processor through the communication system;
- at least one fan out node device bidirectionally coupling a plurality of separate data paths to the network controller;
- a line master exchange unit device connected to receive terminal generated data from a communication channel and communicate the received terminal generated data to a given fan out node along a given data path and to receive host data processor generated data from the given fan out node along the given data path and control the flow of the host processor generated data to the communication channel for distribution to a terminal; and
- a communication channel coupling the line master exchange unit device to at least one terminal for bidirectional communication of data therebetween, the network controller, fan out node device and the line master exchange unit device each comprising at least one programmable processor, each processor including a store of instructions that are executable by the processor and each processor being coupled to at least one other processor through a read write multiple port memory that can be accessed by at least the two different processors coupled thereto.

57. The communication system according to claim 56 above, further comprising a multiple port read write memory coupling a network controller programmable processor to a fan out node programmable processor, the multiple port memory being shared by both said network controller and fan out node programmable processors.

58. The communication system according to claim 57 above, further comprising a multiple port read write memory coupling a fan out node device programmable processor to a line master exchange unit device programmable processor, the most recently mentioned multiple port memory being accessible by and shared by the fan out node device programmable processor coupled thereto and the line master exchange unit device processor coupled thereto.

59. The communication system according to claim 58 above, wherein each of said multiple port memories has a first portion and a second portion different from the first portion, one programmable processor coupled thereto being operable to write into the first portion and read from the second portion and another programmable processor coupled thereto being operable to read from the first portion and write into the second portion, bidirectional communication between the coupled programmable processors thus being accomplished.

60. The communication system according to claim 56 above, wherein the network controller and line master exchange unit device each comprise a plurality of programmable processors including a store of instructions that are executable by the processor with each of the last mentioned programmable processors being coupled to another programmable processor through a multiple port read write memory that is shared by the programmable processors coupled thereto.

61. The communication system according to claim 60 above, wherein the store of instructions for each of the before mentioned programmable processors and the multiple port memories coupled thereto are addressably accessible by a host data processing system connected to the network by connection to the network controller.

62. The communication system according to claim 61 above, wherein the communication system includes means for providing communication through the system for access to said stores and said memories by the host data processing system.

63. A communication system connected to provide bidirectional communication between at least one terminal device and a host data processor, the system comprising a plurality of programmable network data processors connected between the terminal and the host data processor, each network data processor being coupled to execute instructions stored in a program memory, a plurality of addressable program memories, each program memory being coupled to a network data processor and storing instructions to be executed by the coupled network data processor, and each network data processor responding to an address code that is uniquely associated with the network data processor contained within a message being communicated through the network by executing a command contained within said address code containing message which command does not specify the routing through the system of the message containing the command.

64. The communication system according to claim 63 above, wherein each network data processor further includes a stored routing table that is accessible by the instruction execution device in response to a message address code other than said unique address code and stores information indicating one of at least two different paths over which a message might be passed on, each network data processor being operable in response to said stored instructions to obtain indicating information from the routing table and in response thereto to control the passing on of a message that does not contain the unique address of the network data processor.

65. The communication system according to claim 63 above, wherein each message that is communicated through the network contains supervision decision information indicating whether the message is a supervision message unique to an addressable network data processor or a data message unique to a given terminal device, and wherein at least one of said network data processors is a terminal exchange unit network data processor which is operable to communicate to a terminal device connected thereto a message passing through the network and containing the unique address code of the terminal exchange unit network data processor and to receive messages from the terminal device and insert the unique address code of the terminal exchange unit network data processor in the message and pass the message along the network.

66. A digital data communication system comprising a plurality of programmable network data processors connected to bidirectionally convey data between a communication link and a host data processor and between the communication link and at least one terminal device, each network data processor including means for executing a stored program, an addressable data store that is directly accessible only by the program execution means within the network data processor, each network data processor having an address assigned thereto that is unique within the network and being responsive to certain assigned address containing messages communicated through the network to read information including information other than terminal data being communicated through the network from the data store and send the information that is read through the communication system and being responsive to certain other assigned address containing messages communicated through the network to write into its data store information including information other than terminal information communicated through the network contained within the certain other messages.

67. A communication system according to claim 66 above, wherein each network data processor is further coupled to addressably access a multiple port data store that is shared with at least one other network data processor and is further responsive to said certain message to write information into said multiple port data store and is further responsive to said certain other messages to read information from the multiple port data store and send the information that is read through the network.

68. The communication system according to claim 66 above, wherein the information included within said certain messages can include program information and wherein the execution means is operative to execute the programs communicated in said certain messages.

69. The communication system according to claim 68 above, further comprising a host data processor coupled to send a plurality of said certain messages containing program information to a plurality of different network data processors by a host data processor, thereby controlling said communication network to provide operation thereof as a multiprocessor.

70. A digital data communication system comprising a plurality of network data processors coupled to pass data messages through the system along paths determined by address information contained in the messages, each system data processor having an address associated therewith that is unique to the system and being operative to execute program instructions commanded by messages passing through the normal data carrying facilities of the network and which also contain the associated address of the network data processor and information indicating that the instructions are to be executed.

71. A communication system according to claim 70 above, wherein each network data processor is operative to communicate through the network results of executing program instructions, the network being thereby operable as a multiprocessor system under control of a host data processor system.

72. A communication system according to claim 71 above, further comprising a network console coupled to receive operator commands and being operative in response thereto (a) to generate and send through the system messages commanding selected network data processors to execute selected instructions, (b) to receive information generated by the selected network data processors as a result of executing the selected instructions, and (c) communicate to an operator information generated as a result of execution of the selected instructions.

73. The communication system according to claim 72 above, wherein each said network data processor includes read only storage containing instructions that may be executed by the network data processor in response to messages received through the communication system which contain the associated address.

74. A communication system according to claim 71 above, comprising at least 25 of said network data processors.

75. A data communication system comprising a line master exchange unit device coupled for bidirectional communication of messages between a host data processor and a four ended duplex communication link carrying messages through first and second simplex communication links in opposite directions, the line master exchange unit device being operable to test the integrity of the first and second simplex communication links and upon detecting a fault, to isolate the fault by communicating to a line exchange unit device coupled to the first and second simplex communication links a reconfiguration message; first and second simplex communication links carrying information in opposite directions therethrough, each forming a loop that begins and ends at the line master exchange unit device; a plurality of line exchange unit devices, each being coupled to the first and second simplex communication links and to at least one other communication link and being operable to selectively route messages along and between the communication links coupled thereto in response to address information contained in the messages, each line exchange unit device being responsive to a reconfiguration message directed thereto to selectively route messages received on one of said first and second communication links to either the other of the first and second communication links or to a one other communication link coupled to the line exchange unit device, thereby providing a third simplex communication link comprising a portion less than the whole of the first simplex communication link and a portion less than the whole of the second simplex communication link.

76. A communication system according to claim 75 above, wherein the duplex communication link is a digital data service long distance data link.

77. A communication system according to claim 75 above, wherein the line master exchange unit device is operable to test the integrity of the first and second simplex communication links by periodically sending a test message around each of the first and second communication links, checking for arrival of a test message at a receiving end of a simplex communication link within a selected period of time after it is sent and determining that a fault exists if a test message does not arrive at the receiving end within the selected period of time a selected plurality of times in succession.

78. A communication system according to claim 77 above, wherein the line master exchange unit device is operable to detect the location of a fault by sending sequential reconfiguration messages along the duplex communication link to determine the farthest away line exchange unit device that can provide continuity with respect to the sending end of the first simplex communication link and the receiving end of the second communication link and the farthest away line exchange unit device that can provide continuity with respect to the sending end of the second simplex communication link and the receiving end of the first communication link.

79. A communication system according to claim 78 above, wherein the line master exchange unit device is operable upon detection of a fault to convert the duplex communication link into two simplex communication links servicing different line exchange unit devices by sending reconfiguration messages which isolate the fault.

80. A digital data communication system comprising a line master exchange unit device coupled for bidirectional communication with a netmaster and with a plurality of addressable terminal exchange unit devices coupling the system to a communicating device through at least one data path; a netmaster including means for periodically issuing an all call message containing unique identifier information permitting the message to be identified as an all call message to each path which leads to a terminal exchange unit device; a plurality of terminal exchange unit devices having mutually exclusive addresses associated therewith coupled for bidirectional communication with the netmaster, each terminal exchange unit device including circuitry connected to recognize the receipt of an all call message and to respond to the receipt of an all call message by sending toward the netmaster an all call response status message containing the mutually exclusive address associated therewith, the status message being delayed relative to receipt of a preceding all call message by a period of time dependent upon the address associated with the terminal exchange unit device.

81. A data communication system according to claim 80 above, wherein the all call response status message includes information indicating a quantity of data which arrived at the responding terminal exchange unit device since the preceding all call response status message.

82. A data communication system according to claim 80 above, wherein the all call response status message includes information indicating the number of data transmission errors that have occurred since the preceding all call response.

83. The data communication system according to claim 80 above, further comprising at least one addressable node device having an address associated therewith and being coupled for bidirectional communication with the line master exchange unit device and for bidirectional communication along separate data paths with at least two different terminal exchange unit devices, each addressable node device including circuitry which operates upon receipt of an all call message from the line master exchange unit device to send the all call message along each path leading toward a terminal exchange unit device, which operates upon receipt of an all call message to send over the communication network toward the line master exchange unit device an all call response status message including the associated address of the addressable node device, which operates upon receipt of an all call response message from along a path leading toward a terminal exchange unit device to store an associative relationship between each different address contained in all call response messages received over paths leading toward a terminal exchange unit device and the particular path over which an address containing all call response message is received, and which is operable to forward address containing messages received along the network from the line master exchange unit device along a particular path leading toward a terminal exchange unit device determined by the store associative relationship.

84. The data communication system according to claim 83 above, wherein the netmaster further includes a stored table of accumulated information from all call response messages from each addressable device in the communication system.

85. A digital communication system comprising a network controller and a plurality of addressable node devices coupled to carry messages to and from the network controller to form the communication system, each addressable node device having an address associated therewith which is unique to the system, each addressable node device being operable upon receipt of an all call message to send toward the network controller over the system an all call response message containing the unique address of the node device, node devices which are coupled between the network controller and other addressable node devices further including a table of associative relationships between addresses contained within all call response messages and system data paths over which the all call response messages are received, the table being used to select a path over which an address containing message from the network controller to an addressable node device is forwarded.

86. The communication system according to claim 85 above, wherein the network controller further includes timing circuitry causing an all call message to be issued approximately every 22 seconds.

87. The communication system according to claim 85 above, wherein each addressable node device further includes timing circuitry causing the node to issue an all call response message a selected time period after receipt of an all call message, the selected time period being linearly proportional to a magnitude of the unique address associated therewith.

88. A communication network comprising a plurality of decision making devices coupled to provide communication between a plurality of communicating devices which communicate with one another by sending through the network information messages including at least one block of data having a beginning, a middle and an end with address information identifying a recipient of the block being located at the beginning thereof, each decision making device including circuitry connected to receive a beginning portion of a block of data, to make a decision in response to the address information to determine a proper path over which the block should be forwarded, to begin forwarding the beginning of the block over the determined path before the middle of the block is received, and to continue forwarding the remainder of the block over the determined path until the end of the block has been forwarded.

89. A communication network according to claim 88 above, further comprising at least one serial communication link connected between a pair of decision making devices, the serial communication link forming a path over which a block of data may be forwarded.

90. A communication network according to claim 88 above, wherein each block of data includes a maximum of 216 bits with the address information being located within the first 24 bits.

91. A communication network according to claim 90 above, wherein the address information is located within the first 16 bits.

92. A communication network according to claim 90 above, wherein each block of information may be a small block having a given length or a large block having a length twice the given length.

93. A communication network according to claim 92 above, wherein each large block comprises first and second small blocks, each having the given length, the address information being contained only in a first small block of a large block.

94. The communication network according to claim 93 above, wherein each first small block contains information near the beginning thereof indicating that it is a first small block of a long block, wherein each second small block contains information near the beginning thereof indicating that it is a second small block, wherein each small block contains information near the beginning thereof indicating whether it is a single or double small block, wherein at least one small block may be interposed between the communication over the network of first and second small blocks of a long block, and wherein each decision making device is operative in response to information contained within each small block to properly forward the small block over a proper communication path.

95. A communication network comprising:
a plurality of terminal nodes, each including a buffer data store and terminal node control circuitry coupled to receive data on a block by block basis over a communication link from a line master exchange unit device at a first data rate and store received data in the buffer data store and coupled to transfer received data from the buffer data store to a terminal at a second data rate slower than the first data rate;
a line master exchange unit device including a large data store having a buffer data store corresponding to each of said terminal nodes, a parameter store storing a buffer content parameter for each of said terminal nodes, and exchange unit control circuitry coupled to receive terminal node data on a block by block basis and store the data in a buffer data store corresponding to a destination terminal node for the data, the exchange unit control circuitry being operative to maintain the buffer content parameter for a given terminal node at a value reflecting the amount of data stored in the buffer data store at the given terminal node and to send data over the communication link from the large data store to the terminal nodes on a block by block basis with a terminal node being selected to receive a next block of data on the basis of the selected terminal node having a smallest buffer content parameter from among those terminal nodes for which data is stored in the large data store; and
a communication link coupled to carry data between the line master exchange unit device and the terminal nodes.

96. The communication network according to claim 95 above, wherein the exchange unit control circuitry is operative to maintain the buffer content parameter for each given terminal node by increasing the parameter as data is sent to the terminal node to reflect the quantity of data sent and by decreasing the parameter at the second data rate for the terminal node.

97. The communication network according to claim 96 above, wherein the control circuitry for each terminal node is operative to send over the communication link supervision messages to the line master exchange unit device carrying information indicating the second data rate for the terminal connected thereto and wherein the line master exchange unit device includes data storage for storing the second data rate indicating information for use by the exchange unit device control circuitry in maintaining the buffer content parameters.

98. The communication network according to claim 95 above, wherein the communication link includes a communication loop beginning and ending with the line master exchange unit device and including a plurality of exchange unit devices connected in the loop, each exchange unit device being coupled to at least one terminal node.

99. The communication network according to claim 98 above, wherein the communication link further includes a second communication loop beginning and ending with one of said exchange unit devices, a plurality of said terminal nodes being connected along the second loop.

100. The communication network according to claim 99 above, wherein a coaxial cable carries communications along the second loop.

101. The communication network according to claim 95 above, further comprising a network controller connected to provide communication between the line master exchange unit device and a host data processing system, the network controller being operable to issue commands through the communications network to terminal nodes commanding the terminal nodes to provide information relating to terminal node activity and to store responses to the commands received through the network, the terminal node control circuitry receiving commands through the network from the network controller and providing information relating to the terminal node activity through the network to the controller in response thereto.

102. The communication network according to claim 95 above, wherein the line master exchange unit device is further coupled for bidirectional communication with a host data processing system, and is operative to inform the host data processing system when space is available for storage of a message for a terminal node in a data store corresponding thereto in the large data store and wherein the host data processing system is operative to send a message for a given terminal only when the availability of a data store corresponding to the associated terminal node in the large data store has been indicated by the line master exchange unit device.

103. A communication system comprising:
first and second pluralities of node devices, each node device including a data store with program information stored therein and a data processor coupled to execute the stored program information, the first plurality being disposed at a first physical site and the second plurality being disposed at a second physical site remote from the first physical site, at least one node device of each of the first and second pluralities being coupled for communication with a data device;
a first writeable and readable data store disposed at the first site and having a first port coupled to a first node device of the first plurality and a second port coupled to a different, second node device of the first plurality to enable the coupled node devices to write data into and read data from the first data store, the writing of data into the first data store by one of said first plurality first and second node devices and the reading of data from the first data store by the other being the sole means of communication between the first and second node devices of the first plurality;
a second writeable and readable data store disposed at the second site and having a first port coupled to a first node device of the second plurality and a second port coupled to a different, second node device of the second plurality to enable the coupled node devices to write data into and read data from the second data store, the writing of data into the second data store by one of said second plurality first and second node devices and the reading of data from the second data store by the other being the sole means of communication between the first and second node devices of the second plurality; and at least one communication channel segment coupled to provide communication between the first node device at the first site and the first node device at the second site.

104. A parallel processing system comprising:

first and second pluralities of system addressable programmable processors, each processor including processor addressable data storage for program information that can be executed by the processor, the first and second pluralities being physically remote from each other, each processor being operable in response to a net control write message containing the system address thereof to write message contained data into the data storage at processor address locations identified by the message and to communicate messages that do not contain the system address thereof to another processor; and a controller coupled for communication with the programmable processors of the first and second pluralities, the controller being operable to send to the processors of the system net control write messages which command a selected processor to execute selected program instructions.

105. The processing system according to claim 104 above, wherein the controller is further operable to send to an addressable processor a net control read message including a system address of the processor and an indication of processor address storage locations which are to be read, and wherein each processor is operative to respond to the receipt of a net control read message containing the system address thereof by issuing to the controller a net control response message indicating the system address of the processor and the contents of the processor address storage locations indicated by the net control read message.

106. The processing system according to claim 105 above, wherein all communications between the controller and a processor are in a given fixed length data block format.

107. The processing system according to claim 105 above, further comprising a serial data link coupled to provide communication between the first and second pluralities of processors.

108. The method of communicating data through a communication system including a plurality of communicating nodes, some of which are physically contiguous and some of which are physically remote and coupled by a serial data link, some of the nodes being addressable terminal nodes located at a source or destination of communicated data, the method comprising the steps of:

assembling data of a message to be communicated into at least one data block, each data block having a given fixed length format, each data block including an address identifying a node at an end point of the communication;

communicating the message through a plurality of nodes of the system from node to node to the identified node on a block by block basis with the communication path and timing of each block of a message being independent of any other block of the same message.

109. The method of communicating data according to claim 108 above, wherein the system includes a line master exchange unit device having a first store for holding a complete message in block form and wherein each terminal node includes a second store for holding a complete message in block form, wherein the step of assembling further includes the step of including in each block of data a position number indicating a sequential position of the block within a message and wherein the step of communicating includes the steps of storing the message in the first store, communicating the message through the system on a block by block basis from the first store to the terminal node indicated by the address of each block and storing the blocks of the message in the second store in the order indicated by the position number.

110. The method of communicating data according to claim 109 above, wherein the step of communicating further includes the step of terminating further execution of the step of communicating the message to the system upon sending the last block of a message or upon receiving at the line master exchange unit device an error message from the terminal node receiving the message, said error message indicating that an error has occurred in the communication of the message, and the step of sending an error message through the system in the given format when an error is detected in the message as it is received at the terminal node.

111. The method of communicating data according to claim 110 above, wherein the step of sending an error message further includes the step of placing in the error message a position number indicating a last of a complete sequence of blocks of data of the message received error free at the terminal node and comprising the further step of recommunicating a message on a block by block basis from the first store to a terminal node indicated by the address included in the block of the message in response to receipt by the line master exchange unit device of an error message, the recommunication beginning with the next sequential data block of a message following the data block indicated by the position number placed in the message.

112. The method of communicating data according to claim 108 above, wherein the step of communicating includes the step of sending each block of data through the serial data link coupling physically remote nodes on a threadthrough basis in which the address portion of a data block is sent near the beginning thereof and a receiving node response to the address by beginning a forwarding of a received data block before the entire data block is received over the serial data link.

113. The method of communicating data according to claim 112 above, wherein the step of sending includes the step of first transforming each block into a plurality of predetermined fixed link small blocks and then sending only the minimum number of small blocks required to carry all of the actual data of a block and retransforming the small block to a block upon removal of data from the serial data link.

* * * * *

UNITED STATES PATENT AND TRADEMARK OFFICE
CERTIFICATE OF CORRECTION

PATENT NO. : 4,156,798

DATED : May 29, 1979

INVENTOR(S) : Melvin L. Doelz

It is certified that error appears in the above-identified patent and that said Letters Patent are hereby corrected as shown below:

Column 5, line 68, strike entire line. Column 6, line 42, after "Implementation" strike "the". Column 7, line 8, after "Message" and before "Output", "ABORTM)" should read --(ABORTM)--; line 62, after "and" and before "which", "28" should read --18--. Column 8, line 10, after "30." strike "12, 14, 16"; line 17, after "46" and before "47" insert a comma (--,--); line 51, after "79", "90" should read --80--. Column 10, line 34, after "input" strike "115" and insert --and--; line 43, "RAMA[0.25K]" should read --RAM[.25K]--. Column 12, line 11, "art" should read --part--; line 31, after "next write", "(NR)" should read --(NW)--; line 43, after "the next" insert --read--; line 53, after "lowest number", "of" should read --or--. Column 13, line 24, "poiner" should read --pointer--. Column 14, line 60, after "in a 24" strike "a". Column 15, line 56, after "a" and before "nonaddressable", "sngle" should read --single--. Column 16, line 28, after "172," and before "is", "wich" should read --which--. Column 18, line 5, after "module" and before "BNADR", "signated" should read --designated--; line 43, "ROMA[0.5K]" should read --RAMA[0.5K]--. Column 19, line 4, after "queue" and before "191", "PDQE" should read --FDQE--. Column 22, line 42, after "signal" and before "and", "DAOUT" should read --DAOUT--; line 43, after "signal" and before "to", "DAOUT" should read --DAOUT--. Column 23, line 48, after "inserted" and before "next", "inthe" should read --in the--. Column 25, line 7, after "nated" and before ", a", "ENPROM" should read --EDNPROM--; line 8, before ", a", "ENDBUSX" should read --EDNBUSX--; line 13, after "messages", "ALCAM" should read --ALCALM--. Column 27, line 24, after "within" and before "308", "CHIm" should read --CHIM--. Column 29, line 25, after "input" and before "is", "G" should read --$\overline{G}$--; line 51, after "344" and before

UNITED STATES PATENT AND TRADEMARK OFFICE
CERTIFICATE OF CORRECTION

PATENT NO. : 4,156,798

DATED : May 29, 1979

INVENTOR(S) : Melvin L. Doelz

It is certified that error appears in the above-identified patent and that said Letters Patent are hereby corrected as shown below:

"346", "and" should read --or--. Column 30, line 9, after "array" and before "where", "selectio" should read --selection--. Column 33, line 58, after "coax" and before "454", "tranceiver" should read --transceiver--. Column 34, line 58, after "a" (first occurrence) and before "signal", strike "a". Column 39, line 41, after "its" and before "/output", "intput" should read --input--; line 60, after "DO" and before "CO", "aND" should read --and--. Column 42, line 67, after "for" and before "use", "intrnal" should read --internal--. Column 43, line 30, after "double" and before "block" insert --small--; line 46, after "the" and before "of", "block" should read --blocks--; line 47, after "up" and before "15", "tp" should read --to--; line 67, after "carries" and before "No.", "messag" should read --message--; line 68, after "byte" and before "3", "positions" should read --position--. Column 44, line 9, after "is", "related" should read --relayed--; line 10, after "54" and before "and", "456" should read --56--; line 33, after "node" and before "174", "LM06N" should read --LM96N--; line 68, after "in" and before "NMINQ", "quene" should read --queue--. Column 45, line 17, after "blocks" and before "be", "my" should read --may--; line 48, after "output data" and before "or", "messsge" should read --message--; line 57, after "tains" and before "in", "1, 0, 0, 1, 0" should read --1, 0, 0, 0, 1, 0--. Column 46, line 19, after "down" and before "227", "quenes" should read --queues--. Column 47, line 7, after "a" and before "terminal", "dentination" should read --destination--; line 26, before "problem", "not" should read --no--; line 40, after "Message", "(EEQSTM)" should read --(REQSTM)--; line 54, after "usage" and before "is", "examle" should read --example--. Column 48, line 37, after "the" and

UNITED STATES PATENT AND TRADEMARK OFFICE
CERTIFICATE OF CORRECTION

PATENT NO. : 4,156,798

DATED : May 29, 1979

INVENTOR(S) : Melvin L. Doelz

Page 3 of 4

It is certified that error appears in the above-identified patent and that said Letters Patent are hereby corrected as shown below:

before "data", "hose" should read --host--; line 37, after "12" and before "communication", "which" should read --while--; line 62, after "over", "on" should read --one--; line 65, after "The" and before "direction", "lookback" should read --loopback--. Column 49, line 6, after "3", "in" should read --is--; line 37, after "message" and before "does" insert --and--; line 39, after "message" and before "normal" insert --during--; line 48, after "3" and before "35", "to" should read --is--; line 54, after "the" and before "node", "net-master" should read --netmaster--. Column 50, line 59, after "the" and before "address", "nodes" should read --node--; line 62, after "3" and before "37", "to" should read --is--. Column 51, line 28, after "byte" and before "0-22", "position" should read --positions--; line 43, after "to" and before "call" insert --all--. Column 53, line 12, after "devices" and before "to", "62" should read --64--. Column 54, line 39, after "byte" and before "8", "positions" should read --position--. Column 63, line 7, after "are" and before "by", "connected" should read --interconnected--; line 62, after "OE96NW" and before "It", "modes" should read --nodes--. Column 64, line 33, after "input" and before "message", "daa" should read --data--. Column 65, line 9, after "netmaster" and before "node", "iferface" should read --interface--; line 45, after "upon" and before "an", "receving" should read --receiving--. Column 66, line 65, after "control" and before "messages", "wrire" should read --write--. Column 67, line 1, after "console" and before "the", "released" should read --releases--. Column 68, line 11, after "to" and before "call" (second occurrence), "call" (first occurrence) should read --all--; line 25, after "the" and before "B96BN", "mode" should read --node--; line 63, after "B96BN" insert --170--. Column 69, line 8, after

UNITED STATES PATENT AND TRADEMARK OFFICE
CERTIFICATE OF CORRECTION

PATENT NO. : 4,156,798

DATED : May 29, 1979

INVENTOR(S) : Melvin L. Doelz

Page 4 of 4

It is certified that error appears in the above-identified patent and that said Letters Patent are hereby corrected as shown below:

"passed" and before "through", "downwardly" should read --downward--.  Column 70, line 8, after "block" and before "acknowledgement", insert --set--.  Column 71, line 8, after "nearest" and before "either", "unitl" should read --until--.  Column 72, line 12, after "agree", strike the comma (",").  Column 78, line 33, after "the" and before "for", "channeel" should read --channel--; line 34, after "to" and before "line", "he" should read --the--.  Column 79, line 62, before "all", "As" should read --An--.  Column 82, line 58, after "LM96N" insert --SIDE--; line 58, after "0C00", "OCFF" should read --0CFF--.  Column 83, line 50, after "LEAST SIG." insert --BYTE--.  Column 166, line 53, after "block" and before "each" insert a comma (--,--).  Column 167, line 52, after "an" and before "by", "eror" should read --error--.

Signed and Sealed this

Twenty-third Day of October 1979

[SEAL]

Attest:

RUTH C. MASON
Attesting Officer

LUTRELLE F. PARKER
Acting Commissioner of Patents and Trademarks